Oct. 11, 1966 G. L. SHELTON, JR., ET AL 3,278,899

METHOD AND APPARATUS FOR SOLVING PROBLEMS, E.G., IDENTIFYING SPECIMENS, USING ORDER OF LIKENESS MATRICES

Filed Dec. 18, 1962 45 Sheets-Sheet 1

INVENTORS
GLENMORE L. SHELTON, JR.
LAWRENCE P. HORWITZ

BY

Lester W. Clark
ATTORNEY

FIG. 5a

| ELEMENTS | SQUARES | REPEATS | SUB-TOTALS OF SQUARED ELEMENTS |
|---|---|---|---|
| 1 | 1 | 2 | 2 |
| 2 | 4 | 2 | 8 |
| 3 | 9 | 2 | 18 |
| 4 | 16 | 2 | 32 |
| 5 | 25 | 2 | 50 |
| 6 | 36 | 2 | 72 |
| 7 | 49 | 2 | 98 |
| 8 | 64 | 2 | 128 |
| 9 | 81 | 1 | 81 |

$$\Sigma = 489$$

$$\sqrt{\Sigma} = 22.1$$

$$\text{NORMALIZING FACTOR} = \frac{1}{22.1} = 0.045$$

FIG. 5b

| ELEMENTS | SQUARES | REPEATS | SUB-TOTALS OF SQUARED ELEMENTS |
|---|---|---|---|
| 1 | 1 | 34 | 34 |
| 2 | 4 | 26 | 104 |
| 3 | 9 | 18 | 162 |
| 4 | 16 | 10 | 160 |
| 5 | 25 | 4 | 100 |
| 6 | 36 | 4 | 144 |
| 7 | 49 | 2 | 98 |
| 8 | 64 | 2 | 128 |
| 9 | 81 | 2 | 162 |
| 17 | 289 | 1 | 289 |

$$\Sigma = 1381$$

$$\sqrt{\Sigma} = 37.2$$

$$\text{NORMALIZING FACTOR} = \frac{1}{37.2} = 0.027$$

FIG. 6

| COMPUTATION OF $G_{1,1}$ | | | |
|---|---|---|---|
| E of $D_1$ | F of $Z_1$ | REPEATS | SUB-TOTALS |
| 1 | .045 | 2 | 0.090 |
| 2 | .090 | 2 | 0.360 |
| 3 | .14 | 2 | 0.84 |
| 4 | .18 | 2 | 1.4 |
| 5 | .23 | 2 | 2.3 |
| 6 | .27 | 2 | 3.2 |
| 7 | .32 | 2 | 4.5 |
| 8 | .36 | 2 | 5.8 |
| 9 | .41 | 1 | 3.7 |
| | | | 22.190= |
| | | | $G_{1,1}$ = 1.00 |

FIG. 7

| COMPUTATION OF $G_{1,4}$ | | | |
|---|---|---|---|
| E of $D_1$ | F of $Z_4$ | REPEATS | SUB-TOTALS |
| 1 | .027 | 2 | 0.054 |
| 2 | .054 | 2 | 0.216 |
| 3 | .081 | 2 | 0.486 |
| 4 | .11 | 2 | 0.88 |
| 5 | .13 | 2 | 1.3 |
| 6 | .19 | 2 | 2.3 |
| 7 | .22 | 2 | 3.1 |
| 8 | .24 | 2 | 3.8 |
| 9 | .46 | 1 | 4.1 |
| | | | 16.236= |
| | | | $G_{1,4} = \frac{16.2}{22.2} = 0.73$ |

FIG.8

| COMPUTATION OF $G_{4,4}$ | | | |
|---|---|---|---|
| E of $D_4$ | F of $Z_4$ | REPEATS | SUB-TOTALS |
| 1 | .027 | 34 | 0.92 |
| 2 | .054 | 26 | 2.7 |
| 3 | .081 | 18 | 4.4 |
| 4 | .11 | 10 | 4.3 |
| 5 | .13 | 4 | 2.7 |
| 6 | .16 | 4 | 3.9 |
| 7 | .19 | 2 | 2.7 |
| 8 | .22 | 2 | 3.5 |
| 9 | .24 | 2 | 4.4 |
| 17 | .46 | 1 | 7.8 |
| | | | 37.32= |
| | | | $G_{4,4}$ = 1.00 |

FIG.9

| COMPUTATION OF $G_{4,1}$ | | | |
|---|---|---|---|
| E of $D_4$ | F of $Z_1$ | REPEATS | SUB-TOTALS |
| 1 | .045 | 2 | 0.090 |
| 2 | .090 | 2 | 0.36 |
| 3 | .14 | 2 | 0.84 |
| 4 | .18 | 2 | 1.4 |
| 5 | ,23 | 2 | 2.3 |
| 7 | .27 | 2 | 3.8 |
| 8 | .32 | 2 | 5.1 |
| 9 | .36 | 2 | 6.5 |
| 17 | .41 | 1 | 6.9 |
| | | | 27.290= |
| | | | $G_{4,1} = \frac{27.3}{37.3} = 0.73$ |

FIG. 10

REFERENCE MATRIX 26 28

| | | | | | | | | | | |
|---|---|---|---|---|---|---|---|---|---|---|
| $G_{1,n}$ | 1 | 4 | 0 | 9 | 5 | 6 | 7 | 8 | 2 | 3 |
| n=9} n=0 | 1.00 | .73 | .57 | .54 | .54 | .53 | .52 | .50 | .49 | .46 |
| $G_{2,n}$ | 2 | 7 | 3 | 6 | 9 | 8 | 5 | 4 | 0 | 1 |
| n=9} n=0 | 1.00 | .92 | .89 | .89 | .88 | .87 | .87 | .82 | .78 | .49 |
| $G_{3,n}$ | 3 | 2 | 5 | 8 | 6 | 9 | 4 | 7 | 0 | 1 |
| n=9} n=0 | 1.00 | .89 | .89 | .86 | .86 | .84 | .81 | .81 | .75 | .46 |
| $G_{4,n}$ | 4 | 6 | 5 | 9 | 8 | 2 | 7 | 3 | 0 | 1 |
| n=9} n=0 | 1.00 | .91 | .88 | .88 | .86 | .82 | .82 | .81 | .77 | .73 |
| $G_{5,n}$ | 5 | 8 | 3 | 4 | 2 | 6 | 9 | 7 | 0 | 1 |
| n=9} n=0 | 1.00 | .91 | .89 | .88 | .87 | .87 | .85 | .83 | .79 | .54 |
| $G_{6,n}$ | 6 | 9 | 4 | 8 | 7 | 2 | 5 | 3 | 0 | 1 |
| n=9} n=0 | 1.00 | .97 | .91 | .89 | .89 | .89 | .87 | .86 | .77 | .53 |
| $G_{7,n}$ | 7 | 2 | 6 | 9 | 5 | 8 | 4 | 3 | 0 | 1 |
| n=9} n=0 | 1.00 | .92 | .89 | .87 | .83 | .83 | .82 | .81 | .77 | .52 |
| $G_{8,n}$ | 8 | 5 | 6 | 9 | 2 | 3 | 4 | 0 | 7 | 1 |
| n=9} n=0 | 1.00 | .91 | .89 | .89 | .87 | .86 | .86 | .84 | .83 | .50 |
| $G_{9,n}$ | 9 | 6 | 8 | 4 | 2 | 7 | 5 | 3 | 0 | 1 |
| n=9} n=0 | 1.00 | .97 | .89 | .88 | .88 | .87 | .85 | .84 | .77 | .54 |
| $G_{0,n}$ | 0 | 8 | 5 | 6 | 4 | 7 | 9 | 2 | 3 | 1 |
| n=9} n=0 | 1.00 | .84 | .79 | .77 | .77 | .77 | .77 | .78 | .75 | .57 |

Oct. 11, 1966 G. L. SHELTON, JR., ET AL 3,278,899

METHOD AND APPARATUS FOR SOLVING PROBLEMS, E.G., IDENTIFYING SPECIMENS, USING ORDER OF LIKENESS MATRICES

Filed Dec. 18, 1962 45 Sheets-Sheet 16

AUTO CORRELATION ELEMENT GENERATOR (E GENERATOR)

Oct. 11, 1966 G. L. SHELTON, JR., ET AL 3,278,899

METHOD AND APPARATUS FOR SOLVING PROBLEMS, E.G., IDENTIFYING SPECIMENS, USING ORDER OF LIKENESS MATRICES

Filed Dec. 18, 1962 45 Sheets-Sheet 19

Oct. 11, 1966 G. L. SHELTON, JR., ET AL 3,278,899

METHOD AND APPARATUS FOR SOLVING PROBLEMS, E.G., IDENTIFYING SPECIMENS, USING ORDER OF LIKENESS MATRICES

Filed Dec. 18, 1962 45 Sheets-Sheet 20

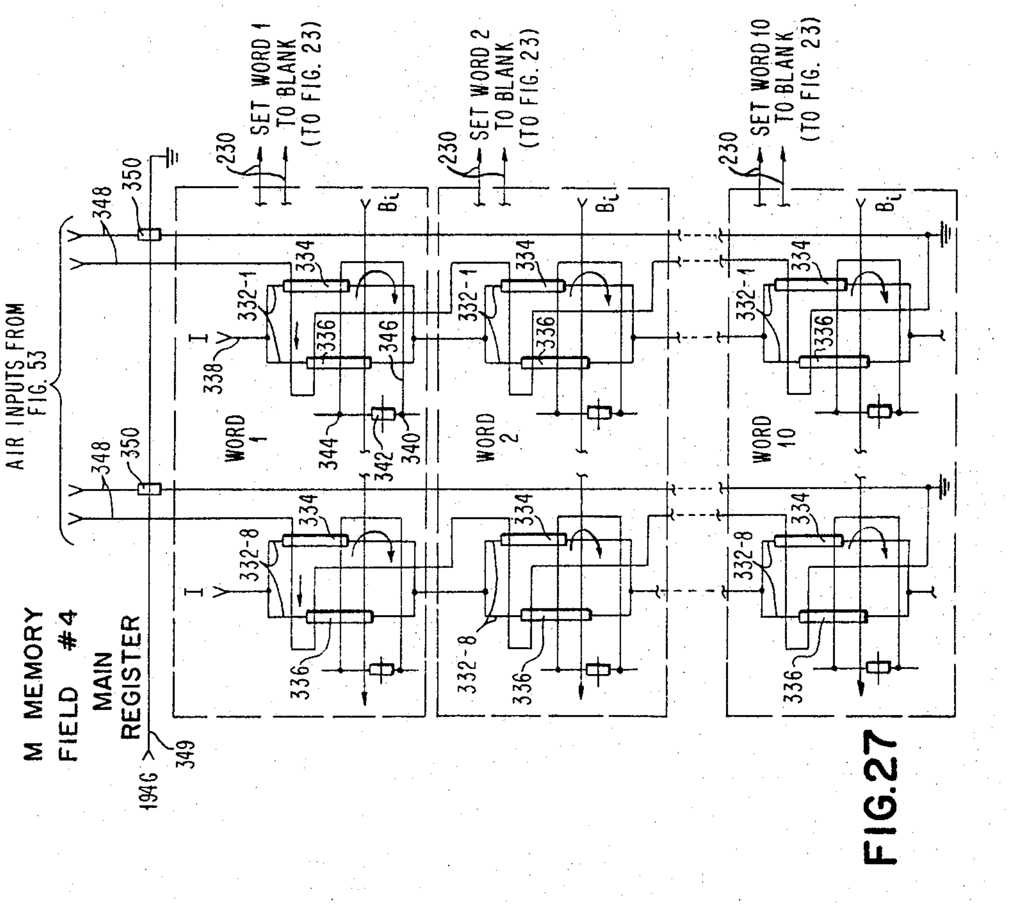
FIG.27
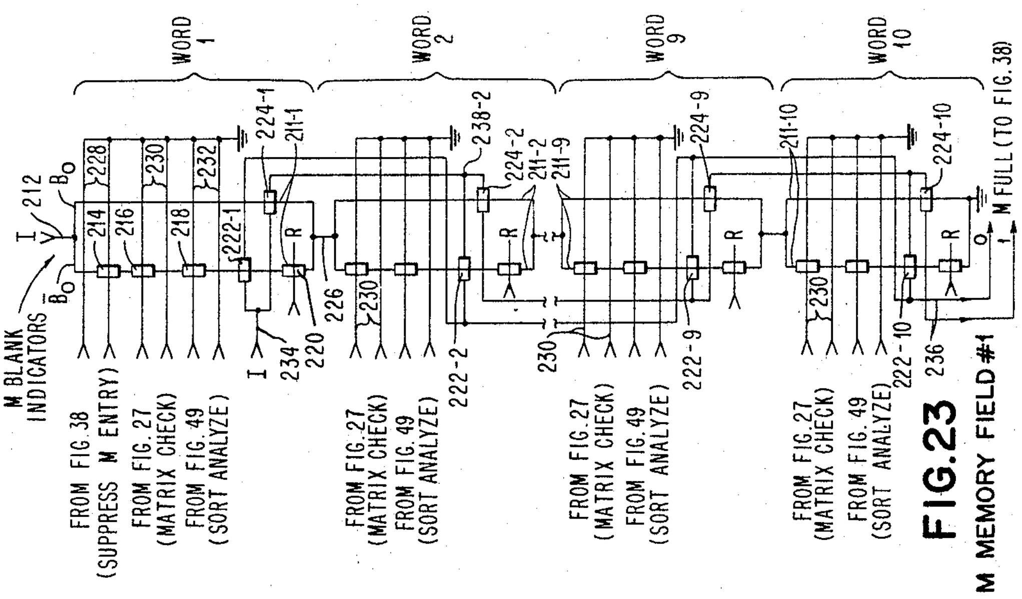
FIG.23 M MEMORY FIELD #1

Oct. 11, 1966 G. L. SHELTON, JR., ET AL 3,278,899

METHOD AND APPARATUS FOR SOLVING PROBLEMS, E.G., IDENTIFYING SPECIMENS, USING ORDER OF LIKENESS MATRICES

Filed Dec. 18, 1962 45 Sheets-Sheet 25

MULT/ADD UNIT

Oct. 11, 1966 G. L. SHELTON, JR., ET AL 3,278,899

METHOD AND APPARATUS FOR SOLVING PROBLEMS, E.G., IDENTIFYING SPECIMENS, USING ORDER OF LIKENESS MATRICES

Filed Dec. 18, 1962 45 Sheets-Sheet 28

Oct. 11, 1966 G. L. SHELTON, JR., ET AL 3,278,899

METHOD AND APPARATUS FOR SOLVING PROBLEMS, E.G., IDENTIFYING SPECIMENS, USING ORDER OF LIKENESS MATRICES

Filed Dec. 18, 1962 45 Sheets-Sheet 29

Oct. 11, 1966 G. L. SHELTON, JR., ET AL 3,278,899

METHOD AND APPARATUS FOR SOLVING PROBLEMS, E.G., IDENTIFYING SPECIMENS, USING ORDER OF LIKENESS MATRICES

Filed Dec. 18, 1962 45 Sheets-Sheet 30

CLOCKS

Oct. 11, 1966 G. L. SHELTON, JR., ET AL 3,278,899

METHOD AND APPARATUS FOR SOLVING PROBLEMS, E.G., IDENTIFYING SPECIMENS, USING ORDER OF LIKENESS MATRICES

Filed Dec. 18, 1962 45 Sheets-Sheet 33

Oct. 11, 1966 G. L. SHELTON, JR., ET AL 3,278,899
METHOD AND APPARATUS FOR SOLVING PROBLEMS, E.G., IDENTIFYING SPECIMENS, USING ORDER OF LIKENESS MATRICES
Filed Dec. 18, 1962 45 Sheets-Sheet 34

Oct. 11, 1966 G. L. SHELTON, JR., ET AL 3,278,899

METHOD AND APPARATUS FOR SOLVING PROBLEMS, E.G., IDENTIFYING SPECIMENS, USING ORDER OF LIKENESS MATRICES

Filed Dec. 18, 1962

45 Sheets-Sheet 35

Oct. 11, 1966 G. L. SHELTON, JR., ET AL 3,278,899

METHOD AND APPARATUS FOR SOLVING PROBLEMS, E.G., IDENTIFYING SPECIMENS, USING ORDER OF LIKENESS MATRICES

Filed Dec. 18, 1962 45 Sheets-Sheet 37

Oct. 11, 1966 G. L. SHELTON, JR., ET AL 3,278,899
METHOD AND APPARATUS FOR SOLVING PROBLEMS, E.G., IDENTIFYING SPECIMENS, USING ORDER OF LIKENESS MATRICES
Filed Dec. 18, 1962 45 Sheets-Sheet 38

Oct. 11, 1966 G. L. SHELTON, JR., ET AL 3,278,899

METHOD AND APPARATUS FOR SOLVING PROBLEMS, E.G., IDENTIFYING SPECIMENS, USING ORDER OF LIKENESS MATRICES

Filed Dec. 18, 1962 45 Sheets-Sheet 43

United States Patent Office 3,278,899

Patented Oct. 11, 1966

3,278,899

METHOD AND APPARATUS FOR SOLVING PROBLEMS, e.g., IDENTIFYING SPECIMENS, USING ORDER OF LIKENESS MATRICES

Glenmore L. Shelton, Jr., Carmel, and Lawrence P. Horwitz, Chappaqua, N.Y., assignors to International Business Machines Corporation, New York, N.Y., a corporation of New York Filed Dec. 18, 1962, Ser. No. 245,581
26 Claims. (Cl. 340—146.3)

This invention relates to specimen identification apparatus and methods in which each unknown specimen is to be identified with one of a finite set of distinctively different reference patterns, even though the unknown specimens may differ somewhat from their corresponding reference patterns, as to size, shape or position within a field of observation. The invention is disclosed herein as applied to apparatus and methods for the recognition of numerical characters, where those characters may vary as to size or type font, or as to position within a field of observation. While the invention is of particular utility in connection with the recognition of characters, either numerical or alphabetical, it is applicable, in its broader aspects, to the recognition or identification of other specimens.

The problems of specimen identification are solved, in accordance with the present invention, by the use of certain novel problem solving methods and apparatus which are useful in connection with the solution of other problems.

The methods and apparatus of the embodiment of the present invention described herein utilize the order of likeness which is characteristic of a finite set of distinctively different ideal patterns. If a common property of any finite set of ideal patterns is measured with sufficient sensitivity in all the members of the set, and the measurements are compared, then the members of the set may be arranged in an order of likeness based on that comparison. For example, a set of several different coins may be arranged in an order of likeness based on a comparison of their diameters. That order of likeness may be used, as in coin sorters, to identify coins on the basis of their diameters.

For more complex sets of patterns, such as alphabetical and numerical characters, or photographs, the simple order of likeness described above is not effective as a basis for a method or apparatus of identification of unknown patterns. In any such complex set of patterns, the range of variation of a simple measured property such as a dimension is likely to be small as compared to the number of patterns in the set, so that the differences between the measurements are of the same order of magnitude as the probable errors in making the measurements. It has been proposed to overcome these difficulties by the use of two different principles: (1) by increasing the sensitivity of each measurement; and (2) by comparing the products of the measurements, taken two at a time, rather than the measurements themselves. Comparison of products effectively squares the range of variation, so that the differences between products are more readily recognizable.

Both of the two principles mentioned above are used in the specimen identification apparatus and methods disclosed and claimed in our copending application for United States Letters Patent, Serial No. 45,034, filed July 25, 1960, now Patent No. 3,196,392, issued July 20, 1965. In that apparatus and method, autocorrelation functions of specimens to be identified are compared with autocorrelation functions of reference patterns. The methods and apparatus of that application are illustrated therein as applied to recognition of a single font of characters.

It has now been discovered that, for any set of reference patterns to be used in the recognition of unknown specimens, a common property which may be a combination of simple properties) of the patterns may be measured and a set of comparison products (e.g., cross-correlation products, as shown herein) based on those measurements may be developed and arranged in a two-dimensional order of likeness matrix, in which the order of appearance in one dimension is arbitrary (e.g., numerical order) and the order of appearance in the other dimension is the order of magnitude of the products. Furthermore, it has been discovered that such an order of likeness matrix is invariant to all affine transformations (e.g., change of type size or some other changes of font) and many non-affine transformations of the original set of reference patterns. Consequently, in accordance with the present invention, the order of likeness matrix is made the basis of recognition of characters from fonts other than that of the reference patterns.

An affine transformation may be defined as one involving translation, rotation, stretching, shrinking, reflection, elongation, or compression, or products of those transformations.

Many properties other than cross-correlation products may be used to develop order of likeness matrices which are invariant to large groups of transformations.

In the order of likeness matrix each row represents the comparison products between one member of the set and all the members of the set, including the one member itself. Each item in the row measures the comparison of (a) the one member associated with that row with (b) either itself or one of the other members of the set. In such a matrix, the rows are arranged in an arbitrary sequence, e.g., in alphabetical or numerical order, as mentioned above.

If a set of unknown specimens is then observed, equal in number to the reference set, but each differing from its counterpart in the reference set by a common affine transformation, that same common property may be measured in the unknown specimens, and a similar order of likeness matrix may be established for the unknown specimens. This order of likeness matrix of the unknown specimens has each row identified with a particular unknown specimen, but the rows are in a random order rather than in alphabetical or numerical order. The new matrix must then be checked to determine the possibility of a rearrangement of the order of rows which will make the two matrices equivalent. If such an arrangement can be found, then each member of the unknown set corresponding to a particular row in the rearranged matrix may be identified with that member of the reference set which is represented by the same row in the order of likeness matrix of the set of reference patterns.

The statements in the preceding paragraph are true for all affine transformations of a set of ideal specimens, and also for many non-affine transformations. The presence of "noise" in the sensing mechanism may be regarded as a sort of non-affine transformation which, as long as it remains below a certain level, does not disturb the order of likeness of the specimens.

The present invention is described herein as applied to the methods and apparatus of Patent No. 3,196,392 mentioned above, although this invention is not necessarily limited to those methods and apparatus.

Any specimen may be expresed in terms of its autocorrelation function if the specimen is capable of being presented as a pattern of variation of a measurable property or properties across a field of observation.

The specimens selected for illustration herein are numerical characters, printed in black and appearing on a white background. The measurable property in these illustrative specimens is the quality of being black, and the only variation is in the presence or absence of that property in various parts of the observed area. The invention is useful, however, with specimens other than numerical or alphabetical characters. Furthermore, contrasts other than color contrasts may be employed, and degrees of contrast other than simple presence-or-absence may be useful in many cases.

To determine the autocorrelation function of a character, the character is presented to the apparatus described herein as a specimen consisting of contrasting foreground and background areas within a field of observation divided by a convenient set of coordinates (rectangular coordinates in the examples given) into a finite number of elemental areas (squares, in the examples). The autocorrelation function is based upon an arbitrary function of the specimen in which any elemental area containing part of a foreground area is considered black and is assigned the value "1." All other elemental areas are considered white and are assigned the value "0." Note that the word "specimen" is used to describe the complete field of observation including the background areas and foreground areas, while the word "character" describes the particular contour of foreground areas.

To illustrate the generation of an autocorrelation function, the specimen so presented may be considered as having a twin. The twin specimens are analyzed by considering one as shifted relative to the other along each of the coordinates, by increments corresponding in size to the dimensions of an elemental area, until all the possible overlapping positions of the twin specimens are exhausted. In each overlapping position, the specimens are compared for correlation between each pair of aligned elemental areas, and the products of the values of all the pairs of aligned areas are determined. Whenever the two aligned elemental areas are black on both twin specimens, the product is "1." Under all other conditions, the product is "0." The products are summed for all the overlapping elemental areas of the twin specimens, and that sum gives the value of the autocorrelation function for that particular overlapping position.

The autocorrelation function of a specimen may be expressed as a matrix of the summed products for all the overlapping positions of the twin specimens. That matrix is an array of locations, and includes a central location in which appears the sum of the products when normal and superimposed positions are aligned (which is equal to the sum of black elemental areas in the specimen). The maximum value in the matrix always appears at the central location, and the matrix is always symmetrical with respect to reflections through that central location.

To define the autocorrelation function matrix without resort to the "twin specimen" illustration used above, it may be stated that the value appearing in each location in the autocorrelation function matrix of a given specimen or reference pattern defines the number of pairs of black elemental areas separated by given distances in the two coordinate directions. The complete matrix gives the number of such pairs over all distances within the frame of reference, for both coordinate directions.

Let $(x, y)$ represent the cordinates of an elemental area within the field of observation and let $(x+x', y+y')$ represent the coordinates of another elemental area within the field and separated from the elemental area $(x, y)$ by $(x', y')$. Let $f(x, y)$ and $f(x+x')$ $(y+y')$ represent arbitrary functions as described above which have the value "1" when the elemental area located by $(x, y)$ or $(x+x')$ $(y+y')$ is black and the value "0" when the elemental area is white. Then the product $f(x, y)$ $f(x+x', y+y')=1$ only where both elemental areas are black. The autocorrelation function may then be defined as:

$$D(x', y')=\sum_{x, y} f(x, y)f(x+x', y+y')$$

where $(x', y')$ may vary throughout the field of observation. The summation for each set of values of $(x', y')$ provides the totality of the autocorrelation function for a particular location in the autocorrelation function matrix. It should be observed that, for any specimen, $D(x', y')$ is always at its maximum when $x'=0$ and $y'=0$, since there then exists the greatest possible correspondence between $f(x, y)$ and $f(x+x')$ $(y+y')$.

The term "correlation function" as used herein is a generic term including both autocorrelation functions and functions of autocorrelation functions.

The terms "product matrix" and "cross-correlation function" as used herein mean the point-by-point product of the corresponding points of two different correlation functions.

In our Patent No. 3,196,392 mentioned above, there are described specimen identification methods and apparatus involving the comparison of the autocorrelation function matrices of observed unknown specimens with the normalized autocorrelation functions of a set of reference patterns.

The normalized autocorrelation function matrix $Z(x', y')$ is obtained from the autocorrelation function matrix $D(x', y')$ by dividing the value appearing at each location in the latter matrix by the square root of the sum of the squares of all the values in the matrix. It may be expressed mathematically as:

$$Z(x', y')=\frac{D(x', y')}{\left[\sum_{x', y'} D^2(x', y')\right]^{1/2}}$$

The normalizing process effectively weights any larger value (for $x'=0$, $y'=0$) in the matrix disproportionately greater than any smaller value. This process insures that the reference pattern that most nearly resemble the specimen will provide the greatest crosscorrelation value.

In the apparatus of our copending application, the autocorrelation function of an observed specimen is compared with the set of normalized autocorrelations of the reference patterns, which are stored in a comparison memory. This comparison is carried out by developing a set of point-by-point product matrices of the specimen autocorrelation function and the normalized autocorrelation function of each reference pattern. For example, the product matric $S_{A,R_n}$ $(x', y')$ of specimen A and reference pattern $R_n$ is represented mathematically as $$S_{A,R_n}(x', y')=D_A(x', y')Z_{R_n}(x'y')$$

Each of the set of product matrices S is summed to produce a cross-correlation sum, hereinafter identified by the reference character G with appropriate subscripts, which sum may be defined by the following equation:

$$G_{A, R_n}=\sum_{\substack{x^1=0 \\ y^1=0}}^{\substack{x^1=m_1 \\ y^1=m_2}} S_{A,R_n}(x^1, y^1)$$

The set of sums G is compared to determine the largest sum. The largest sum is derived from the product of the correlation function of the unknown specimen and the correlation function of the particular known reference pattern which is most nearly like the unknown specimen. The largest sum thus identifies an unknown specimen with a particular known reference pattern. This identification is positive provided that the largest sum differs from the next largest sum by an arbitrarily selected ratio (e.g., 2%). If the required 2% difference between the two largest sums does not exist, the specimen is rejected as unrecognized. Such non-recognition of the observed specimens may occur when the specimens being observed differ from the reference patterns as to the size or style (font) of the type employed.

The terms "autocorrelation," "autocorrelation function," and "autocorrelation pattern," as used in this specification, describe operations and functions wherein data $f(t)$ is compared to or analyzed with respect to *itself* $f(t)$ or a function derived from *itself*, displaced in time or space. This basic autocorrelation function for a time displacement $t'$ is described mathematically as:

$$\Sigma_t f(t) \cdot f(t+t')$$

In contrast, the terms "cross-correlation," "cross-correlation function," and "cross-correlation pattern" refer to operations and functions wherein data $f(t)$ is compared to or analyzed with respect to *other data* $g(t)$ or a function of *other data*, which may or may not be displaced in time or space. The basic cross-correlation function for a time displacement $t'$ is described mathematically as:

$$\Sigma_t f(t) \cdot g(t+t') \text{ or } \Sigma_t f(t+t') \cdot g(t)$$

where two different functions $f(t)$ and $g(t)$ are employed.

The above definitions are supported in a reference entitled, Control Engineers Handbook, John G. Truxal, Editor, published by the McGraw Hill Book Company, 1958, especially at pages 4–64 through 4–78.

The identification of specimens, e.g., characters, may be described as the solution of a series of specimen problems, where it is known that each possible solution (identification) is one of a class of known solutions (e.g., an alphabet), and there is also known at least one class of pattern problems (e.g., a font of letters) which correspond respectively to the known solutions. If any specimen problem can be identified with a particular one of the pattern problems, then the specimen problem is solved, i.e., the specimen is identified. The identification of characters in accordance with the present invention, may be described as the solution of a set of unsolved problems, by comparing an order of likeness matrix of the unsolved problems with the order of likeness matrix of a set of solved problems, and identifying each unsolved problem with one of the set of solved problems, if correspondence between the two matrices can be established.

Problems other than specimen recognition problems may be solved using the methods and apparatus of the present invention, provided the problems have the following characteristics (which characteristics are typical of specimen recognition problems):

(1) It must be known that the solution of each unsolved problem is one of a class of known solutions;

(2) There must be a class of known problems corresponding respectively to the known solutions;

(3) The number of unsolved problems must be finite and equal to the number of known problems;

(4) The unsolved problems and the known problems must have a common property which is measurable and expressible in statistical terms.

In order to facilitate an understanding of the invention, it will be described in detail below in terms of methods and apparatus or recognition of specimens, particularly numerical characters. Thus, the invention will be described in terms of a concrete embodiment.

In order to solve other types of problems according to the invention, there must be selected a property common to all the unsolved problems and all the known problems, which property must be measurable and capable of expression in statistical terms. In the disclosed embodiment of the invention, that property is the black-or-whiteness of the individual elemental areas of the unknown specimens. The statistical terms are the autocorrelation functions and the normalized autocorrelation functions of the unknown specimens (i.e., the problems to be solved). For each of the unsolved problems, there is produced a set of cross-correlation functions consisting of the product of the autocorrelation function of that one problem times the set of normalized autocorrelation functions of all the unsolved problems. There are thus produced a number of sets of cross-correlation functions equal to the number of unsolved problems. These cross-correlation functions provide a measure of the relationship between the unsolved problems. The cross-correlation functions are summed to provide indices of the relationships between the unsolved problems. Each set of indices corresponding to a set of cross-correlation functions, and hence to one unsolved problem, is arranged in numerical order and thus exhibits the order of likeness of that one problem with respect to all the other members of the set of unsolved problems. The complete array of the sets of orders of likeness, one for each unsolved problem, constitutes an order of likeness matrix. A similar order of likeness matrix is generated for the known problems, and the unsolved problems are solved by comparison of the two matrices and rearrangement of the matrix derived from the unsolved problems to make it equivalent to the matrix derived from the known problems. The rearrangement identifies each unsolved problem with one of the known problems and thereby solves it.

An object of the present invention is to provide specimen identification apparatus and methods which are effective in the presence of transformations, e.g., changes of size or shape, of the observed specimens.

Another object is to provide character identification methods and apparatus which are effective in the presence of changes in the size or style (font) of the observed characters.

Another object of the invention is to provide improved methods and apparatus for solving problems.

Another object of the invention is to provide improved methods and apparatus for identifying a set of unrecognized specimens with a set of known reference patterns. A still further object is to provide methods and apparatus of the type described in which a tentative identification is first made and then checked for errors by comparing the orders of likeness of the specimens and reference patterns.

The foregoing objects of the invention are attained in the apparatus and methods described herein.

The present invention utilizes an order of likeness matrix. In the embodiment described, that matrix is a matrix of the cross-correlation sums of the set of reference patterns. The invention is illustrated as applied to a set of ten numerical characters from 0 to 9 as reference patterns. A cross-correlation function may be defined as a point-by-point product matrix of the auto-correlation function of one member of the set of patterns times the normalized autocorrelation function of either the same or another member of the set. Thus, the cross-correlation function $S_{A,B(x',y')}$ is the product matrix of the autocorrelation function $D_A$ and the normalized auto-correlation function $Z_B$ may be defined mathematically by the following equation:

$$S_{A,B}(x', y') = D_A(x', y') \cdot Z_B(x', y')$$

The cross-correlation functions are summed, and the resulting cross-correlation sums G are arranged in a matrix having each row representing a sequence of sums of all the cross-correlation functions of a particular reference pattern. Within each such row the sums are arranged in order of their magnitude. The matrix thus derived has a number of rows equal to the number of reference patterns, each row corresponding to a particular reference pattern. Each row consists of a plurality of sums arranged in order of their magnitude. Each sum in a row may be tagged with the symbol of the particular pattern whose normalized autocorrelation function was used in deriving that sum. A matrix so derived is termed herein an order of likeness matrix.

The apparatus has stored data defining a reference order of likeness matrix of the set of reference patterns with which the received patterns are to be identified. As mentioned above, the rows in that matrix are arranged in an arbitrary order (e.g., numerical order) and the elements in each row are arranged in order of magnitude.

When the apparatus receives a series of unrecognized specimens, it goes through a cycle of operation having four phases, which may be broadly defined as:

(1) Collect a set of different unrecognized specimens equal in number to the set of reference patterns, these specimens being stored as sets of data defining their autocorrelation functions;

(2) Generate the cross-correlation functions of the set of unrecognized specimens and from those functions generate an order of likeness matrix of the received specimens;

(3) Decode (i.e., rearrange) the rows of the order of likeness matrix of the received specimens to establish a row-by-row correspondence with the order of likeness matrix of the reference patterns; and (4) Use the autocorrelation functions of the set of received specimens to identify further received specimens, following the method described in our copending application Serial No. 45,034, identified above. This phase continues until a new series of unrecognized specimens is received.

In phase (1) as identified above, the apparatus generates the autocorrelation function and the normalized autocorrelation function of each new received specimen and compares them with the corresponding functions of the previously received unrecognized specimens. If the comparison shows the new specimen to be different from all those previously received, its autocorrelation function and normalized function are stored. If the new specimen is the same as one previously received, its functions are discarded. This process continues until the apparatus has stored a set of different autocorrelation functions and normalized functions equal in number to the set of reference patterns.

In phase (2), the apparatus generates the cross-correlation functions for the set of unrecognized specimens by determining a set of product matrices of the unrecognized specimens cross-correlated with each other. These cross-correlation functions are arranged to generate a received matrix of data corresponding to the stored response matrix, except that the rows of cross-correlation functions are in random order and the elements in each row are also in random order.

In phase (3), the apparatus decodes the received matrix, using the reference order of likeness matrix as a guide, to determine whether there is a possible arbitrary order of the rows of the received matrix, which, when the elements of each row are sorted in order of magnitude, will make the received matrix correspond to the reference matrix, element for element. If such an arbitrary order is found, then the rows of elements in the received matrix are transposed to place them in that order, and there is established a row-for-row identification of the specimens defined by the rows in the transposed received matrix with the patterns defined by the rows in the reference matrix.

In phase (4), the apparatus proceeds to identify further received specimens by comparing their autocorrelation function with the autocorrelation functions of the identified specimens associated with the transposed received matrix. This identification of further received specimens follows the methods described in our Patent No. 3,196,392 identified above, and continues until a new series of unrecognizable specimens is received, whereupon phase (1) is again initiated.

It may be observed that the normal and usual mode of operation of the apparatus is in phase (4). Only when unrecognizable specimens are received during phase (4) operation, does the apparatus shift and go through the cycles of phases (1), (2) and (3) and thence back to phase (4). Of course, when initially starting the apparatus, it may either go through phases (1), (2) and (3) before it is ready for operation in phase (4); or the operation may be started in phase (4) on the basis of stored information.

Other objects and advantages of the invention will become apparent from a consideration of the following specification and claims, taken together with the accompanying drawings.

FIGS. 1 and 2 are graphical illustrations of the generation of two autocorrelation elements for a particular numeral "3";

FIGS. 3*a* to 3*j* illustrate a complete set of numerical characters of a particular font and the autocorrelation function of each character in the set;

FIGS. 4*a* to 4*j* illustrate a complete set of numerical characters of a part which is an affine transformation of the font in FIGS. 3*a* to 3*j*, and their autocorrelation functions;

FIGS. 5*a* and 5*b* illustrate the computation of a normalizing factor for two of the characters of FIGS. 3*a* to 3*j*;

FIGS. 6 to 9 illustrate the computation of cross-correlation elements for two of the characters of FIGS. 3*a* to 3*j*;

FIG. 10 illustrates a reference order of likeness matrix which is the same for either the font of FIGS. 3*a* to 3*j* or the font of FIGS. 4*a* to 4*j*, and by means of which the characters of one font may be recognized as the respective equivalent of the characters of the other font;

FIG. 23 is a fragmentary wiring diagram of field #1 of the M memory of FIG. 22;

FIG. 27 is a fragmentary wiring diagram of read out and erasing circuits in field #4 of the M memory of FIG. 22;

Figure 11:
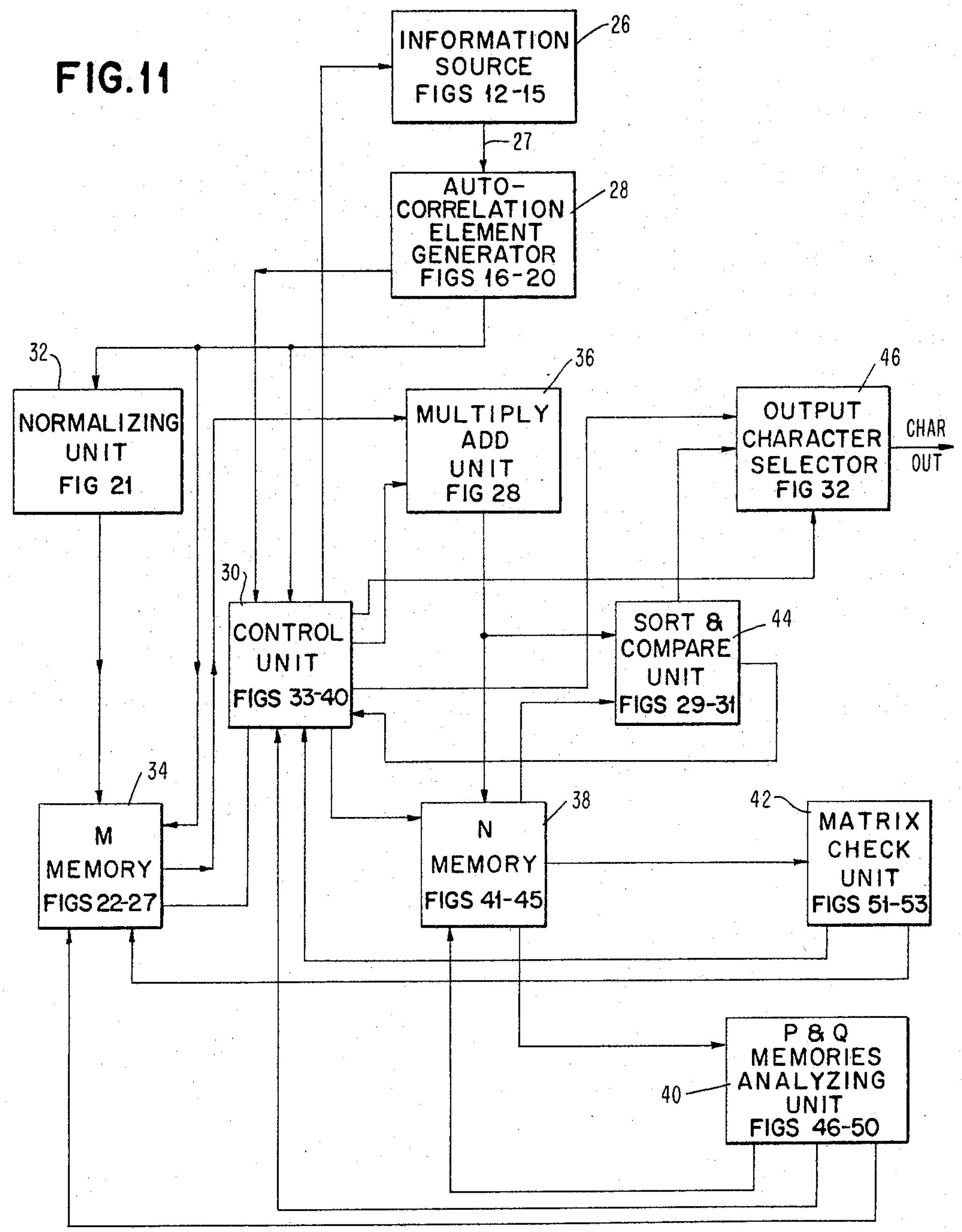
FIG. 11 is a block diagram indicating the principal units of an apparatus embodying the invention, the figures where the details of the respective units are shown, and the flow of information between those units.
Figures 43, 43A:
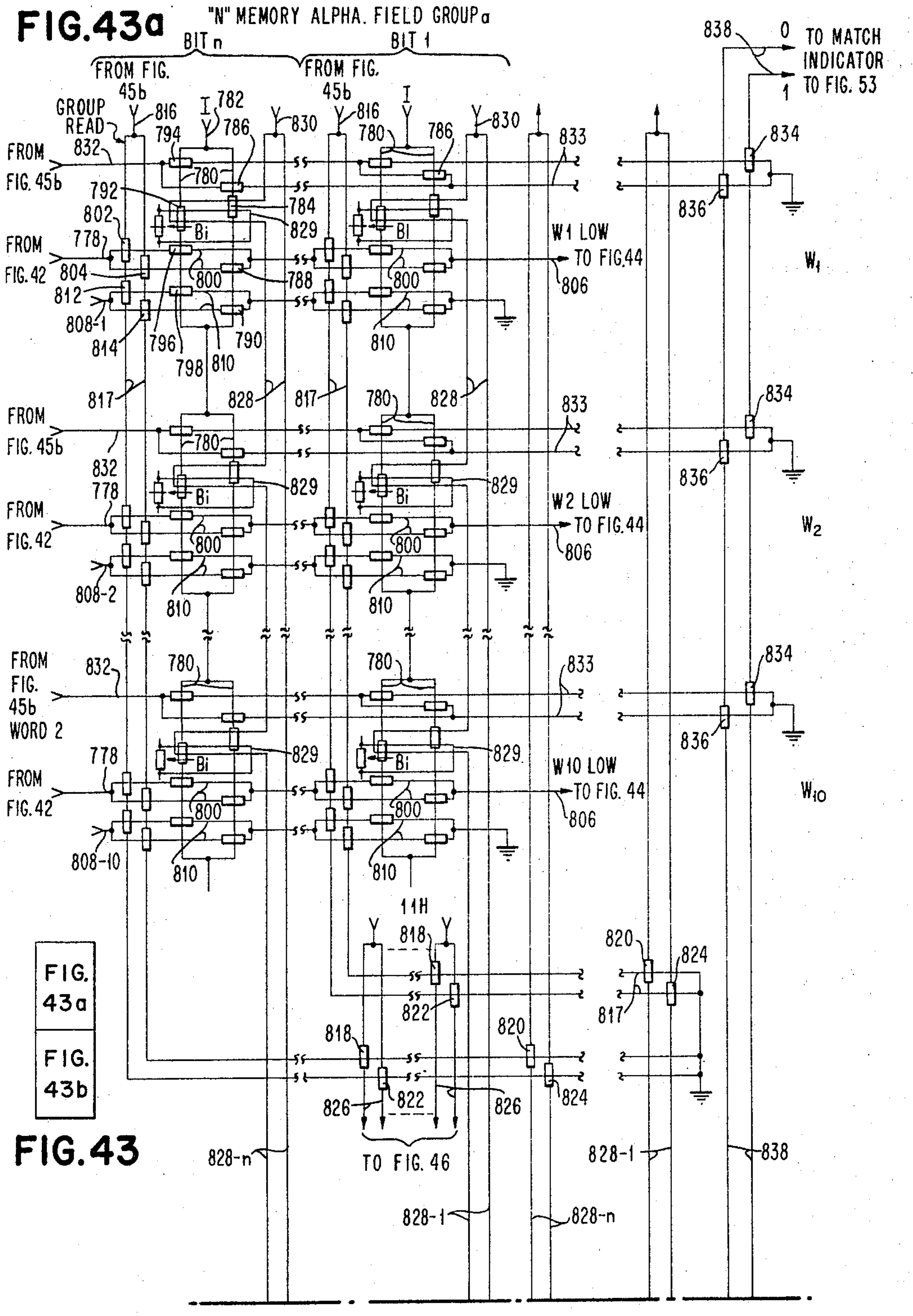
FIG. 43 is a small diagrammatic figure illustrating the positional relationship of FIGS. 43*a* and 43*b*.
Figure 43B:
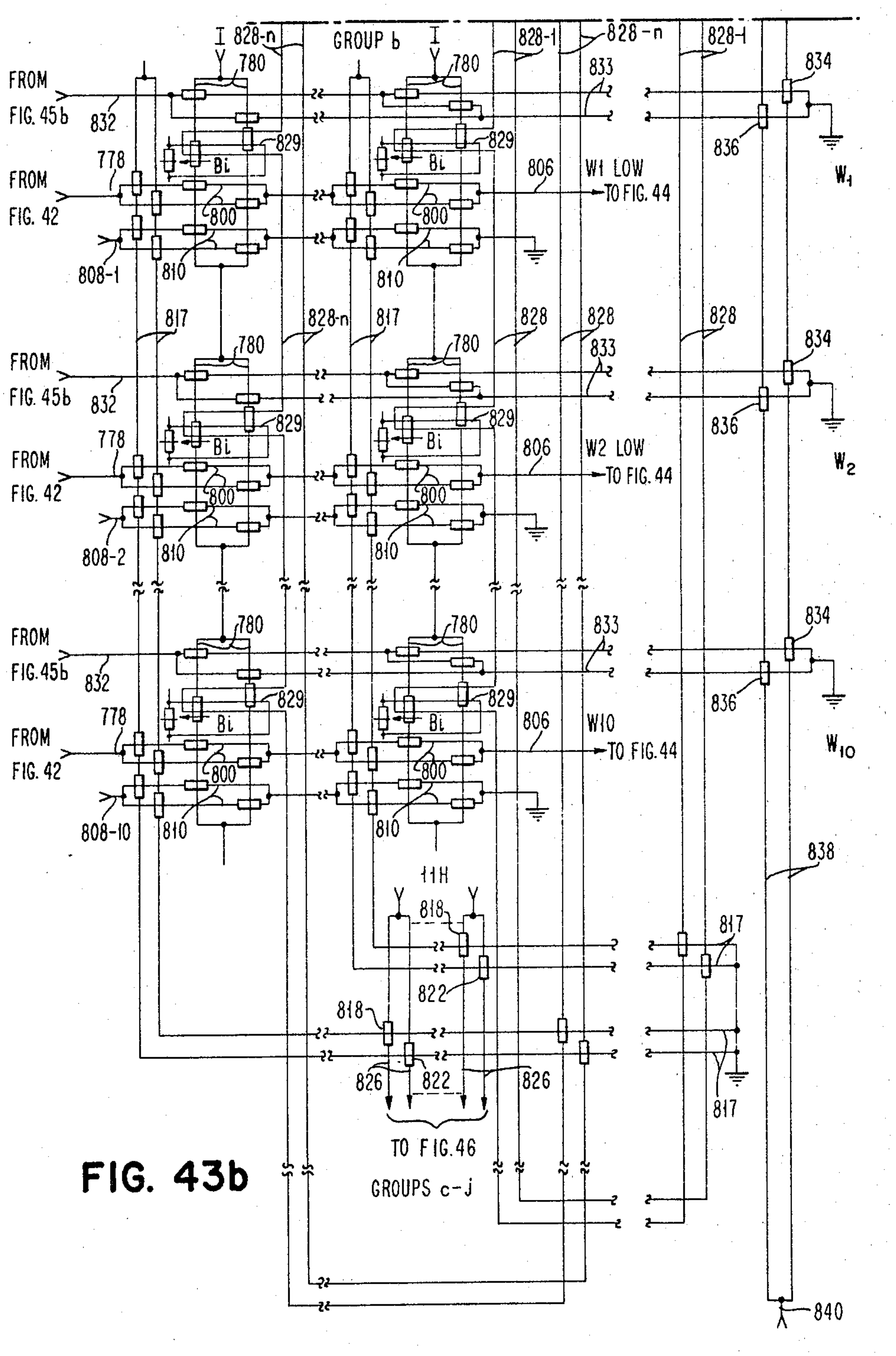
Figure 44:
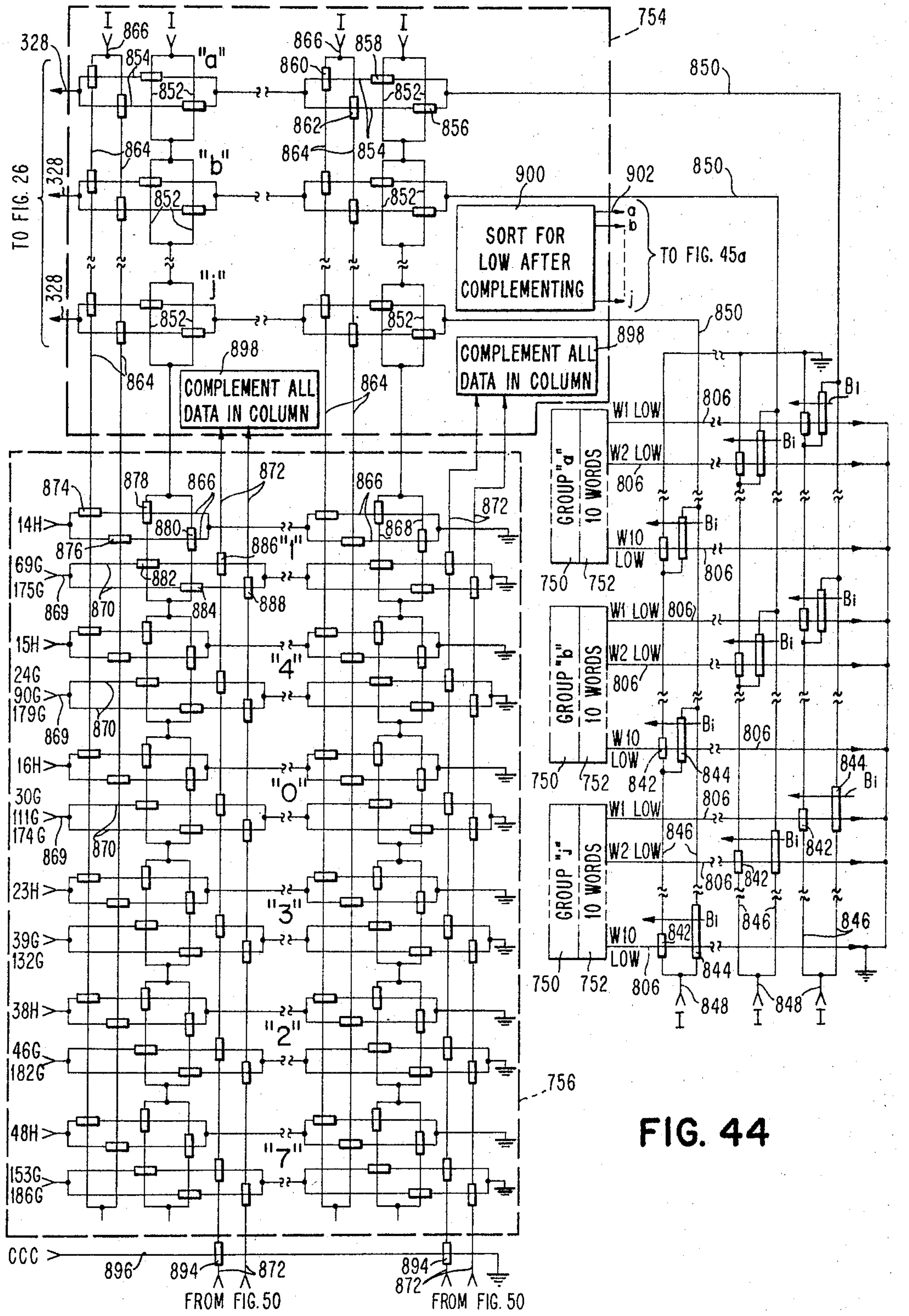
Figures 45, 45A:
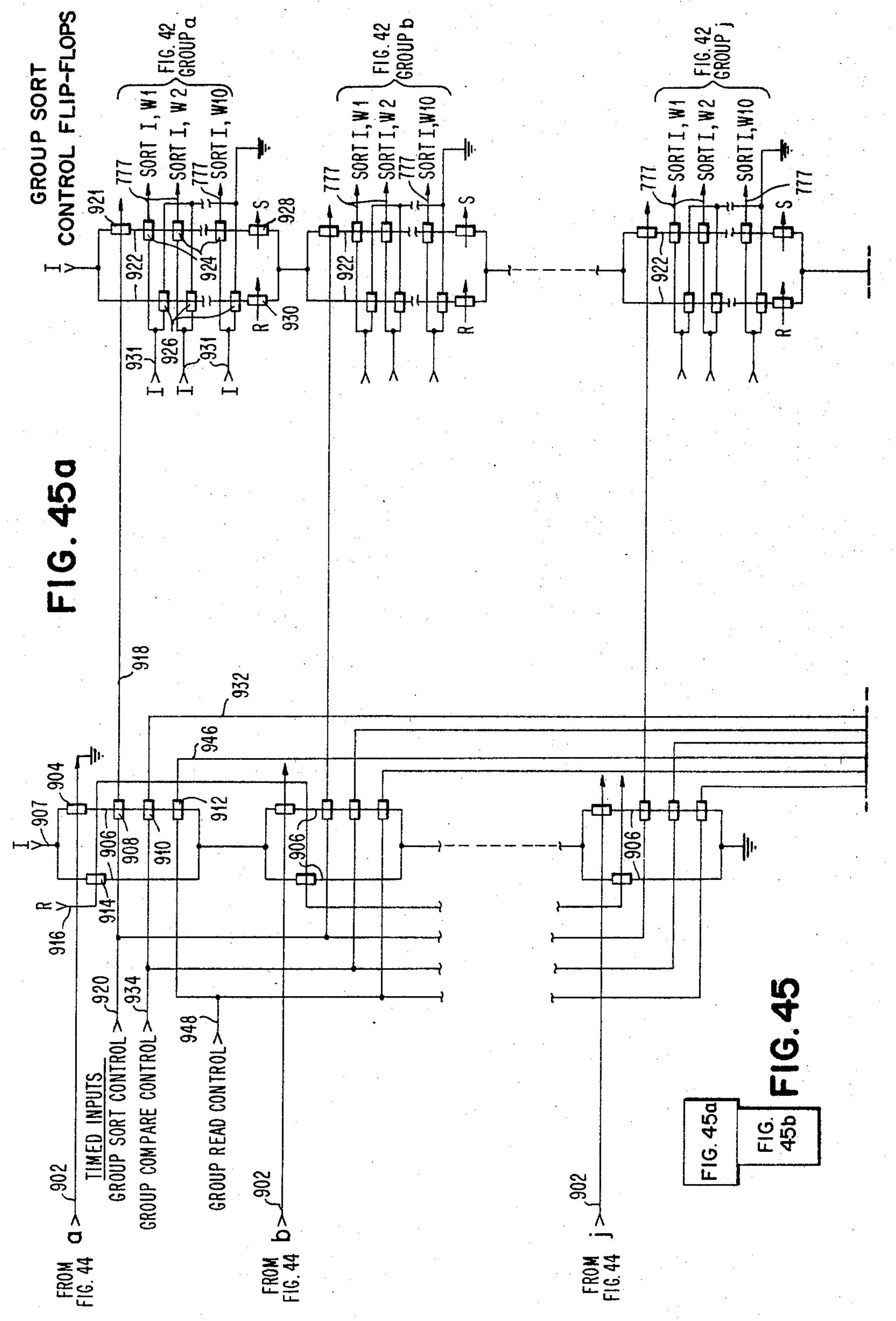
Figure 45B:
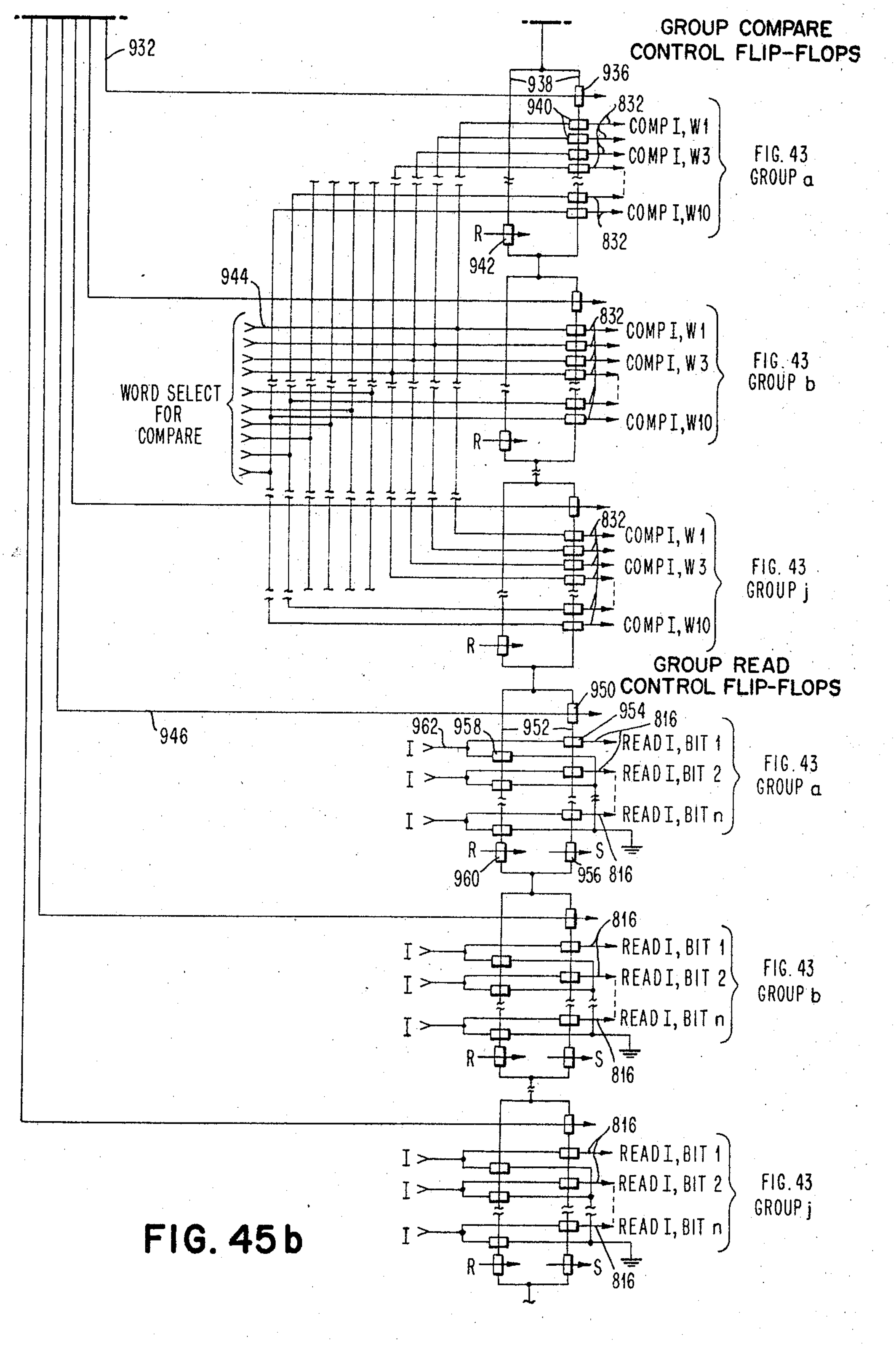
Figures 46, 51:
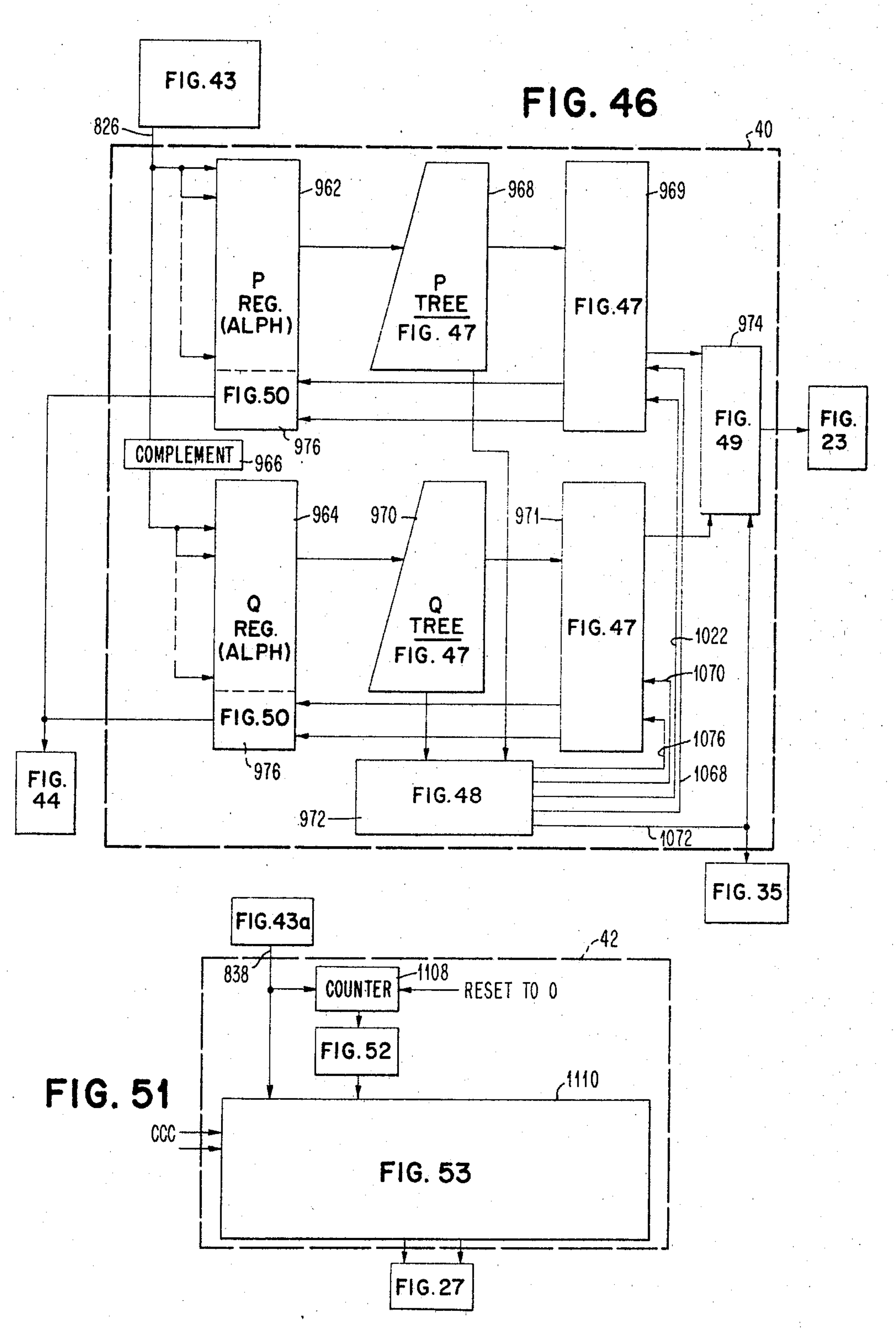
Figure 47:
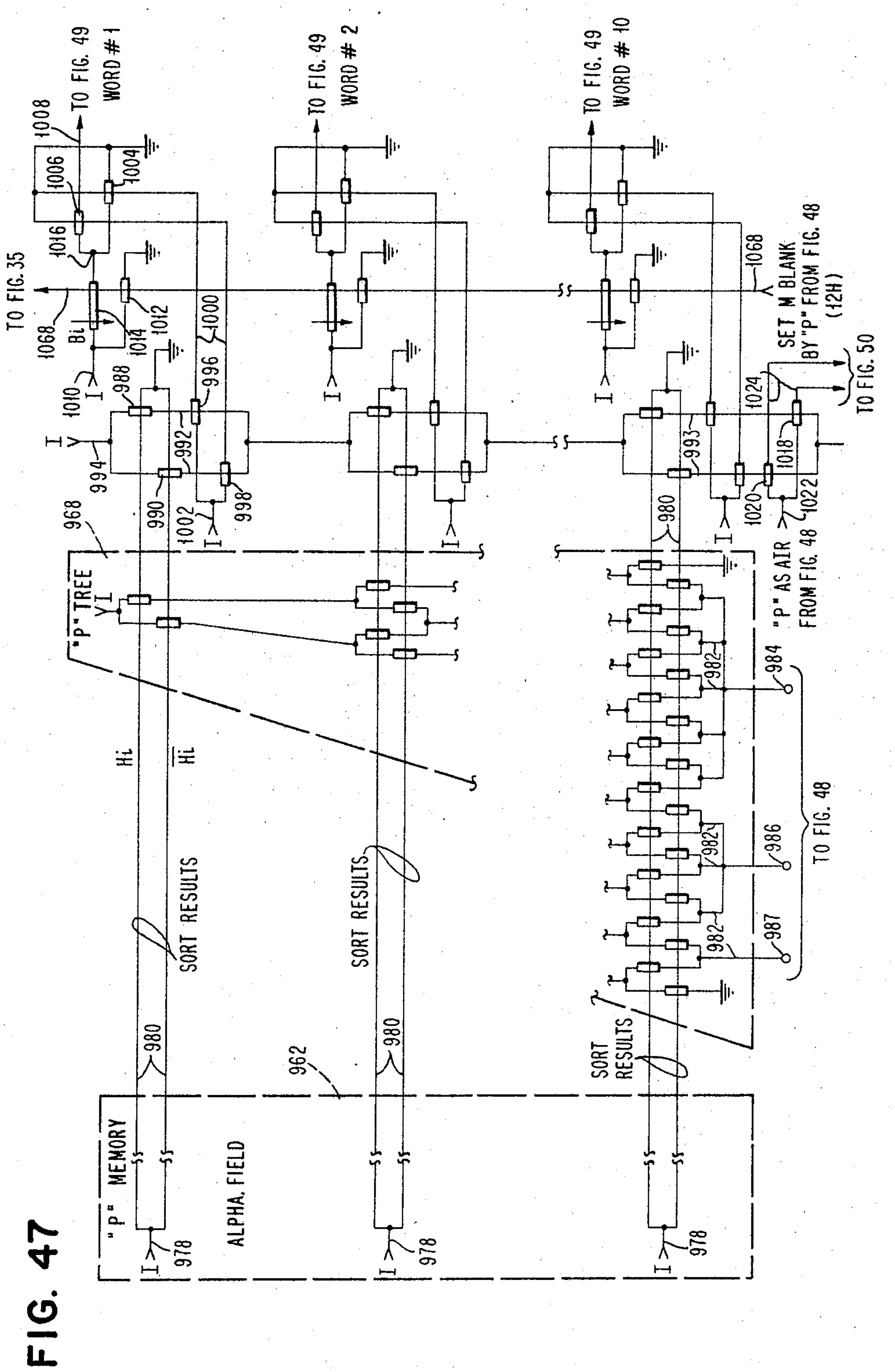
Figure 52:
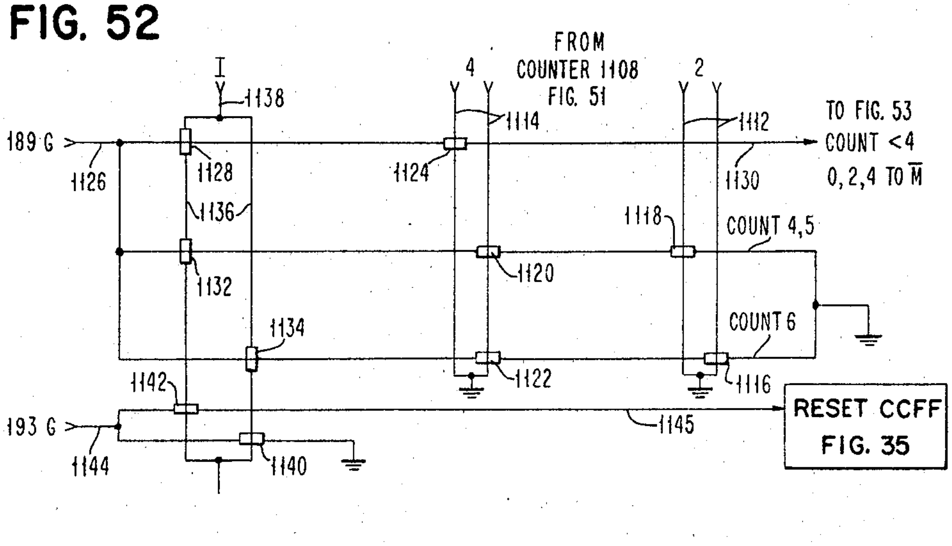
Figure 48:
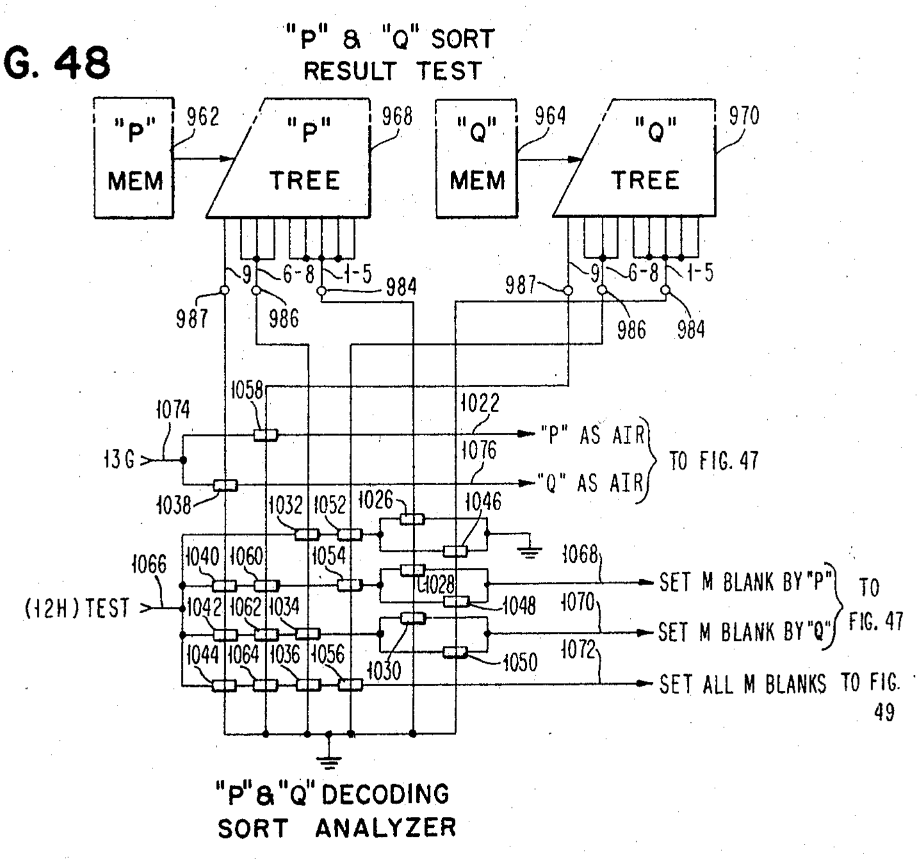
Figures 49, 50:
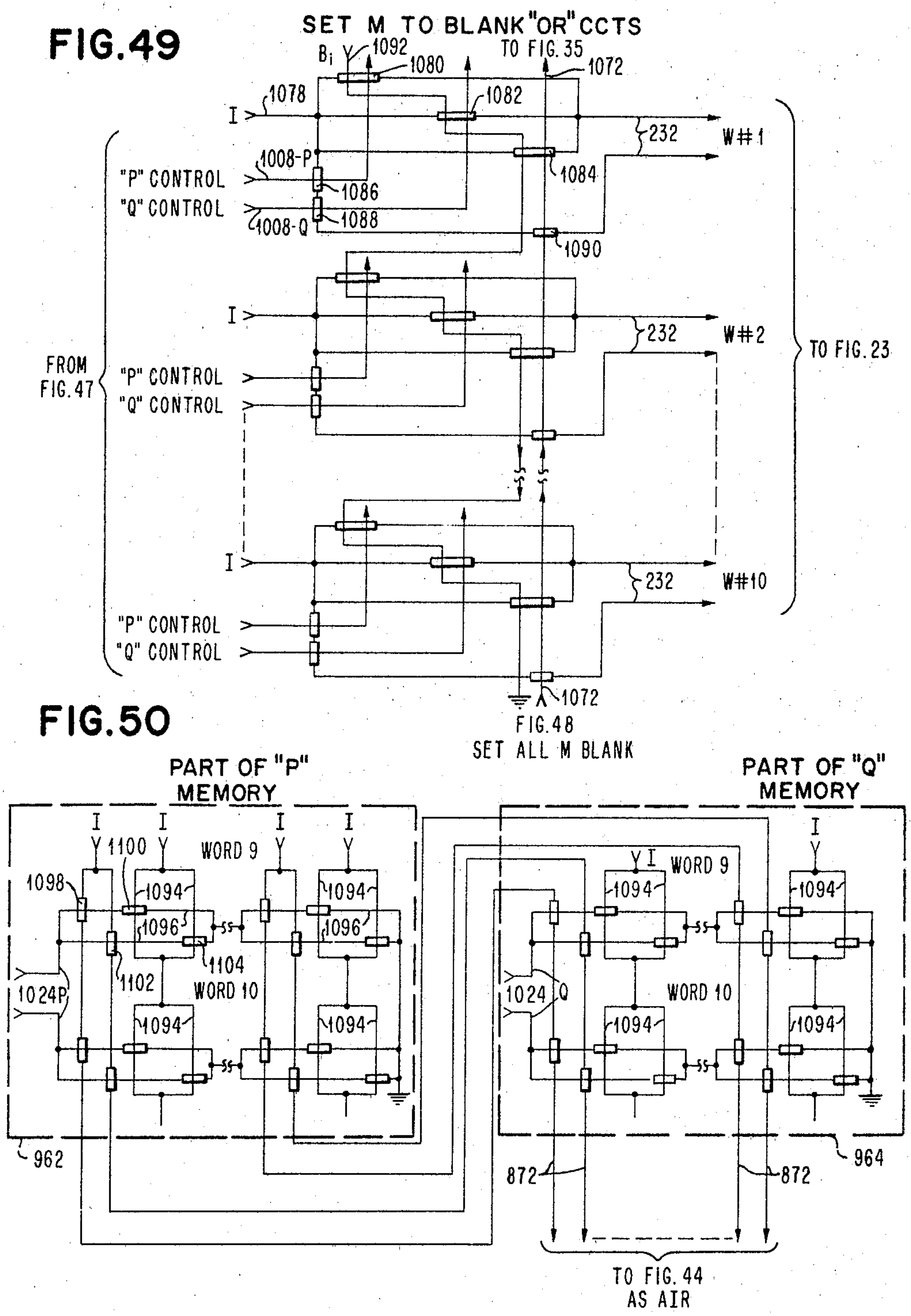
Figure 53:
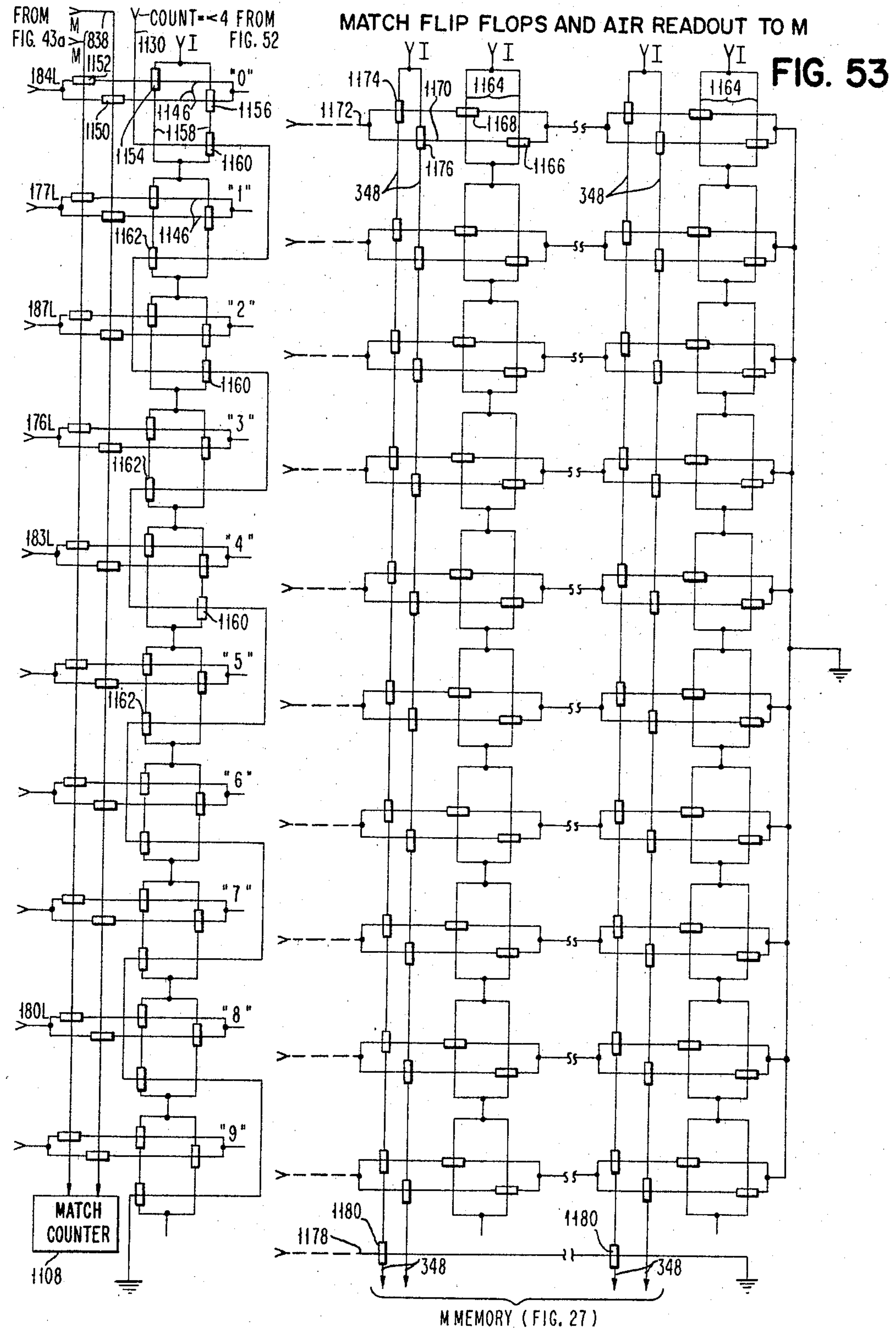

FIGS. 43*a* and 43*b* together show the wiring diagram of the F register of the N memory;

FIG. 44 is a wiring diagram of the Group E register and the group identification register of the N memory;

FIG. 45 is a small diagrammatic illustration showing the proper positional relationship of FIGS. 45*a* and 45*b*;

FIGS. 45*a* and 45*b* together show the wiring diagram of the sort, read and compare control circuits for the F register of FIG. 43;

FIG. 46 is a block diagram showing the subunits included in the P and Q memories and analyzing unit, shown as a single block in FIG. 11;

FIG. 47 is a wiring diagram showing the sorting circuits for the P memory of FIG. 46;

FIG. 48 is a wiring diagram showing the output checking circuits for the P memory of FIG. 46;

FIG. 49 is a wiring diagram of the circuits controlled by the P and Q memories for setting the M memory or certain locations thereof to the blank condition;

FIG. 50 is a wiring diagram of a circuit for reading out a selected word from either the P or the Q memory;

FIG. 51 is a block diagram showing the subunits included in the matrix check unit shown as a single block in FIG. 11;

FIG. 52 is a wiring diagram of a counter decoding circuit forming one of the subunits in the matrix check unit of FIG. 51; and FIG. 53 is a wiring diagram of a match checking circuit forming part of the matrix check unit.

*FIGS. 1 to 10*

The particular font of numerical characters shown in these figures was selected with a view to simplifying the illustration of the invention as much as possible. For example, the numerical characters shown in FIGS. 3*a* to 3*j* appear in arrays of squares which are for the most part 5 squares wide and 9 squares long. The character 8 is 6 squares wide and the character 0 is seven squares wide. In a practical system, it would be desirable to make the squares much smaller with respect to the size of the character to be recognized. For example, it might be desirable to make the characters 30 squares wide by 30 squares long, or thereabouts. Furthermore, the transformation of the characters in FIG. 3 which is exhibited in the characters of FIG. 4 is a highly simplified transformation, consisting of slanting or shearing each character by moving each row of squares above the bottom row one column to the right for each row above the bottom. Such a transformation represents probably a more severe transformation of characters than is likely to be encountered in practice, where the typical transformation encountered might be a change in font from one size of type to another.

Because of the small number of squares in each character, the margin for error in the recognition of characters is not as great as would be secured in a more practical system. For example, the system disclosed must separate one character from another by depending upon a margin of 2% in the magnitude of a statistical figure which designates the character. In a more practical system, using a larger number of elemental areas, a 10% margin of distinction between characters would be easily obtainable. It would also be much more desirable, since it would be less easily confused by random noise.

Figure 1:
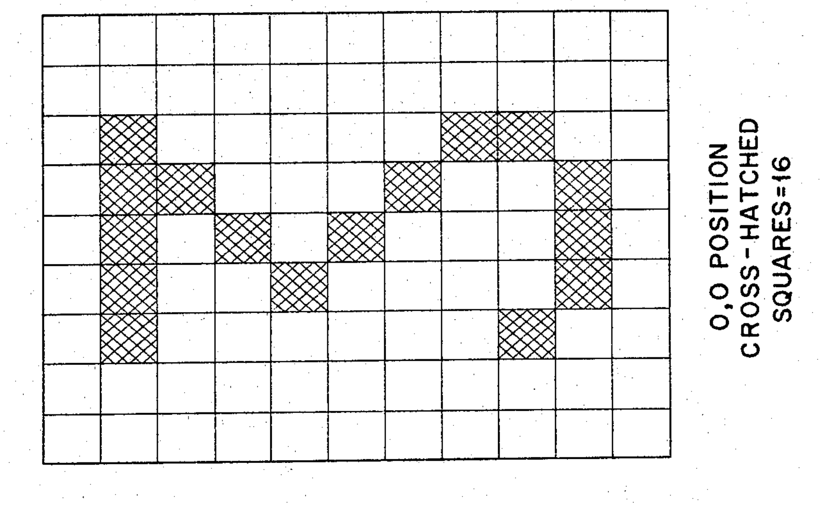

Referring to FIG. 1, it may be described as illustrating two reproductions of a numerical character "3" superimposed on each other. One of the reproductions is drawn in the squares by means of parallel lines slanting downwardly from left to right. The other of the reproductions is drawn in the squares by means of parallel lines slanting downwardly from right to left. Since the overall contour of both reproductions of the character are the same, what appears in FIG. 1 is a number of cross-hatched squares. It may be seen that the number of cross-hatched squares is 16. In other words, it may be stated that the autocorrelation element of this particular numeral "3," for the position in which that numeral is superimposed upon itself, is 16. In this specification, an autocorrelation matrix is referred to by the reference character D, with appropriate subscripts, while the autocorrelation elements which make up the matrix are referred to by the reference character E, with appropriate subscripts. Referring to FIG. 3*c*, it may be seen that the number 16 is entered in the center square indicated by the reference numeral 22 in the autocorrelation function matrix. The element in the center square is referred to herein as $E_0$.

Figure 2:
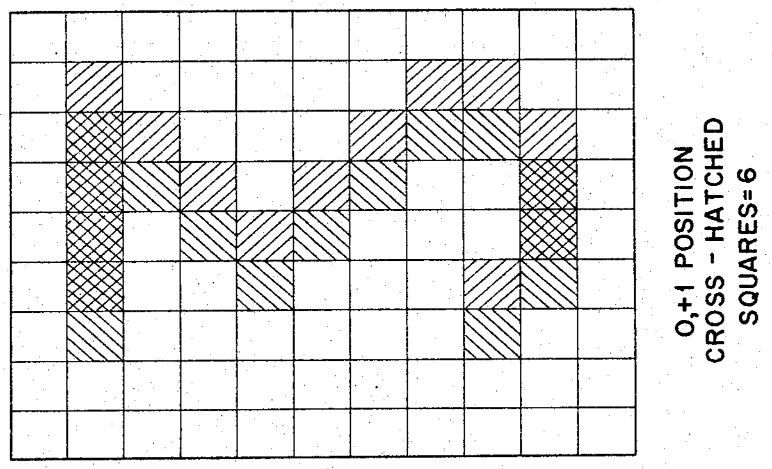

Referring now to FIG. 2, it may be seen that the numeral "3" represented by the squares filled with parallel diagonal lines extending downwardly from right to left remains in the same position as in FIG. 1, but the numeral "3" represented by the squares filled with diagonal lines extending downwardly from left to right has been shifted one square to the right from the position in which it appeared in FIG. 1. In FIG. 2, there are now only six squares where two representations of the numeral "3" overlap and which are consequently filled with cross-hatched diagonal lines. In other words, the autocorrelation element $E_{1,0}$ for the numeral 3 for the $(+1, 0)$ position is 6. $(+1, 0)$ means that the numeral "3" is compared with its twin with the latter shifted one square to the right and with no vertical shift. Referring to FIG. 3*c*, it may be seen that the number 6 is entered in the square identified by the reference numeral 23, which square may be located from the center square 22 by means of a zero vertical shift and a $+1$ horizontal shift (one square to the right).

The complete autocorrelation function for the numeral 3 may be developed in the same manner, by considering one of the representations of the numeral 3 to be shifted a certain number of squares to right or left and/or up or down from the 0, 0 position of the numeral 3, counting the number of overlapping squares in each such position, and entering the number in the corresponding position in the autocorrelation function matrix of FIG. 3*c*.

The development of such an autocorrelation function matrix is described more completely in our Patent No. 3,196,392. As pointed out in that application, the complete autocorrelation function matrix includes redundant features which may be omitted without loss of information. The matrix is completely defined by a center square such as 22 and one-half of all the other squares in the complete matrix. In the autocorrelation functions as shown in FIGS. 3 and 4, the illustrations have been simplified by eliminating the redundant parts of the matrix to the left and below the center position 22. In many of the autocorrelation function matrices shown in FIGS. 3 and 4, wherever the value of the function was 0, that value has been omitted from the matrix shown in the drawing, in order to simplify the drawing. Furthermore, in some cases (e.g., FIG. 4*a*), a portion of a matrix consisting entirely of zeroes has been omitted completely.

Figure 3B:
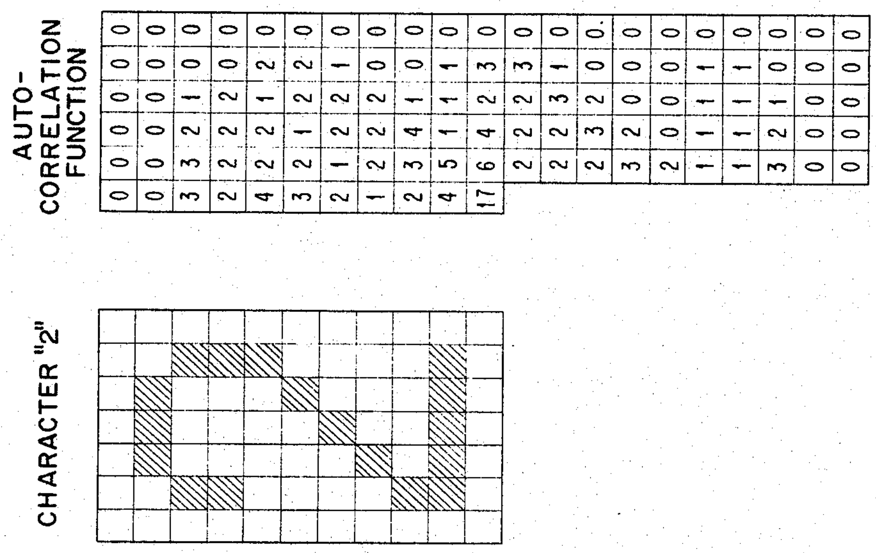
Figure 3A:
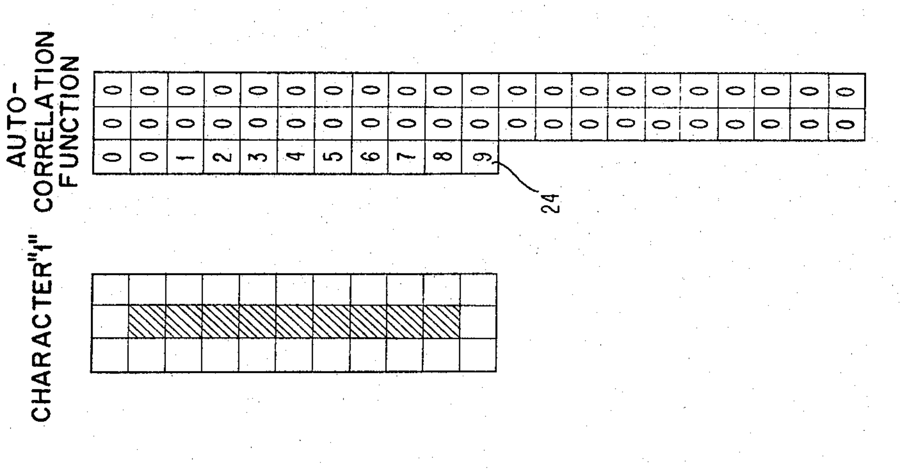

FIG. 5*a* illustrates the computation of the normalizing factor for calculating the normalized autocorrelation function matrix $Z_1$ for the character 1 corresponding to the autocorrelation function matrix $D_1$ shown in FIG. 3*a*. Referring to FIG. 3*a*, it may be seen that there appear in the matrix squares in which are entered nine different values from 1 to 9. These values are entered in the column headed "Elements" in FIG. 5*a*. In the column headed "Squares" in FIG. 5*a*, each number represents the square of the number in the same row in the column headed "Elements" thus 1 is the square of 1 and 4 is the square of 2. In the column headed "Repeats" there is entered the number of times that a particular element appears in the complete autocorrelation function matrix, i.e., the matrix with the redundant portion (omitted in FIG. 3*a*) supplied. Thus, the number 9, which appears only in the center square 24 has only one repeat in the matrix so that the number 1 is listed in the third column of FIG. 5*a* in the horizontal line where 9 appears in the first column. Each of the other numbers listed in column 1 appears not only in the space illustrated in FIG. 3*a*, but in the corresponding space below the center square 24 and so would be repeated twice in the complete matrix. Consequently, the number 2 is listed in the column headed "Repeats" for all of the other elements except 9.

In the column headed "Sub-totals of Squared Elements" the figure in the "Repeats" column is multiplied by the number in the squares column and the product is entered in the sub-totals column. Thus, the first two numbers are obtained by multiplying two times one to get the sub-total 2. The second number is obtained by multiplying two times four to get the sub-total 8. All the numbers in the sub-totals column are then totalled to get the sum indicated by $\Sigma=489$. The square root of $\Sigma$ is determined as 22.1 and the normalizing factor for $F_1$ is thus the reciprocal of 22.1 or 0.045.

This factor may be utilized to determine each normalized autocorrelation element F from each autocorrelation element E shown in FIG. 3*a* by multiplying this factor times each of the elements E appearing in the matrix of FIG. 3*a*. In this specification, a complete normalized autocorrelation function matrix is identified by the character Z with appropriate subscripts, while the elements which make up a matrix Z are identified by the reference character F with appropriate subscripts.

Figure 3D:
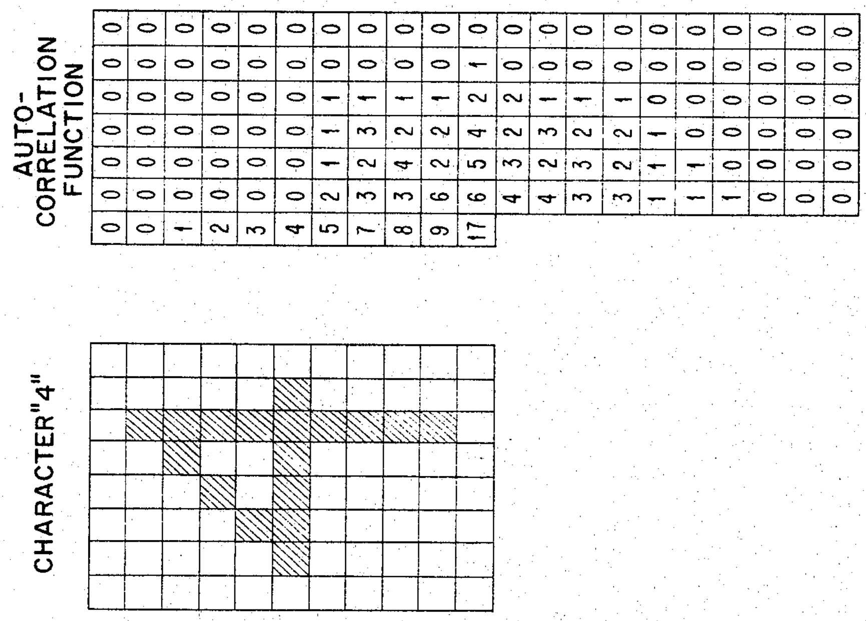
Figure 3C:
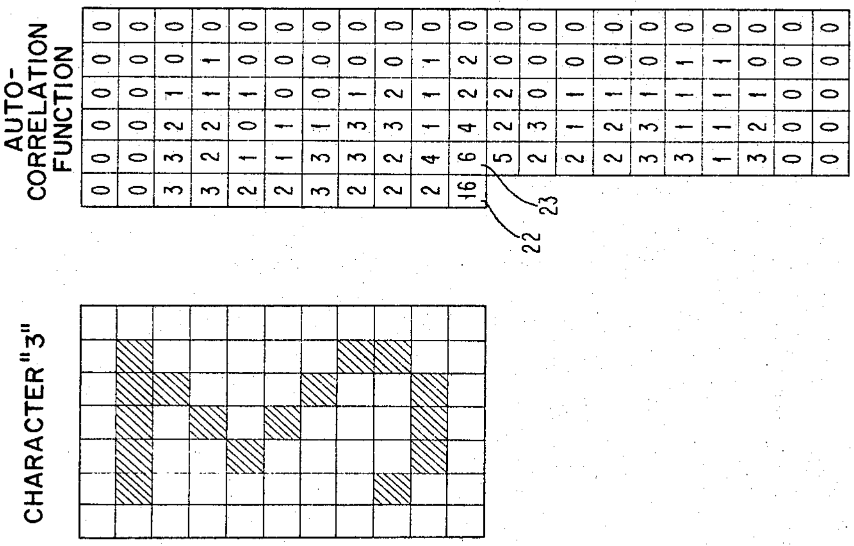
Figure 3F:
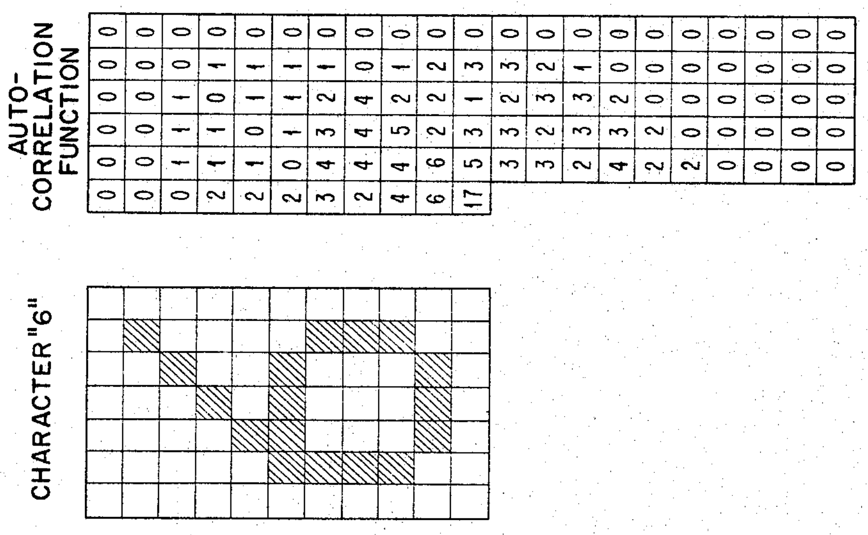
Figure 3E:
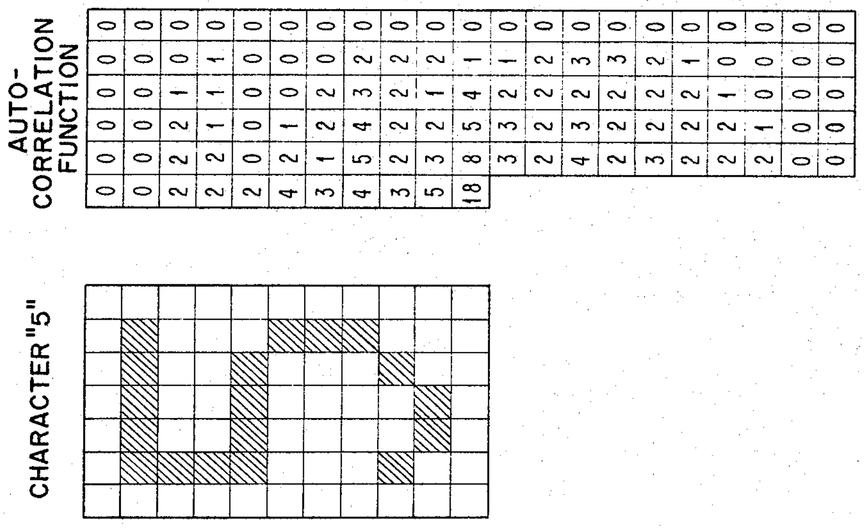
Figure 3H:
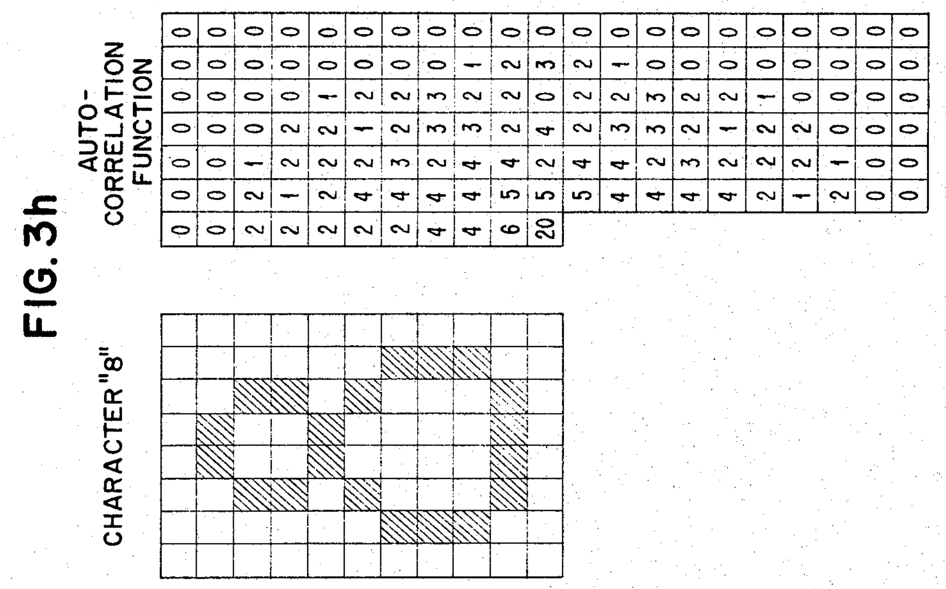
Figure 3G:
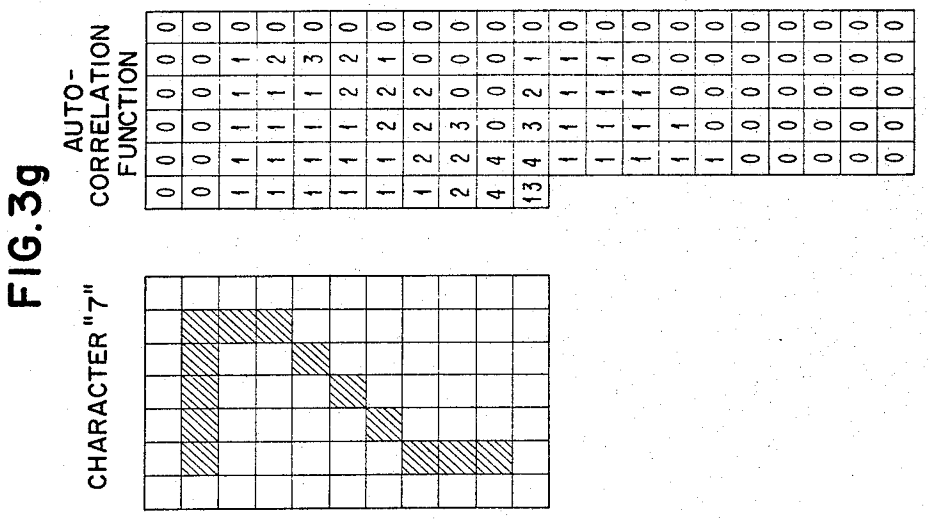
Figure 3J:
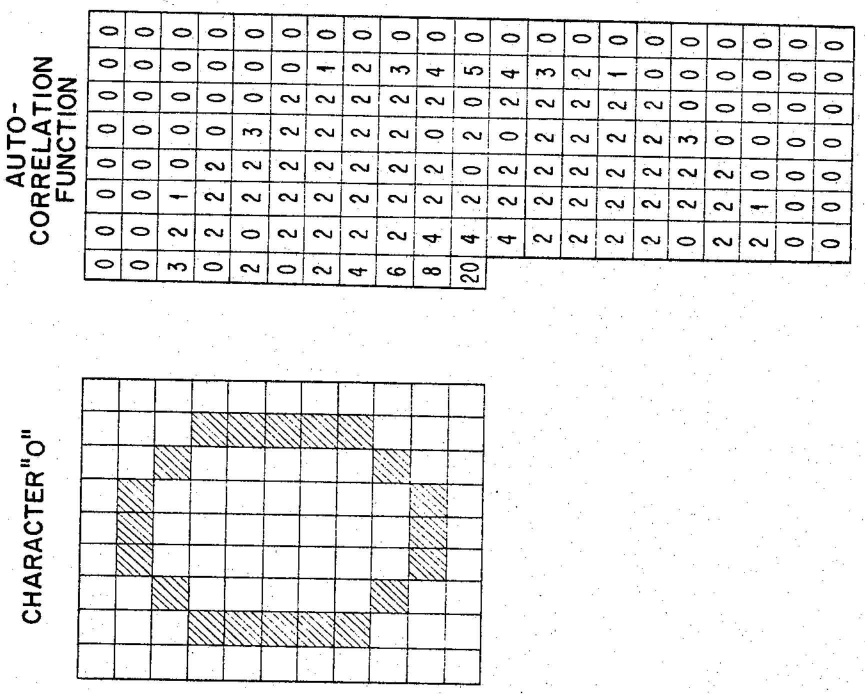
Figure 3I:
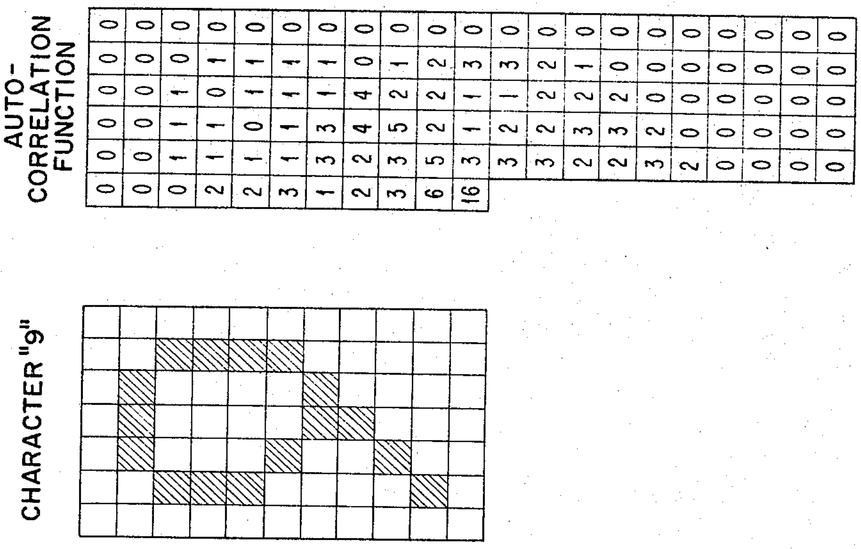

In FIG. 5*b*, the same process of computing the normalizing factor is repeated for the character "4" which appears in FIG. 3*d*. Referring to FIGS. 5*d* and 3*d*, it may be seen that the number 1 appears 17 times in the autocorrelation function matrix of FIG. 3*d*. Consequently there are $(34=17\times2)$ repeats of the number 1 in the complete autocorrelation function matrix, including the redundant portion omitted in FIG. 3*d*. Similarly, the number 2 appears 13 times in FIG. 3*d*, so that there are 26 repeats. The "repeat" column entries are similarly made with respect to all the other numbers in the first column except the number 17, which appears only once at the 0, 0 position in FIG. 3*d*. After figuring the total of the squared elements, taking the square root of that total and finding the reciprocal of the square root, there results a normalizing factor for the character "4" of 0.027.

FIGS. 6 to 9 illustrate the computation of the sums of the cross-correlation functions corresponding to the reference characters "1" and "4" of FIGS. 3*a* and 3*d*. Such functions are referred to herein by the reference character S and the sum of such a function is indicated by the reference character G, each with appropriate subscripts. Each cross-correlation function represents the point-by-point product of an autocorrelation function matrix times a normalized autocorrelation function matrix, and hence is a matrix of products EF. Since we are dealing in this example with two numerals, namely the numerals 1 and 4, there are four cross-correlation sums possible, namely $G_{1,1}$, $G_{1,4}$, and $G_{4,1}$, and $G_{4,4}$. The computation of one of these four cross-correlation products is illustrated in each one of the four FIGS. 6 to 9. FIG. 6 illustrates the computation of the sum $G_{1,1}$ of the product of the autocorrelation function $D_1$ times the normalized autocorrelation function $Z_1$, of the same numeral "1." FIG. 7 illustrates the computation of the sum $G_{1,4}$ of the cross-correlation product of the autocorrelation function $D_1$ times the normalized autocorrelation function $Z_4$ of the numeral "4." FIG. 8 shows the computation of the sum $G_{4,4}$ of the cross-correlation product 4 of the autocorrelation function $D_4$ times the normalized autocorrelation function $Z_4$. FIG. 9 illustrates the computation of the sum $G_{4,1}$ of the cross-correlation product $G_{4,1}$ of the autocorrelation function $D_4$ times the normalized autocorrelation function $Z_1$.

Referring to FIG. 6, the column headed E of $D_1$ represents the autocorrelation function elements appearing in the matrix in FIG. 3*a*. Nine different elements appear, numbered respectively from 1 to 9. The figures in the column F of $D_1$ of FIG. 6 represent the corresponding normalized autocorrelation elements of the reference character "1." As mentioned above each normalized autocorrelation element F is equal to the product of the corresponding autocorrelation element E of FIG. 3*a* multiplied by the normalizing factor (0.045) as computed in FIG. 5*a*. Consequently, each item in column "F of $Z_1$" is equal to the item in the same row in column "E of $D_1$" times the normalizing factor 0.045. The number of repeats in the column headed by the word "Repeats" is the number of repeats in the complete autocorrelation function matrix, including the redundant portion omitted from FIG. 3*a*. Each item in the column headed "Sub-totals" is the product of the number in the "Repeats" column times the number in the "E of $D_1$" column times the number in the "F of $Z_1$" row. The sum $G_{1,1}$ of the sub-totals appears at the bottom of the "Sub-total" column.

Since this is a computation of the cross-correlation function of the numeral 1 with itself, the total appearing at the bottom of the sub-total column is taken as unity for the purpose of comparison with other cross-correlation functions. The reason for converting each of these cross-correlation totals to a per unit basis is to provide a ready comparison of the margin for error in distinguishing between different cross-correlation functions. The meaning of the preceding statement will become more clear as the description of this invention and its operation proceeds.

Referring to FIG. 7, the items in the column headed "E of $D_1$" are the same as the items in the column "E of $D_1$" of FIG. 6. The items in the column headed "F of $Z_4$" are the products of the normalizing factor 0.027 (computed for the character "4" in FIG. 5*b*) times those elements which appear in the autocorrelation function matrix for the character 4 in FIG. 3*d* in the same positions as the corresponding elements for the character "1" which appear in the matrix in FIG. 3*a*. Thus, if the matrix in FIG. 3*a* were placed in the position overlapping the matrix of FIG. 3*d*, the element 1 would appear in the third row of the first column for the character "1." The element 1 would also appear in the first row for the third column for the character "4," consequently, the normalized element is obtained by multiplying 1 taken from the matrix for the character "4" times the normalizing factor of 0.027 resulting in a product of 0.027.

The number of repeats of this particular overlap is the same as the number of repeats of the number 1 in the matrix of FIG. 3*a*, namely 2. Consequently, the sub-total for the first line of the table of FIG. 7 is 2 times .027 or 0.054. Referring now to the last line of the table of FIG. 7, we see 9 in the "E of $D_1$" column. The corresponding element in the matrix of FIG. 3*d* is the number 17. 17 times the normalizing factor 0.027 gives 0.46, which appears in the last line of the column headed "F of $Z_4$." There is only one repeat of this particular overlap, namely that appearing in the 0,0 position of the matrices. Consequently, the sub-total appearing in the right hand column of the table of FIG. 7 is 9 times 0.46 or 4.1.

When the sub-totals of FIG. 7 are added, they produce a sum $G_{1,4}$ for the cross-correlation function of 16.2. On a per unit basis, using the 22.2 total of $G_{1,1}$ as equal to unity, we get $G_{1,4}$ is equal to 16.2 divided by 22.2 or 0.73.

The sum $G_{4,4}$ of the cross-correlation function representing the product of the autocorrelation function $D_4$ with the cross-correlation function $Z_4$ is shown in FIG. 8. It follows the principles discussed above in connections with FIGS. 6 and 7, resulting in an absolute value of 37.3 for the sum $G_{4,4}$ of the cross-correlation function. As in the case of $G_{1,1}$, the value of $G_{4,4}$ is taken equal to unity for the purposes of comparison.

In a similar fashion, the sum $G_{4,1}$ of the cross-correlation function $D_4$ times $Z_1$ is computed in FIG. 9 as equal to 0.73, on a per unit basis, with $G_{4,4}$ equal to 1.

FIG. 10 shows the reference order of likeness matrix for the cross-correlation functions of the set of numerical characters shown in FIGS. 3*a* to 3*j*. It may be seen that the G functions in each row of the matrix are arranged in descending order of magnitude, with the largest G functions at the left hand end of the row. The largest G function, on a per unit basis, is always the cross-correlation function of a particular character with itself, and is taken as 1. Note that the function $G_{1,1}$, which was computed in FIG. 6, appears in FIG. 10 in the first row, first column. The function $G_{1,4}$ which was computed in FIG. 7 appears in the second column of the first row of FIG. 10. The function $G_{4,4}$ which was computed in FIG. 8 appears in the fourth row, first column of FIG. 10. The function $G_{4,1}$ which was computed in FIG. 9 appears in the fourth row, last column of FIG. 10. Note that the per unit values of the functions $G_{1,4}$ and $G_{4,1}$ are the same, namely 0.73. This equivalence of per unit values is characteristic of the order of likeness matrix throughout its arrangement, and may be used as a basis for checking the computation of the matrix.

Note that the cross-correlation functions for the numeral "1" appear in the last column of the reference matrix in every row except the first row. Advantage is taken of this fact to aid in decoding a matrix of unknown characters, in the operations described below.

In those instances where the per unit distinction between adjacent cross-correlation functions in a row is less than 0.02, those adjacent functions have been enclosed in a square, for example, as indicated at 26 and 28 in the first row of the matrix of FIG. 10. It will be recognized that a large percentage of the numbers and cross-correlation functions shown in FIG. 10 are enclosed within such squares, and thus are not suitable for use in decoding a matrix of unknown numerals. The reasons that such a large proportion of the cross-correlation functions are so close together are: (1) that the particular font of numerals chosen is so simple and (2) that the number of squares employed is so small as compared to the size of the numeral. In a more practical system, using more typical characters and a considerably larger number of squares, there would be relatively few instances where it would be necessary to avoid use of certain combinations in decoding by enclosing them in squares as indicated at 26 and 28 in FIG. 10.

The matrix of FIG. 10 applies not only to the font shown in FIGS. 3*a* to 3*j*, but also to the transformation of that font shown in FIGS. 4*a* to 4*j*. If a reference matrix is figured out for the font shown in FIGS. 4*a* to 4*j*, it will be exactly the same as the matrix shown in FIG. 10, even though the font of characters is different. This will be true of any affine transformation of the characters shown in FIGS. 3*a* to 3*j*, and for many non-affine transformations.

As previously pointed out, the machine typically operates by comparing the autocorrelation functions of the characters read with the normalized autocorrelation functions of a previously recognized font of characters. When a font appears which is not recognized by this comparison the apparatus proceeds to collect a set of unlike characters which are unrecognized, equal in number to the set of characters which the machine has been designed to read. The apparatus then computes the cross-correlation functions of these unknown characters and analyzes the resulting received matrix to try and match with the reference matrix of FIG. 10.

The decoding may proceed, for example, by assigning the identification "1" to the numeral which appears most often in the right hand column (the least like column of the matrix). The next step may be to assign the identification "0" to the character whose cross-correlation functions appear most often in the next to last column of the matrix. Note that in the matrix of FIG. 10, the cross-correlation functions of the character "0" appear in the next to last column in all but the first, eighth, and last lines of the matrix. Having tentatively identified the "1" and "0," the decoding may proceed by turning to the rows of the matrix and utilizing the 1 row to establish the identity of the "4" and "3" characters (the "0" character has already been identified and the other characters are enclosed within the squares 26 and 28 so that their identification is not certain in the "1" row). The "0" row may be similarly used to identify the characters "8," "5," "2" and "3." The "4" row can be used to identify the character "6." The "2" row can be used to identify the character "7" and cross-checked with the "5" row. The character "9," which is the only remaining character to be identified, may be identified from the "3" row and cross-checked with the "5" row.

The foregoing outline of a decoding system based on the matrix of FIG. 10 is intended as an example only. There is typically a choice of systems available with any reference matrix. The system used in the apparatus described herein differs in many respects from the system outlined above. The actual system to be used in connection with any particular matrix depends upon the characteristics of that matrix. In general, however, it will be found best to make the initial identification of a character by seeking the character appearing most frequently in the least like column of the matrix.

The decoding of the received matrix is accomplished through the use of cues. If the font of received unrecognized characters is an affine transformation of the font on which the reference matrix was based, then the received matrix differs from the reference matrix only in the order in which the lines appear. The order in the reference matrix is in arbitrary (e.g., numerical) order, while the order in the received matrix will be a random order having no relation to the arbitrary order. Hence, where in a column of the reference matrix the same character appears in a certain proportion of the rows, that character may be recognized as the one which appears in the same column of the received matrix in the same proportion of the rows. Having recognized one character by comparison of its appearance in a particular column of the received matrix with its appearance in a particular column of the reference matrix, as the characters "1" and "0" were recognized in the decoding procedure outlined above, then the line or lines in the matrix in which those characters appear are identified and used to recognize other characters in the set.

It has been found, in all sets of characters with which the present invention has been tried, that the least like column of the matrix provides a cue by the presence of a certain character in a large proportion of the rows. Where the characters are numerical, that character is always the character "1." Where the characters are alphabetical, the lower case "*l*" and the lower case "*i*" appear approximately the same number of times in the least like column. These two characters can be readily separated and identified by other techniques, because of the dot over the *i*. For example, where the autocorrelation functions are determined, the $E_1$ element of the character small "*l*" will be somewhat larger than the $E_1$ element of the small "*i*." If both alphabetical and numerical characters are employed in the font to be recognized, then the small "*l*" and the numerical "1" are substantially indistinguishable, and have to be transmitted to the readout of the apparatus as the same character, with a distinction being made between them at the readout, usually on a basis of context. For example, the alphabetical character (*l*) almost never appears by itself, but is almost always preceded or followed by another alphabetical character. While it may be preceded or followed by a space, it is almost never both preceded and followed by a space. The numerical character "1" on the other hand, may be preceded and followed by a space, or it may be preceded or followed by other numerical characters. The numerical "1" and the alphabetical "*l*" are therefore separable from each other by comparing the identities of the preceding and following characters.

Instead of deriving the cross-correlation sums G from products of the autocorrelation functions of the specimens and normalized autocorrelation functions of the reference patterns, equivalent results may be secured by normalizing both the specimen functions and the reference pattern functions.

*FIG. 11*

This figure is a block diagram showing the principal units employed in a character recognition apparatus embodying the invention. In this diagram, each principal unit is indicated by a labeled block. The blocks are connected by single lines to which arrowheads have been applied to indicate the direction of flow of information through the system. While the connecting lines in this figure may indicate that an output of one block is connected to the inputs of several other blocks in parallel, it should be borne in mind that these lines represent the flow of information, not of electric current, and that the input lines of the several blocks receiving the information may be electrically in series, as described more fully below. Each single line in this figure represents a large number of electric connections, as will be apparent from the following detailed disclosure. Each block in FIG. 11 includes a legend identifying a particular major unit of the apparatus, and also a legend identifying the particular figure or figures of the drawing in which the details of that unit may be found.

The principal unit includes an information source 26, and autocorrelation element generator 28, a control unit 30, a normalizing unit 32, an M memory 34, a multiply-add unit 36, an N memory 38, an analyzing unit 40, including P and Q memories, a matrix check unit 42, a sort-compare unit 44, and an output character selector 46.

*Information source—FIGS. 12 to 15*

In order to simplify the disclosure of the present invention, the information source from which specimens to be identified are supplied to the apparatus has been shown as a paper tape 48, on which a series of numerical characters is printed. It may be assumed, for purposes of the present invention, that the characters are printed in black ink on white paper, although any color contrast may be employed. A plan view of the tape 48 is shown in FIG. 12.

Figures 12, 13:
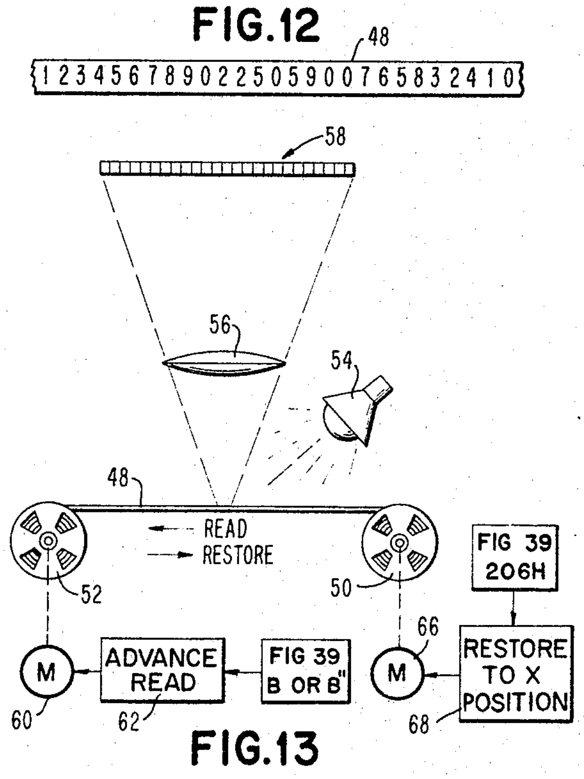
FIG. 12 is a fragmentary plan view of a paper tape which is used in the apparatus of FIG. 11 as a source of input characters.
FIG. 13 is a somewhat diagrammatic illustration of an apparatus for feeding the tape of FIG. 12 through a photoelectric reading mechanism.

In FIG. 13, the tape 48 is shown as proceeding from a storage reel 50 to a take-up reel 52. The paper tape 48 between the reels 50 and 52 is illuminated by lamp 54 and the light from the characters printed on the tape is reflected through a suitable optical system generally indicated at 56 to a bank of photocells 58. The reel 52 is driven by a motor 60 in a direction to advance the reading of the characters on the tape, i.e., to move the tape from the storage reel 50 to the take-up reel 52. The motor 60 is controlled by an advance read mechanism 62, which may be of any suitable type, and which responds to signal impulses received from the clocks illustrated in FIG. 39.

The reel 50 may be driven by a motor 66 in the reverse or rewinding direction. It is controlled by a mechanism generally indicated at 68 in FIG. 13 and labeled "Restore to X Position." The mechanism 68 receives an actuating signal from the CCC clock of FIG. 39 at a time 206H, as described below.

Figure 14:
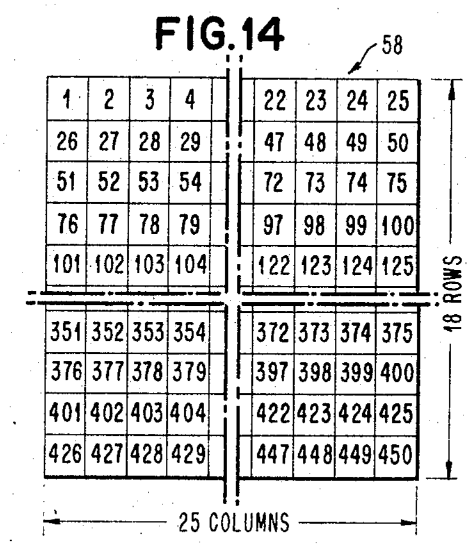
FIG. 14 is a plan view of an array of photocells used in the reading mechanism of FIG. 13.

The bank of photocells 58 is diagrammatically illustrated in FIG. 14. It may be seen that there are eighteen rows of photocells, and that theer are twenty-five photocells in each row. The photocells are illustrated as square and as completely filling the observed area of the block 58. Thus there are 450 photocells.

Figure 4A:
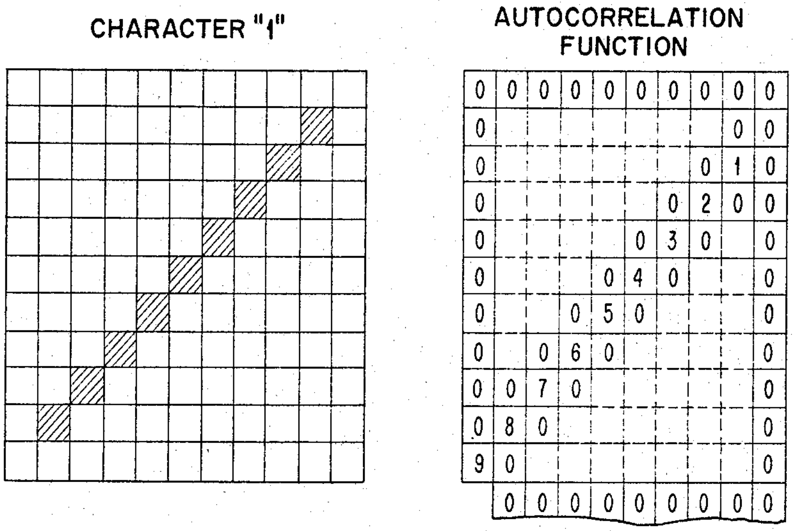
Figure 4B:
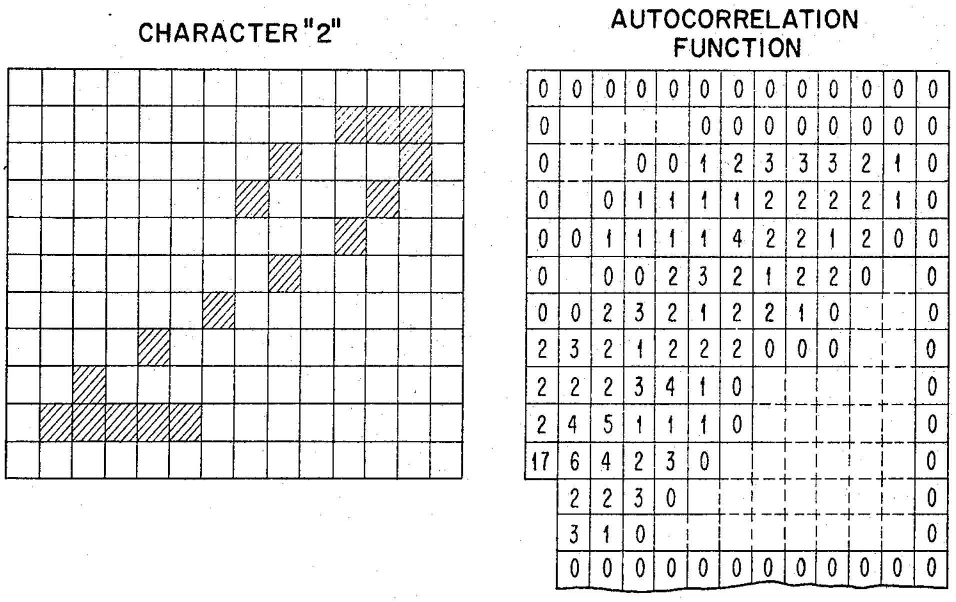
Figure 4C:
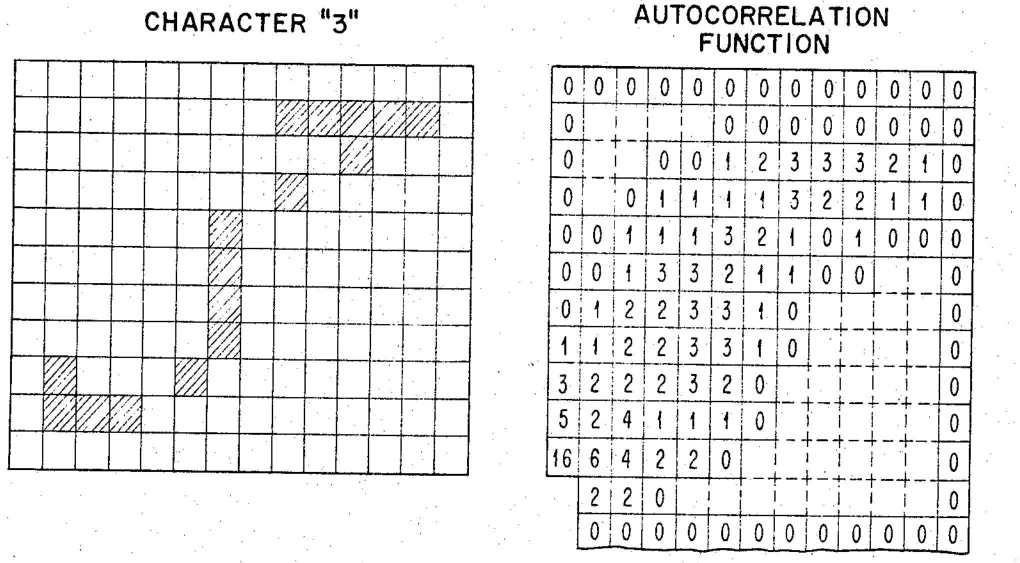
Figure 4D:
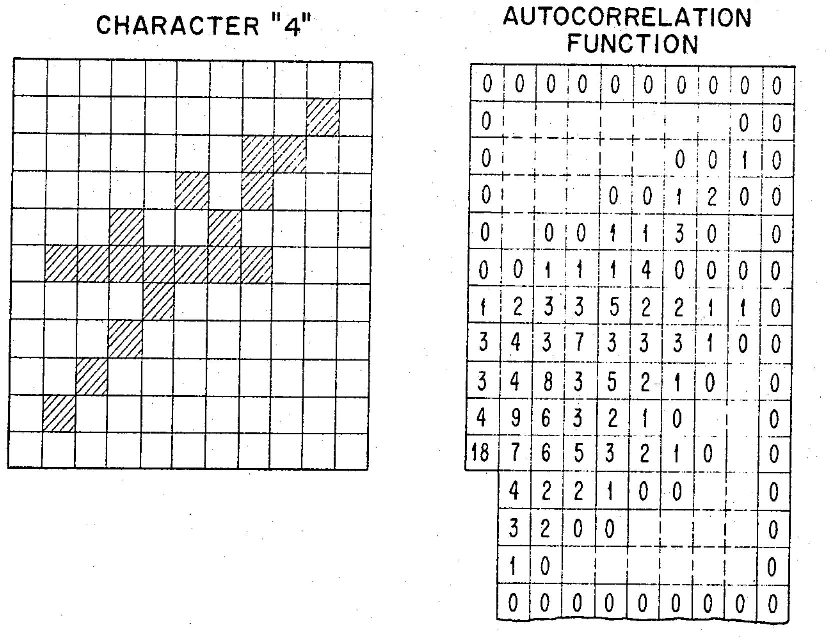
Figure 4E:
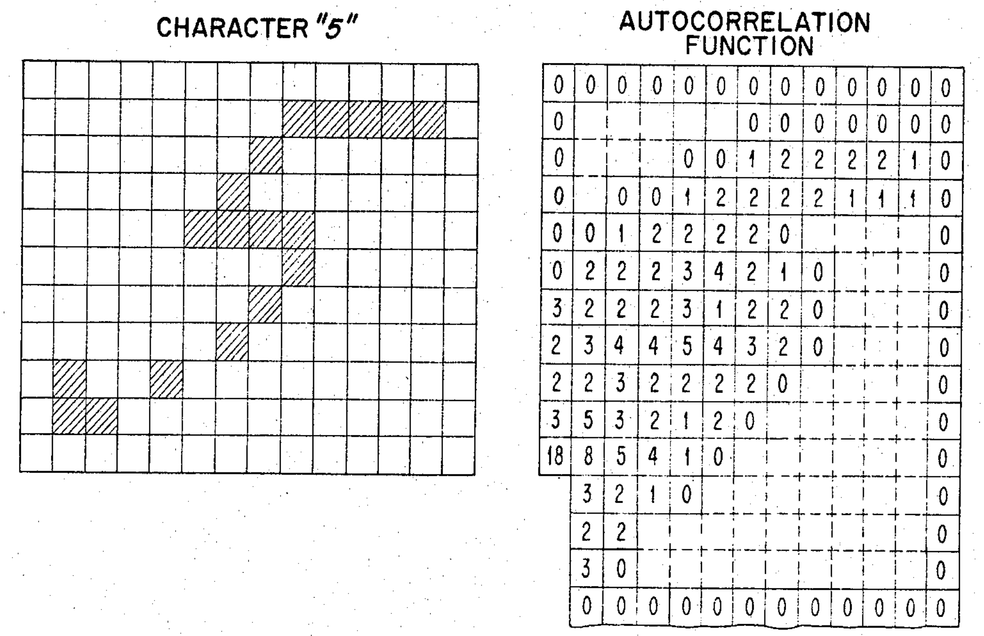
Figure 4F:
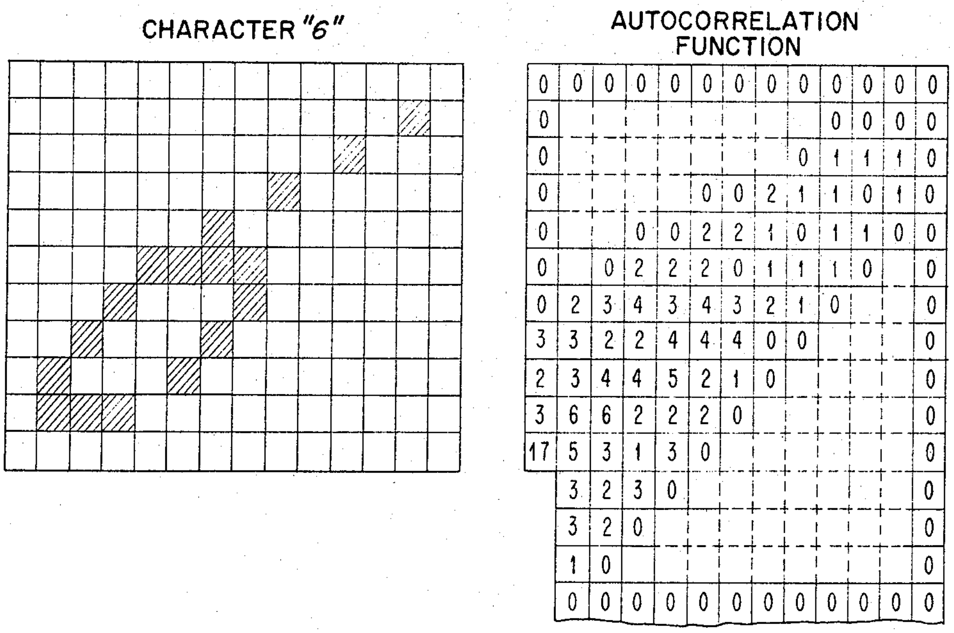
Figure 4G:
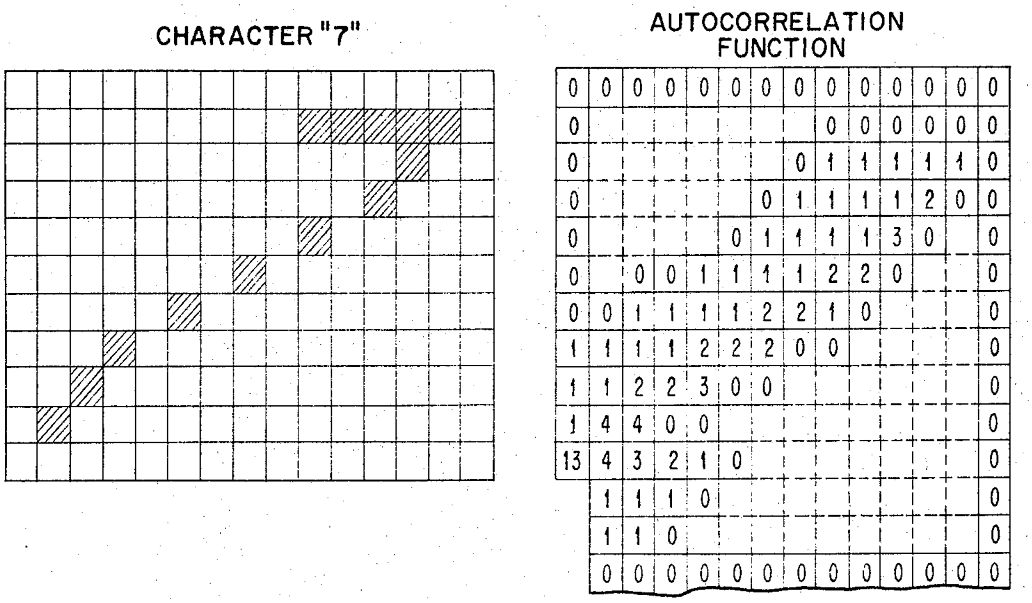
Figure 4H:
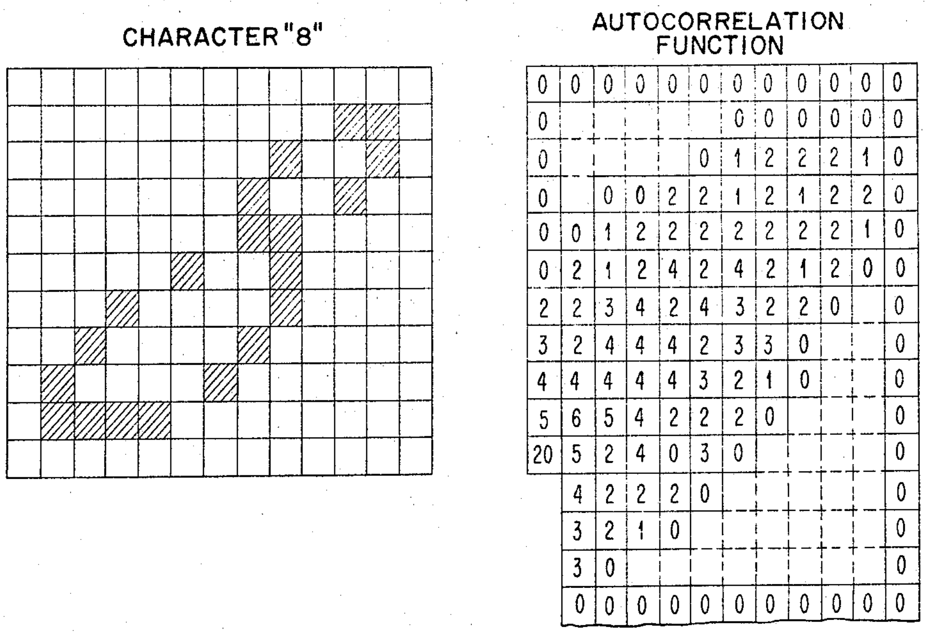
Figure 4I:
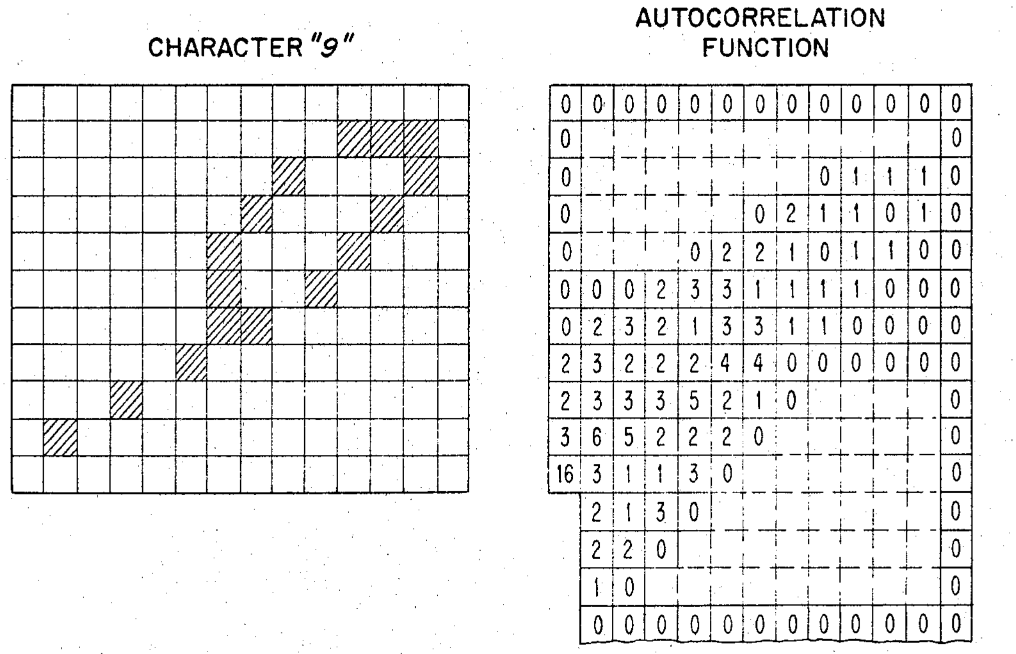
Figure 4J:
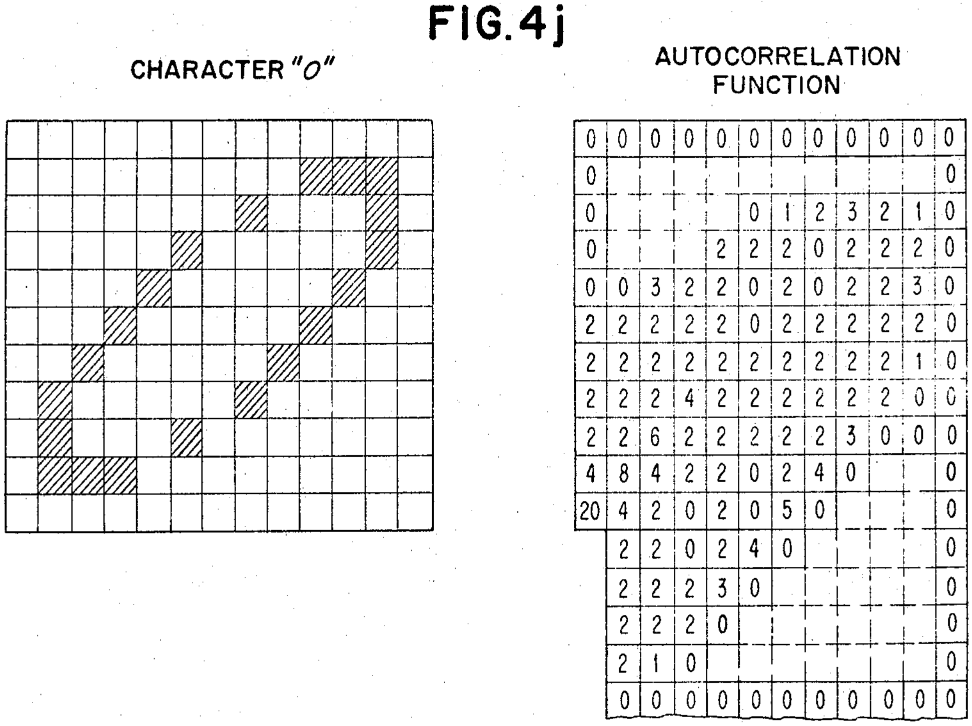

The selection of a particular number of photocells is based on the dimensions of the largest character which the apparatus is expected to recognize and on the maximum lateral and vertical shifts permitted within the field of observation. Referring to FIG. 4*g*, it may be seen that the widest character in the font of FIGS. 3 and 4 is the skewed character 7 of FIG. 4*g*, which is illustrated as being thirteen elements wide. The array of photocells shown in FIG. 14 permits a shift of this character "7" from an extreme left-hand position in which its farthest left element appears in the first column in FIG. 14 and its farthest right element appears in the column headed by cell number "13" to a farthest right position in which its most leftward element appears in the column headed "13" and its farthest right element appears in the column headed "25." Thus, the lateral width of this particular array of photocells is based on a rule that if the widest character to be recognized is $n$ elements wide, then the array of photocells is $2n-1$ elements wide.

All of the characters shown in FIGS. 3 and 4 are nine elements high, so that eighteen rows of photocells are provided to allow a vertical shift of each element within the field of the photocells equal to the height of the character. The array of photocells may be made larger to accommodate greater shifts of the specimens to be observed, without modifying the ability of the system to identify the specimens.

Alternatively, the array of photocells may be made to have a number of columns equal to the number of elements in the width of the widest character, plus one or more. Then, as a specimen passes across the photocell array, the first column after a blank column may be recognized, by suitable apparatus, as the beginning of a character, and the data defining the character is gated out of the photocells and into the apparatus of FIG. 18 when the last several successive blank columns reach the right hand position in the array of photocells. Where such a smaller array of photocells is used, further apparatus is required at the inputs to FIG. 18 to render certain of those inputs blank, as described below in connection with that figure.

Figures 15, 16, 17, 19:
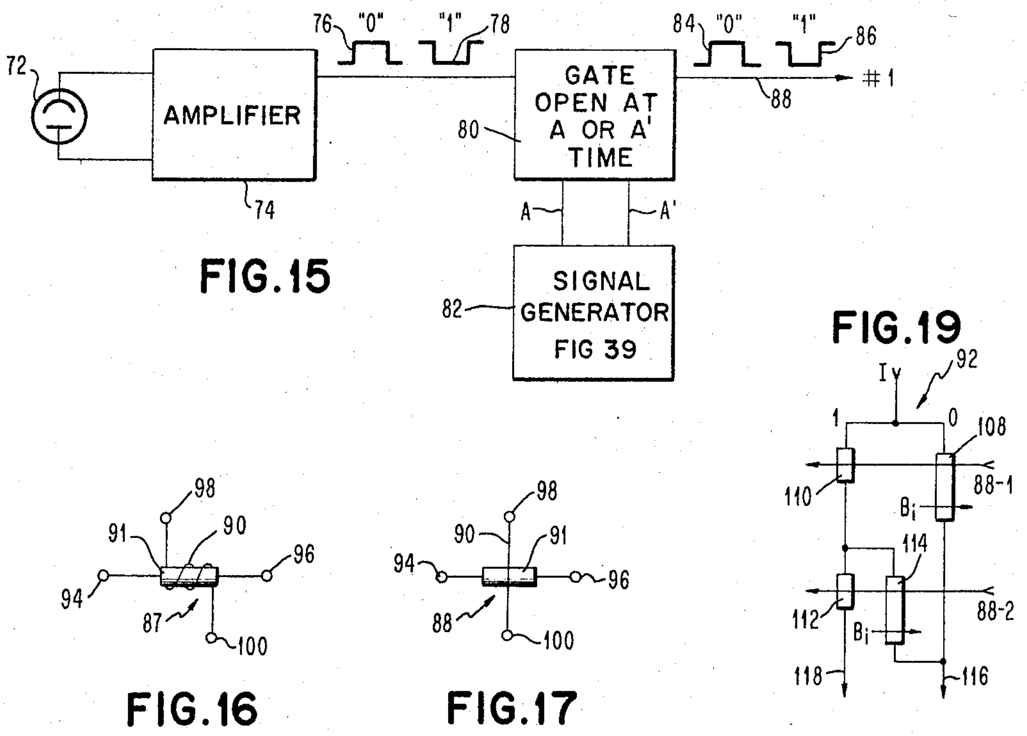
FIG. 15 is a diagrammatic illustration of a wiring diagram of the circuitry connected to one of the photocells of FIG. 14.
FIG. 16 is a diagrammatic illustration of a cryotron, as used in the circuits of the apparatus.
FIG. 17 is a diagram similar to FIG. 16, but shown conventionally, as used in the other figures of the drawing.
FIG. 19 is a wiring diagram of a cryotron and circuit used in the autocorrelation element generator of FIG. 18.

Each of the photocells shown in FIG. 14 is connected in a circuit such as shown in FIG. 15. As there shown, a photocell 72 has its electrodes connected to input terminals of an impedance matching amplifier 74 which in arranged to produce an output signal consisting of a square wave positive pulse 76 having an arbitrary value "0" when the photocell 72 is illuminated and to produce an output signal 78 having an arbitrary value "1" when the cell 72 is not illuminated. The signals from the amplifier 74 are supplied to the input of a gate circuit 80 controlled by time impulses from a signal generator 82 shown in greater detail in FIG. 39. The signal generator includes clocks which supply opening impulses to the gate 80 at either a cyclically repeated time A or a cyclically repeated time A', to be described in greater detail below. The output signals from the gate circuit, shown at 84 and 86, appear on an output line 88 and correspond respectively to the signals 76 and 78 at the output of the amplifier 74.

*FIGS. 16–20*

Apparatus embodying the present invention necessarily includes complex electrical circuitry for carrying out the various arithmetic and logic operations involved. In order to present that circuitry in as simple a form as possible, the embodiment disclosed herein utilizes cryotrons.

The term "cryotron" as used herein refers to cryogenic gating devices composed of materials which are said to be normally superconductive when maintained at very low temperatures such as may be achieved by immersion in liquid helium, for example. These cryotron gating devices include a main or gate conductor of superconductive material and a separate control conductor arranged such that when a current is provided in the control conductor, it is effective to produce a magnetic field which causes the gate conductor to lose at least some of its superconductive properties so that the gate conductor becomes resistive.

FIGURE 16 illustrates such a cryotron device 87 having a control winding 90 around a gate elemet 91. The current to be gated or controlled flows through the gate element 91 between terminals 94 and 96, while the control current which causes such gating flows through the winding 90 between terminals 90 and 100.

In FIGURE 17, the cryotron of FIGURE 16 is illustrated in a simplified form, the same reference numerals being employed to designate corresponding parts. It is to be seen that the only difference is that the winding 90 is represented in FIGURE 17 simply by a conductor disposed across gate element 91. This simplified representation of a cryotron is employed throughout the drawings. The circuit lines or wires and the control conductor or winding 90 of each cryotron may be composed of a so-called "hard" superconductor material such as niobium or lead. On the other hand, the gate element 91 of each cryotron is composed of a "soft" superconductor material such as tantalum or tin, for instance. The current employed is such that the current in the control winding 90 creates a magnetic field which exceeds the critical field value to cause the gate to become resistive, but the field does not exceed such a critical value with respect to the material of the control winding 90 and the interconnecting lines and wires, so that these elements remain substantially superconductive.

When two gate conductors are electrically connected in parallel, one being superconducting and the other being resistive, a current flowing to the parallel combination will flow entirely through the superconducting gate, although the other gate may exhibit only a few tenths of an ohm resistance. Then, if the resistive gate is allowed to become superconducting, the current will continue to flow through the original superconducting gate. Thus, current is caused to flow through a selected path which is maintained superconducting and such current will continue to flow in that path even though other parallel paths later become superconducting. Cryotron circuits such as those disclosed herein commonly include such alternate paths.

To promote the clarity and ease of understanding of the cryogenic circuits shown herein, the custom is followed throughout the drawings of showing alternate circuit paths indicating or storing binary zero or binary one with the "zero" line at the right or the top and with the "one" line at the left or the bottom.

It is to be understood that the cryotron devices may be constructed of thin films such as are shown and described in copending application Serial Number 625,512, filed November 30, 1956, by R. L. Garwin and entitled "Fast Cryotrons" and assigned to the same assignee as the present invention. Another patent application which is of interest in connection with the present application is Serial Number 29,897, filed May 18, 1960, and now abandoned, by M. K. Haynes, entitled "Adder Circuit" and assigned to the same assignee as the present invention. Additional information on cryogenic superconductive gating devices and certain logical circuits which may be created with such devices is contained in an article by D. A. Buck entitled "The Cryotron–A Superconductive Computer Component" in Proceedings of the IRE, volume 44, No. 4, pages 482–493, April 1956.

*FIG. 18*

Figure 18:
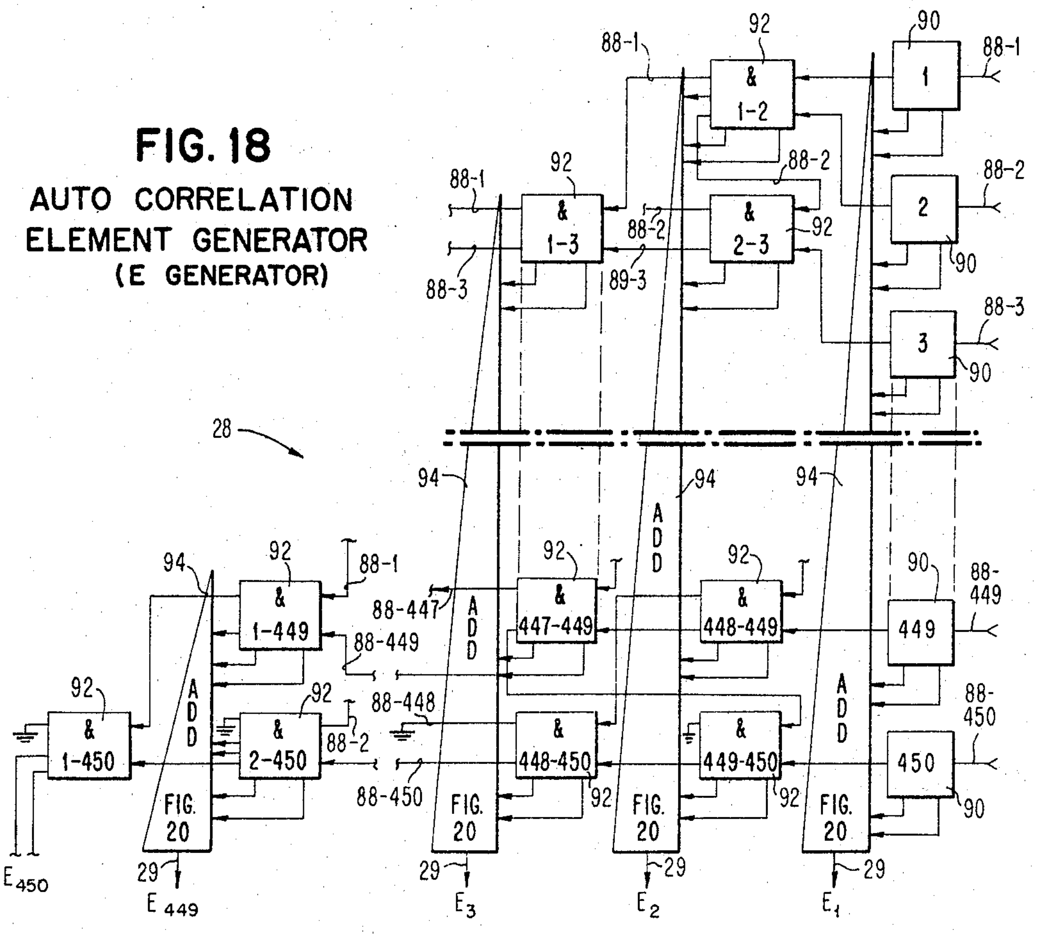
FIG. 18 is a diagrammatic illustration of the autocorrelation element generator used in the apparatus.

FIGURE 18 illustrates in block diagram form the autocorrelation element generator shown as a single block at 28 in FIGURE 11. The generator of FIGURE 18 has 450 input lines appearing at the right-hand side of the figure, each corresponding to one of the 450 photocells of FIGURE 14, and each connected to a particular photocell by circuitry such as shown in FIGURE 15 leading from the photocell 72 to the wire 88, which may be characterized either as an output line of the information source 26 or as an input line of the autocorrelation element generator 28. Thus, the line 88 connecting the blocks 26 and 28 in FIGURE 11 represents a large number (in this particular embodiment, 450) of lines cabled together. Each input line in FIGURE 18 is given a hyphenated designation consisting of the reference numeral 88 followed by a numerical designation, such as 88–1, 88–450. The current through each of the input lines 88 flows through a cyrogenic converter 90, shown in detail in FIGURE 20 which converts the single line information in the line 88 to the alternate line form conventional with cyrogenic circuits, and thence through a plurality of AND circuits 92, one of which is shown in detail in FIGURE 19. The number of AND circuits required is equal to the number of combinations of the 450 input lines, taken two at a time.

Figure 20:
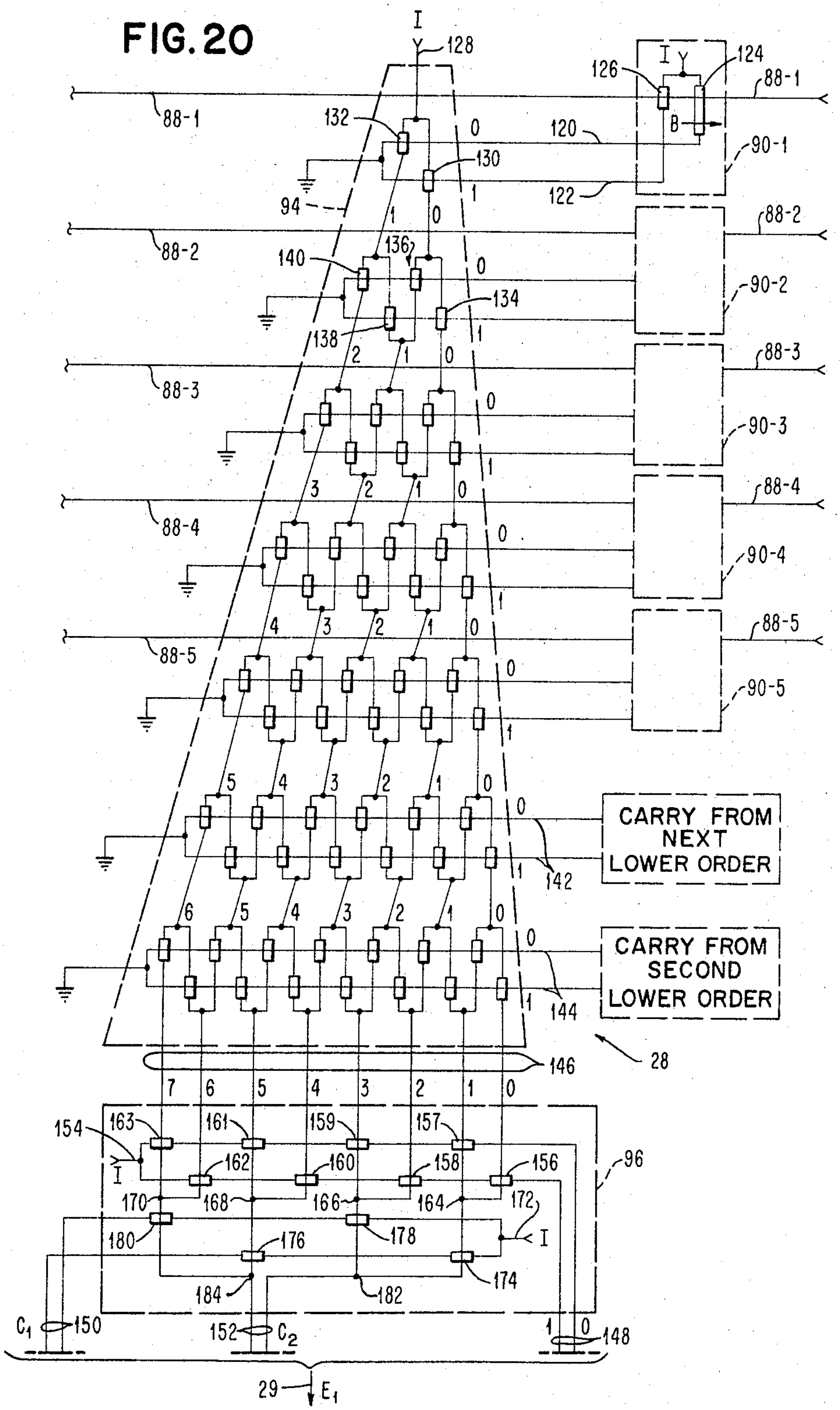
FIG. 20 is a wiring diagram of an adder circuit used in the autocorrelation generator of FIG. 18.

The outputs of the cyrogenic converters 90 are supplied to an adder circuit 94, shown in detail in FIGURE 20, which counts the number of input lines on which a signal is received at any given A or A' time. (The timing sequences employed are described below in connection with FIG. 39.) The adder 94 includes a binary coder 96 which converts its output into the binary form in which it appears on $E_1$ output lines 29.

Each AND circuit 92 in the column of such circuits nearest the right-hand side of FIG. 18 combines signals from two input lines numerically differing from each other by one. There is one AND circuit in this column for each such combination. For example, the uppermost AND circuit has two inputs from the input lines 88–1 and 88–2. The next AND circuit in the column has two inputs from the lines 88–2 and 88–3, and so on down the column. Most of the many AND circuits required are omitted from the drawing for the sake of clarity. The last two AND circuits in the column are shown as the AND circuit connected to input lines 88–448 and 88–449 and the AND circuit connected to input lines 88–449 and 88–450. The output lines of all the AND circuits in this column are connected to another adder 94 which includes a binary coder 96 connected to the $E_2$ output line 29. Each AND circuit in the second column of AND circuits in FIG. 18, from the right-hand side of that figure, combines input signals from two input terminals whose numerical designations differ from each other by two. Only three AND circuits are shown in this column in the drawing, namely the first one, which combines the signals from the input lines 88–1 and 88–3, the next-to-last one which combines the signals from lines 88–447 and 88–449 and the last one which combines the signals from 88–448 and 88–450. The output signals of the AND circuits 92 of this column are supplied to another adder 94, which includes a binary coder 96 connected to the $E_3$ output line 29.

Further columns of AND circuits are provided (not shown in the drawing), one column for each set of combinations of two inputs whose numerical designations differ from each other by a particular number. In the complete apparatus, 449 such columns will be required. The last two columns appear on the left-hand side of FIG. 18. The next-to-last column includes only two AND circuits 92, each of these two including input lines whose designations are 448 numbers apart. The uppermost of these two circuits combines the inputs of lines 88–1 and 88–449. The lowermost combines the inputs of line 88–2 and 88–450. The outputs of these two AND circuits are supplied to an adder 94 which includes a binary coder connected to $E_{449}$ output line 29. The last column consists of only one AND circuit, combining the inputs of lines 1 and 450. The output of that AND circuit is connected directly to the output line 29 for $E_{450}$, since no binary coder is needed as only one binary digit is involved.

Were a smaller array of photocells, such as one cell wider than the widest character, is used, as suggested above, the complete array of AND circuits shown in FIGURE 18 is not necessary to generate a complete autocorrelation function. In the present example, where the widest character is thirteen elements wide, then the array of photocells would be fourteen columns wide, but the extra column would be used only to recognize the leading edge of each specimen. The array of outputs from the photocells would consist of outputs eighteen rows with thirteen photocells in each row. Preceding the first row would be six permanently blanked inputs 88 in FIG. 18, and between each pair of rows would appear twelve permanently blanked inputs. If an autocorrelation element generator were to be constructed with a specific limit on the width of the obsreved specimens, then all the AND circuits connected to the blanked inputs could be eliminated. If, however, the generator is required to be somewhat more flexible as to the observed character width, all the AND circuits should be retained, and suitable switching arrangements provided for blanking selected inputs 88.

The apparatus as shown is intended to observe positive characters, e.g., black-on-white. It could readily be adapted to observe negative characters, e.g., white-on-black, providing apparatus to complement all the inputs to FIGURE 18.

*FIG. 19*

This figure illustrates the details of construction of one of the cryogenic AND circuits 92. The AND circuit 92 includes a pair of alternate current paths, identified conventionally as "0" and "1" paths, leading to output lines 116 and 118, and supplied from a common constant current source indicated at I in the drawing. A cryotron 108 is connected in series with the "0" alternate current path. The "1" side of the alternate circuits includes in series two cryotrons 110 and 112. A crossover cryotron 114 is connected between a point in the "1" path between the cryotrons 110 and 112 and the "0" output line 116.

The input line 88–1 passes through control windings of the cryotrons 108 and 110. The input line 88–2 extends through control windings on the cryotrons 112 and 114. The cryotrons 108 and 114 are supplied with bias windings indicated at B; in the drawings, through which a constant current flows in a direction to oppose the effects of the currents in the input lines 88–1 and 88–2, respectively.

*Operation of FIGURE 19*

When that part of an observed specimen projected on a particular photocell of the bank 58 is black, the circuitry associated with that photocell produces an output signal such as that indicated at 86 in FIGURE 15, having a substantially zero current value. It is desired to have the AND circuit of FIGURE 19 produce an output on the "1" line of the alternate circuits only when both the input lines 88–1 and 88–2 have zero current value signals 86 impressed on them, such zero current signals having a nominal value of "1," as indicated in FIGURE 15.

When there is no current flowing in the input lines 88–1 and 88–2, the bias winding on cryotron 108 blocks that cryotron, so that the current from the source I must necessarily flow through the cryotron 110. The bias current also blocks the crossover cryotron 114, so that the current from the source I continues through the cryotron 112 and out the "1" output line 118.

If the input line 88–1 has current flowing in it, then that current in the control winding of cryotron 108 opposes and bucks down the effect of the bias winding current, so that cryotron 108 is superconductive and current from the source I flows through the cryotron 108 to the "0" output line 118. At the same time, the current in line 88–1 flows in the control winding of cryotron 110 and blocks it.

If no current (signal condition 86) flows in input line 88–1, but current flows in input line 88–2, then the current from the source I is blocked at cryotron 108 by the effect of the bias winding. The current in line 88–2 blocks the cryotron 112, and also opposes the effect of the bias winding on cryotron 114, thereby making cryotron 114 superconductive so that the current flowing through cryotron 110 also flows through cryotron 114 and out the "0" output line 116.

It should be observed that the input lines 88–1 and 88–2 pass through the AND circuit 92, without being substantially loaded by the control windings of the cryotron therein. Referring to FIGURE 18, it may be seen that the input line 88–1 threads through the cryogenic converter 90 and then in series through all the AND circuits 92 which involve a combination including the input line 88–1. Similarly, the input line 88–2 threads through a converter 90, and through all the AND circuits in series which involve the input line 88–2. Each input line threads in series through a converter 90 and then through all the AND circuits involving a combination of numerical designations including the designation of that input line. After passing through all the AND circuits, each input line is terminated at ground.

*FIG. 20*

The details of one of the cryogenic converters 90 is shown in this figure in the case of the converter 90–1 connected with the input line 88–1. It may be seen that the converter 90–1 includes a pair of alternate current paths leading from a constant current source I to a pair of alternate "0" and "1" output lines 120 and 122. A cryotron 124 is connected in series with the "0" output line, and a cryotron 126 is connected in series with the "1" output line 122. The cryotron 124 is provided with a bias winding B. The current in the input line 88–1 flows through the control windings of both the cryotrons 124 and 126.

When there is no current in the input line 88–1, the bias winding current blocks the cryotron 124 and makes it resistive, while the cryotron 126 is superconductive, so that a signal current appears on the "1" output line 122. When there is current in the input line 88–1, that current flowing in the control winding of cryotron 124 opposes the bias current of that cryotron, so that it becomes superconductive and the current from source I flows out on the "0" output line 120. At the same time, the current in the input line 88–1 flowing through the control winding of cryotron 126 blocks the flow of current through that cryotron so that no current flows out on the "1" output line 122.

In the adder 94, zero or one bit signal currents enter at each input converter 90, and a constant current entering at the top as indicated at 128, is switched in the adder 94 to sum the one bits. Thus, a pair of cryotrons 130 and 132 are provided at the word one level (converter 90–1 output lines), having their gates arranged to alternatively receive the current from current source 128, and having their control windings traversed by the information currents transmitted from the converter unit 90–1. A "zero" information current received on the control winding of cryotron 132 forces the current from 128 to traverse the gate of cryotron 130 to indicate a zero sum from this word one level. Conversely, a "1" information current proceeding from the line 122 through the control winding of adder cryotron 130 closes the gate 130 and forces the current from 96 through the gate of cryotron 132 on the "1" count branch. At the word one level (converter 90–2 output lines) of adder 94, two pairs of cryotrons 134, 136 and 138, 140 are provided. In a manner of operation similar to that described above, a zero count at the word one level issuing as a current through the gate of cryotron 130 will be raised from "0" to "1," if a "1" signal current appears at the control winding of cryotron 134 to force that current through the gate of cryotron 136, while a "0" signal at the control winding of cryotron 136 will force the current through the gate of cryotron 134 to again indicate a "0" count directly beneath the second level of adder 94. In a similar manner, if a "1" bit was counted at the word one level, a one bit can also be counted at the word two level by a current from converter 90–2 which traverses the control winding of cryotron 138 to force current through the gate of cryotron 140. Conversely, a zero bit at the word two level will provide current through the control winding of cryotron 140 and force the current through the gate of cryotron 138 to maintain the count at the one level. It will be understood from the remainder of the diagram of the network that for each added word position of the network, the network is widened by one pair of cryotrons for the purpose of providing the possibility of achieving a higher count.

In order to simplify the circuitry, the adder 94 is provided, at convenient intervals, with a binary coder 96, which converts the information appearing on the output lines 146, only one of which is energized at a given time, into a set of binary alternative pairs, on which the information appears in binary form. This conversion of the "one out of *n*" circuits to a plurality of alternative pairs corresponding to binary orders is shown and described in greater detail in the copending application of Harold Fleisher and Robert I. Roth, Serial No. 79,823, filed December 30, 1960, and now Patent No. 3,141,964, entitled Calculating Memory. For example, immediately below the word five level, the information lines 142 enter the network to indicate a carry one $C_1$ signal from the *n*–1 order, (the order shown being the *n* order) and at the next level below that, information signals enter on lines 144 for a carry two $C_2$ signal from the *n*–2 order. It is to be seen that at each of these two levels the network also becomes two cryotrons wider, so that at the output connections 146 from the adder 94, there is a possibility of the indication of any count from zero through seven as indicated by a current on one of the eight lines 146. The lines are respectively labeled with their values zero through seven. This information at the connections 146 may be said to be conveyed in the form of a "one out of eight" signal, since the information is represented as a unique signal condition on only one out of the eight separate current paths.

The one out of eight information signal on lines 146 is converted in the binary coder network 96 into a binary form including a sum bit having a zero or one value indicated by an output on one of the pair 148, a first order carry signal $C_1$ on output pair 150 which is indicative of the presence of a two component, and a second order carry signal $C_2$ an output pair 152 indicative of the presence of a four component. The sum bit for output pair 148 is derived from current supplied at a current source connection 154 to the even or odd circuit cryotrons 156 through 163. Thus, if the output from the network at connections 146 is odd, a current will flow through one of the control windings of cryotrons 157, 159, 161 or 163 to force the current 154 through the gates of cryotrons 156, 158, 160 and 162 to indicate a "1" value for the sum. Conversely, if the output from the network on connections 146 is even, the current will traverse the control windings of one of the cryotrons 156, 158, 160 or 162 to force the current from 154 through the gates of cryotrons 157, 159, 161 or 163 to indicate a zero sum on the output pair 148. Immediately below the cryotrons just mentioned, adjacent pairs of lines are joined to simplify the subsequent portions of the decode network. Thus, the zero and one lines are joined at 164, the two and three lines at 166, the four and five lines at 168, and the six and seven lines at 170. The outputs from these joined pairs thus serve as an indication of a count by two which is needed for the generation of the carry one output $C_1$ on lines 150. For this purpose, a current is supplied at 172 to traverse a branch circuit containing cryotrons 174 and 176 to indicate a one value, or to traverse a branch containing cryotrons 178 and 180 to indicate a zero value for the first order carry $C_1$. Thus, if the count is two or three or six or seven, the current is supplied either from point 166 or point 170 through the control windings either of cryotron 178 or 180 to force the 172 current through the branch including cryotrons 174 and 176 to indicate a "1" value for the first order carry $C_1$. On the other hand, if the count is zero or one or four or five, current is supplied either from point 164 or point 168 through the control winding either of cryotron 174 or 176 to force the current into the other branch including the gate of cryotrons 178 and 180 to indicate a zero order carry $C_1$.

The currents from the last-mentioned cryotrons are further joined into pairs as indicated at 182 and 184 and current beyond the point 182 thus indicates a value of zero through three, or a current beyond point 184 indicates a value of four through seven. These are respectively the conditions which call for a "0" value of second order carry $C_2$ or a "1" value of the second order carry $C_2$, and accordingly the circuits beyond points 182 and 184 may be directly employed as the zero and one signal lines for the $C_2$ output pair 152.

*Summary of FIGS. 16–20*

Referring to FIGURE 18, the output of the autocorrelation element generator 28 is shown at the bottom of FIGURE 18 as a number of vertical lines labeled $E_1$, $E_2$ . . . $E_{449}$, $E_{450}$. Each single E output line illustrated in FIGURE 18 actually consists of a plurality of alternative pair circuits such as those shown at 148, 150 and 152 in FIGURE 20. Typically, each E line of FIGURE 18 will include a number of pairs equal to the number of binary orders necessary to indicate the maximum total which may be expected from its associated adder 94. In the case of the output line $E_1$, a sufficient number of binary pairs would be necessary to indicate a total count of 450. The maximum count which can be produced by the output line $E_{449}$ would be 2, so that only two binary orders are required and hence only two alternative pairs. The output line $E_{450}$ can indicate "1" as a maximum total, so that it needs only one alternative pair.

The output lines $E_1$ . . . $E_{450}$ of FIG. 18 are illustrated in FIGURE 11 by a single line 29 having three parallel branches **29*a*, 29*b*, 29*c*, leading respectively to the control unit 30, the M memory 34 and the normalizing unit 32. While the flow of information between the autocorrelation element generator 28 as a source and the control unit 30, normalizing unit 32 and the M memory 34 as destinations may be properly regarded as a flow from one source to the three parallel destinations, nevertheless, the actual circuits which carry the flow of information from the output line $E_1 \ldots E_{450}$ to these three destinations are series circuits. That is, the output lines 29 representing $E_1 \ldots E_{450}$ extend through the inputs of the control unit 30, the normalizing unit 32 and the M memory 34 in series. In each of these units, the information available as flowing currents on the lines $E_1 \ldots E_{450}$ is picked off as required and transferred to the operating elements of the respective units 30, 32 and 34**.

When the apparatus of FIGURE 13 views the numeral "1" of FIGURE 3A, and the gates 80 of FIGURE 15 are opened, then the apparatus of FIGURES 18 and 20 produces at the outputs $E_1 \ldots E_{450}$ a series of numbers representing the autocorrelation function shown in the matrix in FIGURE 3A. $E_1$ will have a count of "9," since the circuits in the adder 94 count the number of "1" bits coming through the input lines 88. The next E line to have an indication other than "0" in it would be the line $E_{26}$ which compares the character "1" of FIGURE 3A with itself, when the character is shifted vertically one square. $E_{26}$ would carry a count of 8, since there would be eight overlapping squares and eight of the AND circuits would produce outputs equal to "1." Similarly, $E_{51}=7$, $E_{76}=6$, $E_{101}=5$, $E_{126}=4$, $E_{151}=3$, $E_{176}=2$, $E_{201}=1$. These are the same as the numbers of the autocorrelation elements as they appear in the matrix of FIGURE 3A.

Similarly, for any of the characters of the fonts of FIGS. 3 and 4, which may be observed by the apparatus of FIGURE 13, there would be produced on the lines $E_1 \ldots E_{450}$ numerals corresponding to the autocorrelation function matrices of FIGURES 3 and 4.

It should be remembered, in this discussion, that a downward shift of one space produces the same E value as an upward shift of one space. For that reason, the output line $E_{26}$, which carries an autocorrelation element corresponding to a downward shift of one photocell, as viewed in FIGURE 14, has the same count as appears in FIGURE 3A in the square that is shifted upward one space above the square 24.

*FIG. 21*

This figure illustrates in block diagram form the normalizing unit 32, which is shown as a single block in FIGURE 11. This unit performs the computation of the normalizing factor as illustrated by way of example in FIGURES *5a* and *5b*, and the multiplication of the autocorrelation elements $E_1 \ldots E_{450}$ by the normalizing factors to produce the normalized autocorrelation elements $F_1 \ldots F_{450}$.

Figure 21:
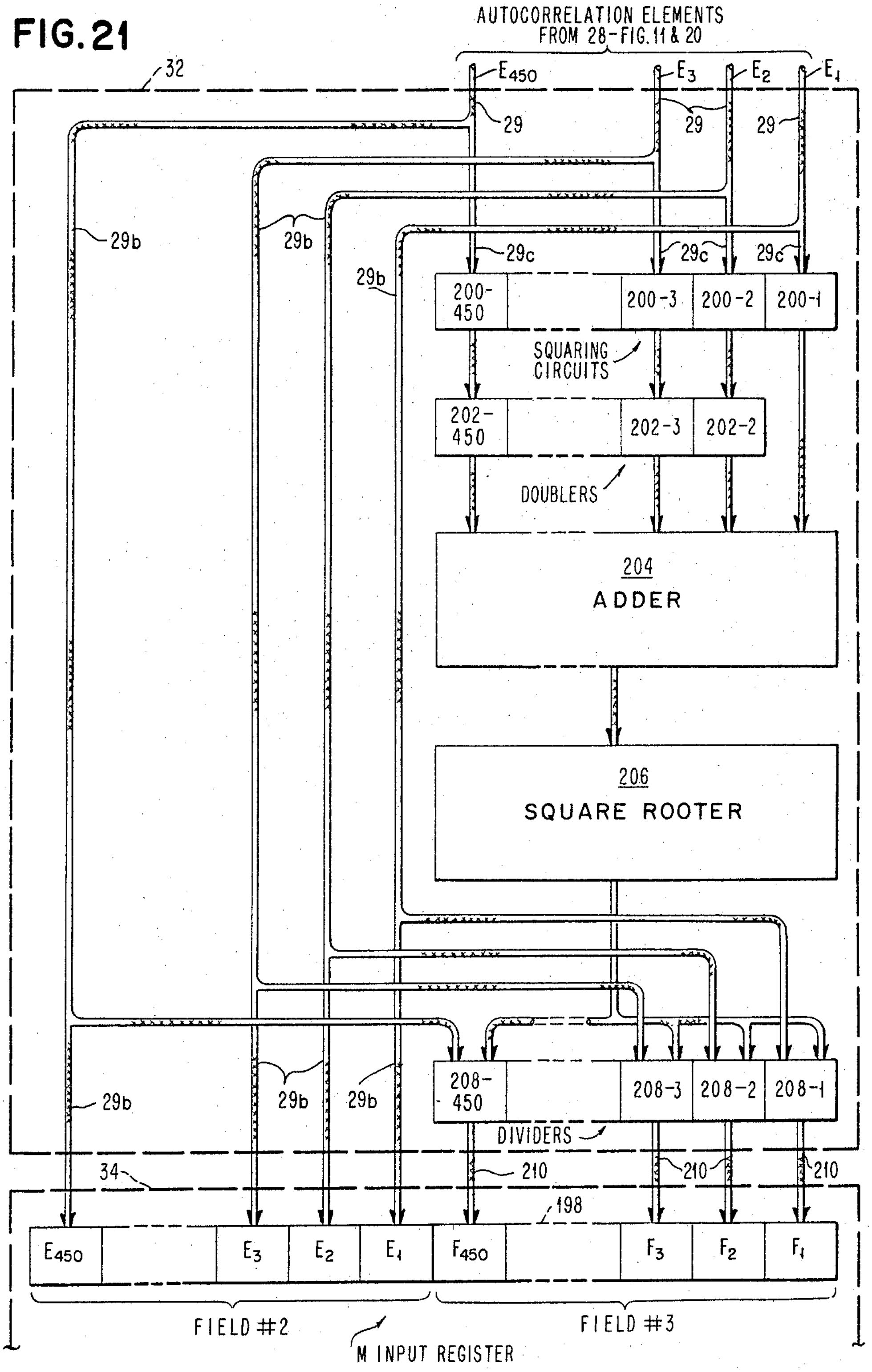
FIG. 21 is a block diagram illustration of a normalizing unit of the apparatus.

The data defining the autocorrelation elements proceed from the output lines 29 for the elements $E_1 \ldots E_{450}$' shown in FIGURE 18, which appear as input lines 29 in FIGURE 21. The connection including all these input lines is shown diagrammatically at 29 as a single line in FIGURE 11.

At the top of FIGURE 21, the input lines 29 are shown as dividing into two parallel sets of input lines **29*b* and 29*c*. The lines 29*b* proceed directly to the field #2 section of the input register 198 of the M memory 34**, which is shown diagrammatically at the bottom of FIG. 21.

The input lines **29*c*, although shown as paralleling the lines 29*b*, may actually represent series-connected cryotron circuits, as mentioned above. The lines 29*c* proceed to a series of squaring circuits 200–1 . . . 200–450**. A suitable squaring circuit is the multiplier illustrated in the co-pending application of Harold Fleisher and Robert I. Roth, Serial Number 117,332, filed June 15, 1961 and now Patent No. 3,163,749, entitled "Combinational Multiplier." These squaring circuits perform the function of deriving the second column of FIG. *5a* from the elements shown in the first column of that figure. The outputs of the squaring circuits are connected to the inputs of a plurality of doubler circuits 202–2 . . . to 202–450. Note that the output of the squaring circuit 200–1 does not pass through a doubler. The purpose of the doubler circuit is to supply, in the summing process, the value of the additional autocorrelation elements in the redundant portion of the autocorrelation matrix, which was omitted in FIGURE *3a*, and which likewise does not appear in the information inputs $E_1$–$E_{450}$. Since the center element of the matrix is not doubled, the output of squaring circuit 200–1 does not pass through a doubler circuit 202.

Since, in a binary system, doubling is accomplished by shifting each binary digit to the next highest binary order, the doublers 202 may, as constrcted, simply consist in changing the significance of each binary order, without any specific structure. This would mean, for example, that, at each input of the adder 204 except that connected to the squaring circuit 200–1, each binary output line from one of the squaring circuits is shifted to the next higher binary order at the input to adder 204.

The outputs of the doubler circuits 202 and of the squaring circuit 200–0 represent the figures in the subtotals column of FIGURE *5a*. These outputs are fed to the input of an adder 204 which performs the function of summing the column of subtotals in FIGURE *5a*. Adder 204 may be similar to adder 94 of FIGURE 20. The sum output of the adder 204 is supplied to a square rooter circuit 206. A suitable square rooter circuit is shown and described in the co-pending application of Harold Fleisher and Roebrt I. Roth, Serial Number 159,034, filed December 13, 1961, and now Patent No. 3,234,369, entitled "Computing Techniques." The output of the square rooter 206 is supplied as a divisor to the divisor input of each of a plurality of divider circuits 208–1 to 208–450. The dividends for the respective divider circuits 208 are supplied from the input lines **29*b***. A suitable divider circuit is shown and described in detail in the copending application of Harold Fleisher and Robert I. Roth, Serial Number 159,175, filed December 13, 1961, entitled "Computing Techniques."

The outputs of the divider circuits 208 are supplied through multiple line 210 to the inputs of the field #3 in the input register 198 of the M memory 34. The divider circuits in effect multiply each input element $E_1 \ldots E_{450}$ by the reciprocal of the output of the square rooter 206. The individual outputs of the divider circuits 450 thereby constitute the normalized autocorrelation elements, and the information in field #3 of the input register 198 constitutes the normalized autocorrelation function $F_1$–$F_{450}$ of the specimen being observed at the information source 26.

Note that all the functional operations mentioned above occur at the times A or A' during which the gate 80 of FIGURE 15 is open. In other words, on the same phase of the time cycle during which an input specimen is first observed, the elements E and the normalized elements F of its autocorrelation functions appear at the input register 198 of the M memory 34.

*FIGS 22–27*

The M memory illustrated in these figures is preferably a push down memory with a self-rearranging feature, as shown and described more completely in the co-pending application of Robert I. Roth, Serial Number 198,239, filed May 28, 1962 and now Patent No. 3,234,524, entitled "Push Down Memory." Those features of such a memory which are not necessary to an understanding of the present invention are either omitted from the following description entirely, or described only in functional terms, where such a functional description seems desirable. Reference is made to said co-pending application for the complete disclosure of the M memory.

Figure 22:
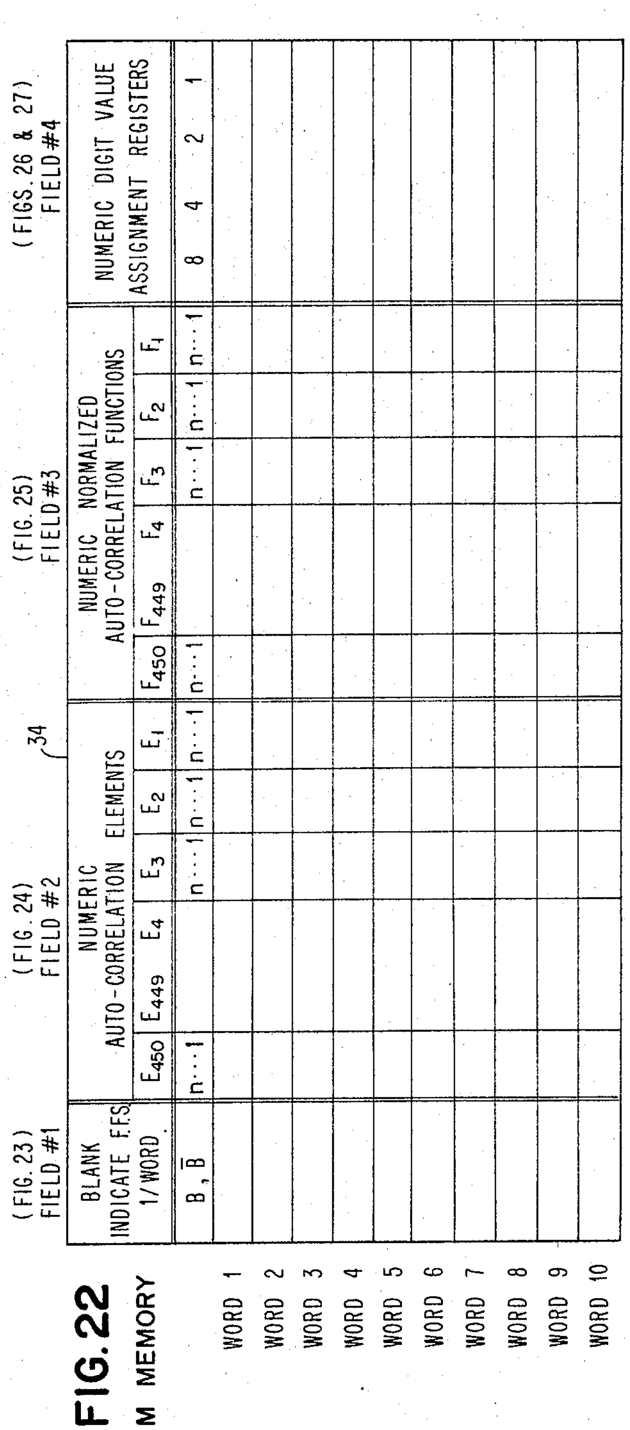
FIG. 22 is a tabular illustration of a memory unit used in the apparatus, hereinafter referred to as the M memory.

As illustrated in FIGURE 22, the M memory 34 has four fields, identified respectively as field #1, field #2, field #3 and field #4. Each of the four fields has a capacity of 10 words, and each word is associated with a corresponding location in each of the four memories. Thus, in diagrammatic FIGURE 22, the total M memory is shown as having 10 lines identified as "WORD 1" to "WORD 10." Each line extends across all four of the memory fields.

Information to be written into the field #2 and field #3 is first entered in the input register shown as 198 in FIGURE 21. Upon receipt of a write-in signal, the information in the input register 198 is written into the "WORD 1" line in field #2 and field #3. If at a subsequent time, another set of data is entered in the input register 198 and a further write signal applied to that register, the new set of data is moved into the memory location labelled "WORD 1" in FIGURE 22, and the set of data already appearing in "WORD 1" is transferred to the location labelled "WORD 2." The term "push down" memory arises from the fact that the data is entered in the memory from the top, and upon each entry of a new set of data, all the data in the memory is pushed down one location.

The transfer between words of the register is made through a series of intermediate registers, one located between each pair of word registers. These intermediate registers may at times be used for the side entry of data into a particular word of the memory, without going through the input register 198.

When the apparatus is recognizing input specimens as in phase (4) of the operation, as described above, the autocorrelation elements E of each of the ten reference numerals are entered in the ten lines of field #2, the corresponding normalized autocorrelation elements F of the same ten numerals are entered in field #3. Each line in field #4 of the memory contains a register in which is recorded the digit value assigned to the reference numeral whose E's and F's are stored in field #2 and field #3. During phase (4) of the operation, the digit value assignments appearing in field #4 appear therein in numerical order. In other words, the specimen in "WORD 1" is then identified as the numeral "1," and the other specimens in order down to the last (word 10) of the memory, wherein the digit value assignment of "0" (identified conventionally as 8+2 in the register) is stored.

*FIG. 23*

Field #1 of the register consists, for each line, of a bistable circuit or indicator flip-flop 211 whose condition indicates either blank ($B_0$) or not blank ($\overline{B}_0$). This field is used during the sorting operations when information is being entered into the memory. In the normal operation of phase (4), all of these bistable circuits are in the not blank condition. The setting of one of these words in field #1 to the blank condition means that upon the next subsequent entry of data from the input register 198, that line in the memory in all fields will be regarded as blank, and the information in it will not be pushed down to the location below, but will be erased.

This figure illustrates part of the circuitry for field #1 of the M memory.

The circuit shown in FIGURE 23 are operative to change the indicator flip-flops 211 in field #1 from their not-blank to their blank conditions at appropriate times. The circuits for changing the flip-flops 211 from blank to not-blank are associated with the write-in circuits, and are shown and described in the copending application Serial No. 198,239, mentioned above. There is also shown in FIGURE 23 a circuit for determining whether or not all 10 locations in the M memory 34 are full.

There are shown in this figure four flip-flop networks 211, vertically arranged one above the other, numbered 211–1, 211–2, 211–9 and 211–10 and respectively representing the indicator flip-flops for the words 1, 2, 9 and 10, as indicated by the legends in the drawing. The circuits for the word 1 will be completely described. The circuits for words 2, 9 and 10 do not differ from the circuits of word 1, except that certain connections and circuitry are omitted. Consequently, the circuitry for words 2, 9 and 10 will not be described in detail, except as may be deemed necessary for the complete understanding of the operation of the apparatus.

Current may flow from a constant source 212 through each flip-flop 211 either in a blank line $B_0$ or a not-blank line $\overline{B}_0$.

The not-blank line $\overline{B}_0$ includes in series the gates of cryotrons 214, 216, 218 and 220, and the control winding of a cryotron 222. The blank line $B_0$ is shown as including only the control winding for a cryotron 224. It should be understood that the blank line $B_0$ also includes one or more cryotrons whose function is to block that line and to transfer the current to the not-blank line $\overline{B}_0$. Such cryotrons are rendered resistive when a word is written into a particular line of the memory. Those cryotrons and the circuits for actuating them are shown and described in detail in the co-pending application Serial Number 198,-239, referred to above.

Figure 38:
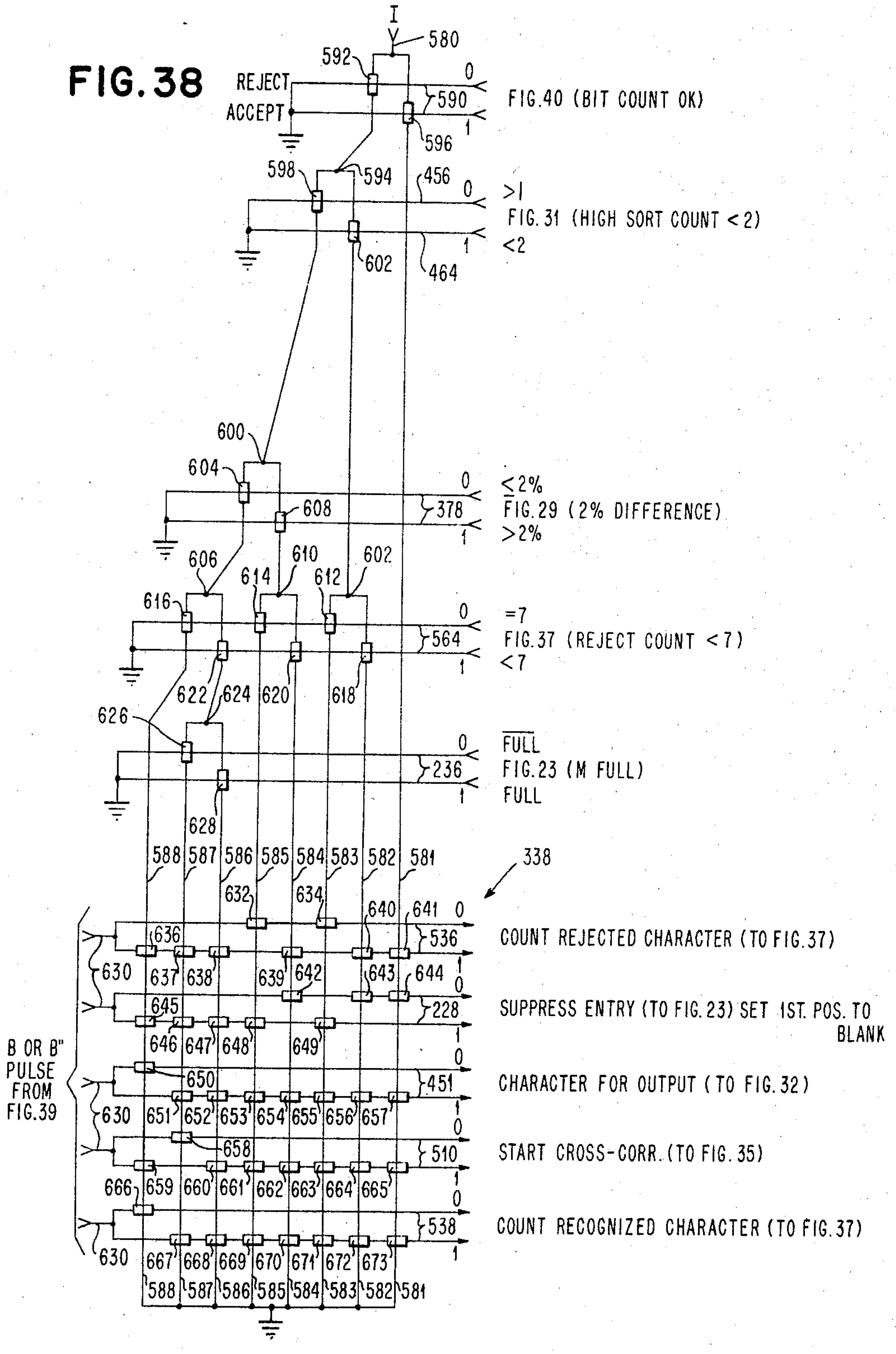
FIG. 38 is a wiring diagram of a test control circuit forming part of the control unit of FIG. 33.

The cryotron 214 is located in the "1" line of an alternative pair 228 whose input network is illustrated in FIGURE 38. Current normally flows in the 0 line of this pair 228. The "1" line is energized during the filling of the M memory if it is found that the data in "WORD 1" is a substantial duplicate of the data in one of the other words of the memory. This indicates that two like specimens have been collected, and that the last one of the two specimens, namely the word in the "WORD 1" position, should be deleted.

Cryotron 216 has its control winding in the "0" line of an alternative pair 230, whose input network is shown in FIGURE 27. Cryotron 218 has its control winding in the "0" line of an alternative pairs 232, whose input network is illustrated in FIGURE 49. The control windings of the cryotrons 216 and 218 are energized at appropriate times during the decoding phase (3) of the operation of the apparatus, as described below in connection with FIGURES 38 and 49.

The cryotron 220 has a control winding in a reset line R, which is energized when it is desired to set the entire M memory to blank. It should be understood that the reset lines of all the words in the field 1 of the memory are connected in series.

The circuit for detecting whether the M memory is completely full includes a constant current source 234 which supplies current to a network including the cryotrons 222 and 224 of all words of the field #1, and which control of the supply of current in an alternative pair of output lines 236. Current may flow from the source 234 through the cryotron 222–1 directly to the "0" output line 236, or it may flow from source 234 through cryotron 224–1 to a junction 238–2. From junction 238–2, current may flow through cryotron 222–2 directly to the "0" line of the output pair 236. Alternatively, current may flow from junction 238–2 through cryotron 224–2 to the junction in the next word corresponding to junction 238–2. Consequently, if any word in the field #1 shows blank, output current flows in the "0" line of the output pair 236. Only if all the words in the memory are full does output current flow in the "1" line of the pair 236.

*FIG. 24*

Figure 24:
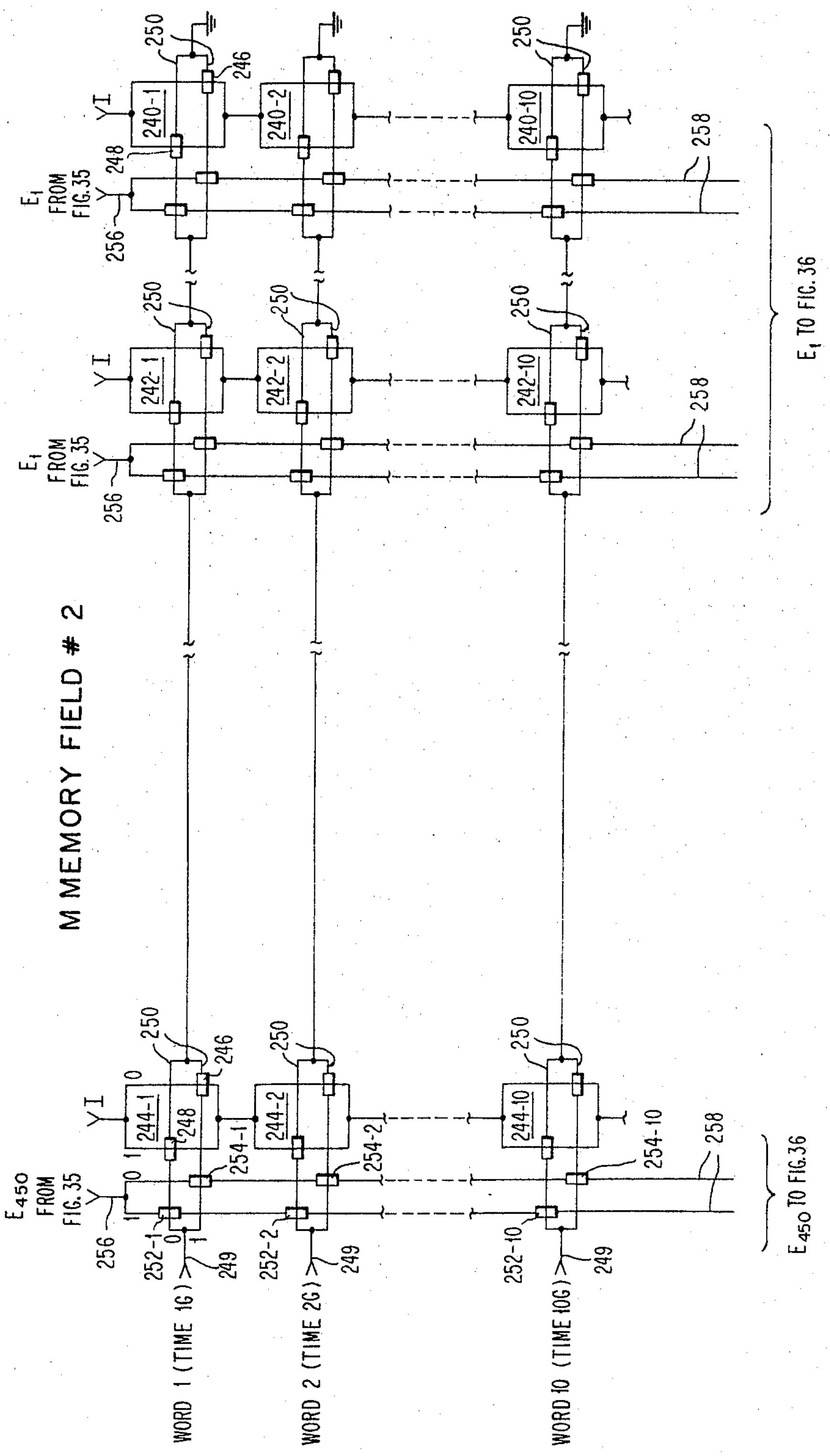
FIG. 24 is a fragmentary wiring diagram of field #2 of the M memory of FIG. 22.

This figure presents a wiring diagram of field #2 of the M memory which is illustrated in tabular form in FIGURE 22. This field consists of a group of ten digit registers corresponding to the ten horizontal lines of FIGURE 22. Each digit register is capable of retaining data identifying the autocorrelation elements $E_1 \ldots E_{450}$ of a particular character or specimen. FIGURE 24 shows the memory element circuits for the lowest and highest binary orders for the element $E_1$, and the single binary order for the element $E_{450}$, for each of the words "one,"

"two" and "ten," and the circuits for reading out of those memory elements.

The memory elements comprise a series of cryogenic flip-flops 240–1, 240–2 . . . 240–10 for the lowest binary order of the element $E_1$, for the ten words in the memory. Another series of cryogenic flip-flops 242–1, 242–2 and 242–10 are the memory elements for the highest binary order of the autocorrelation element $E_1$ for the ten words. Another series of cryogenic flip-flops 244–1, 244–2 . . . 244–10 are the memory elements for the single binary order of autocorrelation element $E_{450}$ for the ten words in the memory.

The circuits for entering data from the input register 198 of FIGURE 21 into the flip-flops 240, 242 and 244 and their counterparts, which are not illustrated, are shown and described in detail in the copending application Serial No. 198,239 (IBM Dkt. 10,552), mentioned above. Briefly, it may be stated that the data in the input register 198 is always transferred from that register to the uppermost word (word "one") of the memory. If the flip-flops 240, 242, 244 of FIGURE 1 are occupied when a new word is transferred into the memory, then the data previously in the flip-flops of the "WORD 1" register are transferred down into the "WORD 2" register, and so on down until all ten words are filled. FIGURE 24 illustrates the circuits for reading data out of the memory flip-flops 240, 242 and 244.

Figure 39:
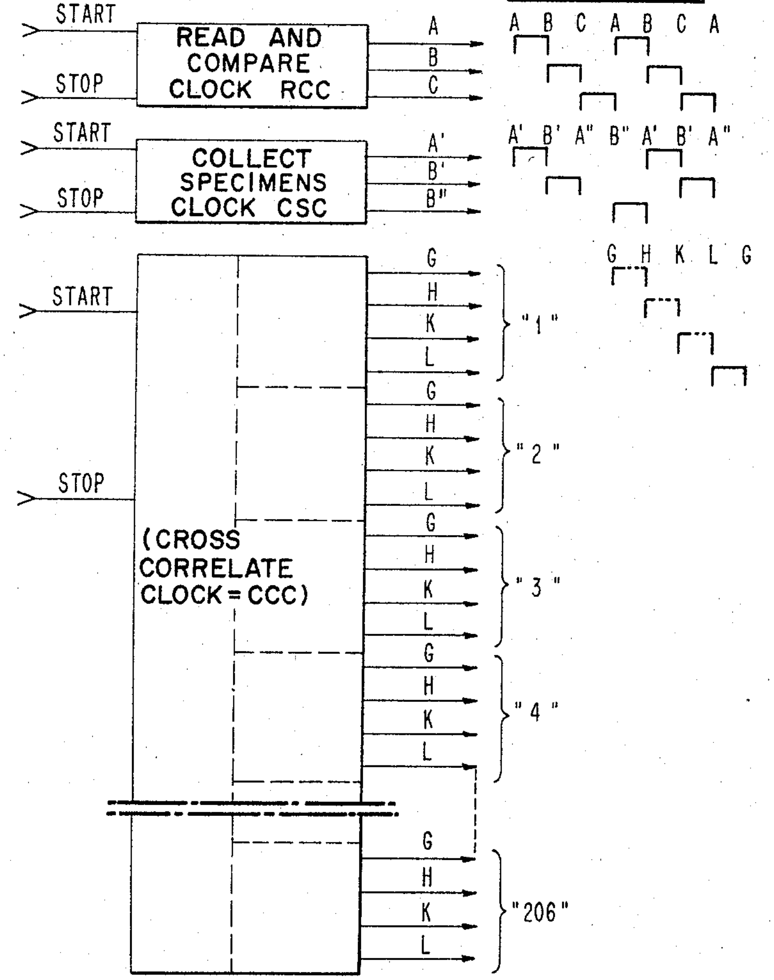
FIG. 39 is a block diagram of the clock or pulse generator circuits in the control unit of FIG. 33.

Each of the memory flip-flops 240, 242 and 244 has its "zero" line connected to the control winding of a cryotron 246 and its "one" line connected to the control winding of a cryotron 248. The cryotrons 246 and 248 are respectively located in the "one" and "zero" lines of a transfer flip-flop 250, which is supplied with current at times 1G only. Each binary order of each autocorrelation element is provided with a similar transfer flip-flop 250. All the flip-flops 250 for word "one" are connected in series and are supplied with current at readout time 1G (FIG. 39). The corresponding flip-flops 250 for each of the other words are also connected in series and supplied with current at a particular G readout time corresponding to the particular word. Thus the flip-flops 250 for word "two" are supplied with current at time 2G and those for word "ten" are supplied with current at time 10G.

Each transfer flip-flop 250 has its "zero" line connected to the control winding of a cryotron 252 and has its "one" line connected to the control winding of a cryotron 254. All ten cryotrons 252 of each binary order of each autocorrelation element E are connected in series between a source of current 256, controlled as shown in FIGURE 35, and the "1" output line of an alternative pair 258. Similarly, all ten cryotrons 254 of each binary order are connected in series between the source 256 and the "0" output line of the alternative pair 258. The source 256 is supplied with current by a circuit shown in FIGURE 35 at an A′ time when it is desired to read the data in a particular word from the field #2 of the M memory. Similarly, for each binary order of each digit register there is provided a source 256 supplied at any A′ time with a current effective to read out information contained in a particular word whose transfer flip-flops 250 are energized at that particular A′ time. The signals appearing on the output line pairs 258 are supplied to circuits illustrated in FIGURE 36.

*FIG. 25*

This figure illustrates the readout circuits for the field #3 of the M memory 24, wherein the normalized autocorrelation functions $F_1$ . . . $F_{450}$ are stored. The write-in circuits for this field are shown and described in copending application Serial No. 198,239 mentioned above.

Figure 25:
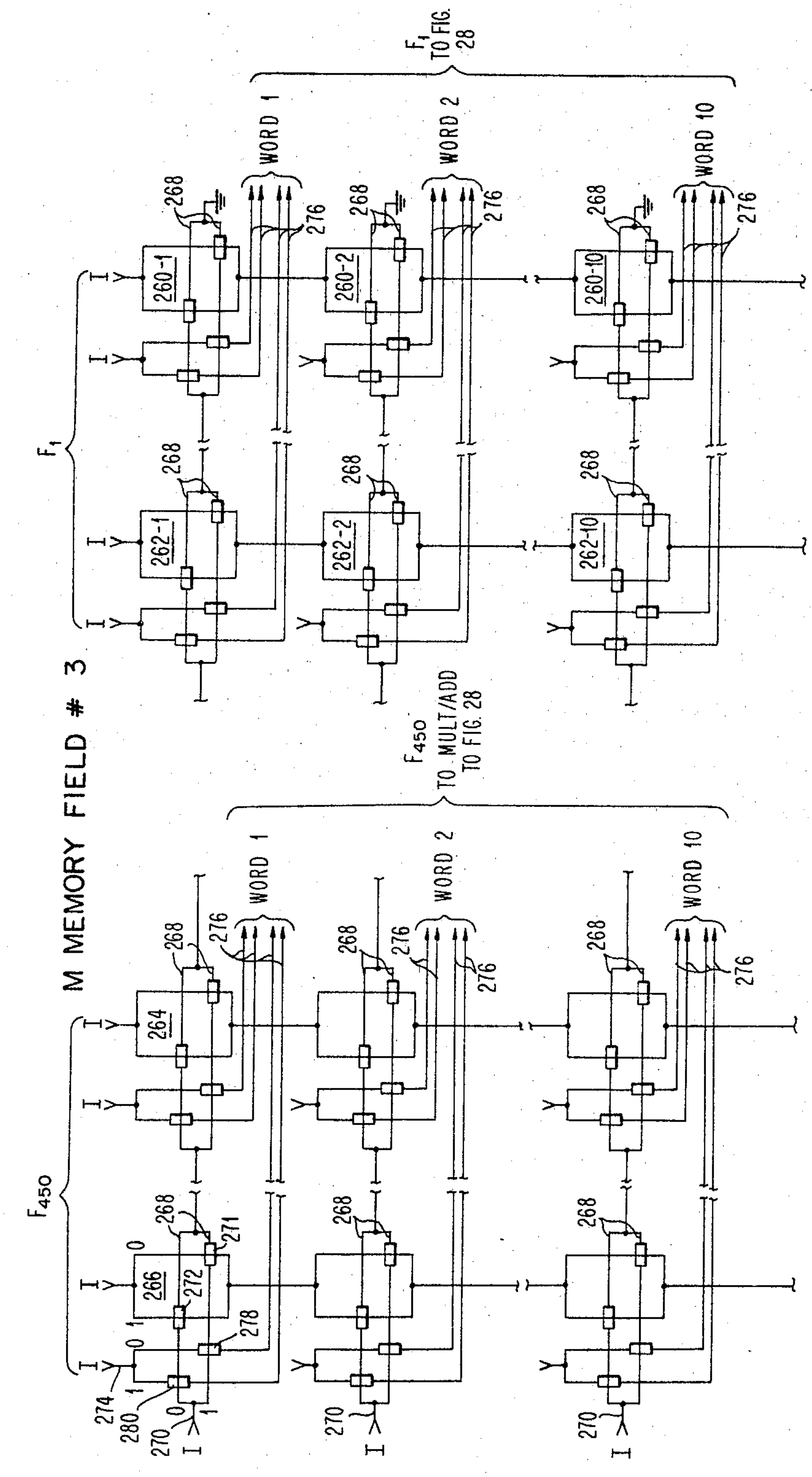
FIG. 25 is a fragmentary wiring diagram of field #3 of the M memory of FIG. 22.

There are shown in FIGURE 25 a set of series-connected memory flip-flops 260–1, 260–2 . . . 260–10 in which are stored the data defining the lowest binary order of the normalized autocorrelation elements $F_1$ for all ten words. Another set of series connected memory flip-flops 262–1, 262–2 . . . 262–10, store the data for the highest binary order for the normalized autocorrelation elements $F_1$. Two similar sets of series-connected flip-flops 264 and 266 store the data for the normalized autocorrelation function $F_{450}$, the flip-flops 264 storing the data for the lowest binary order and flip-flops 266 storing the data for the highest binary order. While only one set of series connected flip-flops 244 was necessary for the autocorrelation element $E_{450}$, because that element could only have the value "one" or the value "zero," a full set of binary orders is required for data defining the normalized $F_{450}$, since that element may represent the value "one" multiplied by a normalizing factor of several binary orders.

Transfer flip-flops 268 are provided for each of the memory flip-flops 260, 262, 264 and 266. All the transfer flip-flops 268 for the word "one" are connected in series to a constant current source 270. Each memory flip-flop 260, 262, 264 and 266 has its "zero" line in the control winding of a cryotron 271 and its "one" line in the control winding of a cryotron 272. Cryotron 271 is connected in the "one" line of the transfer flip-flop 268 and cryotron 272 is connected in the "zero" line of the transfer flip-flop 278. For each binary order of each autocorrelation element, there is provided a constant current source 274 feeding an alternate output pair 276. The "0" line of the alternate pair 276 includes a crytron 278 having a control winding in the "1" line of the flip-flop 268. The "1" line of the output pair 276 includes a cryotron 280 having a control winding in the "0" line of the flip-flop 268.

Thus, each memory flip-flop 260, 262, 264 and 266 of field #3 of the M memory has an individual pair of output lines 276, which are all continuously energized so that the data defining the normalized autocorrelation elements $F_1$ . . . $F_{450}$ of all ten words are continuously read out of the M memory and are supplied to the multiplier-add unit 36 shown in FIGURE 28.

*FIG. 26*

This figure illustrates the electrical circuits for writing in data to field #4 of the M memory. Each word in field #4 constitutes a digit value register for the data appearing in fields #2 and #3. For example, if the E's and F's in fields #2 and #3 identify a character "6" then the field #4 registers in binary form the digit value "6." Since the apparatus is disclosed in connection with a numerical character recognition apparatus, the registers in field #4 are capable of being set to any numerical value between "one" and "ten."

At times during the operation of the apparatus, as disclosed in detail below, there will be stored in the ten words in fields #2 and #3 of the M memory, autocorrelation elements E and normalized autocorrelation elements F which represent ten different numerical characters whose identities are not specifically known at the time the data is entered in the memory. Thereafter, the identities are determined in accordance with the invention. When the identity of a particular numerical character is determined as being stored in a particular word of the M memory, then the circuits illustrated in FIGURE 26 operate to store in field #4 of that word data identifying the numerical digit value of the E and F elements which are stored in the same word of the memory, in fields #2 and #3.

Figure 26:
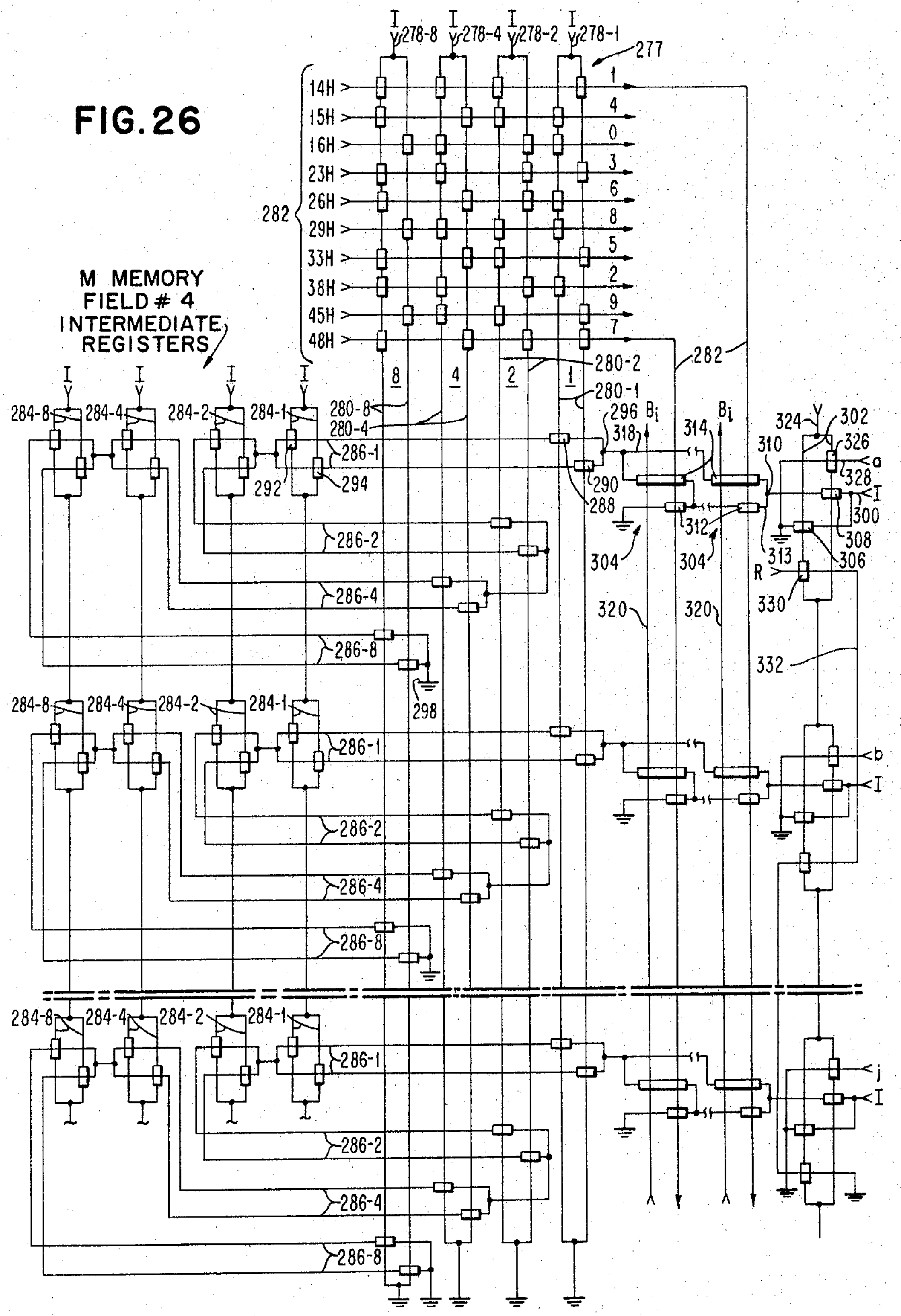
FIG. 26 is a fragmentary wiring diagram of the write-in circuits for field #4 of the M memory of FIG. 22.

At the top of FIGURE 26, a network 277 is supplied from four constant current sources 278–1, 278–2, 278–4 and 278–8. These four constant current sources supply a corresponding set of four alternate pair circuits 280–1, 280–2, 280–4 and 280–8. Each of the alternate pair circuits 280 has connected in series a plurality of cryotrons having control windings which are blocked at specific times by a series of ten timing pulse input lines 282, supplied with current at certain H times indicated by the legend in the drawing. These timing pulse input lines supply currents to block certain cryotrons in the alternate pairs 280, and thereby to establish on the output lines of those alternate pairs currents which represent individual digits as shown in the numerals at the right-hand end of the time control line 282. For example, at time 14H, the "1" lines of the pairs 280–8, 280–4 and 280–2 are blocked but the "0" line of pair 280–1 is blocked. Consequently, at that time, the only "1" line carrying a current is the "1" line for the pair 280–1, which determines that the numerical digit value which is being entered into the field #4 is the digit value "1." Similarly, at the other H times indicated at the left-hand end of the time controlled lines 282 in the drawing, the other nine digits are generated by the network 277, and are established on the output lines 280.

For each of the ten words in the M memory, there is provided in field #4, a set of four memory flip-flops 284–1, 284–2, 284–4 and 284–8, one for each of the four binary orders 1, 2, 4 and 8. Data is transferred to the flip-flops 284 from the output lines 280 by means of a set of transfer flip-flops 286–1, 286–2, 286–4 and 286–8. Each of the transfer flip-flops 286 has a pair of cryotrons 288 and 290 in its "0" and "1" line, respectively, which have their control windings respectively connected in the "1" and "0" lines of the pairs of output lines 280. The two lines of each transfer flip-flop extend through the control windings of a pair of cryotrons 292 and 294 in one of the memory flip-flops 284.

The transfer flip-flops 286–1, 286–2, 286–4 and 286–8 are connected in series between a junction 296 and ground at 298.

Current may be supplied to junction 296 at any of the H times appearing in the line at the left-hand end of the time signal input lines 282. Current is supplied to junction 296 from a source 300 through a digital assignment gate 302 and a chain of ten time controlled gates 304. Only the first and last time-controlled gates, i.e., the gates for times 14H and 48H, are shown in the drawing. Current from source 300 flows either through a cryotron 306 directly to ground or through a cryotron 308 to a junction 310 from which it enters the chain of ten time controlled gates 304. Each of the time controlled gates includes a cryotron 312 and a cross-over cryotron 314. All the cryotrons 312 are connected in series in a line 313 between the junction 310 and ground. Each cross-over cryotron 314 is connected between the line 313 at a point to the right of its associated cryotron 312, as viewed in the drawing, and a line 318 connected to the junction 296. All the cryotrons 314 are biased to their resistive condition by currents flowing in bias lines 320. The time controlled input lines 282 are connected to the control windings of the cryotrons 312 and 314. Each time controlled line 282 passes through both control windings of one gate 304 for each of the ten words in the memory.

Each digital assignment flip-flop has its alternative pair 302 supplied from a constant current source 324. The "0" line of each flip-flop 302 includes in series: (a) a cryotron 326 having its control winding connected in an input line 328 and (b) the control winding of the cryotron 308. Each "1" line of a flip-flop 302 includes in series the control winding of cryotron 306 and a reset cryotron 330. The control windings of all the reset cryotrons 330 are connected in series through a line 332, supplied with current at all K times.

At a particular G time (a G time always precedes an H time in the control sequence), one of the input lines 328 is energized, thereby blocking cryotron 326 and transferring the current in flip-flop 302 from the "0" line to the "1" line, blocking the cryotron 306 and transferring the constant current from source 300 through the cryotron 308 to junction 310. During the G time interval, all the cryotrons 314 in the gates 304 remain blocked, so that the current from junction 310 flows through the cryotrons 312 and line 313 to ground. At the subsequent H time, the gates 304 associated with the time controlled line 282 for that particular H time interval are opened, whereupon the current from the junction 310 associated with the particular input where the line 328 was energized at the G time, now flows through a cryotron 314 to the junction 296 and is effective to transfer whatever digit value assignment appears on the output lines 280 through the transfer flip-flops 286 to the corresponding digit value register flip-flops 284.

The assignment of the digit value "1" to a word in the memory is accomplished at the time interval 14H. The assignment of the other respective digit values shown at the right-hand side of network 277 to the other words in the register is accomplished at the other H intervals identified in the list associated with the corresponding time controlled input lines 282 at the left-hand side of network 277.

The memory flip-flops 284 illustrated in FIGURE 26 are the side entry or intermediate registers of field #4 of the M memory. After data is entered in the memory flip-flop 284 of the intermediate registers, it is transferred on a subsequent time interval to the main registers for the next lower word of the same field #4 of the M memory. The circuits for transferring data from the intermediate registers to the main registers are shown and described completely in the co-pending application Serial No. 198,239, mentioned above (IBM Docket 10,552).

*FIG. 27*

The figure illustrates a portion of the circuitry for the main registers corresponding to the intermediate registers of FIGURE 26. The complete circuits for the main registers of FIGURE 27 are shown in application Serial No. 198,239 IBM Docket 10,552, mentioned above. Only that portion of those circuits is shown herein, which is considered necessary to an understanding of the operation of the apparatus of the present invention.

The main register for each word of the M memory includes a set of memory flip-flops or bistable circuits 332, corresponding to the flip-flops 284 of the intermediate registers of FIGURE 26. For each word in the M memory, there are provided four bistable flip-flops 332–1, 332–2, 332–4 and 332–8. Only the flip-flops 332–1 and 332–8 for the words 1, 2 and 10 are illustrated in FIGURE 27.

Each flip-flop 332 includes the gate of a cryotron 334 in series with its "0" line and the gate of a cryotron 336 in series with its "1" line. The flip-flops 332 for a particular binary order of all ten words in the memory are connected in series with a constant current source 338.

The write-in circuits for the memory elements 332, as more completely described in co-pending application Serial No. 198,239, mentioned above, include a persistent current loop which may be traced in FIGURE 27 from a junction 340 through the gate of a cryotron 342 to a junction 344, thence through a loop wire 346 which includes control windings of cryotrons 336 and 334 back to the junction 340. The control winding of cryotron 342 is connected in a circuit not disclosed in the present application. For the purposes of the present application, it need only be stated that when a binary "1" is stored in a particular memory flip-flop 332, a persistent current flows in the loop 342, 346 in a clockwise direction, as indicated by the arrows in FIGURE 27. When a zero is stored in a memory flip-flop 332, no current flows in the persistent current loop.

Circuits are provided for temporarily complementing the data stored in the memory flip-flops 332. These circuits include an alternative pair 348 for each column of flip-flops 332 in the memory. The alternative pairs 348 are supplied with current from circuits shown in FIGURE 53.

The "0" line of each alternative pair 348 extends through the gate of a cryotron 350 directly to ground. The "1" line of each alternative pair 348 passes to the left as viewed in FIGURE 27, through a control winding of the cryotron 334, and then reverses its direction and passes to the right through a control winding of the cryotron 336. The "1" line continues down the column, passing in the same respective directions through control windings of the cryotrons 334 and 336 of the other memory flip-flops 332 in the column.

Thus, each cryotron 334 has two control windings, one being the persistent loop wire 346 through which current may at times flow to the right, as indicated by the arrow in the drawing, and the other being the "1" line of the alternative pair 348, through which current may at times flow to the left as indicated by the arrow in the drawing.

Each cryotron 336 has two similar control windings, one in the persistent loop wire 346, through which current may at times flow to the right, and another in series with the "1" line of the alternative pair 348, through which current may also at times flow to the right, both flows being indicated by arrows in the drawing. Each cryotron 336 also has a third control winding connected in series with a bias line from a continuous source of bias current indicated at $B_1$ in the drawing.

In the operation of the present apparatus, it may occur that after the digit values are assigned to the several words of the M memory, as described in connection with FIG. 26, it is determined upon checking that the assignment of a digit value to one of the words in the M memory was in error. When such a determination is made, it becomes desirable to set the blank—not blank indicator flip-flop 211 of FIGURE 23 for that particular word to its blank condition, so that the data defining that particular word will be disregarded in further operation of the apparatus.

When it is determined that a particular digital assignment is in error, the digital value of that numeral is placed on the alternative pairs 348 of FIG. 27 by the circuits described below in connection with FIGURE 53. When current is put on the zero line of an alternative pair 348, it may be readily seen that no effect is produced in the memory flip-flop 332. When current is put on the one line of an alternative pair 348, all the information in the memory flip-flops 332 of its associated column is temporarily complemented.

For example, consider that the flip-flop 332–1 of the word one is in the zero condition, which means that current is flowing in the cryotron 334 and not in the cryotron 336, and that no current is flowing in the persistent loop 346. When current flows along the "1" line of the alternative pair 348, it passes through the control winding of the cryotron 334, thereby blocking that cryotron. It also passes through the upper control winding in the cryotron 336, thereby opposing the effect of the bias current in the lower control winding of cryotron 336, rendering the cryotron 336 superconductive, so that current now flows in that cryotron. The information previously stored in the memory flip-flop 332 as a zero has thus been complemented, and now appears as a one.

As soon as the current in the "1" line of the alternative pair 348 stops flowing, the bias current in the lower control winding of the cryotron 336 again becomes effective to block that cryotron, and the blocking current is removed from the upper control winding of the cryotron 334, so that the current through the memory flip-flop 332 returns to the cryotron 334, restoring the original zero condition.

When the memory flip-flop 332–1 is storing a one, current is flowing through the cryotron 336, and no current is flowing through the cryotron 334. At this time, current is also flowing through the persistent loop 346. Note that the persistent loop current in the middle control winding of cryotron 336 opposes the effect of the bias current in the lower control winding of that cryotron, so that cryotron 336 remains superconductive. If now a complementing current appears on the "1" line of alterantive pair 348, it flows through the upper control winding of cryotron 334, thereby opposing the effect of the persistent loop current in the lower control winding of that cryotron and making that cryotron 334 superconductive. At the same time, the complementing current flows in the upper winding of cryotron 336, which previously was superconductive, making that cryotron resistive. The current is thereby transferred in the memory flip-flop 332 from the cryotron 336 to cryotron 334, complementing the one previously stored and making it zero. As soon as the complementing current in the "1" line of the alternative pair 348 terminates, the persistent loop current becomes effective to block the cryotron 334, and the combined effects of the persistent current and the bias current become effective to make the cryotron 336 superconductive, so that the memory flip-flop 332 is restored to its previous condition.

When the memory flip-flops 332 of a particular word are set to a particular digital value, and the binary equivalent of that digital value is supplied through the complement lines 348, then all the flip-flops 332 of that particular word are complemented to zero. Those flip-flops 332 of the word which were previously zero are not disturbed, since no current pulse is received on the one line of the alternative pair 348 associated with that particular binary digit. On the other hand, all memory flip-flops 332 which have a one stored in them are complemented by the signals received on the alternative pairs 348. Consequently, all the flip-flops 332 of that particular word are set to zero.

After that complementing operation, and while the complementing current remains applied to the alternative pairs 348, a sort of the words in field #4 of the memory is made, by circuitry described in the copending application Serial No. 198,239, now Patent No. 3,234,524, to determine which of the ten words is set to zero. When a particular word is found set to zero, a current is supplied to the one line of an output pair 230, which is in turn connected to the same alternative pair 230 in FIG. 23, where it is effective to switch the blank—not blank indicator flip-flop 211 to its blank condition.

At times, such as time 194G described below, it becomes desirable to sort the field #4 for the high word, rather than for the low word. For that purpose, there is provided a high sort line 349 which includes in series the control windings of all the cryotrons 350. When line 349 is supplied with current, all the bits stored in field #4 are complemented by switching the current from the "0" lines of the pairs 348 to the "1" lines. Consequently, upon the subsequent sorting operation, the high word in the field #4 is selected rather than the low word.

*FIG. 28*

This figure illustrates in block diagram form the structure of the multiplier-adder unit shown as a single block 36 in FIGURE 11.

The multiplier-adder unit has one set of input lines corresponding to the output lines 276 of FIGURE 25, on which is continuously supplied data defining the normalized autocorrelation elements $F_1 \ldots F_{450}$ of all the words 1 to 10 which are stored in the M memory 34. A second set of input lines 352 supplies data defining the autocorrelation element $E_1 \ldots E_{450}$ of a particular character, which may be either an incoming character in which case the autocorrelation elements E are supplied by the generator 28, or may be a character stored in the M memory, in which case the autocorrelation elements E are supplied to the lines 352 from the output lines 258 of FIGURE 24. The selective connection of the output lines 258 of FIGURE 24 or the output lines 29 of the autocorrelation element generator 28 to the input lines 352 of FIGURE 28 is accomplished by an "OR" circuit forming a part of the control unit 30, and shown below in detail in connection with FIGURES 34–36.

The function of the multiplier-adder unit is to perform the computation illustrated in FIGURES 6 and 7. That is to say, it computes the cross-correlation functions G. At any instant, the multiplier-add unit computes simultaneously a set of ten sums $G_{1,n} \ldots G_{10,n}$ and supplies the ten sums to a set of ten output lines 354.

Figure 28:
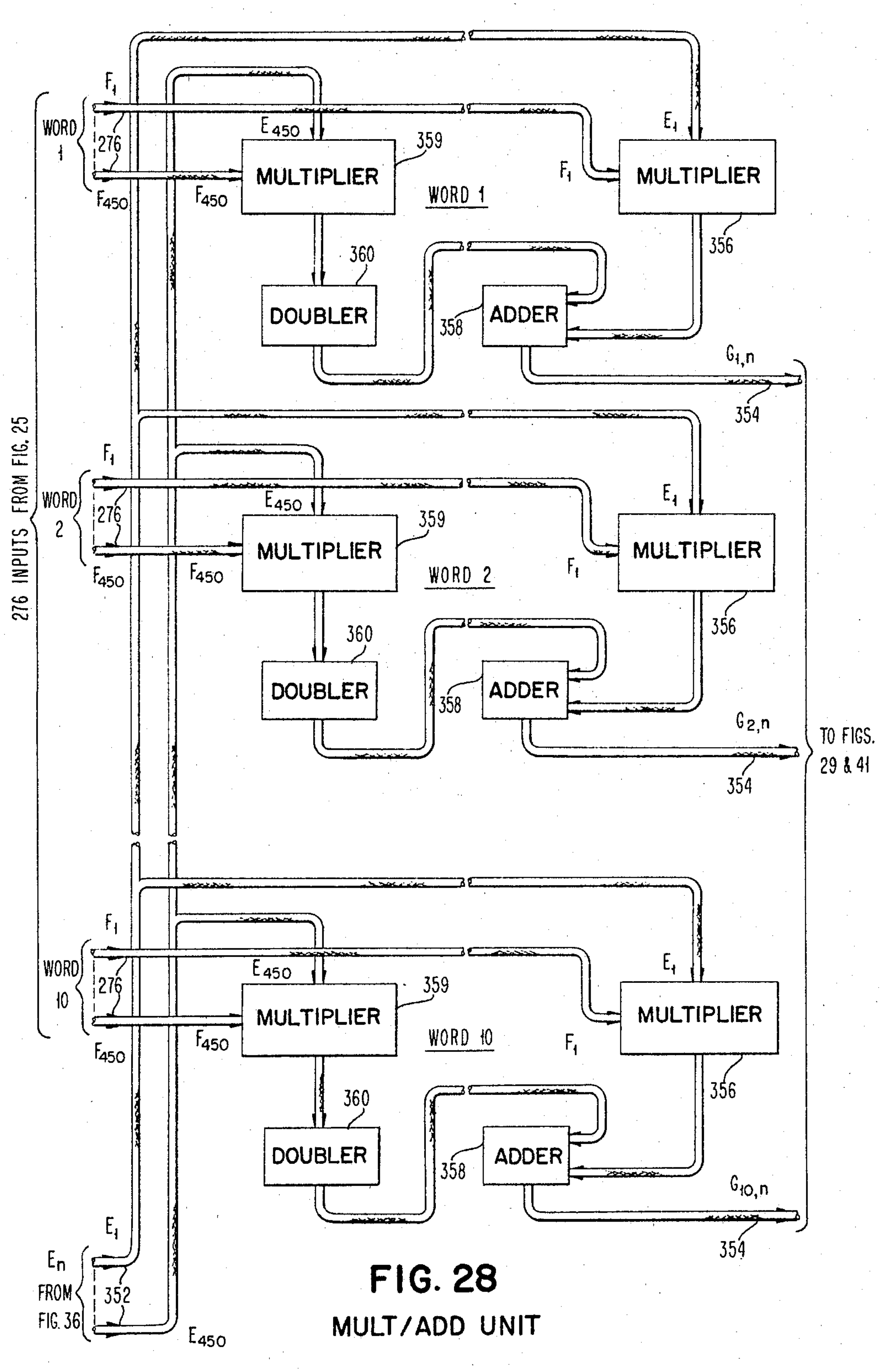
FIG. 28 is a block diagram illustration of a multiplier-adder unit used in the apparatus.

There are ten sections in the multiplier-adder unit shown in FIGURE 28. Since each section is essentially the same as any other, only one section will be described in detail. The section at the top of the drawing multiplies the $F_1 \ldots F_{450}$ elements from the word one of the M memory times the $E_1 \ldots E_{450}$ from either the M memory or the autocorrelation element generator 28, and supplies the product to one input of an adder 358. One multiplier must be provided for each F element, i.e., a total of 450 multipliers for each word. A multiplier 356 multiplies $F_1$ times $E_1$ and transmits the product to adder 358. For each of the other normalized autocorrelation elements $F_2 \ldots F_{450}$ of word one, there is supplied a multiplier 359. Only the multiplier 359 for the $F_{450}$ element is shown. The output products of all the multipliers 359 are supplied through doublers 360 to other inputs of the adder 358. The adder 358 performs the function of adding the sub-totals which appear in the right hand column of FIGURE 6 and supplying the grand total to the output line 354.

Each multiplier 356 and 359 may be the same as that shown in the co-pending application of Harold Fleisher and Robert I. Roth, Serial No. 79,823, filed December 30, 1960, mentioned above. Each of the adders 358 may be the same as the adder 94 of FIGURE 20. The doublers 360, as in the case of the doublers 202 of FIGURE 21, may simply consist of shifting the order of each binary output line of multiplier 359 to the next higher order at the input to adder 358.

*FIG. 29*

Figure 29:
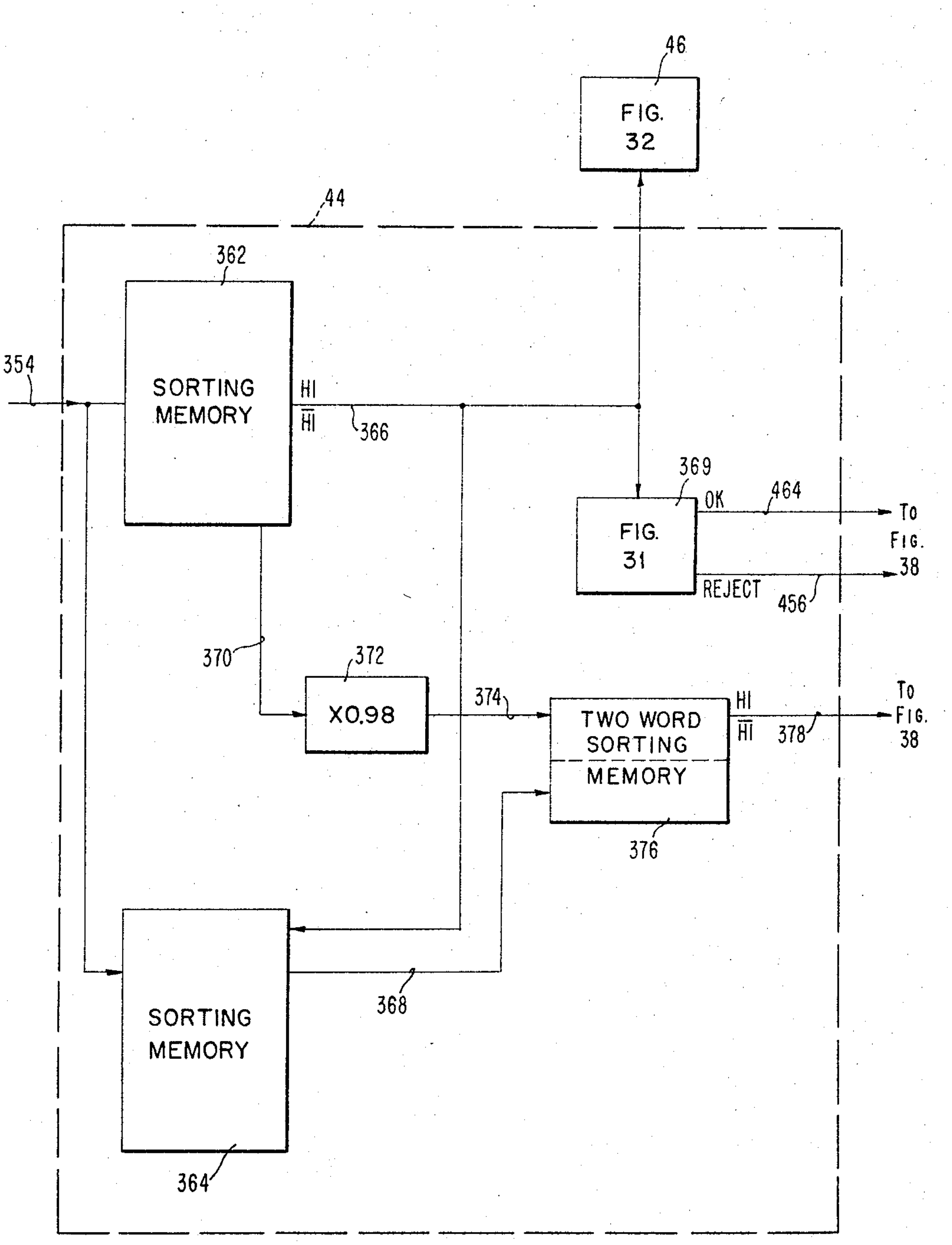
FIG. 29 is a block diagram illustration of a sort and compare unit used in the apparatus.

This figure illustrates the sort-compare unit 44 shown as a single block in FIGURE 11. The principal signal input lines to the unit 44 are the output lines 354 of FIGURE 28. These input lines are shown in FIGURE 29 as being fed in parallel to the inputs of two sorting memories 362 and 364. It should be understood that, as is usual in cryotron circuits, the input lines 354 actually pass through the units 362 and 364 in series. However, the flow of information is effectively parallel, and it is considered that the operation of the circuit will be better understood by illustrating the inputs diagrammatically as being parallel. Other information flows in FIGURE 29, also shown in parallel, are actually carried out in series circuits shown in detail in FIGURES 30–32.

The sorting memories 362 and 364 have similar circuits. The circuitry for memory 364 is shown in greater detail in FIGURE 30. Each sorting memory has ten word registers for the ten words received on the ten sets of input lines 354. The sorting memory is also provided with sorting circuits as shown in greater detail in the copending application of Robert I. Roth, Serial No. 176,958, filed March 2, 1962, entitled "Random Memory with Static Ordered Readout," now Patent No. 3,191,156. These sorting circuits include, for each word of the memory, a pair of output lines 366 on the "0" line of which a signal current appears if that particular word is numerically the highest word in the memory. If a word is not the highest in the memory, the signal appears on its "1" output line 366. If two or more words are equal and highest, both have currents on their "0" output lines.

Figures 31, 32:
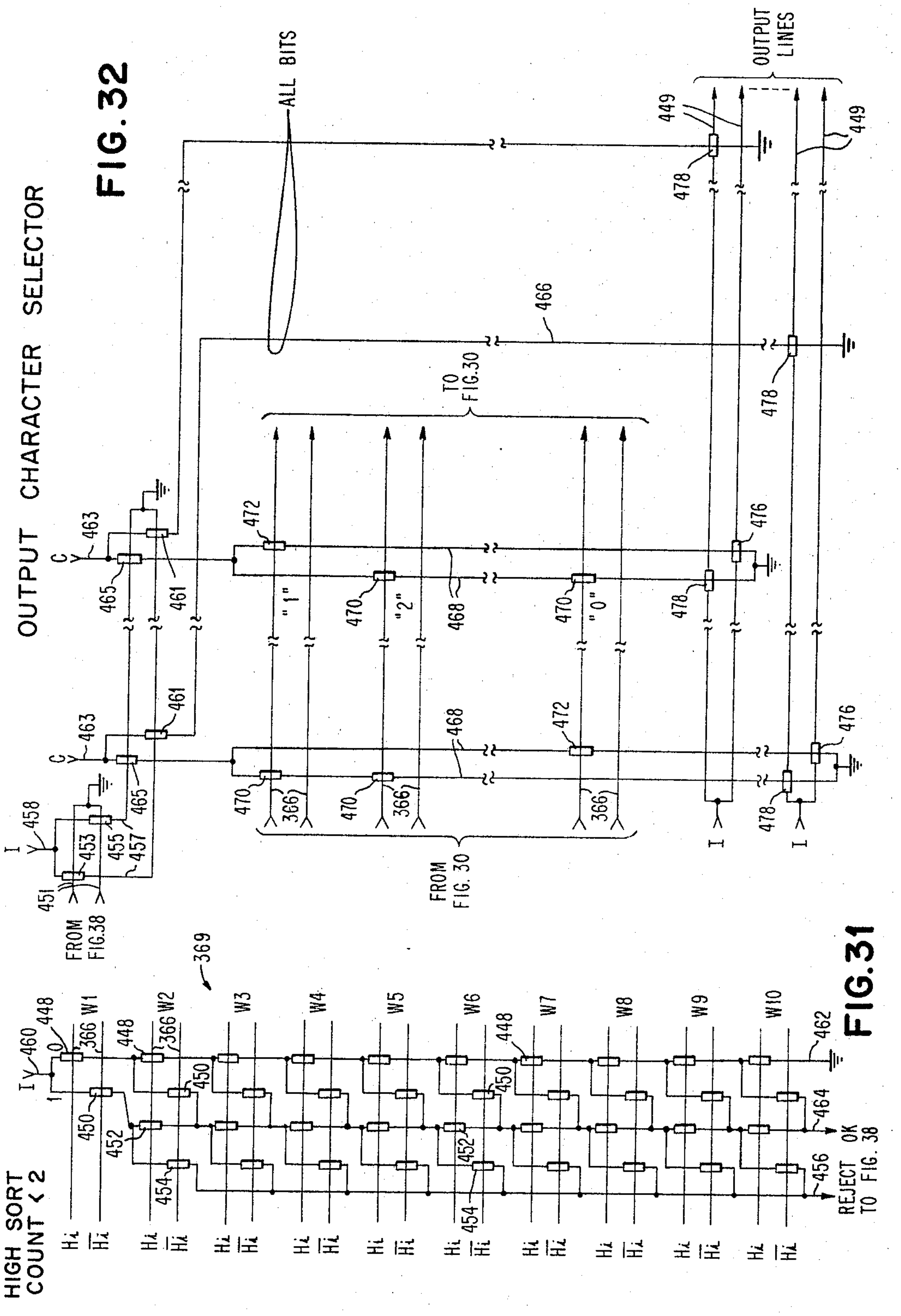
FIG. 31 is a wiring diagram of a high sort count circuit forming part of the apparatus of FIG. 29.
FIG. 32 is a wiring diagram of the output character selector shown as a block in FIGS. 11 and 29.

All the data on the pairs of high-not high output lines 366, from the sorting memory 362, is supplied to a high sort count testing circuit 368, shown in detail in FIGURE 31, to the output character selector 46, shown in detail in FIGURE 32, and to the sorting memory 364. In the sorting memory 364, the high-not high outputs appear as alternative pairs of suppress or not-suppress input lines. The not high output lines 366 become the not-suppress input lines for the sorting memory 364. The high output lines from memory 362 become the suppress input lines for memory 364.

The one word selected as high in the memory 362 has its numerical value transmitted on a set of binary output lines 370 to a multiplier 372.

In operation, the one output line 366 of memory 362 which carries a high signal indicating that that word is the highest in the memory is carried to a suppress input line for the memory 364, where it suppresses that particular high word. The memory 364 sorts the remaining nine words to select the highest numerical value. That next highest numerical value is transmitted on a set of output lines 368. The highest numerical value from sorting memory 362 is multiplied in the multiplier 372 by a constant factor determined empirically from any given cross-correlation matrix. In this particular matrix, as shown in FIGURE 10, the margin for error is 2% so that the multiplier is taken as 0.98.

The product output of the multiplier 372 is transferred on lines 374 to one word of a two word sorting memory 376. The other word in the two word sorting memory 376 is received from the lines 368. The sorting memory 376 has sorting circuits similar to those of memories 362 and 364. The uppermost word in the memory 376, as it appears in FIGURE 29, is provided with a pair of alternative output lines 378. If the word stored in the upper word of memory 376 is equal to or higher than the word stored in the lower memory, then an output current is produced on the "0" line of the pair 378. If the upper word is smaller than the lower word in the memory 376, an output current appears on the "1" line of the pair 378.

*FIG. 30*

This figure illustrates the circuits of the sorting memories 362 and 364 shown as blocks in FIG. 29. These memories are quite similar to each other, so that only the memory 362 will be described in detail. Those parts of the memory 364 which correspond to their counterparts in memory 362 will not be further described, but will be given the same reference numerals as those counterparts. Those elements in memory 364 which are different from anything in memory 362 will be described in detail.

Figure 30:
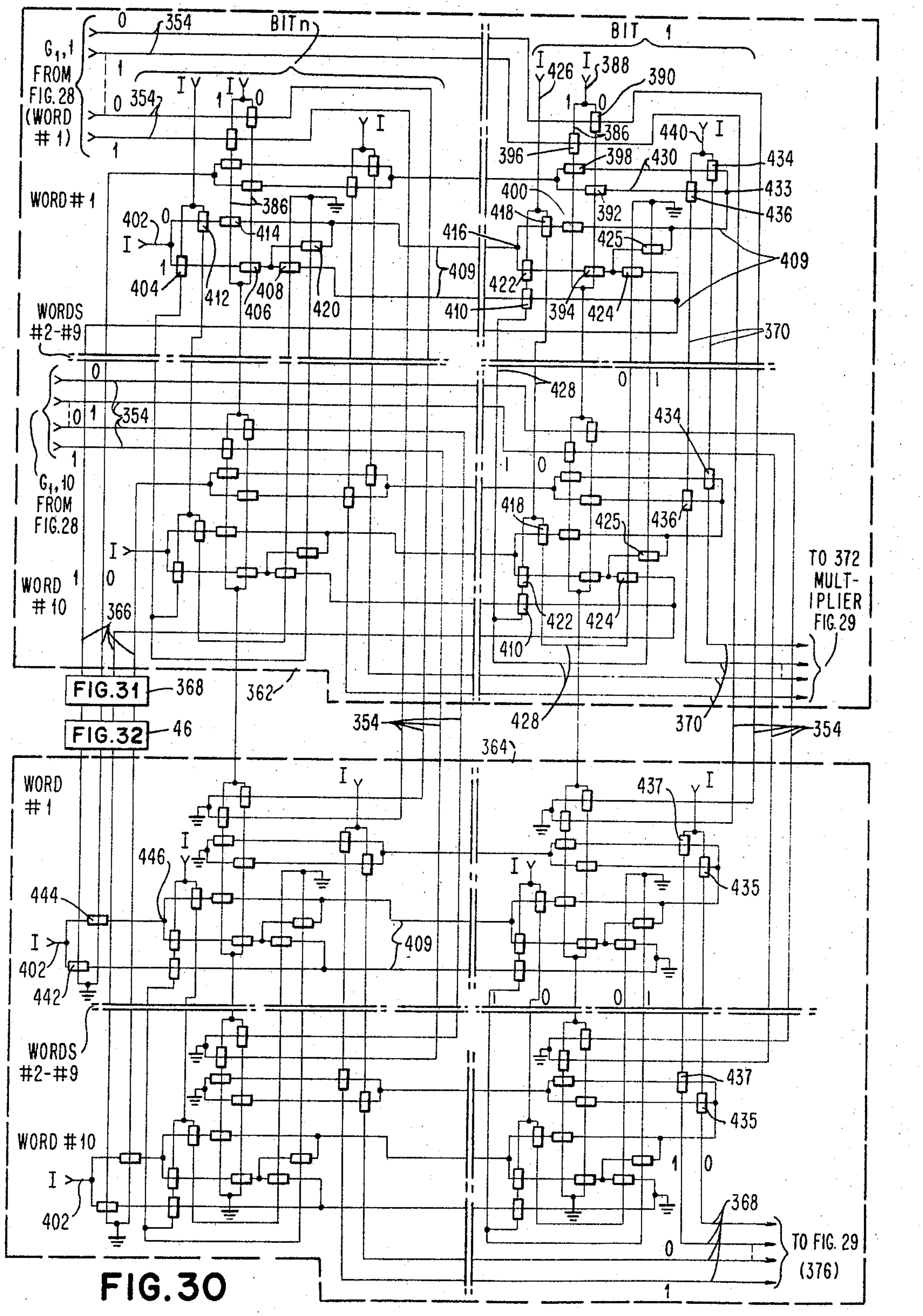
FIG. 30 is a wiring diagram of the sorting memories shown in the block diagram of FIG. 29.

The numerical sorting circuits in memory 362 are generally similar to those shown and described in the co-pending application of Robert I. Roth, Serial No. 176,958, filed March 2, 1962, mentioned above. The circuits shown in the Roth application are modified somewhat for the purposes of the present invention, as shown in FIG. 30.

Referring to the memory 362, there are shown four memory units, one for the lowest bit (bit 1) and one for the highest bit (bit *n*) of word #1; and one for the lowest bit and one for the highest bit of word #10. The memory units for the intervening bits of each word and for the intervening words, not shown in the drawing, are essentially the same as those shown. A disclosure of all the other units would be unnecessarily repetitious.

The memory unit for bit 1 of word #1, which appears at the upper right of the drawing, is described below in detail. The elements of the other memory units shown in the drawing are not described, but have been given the same reference numerals as their counterparts in the one unit described.

The memory unit for bit 1 of word #1, includes a binary flip-flop 386 which receives current from a constant source 388. The "0" line of the flip-flop 386 includes a cryotron 390 and the control windings of two cryotrons 392 and 394. The "1" line of the flip-flop 386 includes a gate of a cryotron 396 and control windings of two cryotrons 398 and 400.

The control windings of the cryotrons 390 and 396 are connected in the input lines 394 for the bit 1 of word #1. Note that the control winding of the cryotron 390 (whose gate is in the "0" line of the flip-flop 386) is connected in the "0" input line 354. Similarly, the control winding of cryotron 396 is connected in the "1" input line 354. Consequently, current in the "0" input line 354 blocks the "0" line of the flip-flop 386, and current in the "1" input line 354 blocks the "1" line of flip-flop 386. Hence, the information appearing on input 354 is entered in the memory units (flip-flops 386) in complement form. That is to say, each "1" on an input line is entered as a "0" and each "0" on an input line is entered as a "1." The reason for the entry of the data in complement form in this memory is that the sorting circuits of the memory are designed to sort for low, as described in application Serial No. 176,958, mentioned above. Since it is desired to sort this memory 362 for the high word in the memory, rather than the low word, all the input data is complemented so that the same sorting circuits may be used.

A sorting circuit interconnects all memory flip-flops 386 of each word of the memory 362. The sorting circuit for word #1 may be traced from a constant current source 402 through a "1" line including the control winding of a cryotron 404, the gate of a cryotron 406 and the gate of a cryotron 408 in the bit *n* unit of the memory and thence through the intervening memory elements of word #1 (not shown) and finally through the control winding of a cryotron 410 in the bit one memory to the "1" output line of an alternative pair 409 which leads directly to the "1" output line 366. Alternatively, current may be traced from source 402 through a "0" line including the control winding of a cryotron 412, and the gate of a cryotron 414, through the intervening memory elements of word #1 (not shown), to a junction 416 in the memory element for bit 1, and thence through the control winding of a cryotron 418 and the gate of cryotron 400 to the "0" output line of the alternative pair 409. A cross-over cryotron 420 has one terminal of its gate connected to a junction between the gates of cryotron 406 and 408 and its opposite terminal connected to the "0" line of pair 409 between the gate of cryotron 414 and junction 416.

A branch path leads from junction 416 through the control winding of a cryotron 422, the gate of cryotron 394 and the gate of a cryotron 424 to a junction with the "1" output line of the alternative pair 409.

An "all one's" circuit is supplied for each column of units in the memory. The "all one's" circuit for the 1 bits in the memory is supplied with current through a constant source 426. Current may flow from source 426 through the gate of cryotron 418 to the "0" line of an alternative pair 428, or it may flow through the gates of cryotron 422 and 410 to the "1" line of the alternative pair 428. In each of the other ten words of the bit 1 column, the "0" line of the pair 428 branches between a path through the gate of a cryotron 418, which continues to the "0" output line, and a cross-over path through the gates of cryotrons 422 and 410 which connects to the "1" output line. At the bottom of the column, the output lines 428 reverse in direction and extend upwardly through all the memory units of the column. The "0" line passes through control winding of the cryotron 424 of each memory element and the "1" line passes through the control winding of the cryotron 425 of each memory element.

The "0" line of each alternative pair 409 supplies current through a series of write flip-flops 430 for all the memory bits of the word with which it is associated to the "0" output line 366. Current in the "0" line of pair 409 may flow, in each memory element, to a junction 433 whence it may flow either through a control winding of a cryotron 434 in series with the gate of cryotron 398, or through the control winding of a cryotron 436, in series with the gate of cryotron 392. The gates of cryotrons 434 and 436 are connected in the respective lines of an alternative output pair 370 supplied with current from a constant source 440. The "0" line of the output pair 370 includes in series the gates of all the cryotrons 434 in a particular column. The "1" line of the output pair 370 includes in series all the gates of the cryotrons 436 in a particular column.

As the current in a sorting circuit proceeds from source 402 through the binary orders from *n* to 1, it remains in the "0" line until it encounters a bit memory element with a stored "1," whereupon it is shifted to the "1" line. When, in a particular column, there appear at least one "0" and at least one "1," the word (or words) having a "1" stored is eliminated from the sort, i.e., that word has no possibility of being the lowest word in the order, and it is eliminated by having the current transferred to its "1" output line 366.

Furthermore, if for all the words remaining in the sort at a particular binary order, the bits in the column for that order are all 1's, then for all those words (each of which might possibly be the low word in the memory) the currents in the alternative pairs 409 are shifted to the respective "0" lines by the "all 1's" circuit of the associated column, so that they all remain in the sort. The operation of the sorting circuits and the all 1's circuits is described in greater detail in the Roth application, Serial No. 176,958, mentioned above. The effect of these circuits is that, for the lowest word stored in the memory, there appears a current on its associated "0" output line 366. For all the other words, the current appears on the "1" output line 366. If two words having equal values are both low, then both will get current on their "0" output lines 366. Those "0" output lines 366 which have current flowing in them, are effective to energize the read-out flip-flops 430 by which information is transferred from the flip-flops 386 of the low word in the memory to the output lines 370. Since, in the present memory, it is desired to select the high word, all the data was entered in the memory as the complement of the input data. In order that the information may appear on the output lines 370 in its true form rather than its complement form, the cryotrons associated with the flip-flops 430 are arranged to complement the data read from the storage flip-flops 386 in transferring it to the output lines 370. Thus, if there is current in the "1" line of a flip-flop 386, cryotron 398 in the "0" line of a flip-flop 430 is blocked so that no current flows through the gate of cryotron 434 in the "0" output line 370. Hence, the "0" output line 370 is not blocked, and current flows in it. Similarly, if current flows through the "0" line of flip-flop 386, the cryotron 392 is blocked, thereby blocking the flow of current in the control winding of cryotron 436, permitting that cryotron to be superconductive so that current appears on the "1" output line 370.

The reason for recomplementing the data back to its true form in the output lines 370 is so that it may be supplied to a conventional multiplier 372, which operates on input information in its true form. Thus the high word of the ten words in the memory is selected and its value is transmitted to the output lines 370. The data on the high-not high output lines 366 are transmitted through the high sort counter testing circuit 368 (FIG. 31) and through the output character selector 46 (FIG. 32) to the memory 364 where the high lines are connected to suppress (i.e., to take out of the sort) the high word determined by the memory 362.

In the memory 364, the suppression of the high word is carried out by an extension of the sorting circuit including two cryotrons 442 and 444, supplied with current from the source 402. The gate of cryotron 442 is connected between source 402 and the "1" line of the alternative pair 409. The gate of cryotron 444 is connected between source 402 and a junction 446 which is the counterpart of the junction 416 or of source 402 in the memory 362. In other words, whenever a particular cryotron 444 is blocked by a current in the "0" line of a particular pair 366, then the current from source 402 in the sorting circuit of memory 364 is transferred to the "1" line, and cannot be selected as the high word of the memory 364.

Since only one of the ten words in the memory 362 should be selected as high, the circuit 368 of FIG. 31 checks that not more than one word is selected as high, and that one high word is eliminated from the sort in the sorting memory 364, so that the signals on the output lines 368 define the second highest word of the ten words supplied to the two memories 362 and 364. Note that the data supplied to the output lines 368 of memory 364 is in complement form. This is accomplished by reversing the gates of cryotrons 435 and 437 in flip-flops 430, as compared to the gates of the corresponding cryotrons 434 and 436 in the memory 362. This data is supplied by lines 368 to the sorting memory 376 (FIG. 29), which is similar to one of the sorting memories 362 and 364, except that it has only a two word capacity and is provided with a high or not-high output pair 378 only for the upper word as it appears in FIG. 29. The output from the multiplier 372 is in true uncomplemented form and must be complemented at its input to the sorting memory 376 so that it may be properly compared with the lower word in the memory 376 derived from output line 368 in complement form.

*FIG. 31*

This figure illustrates the wiring diagram of a circuit for checking that only one of the words in the memory 362 has a high count.

The high-not high output lines 366 for all ten words in the memory 362 pass through the checking circuit 369. The high or "0" line for the word #1 (indicated as $W_1$ on the drawing) passes through the control winding of a cryotron 448 and the not-high or "1" line of the pair 366 for word #1 passes through the control winding of a cryotron 450.

For each of the other ten words, the high or "0" line passes not only through the control winding of a cryotron 448 but also through the control winding of a cryotron 452. Similarly, the not-high or "1" line passes through the control winding of a cryotron 450 and in addition passes through the control winding of a cryotron 454. All the cryotrons 448 are connected in series between a constant current source 460 and ground at 462. All the cryotrons 452 are connected in series with an OK output line 464. A reject output line 456 is also provided. The cryotrons 450 provide cross-over connections between the grounded line 462 and the OK line 464. The cryotrons 454 provide the cross-over connections between the OK line 464 and the output line 456. Current flowing from the source 460 proceeds down the "0" line through the cryotrons 448 until it comes to one such cryotron which is blocked by a current flowing in its control winding, indicating that its associated word is high. At that point, the adjacent cross-over cryotron 450 is superconductive, so the current crosses over into the OK line 464. If only that one word has a signal on its high line 366, then the current remains on the OK line 464 and passes to the output on that line. If, however, the current in the line 464 encounters a cryotron 452 which is blocked by current in its associated control winding connected in its high line 366, indicating that a second word is as high as said one word, then the current crosses through the adjacent cross-over cryotron 454 to the reject output line 456. It may be seen that the circuit of FIG. 31 will produce an output current on OK line 464 if one and only one of the words is high. If more than one of the words is high, the output current will appear on the reject output line 456.

*FIG. 32*

This figure illustrates the complete mechanism of the output character selector 46 of FIG. 11. In this selector, an output character determined by the current in the high line of one of the high-not high pairs 366 of FIG. 30 is used to determine a set of characters delivered on the output lines 449.

At B time, a signal is supplied on an alternate pair 451 from a circuit described below in connection with FIG. 38. A current on the "0" or upper line of the pair 451 indicates that the character being observed must for some reason be rejected. A current on the lower or "1" line of the pair 451 indicates that the character is proper for transfer to the output lines 449. The current in the "0" line 451 flows through the control winding of a cryotron 453. The current in the "1" line of the pair 451 flows through a control winding of a cryotron 455. The cryotrons 453 and 455 have their gates in the "1" and "0" lines respectively of a transfer flip-flop 457 which receives current from a constant source 458.

The "1" line of the transfer flip-flop 457 includes in series the control windings of a plurality of cryotrons 461, one for each digital order of a binary code by which the characters to be recognized are identified. The "0" line of the flip-flop 457 includes control windings of a similar plurality of cryotrons 465.

A set of read out transfer flip-flops 468 is provided for transferring data from the high output line of the alternate pairs 366 (see FIG. 30) to the character output lines 449. The transfer flip-flops 468 are provided with current from sources 463 at C time through the gates of the cryotrons 465. If the cryotrons 465 are blocked, then the currents from the sources 463 pass through the gates of cryotrons 461 to a set of lines 466 which transfer a character identified in the drawing by the legend ALL BITS to the output lines 449. The appearance of this character on the output lines indicates that the character received is not recognizable.

Each high line of an alternate pair 366 conducts current through the control windings of cryotrons 470 and 472. A cryotron 470, having its gate connected in the "1" line of a transfer flip-flop 468 is provided for each of the binary orders wherein the digit for the particular numeral associated with that pair 366 is "0." A cryotron 472, having its gate connected in the "0" line of a transfer flip-flop 468, is provided for each of the binary orders wherein the digit for the particular numeral associated with that pair 366 is "1." For example, in the high line of the uppermost pair 366 shown in FIG. 32, which is the pair for recognizing the numeral "1," the binary code for the character is 0001, so a cryotron 472 is provided from the zero line of the lowest order flip-flop 468 and cryotrons 470 are provided in the "1" lines of the flip-flops 468 for all the other binary orders.

In the case of the next lower alternative pair 366 (the "2" pair), the binary code is 0010, so cryotrons 470 are located in the "1" lines of flip-flops 468 of both the lowest and highest binary orders. The only flip-flop 468 having a cryotron 472 in its "0" line for the numeral "2" is the second order flip-flop not shown in the drawing.

For the character "0," which is conventionally coded as 8+2, there is a cryotron 472 in the "0" line of the "8" order flip-flop 468 (and in the "0" line of the second order flip-flop, not shown), and a cryotron 470 in the "1" line of the lowest binary order flip-flop 468.

The "1" line of each transfer flip-flop 468 flows through the control winding of a cryotron 478 in the "0" line of a pair of output lines 449. The "0" line of the same transfer flip-flop 468 flows through the control winding of a cryotron 476 whose gate is connected in the "1" line of the same output pair 449.

The lines 466 pass through control windings of cryotrons 478 having gates connected in the "0" lines of the output pairs 449.

It may be seen that when a signal is received on the "1" line of the input pair 451 in FIG. 38, then at the following C time, the currents in the transfer flip-flops 468 transfer information from the "0" line of the pair 366 which has been determined to be high and transfer a code defining the corresponding character to the pairs of output lines 449.

On the other hand, if the input signal from FIG. 38 comes in on the "0" line of the pair 451, indicating a rejected character, then the currents from the sources 463 are transferred to the lines 466 and the control windings of the cryotrons 478, thereby causing the output lines 449 to print all "1's." Alternatively, by rearranging the cryotrons 478, the output lines may be made to carry any desired code. The all "1's" is chosen simply because it fits best in the usual binary code for indicating decimal characters, as being a code designation not used by any one of the ten decimal characters.

*FIG. 33*

This figure is a block diagram which is essentially an expansion of the single block shown as the control unit 30 in FIG. 11. In the control unit 30 are subunits described below individually in connection with each of FIGURES 34 to 40. The flow of information between those control units is indicated by the arrowheads in FIG. 33. The control unit 30 also receives information from the various units shown in FIGS. 18, 23, 24, 29 and 31, which appear to the left of the block enclosing the control unit 30 in FIG. 33. The control unit 30 supplies data to the unit of FIG. 24 and also receives data from that unit, which appears in a block at the top of FIG. 33. The control unit 30 supplies data or control impulses to the units of FIGS. 13, 23, 28 and 32, which appear at the right of the block enclosing the control unit 30 in FIG. 33.

*FIGS. 34–36*

The circuits shown in these figures control the selection of the E inputs to the multiply-add unit 36 of FIG. 28. The circuit of FIG. 35 is also associated with certain other functions. These FIGS. 34–36 will first be described as they cooperate in controlling the selection of the E inputs to FIG. 28. As mentioned in connection with FIG. 28, the E input lines 352 of that figure may be selectively supplied with E data either from E output lines 29 of FIGS. 18 and 20 or from E output lines 258 of FIG. 24.

Figures 34, 36:
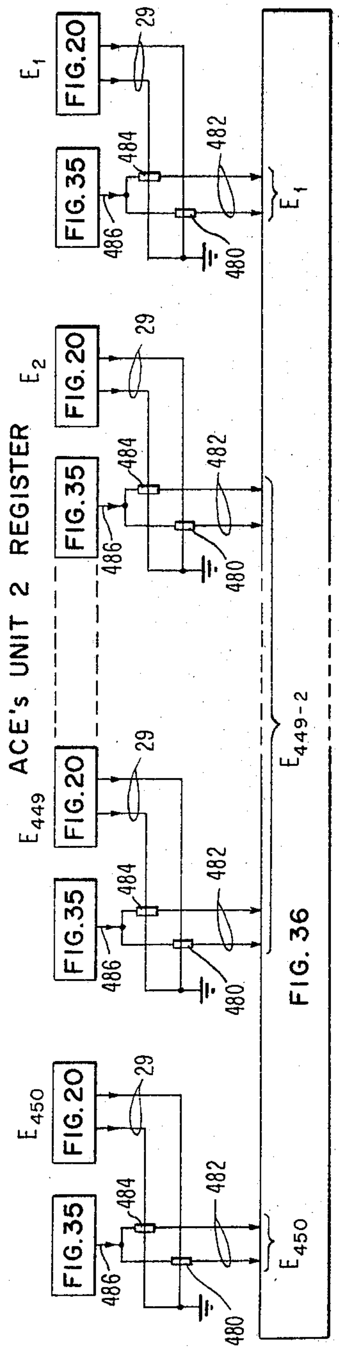
FIG. 34 is a wiring diagram showing an auto-correlation element input register used in the control unit of FIG. 33.
FIG. 36 is a wiring diagram of an OR circuit controlled by the circuit of FIG. 35.
Figure 35:
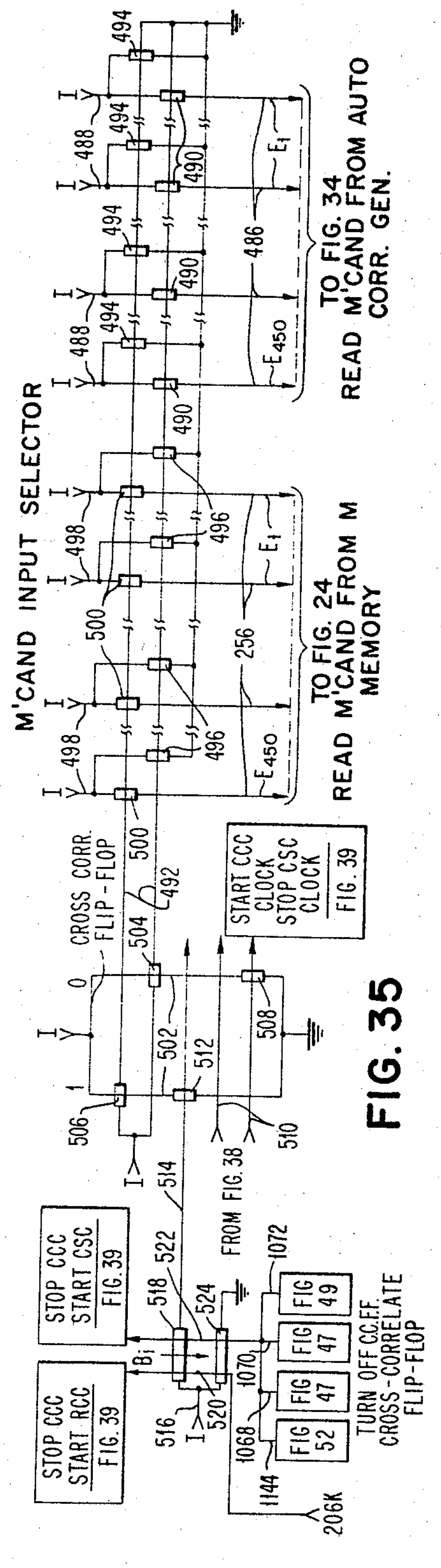
FIG. 35 is a wiring diagram of an input selecting circuit forming part of the control unit of FIG. 33.

FIG. 34 illustrates a register circuit for retaining the data defining the autocorrelation elements $E_1$–$E_{450}$ from the autocorrelation element generator 28 until that data is required for use in the multiply-add unit 36. In FIG. 34, there may be seen a plurality of binary input pairs 29 which correspond to the output pairs 152, etc. of FIGS. 18 and 20 and which are collectively identified in FIG. 20 by the reference character 29. For each of the elements $E_1$ to $E_{450}$, there is a set of input pairs 29 equal in number to the number of binary orders required to define the maximum possible value of that element E. For example, in the case of the element $E_1$, there must be a sufficient number of pairs to define a count of 450. On the other hand, in the case of element $E_{450}$, only one input pair 29 is required. Each input pair 29 has its "0" line extending through the control winding of a cryotron 480 located in the "1" line of one of a plurality of flip-flops 482. The "1" line of each input pair 29 extends through the control winding of a cryotron 484, whose gate is located in the "0" line of one of the flip-flops 482. The flip-flops 482 are supplied with current from lines 486 at times determined by the circuits of FIG. 35. The output portions of flip-flops 482 are shown in FIG. 36.

Referring now to FIG. 35, it may be seen that the current supply lines 486 receive current from constant current sources 488 through the gates of cryotrons 490 having their control windings connected in series in a "1" line of a transfer flip-flop 492. The "0" line of the transfer flip-flop 492 includes in series the control windings of a plurality of cryotrons 494 whose gates are connected between the constant current inputs 488 and ground.

The "1" line of the transfer flip-flop 492 also includes in series the control windings of a plurality of cryotrons 496 connected between constant current sources 498 and ground. The "0" line of the transfer flip-flop 492 includes in series the control windings of a plurality of cryotrons

500 connected between the constant current supplies 498 and a set of lines 256 which supply current to the read out flip-flops 258 in field #2 of the M memory, shown in FIG. 24. The output ends of the flip-flops 258 of FIG. 24 are shown in FIG. 36.

The current flows in the lines of the transfer flip-flop 492 are controlled by a cross-correlate flip-flop 502, which determines whether the apparatus is operating in the cross-correlate phase identified above as phase (2). The "0" line of the cross-correlate flip-flop 502 includes the control winding of a cryotron 504 whose gate is connected in the "1" line of the flip-flop 492. The "1" line of the cross-correlate flip-flop 502 includes the control winding of a cryotron 506 whose gate is connected in the "0" line of the flip-flop 492.

When current flows in the "0" line of the cross-correlate flip-flop 502, the gate of cryotron 504 is closed and the gate of cryotron 506 is open so that the cryotrons 500 all have current flowing in their control windings and are blocked. Hence the data defining the autocorrelation elements E is not then read from the M memory. On the other hand, the cryotrons 490 are not blocked and the cryotrons 494 are blocked, so that read out current is supplied on lines 486 to the read out flip-flops 482, and the data defining the autocorrelation elements E is read from the generator 28. The read out of elements E from generator 28 occurs in all operational phases except the cross-correlate phase (2).

On the other hand, when current flows in the "1" line of the cross-correlate flip-flop 502, cryotron 506 is blocked and the gate of cryotron 504 is open so that the cryotrons 500 have their gates open and the cryotrons 490 have their gates closed. Hence the autocorrelation elements E are then read from the M memory, as is required during the cross-correlate phase (2) of operation.

The "0" line of the cross-correlate flip-flop 502 includes the gate of cryotron 508 having a control winding connected in the "1" line of an alternative pair 510, whose input circuit is described below in connection with FIG. 38.

The "1" line of the cross-correlate flip-flop 502 (FIG. 35), includes a cryotron 512 having a control winding connected in series with a line 514 supplied with current from a constant source 516 through the gate of a cryotron 518. Cryotron 518 has a bias winding and is thus normally blocked. It may be unblocked by current opposing the biasing winding and flowing in either of two control windings connected in lines 520 and 522. Line 520 is supplied with current at time 206K, as described below, and continues through the control windings of cryotrons 524 and 518 to FIG. 39, where it is effective to stop the cross-correlate clock (CCC) and start the read-and-compare clock (RCC), both shown in FIG. 39.

The line 522 may receive current from either of four sources appearing respectively in FIGS. 47, 48,, 49 and 52, as described below. The current in line 522 flows through the control winding of a cryotron 524 whose gate is connected between the source 516 and ground and also through a control winding of cryotron 518 to the clock control circuits of FIG. 39, where it is effective to stop the cross-correlate clock CCC and to start the collect specimens clock CSC.

The operation of the circuits controlling the cross-correlate flip-flop 502 will be described in detail below after the structure of those circuits has been described more completely.

Referring now to FIG. 36, there is shown an OR circuit including a plurality of output pairs 352, which are supplied with current from constant current sources 526.

The number of output pairs 352 is equal to the number of pairs required to define the autocorrelation elements $E_1$–$E_{450}$ (as discussed above in connection with FIG. 34.

Each "0" line of an output pair 352 includes in series the gate of a cryotron 528 having its control winding connected in the "1" line of the corresponding $E_1$ read out flip-flop 258, and the gate of another cryotron 530 having its control winding connected in the "1" line of the corresponding $E_1$ read out flip-flop 482.

Each "1" line of an output pair 352 includes in series the gate of a cryotron 532 having its control winding connected in the "0" line of a read out flip-flop 258, and the gate of a cryotron 534 having its control winding connected in the "0" line of a read out flip-flop 482.

It may be seen that when the cross-correlate flip-flop 502 of FIG. 35 is set to cause cross-correlation, i.e., to cause operation of the apparatus in phase (2), then the currents from the sources 498 (FIG. 35) are supplied through lines 256 (FIGS. 35 and 24) to the flip-flops 258 (FIGS. 24 and 36) and the E values stored in the M memory (FIG. 24) are read out to the output pairs 252 (FIG. 36) which are connected to the multiply-add unit 36 (FIG. 28). On the other hand, when the cross-correlate flip-flop 502 is set to prevent cross-correlation, the currents from the sources 488 (FIG. 35) are supplied through the lines 486 (FIGS. 35 and 34) to read out the autocorrelation elements E from the generator 28 (FIGS. 18 and 20) through the flip-flops 482 (FIGS. 34 and 36) and place the data defining those elements on the pairs 352.

*FIGS 37–38*

Figure 37:
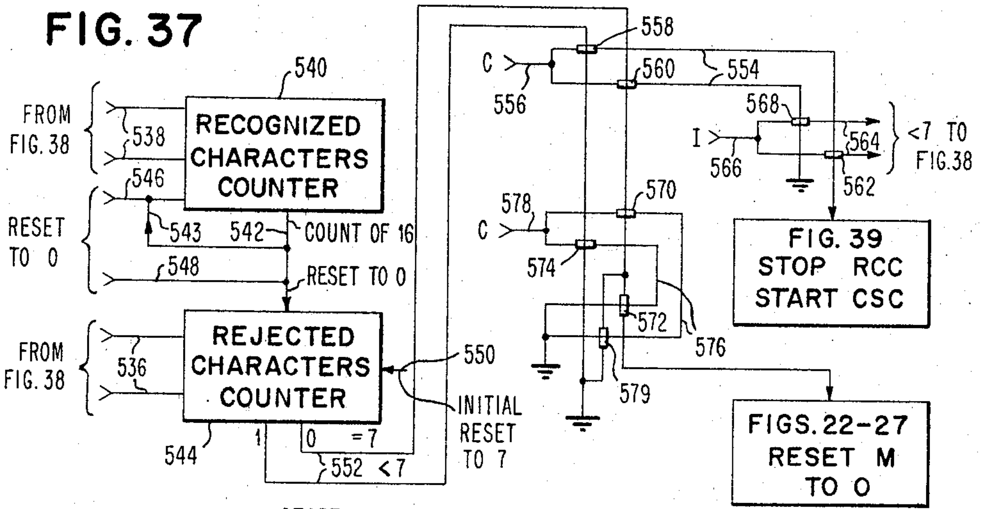
FIG. 37 is a wiring diagram of a circuit for counting rejected and accepted characters and certain circuits controlled thereby.

FIG. 37 shows partly in block form and partly in wiring diagram form a circuit for counting recognized and rejected characters. The specific counting circuits form no part of the present invention. A suitable counter is disclosed and claimed in the copending application of Harold Fleisher and Robert I. Roth, Serial No. 133,679, filed August 24, 1961, entitled "Memory Read Out and Summing System," now Patent No. 3,191,012.

FIG. 38 shows a test control circuit which determines, on each character reading cycle, whether the character being observed is recognized or rejected. There may be some reading cycles (for example, where the space being observed by the register is either a complete blank or a complete black area), where no character is either recognized or rejected as unrecognizable. Among the functions of the test control circuit in FIG. 38 is that of producing a signal on a pair of output lines 536 whenever a character being observed is to be counted as rejected. Another function of the test control unit is to supply a signal to a pair of output lines 538 whenever the character being observed is classified as recognized.

The signals from the output pair 538 are supplied to a recognized character counter 540 in FIG. 37, having a predetermined arbitrarily selected maximum count capacity. In the illustrated apparatus, this count capacity is sixteen. After sixteen characters have been counted by the counter 540, it produces an output pulse on an output line 542.

The pulses on the output pair 536 of FIG. 38, which count the rejected characters, are supplied to a rejected characters counter 544 in FIG. 37. The rejected characters counter also has a fixed capacity, in the example illustrated, seven characters. The output line 542 of the recognized characters counter 540 is connected to the rejected characters counter 544. A signal pulse on the line 542, indicating a count of sixteen recognized characters, is effective to reset the rejected characters counter to its "0" condition. The output line 542 is also connected through a wire 543 to a reset input line 546 of the recognized characters counter 540, and resets that counter to zero at the same time that the rejected characters counter is set to zero. The recognized characters counter may be reset to zero by an independent input pulse on the line 546. The rejected characters counter may be reset to zero by an independent pulse on the reset input line 548. The rejected characters counter may also be initially reset to its maximum capacity of seven by an input pulse on a line 550. This initial reset to seven is utilized when starting the apparatus with all memories blank.

The rejected characters counter 544 is provided with an alternate pair of output lines 552 and produces a current flow on the "1" line of that pair whenever the count in the counter 544 is less than seven and produces a current in the "0" line whenever the count in the counter 544 is equal to seven.

The data on the output lines 552 is read at C time by means of a transfer flip-flop 554 supplied with current from a source 556. The "0" line of the transfer flip-flop 554 includes the gate of a cryotron 558 whose control winding is located in the "1" line of the pair 552. The "1" line of the flip-flop 554 includes the gate of a cryotron 560 whose control winding is connected in the "0" line of the pair 552. The "0" line of the pair 554 extends through a control winding of a cryotron 562 connected in the "1" line of a pair of output lines 564. The "1" line of the pair 554 extends through the control winding of a cryotron 568 whose gate is connected in the "0" line of the output pair 564. The output pair 564 is supplied with current from a constant source 566 and is connected to data input lines 564 in FIG. 38.

The "1" line of the flip-flop 554 is grounded after it passes through the control winding of cryotron 568. The "0" line of pair 554 extends beyond the control winding of the cryotron 562 to FIG. 39, where current flowing in that line is effective to stop the read-and-compare clock RCC and to start the collect-specimens clock CSC.

Note that the output lines 564 always have on them information as to the conditions of the counter 544 during the last preceding C time. The condition of the counter 544 may change at B time, as described below in connection with FIG. 38, but the condition of the output pair 564 does not change until C time, and holds whatever indication it receives at one C time until the next C time.

The "0" line of the pair 552 extends through the control winding of a cryotron 570 and through the gate of a cryotron 572 and thence to the reset circuits shown in FIGS. 23, 24, 25 and 26, and identified there by the character R. The "1" line of the pair 552 extends through the control winding of a cryotron 574 to ground. The cryotrons 570 and 574 have their gates respectively connected in the "0" and "1" lines of a flip-flop 576 supplied with current from a source 578, at C time. The "0" line of the flip flop 576 extends through the control winding of a cryotron 579 whose gate is connected as a crossover between ground and the "0" line of the pair 552 at the current supply side of the gate of cryotron 572.

At any B time, if current appears on the "0" line of the output pair 552 (FIG. 37), then a reset pulse is supplied through the gate of cryotron 572 to the reset circuits associated with the M memory. At the following C time, the source 578 is effective to turn off any such reset pulse which may have been established during the preceding B time and to switch the current from the reset circuits of the M memory through the gate of the cryotron 579 to ground.

Referring now to FIG. 38, there is shown a tree of circuits supplied with currents from a constant source 580 at the top of the figure and branching into eight vertical transfer lines 581–588, all of which are terminated at ground.

Five pairs of horizontal input lines cross the upper ends of the branch tree. The first pair of input lines 590 is supplied from the bit count limit detecting circuit described below in connection with FIG. 40. If the bit count of the character being observed is below or above predetermined limits, then the pair 590 will have current on its "0" line. On the other hand, if the bit count is within the predetermined limits, the pair 590 will have current on its "1" line. The "0" line of the pair 590 extends through the control winding of a cryotron 592 whose gate is connected between the source 580 and a junction 594. The "1" line of the pair 590 includes a control winding of a cryotron 596 whose gate is connected between source 580 and the transfer line 581.

The next lower pair of horizontal input lines appears at 456 and 464 and comes from the high sort count circuit of FIG. 31. Current flows in line 456 if there are two or more equal high cross-correlation products in the sorting memory 362. On the other hand, if there is only one high product in the sorting memory 362, then current flows in the line 464. The line 456 extends through the control winding of a cryotron 598 whose gate is connected between the junction 594 and a junction 600. The line 464 extends through the control winding of a cryotron 602 whose gate is connected between junction 594 and a junction 603.

The third pair of horizontal input lines comes from the sort-and-compare unit 44 (FIG. 29), and is shown at 378. The current in the pair 378 indicates whether there is a difference of at least 2% between the two highest cross-correlation products in the sorting memory 362. If the difference is less than 2%, then current flows in the "0" line of the pair 378 and if the difference is at least equal to 2%, current flows in the "1" line of the pair 378. The "0" line of pair 378 extends through the control winding of a cryotron 604 having its gate connected between the junction 600 and the junction 606. The "1" line of pair 378 extends through the control winding of a cryotron 608 having its gate connected between junction 600 and a junction 610.

The fourth input pair for FIG. 38 is the output pair 564 described in connection with FIG. 37, which indicates whether the rejected characters count is less than seven, and includes a "0" line (indicating count equals seven) extending through the control windings of cryotrons 612, 614 and 616 and a "1" line (indicating count less than seven) extending through the control windings of cryotrons 618, 620 and 622.

Cryotron 612 is connected between junction 603 and transfer line 583. Cryotron 614 is connected between junction 610 and transfer line 585. Cryotron 616 is connected between junction 606 and transfer line 588. Cryotron 618 is connected between junction 603 and transfer line 582. Cryotron 620 is connected between junction 610 and transfer line 584. Cryotron 622 is connected between junction 606 and a junction 624.

The fifth input pair for the test control circuit of FIG. 38 comes from the circuit of FIG. 23, where it appears as the output pair 236 containing information as to whether the M memory is full. When the M memory is full, current flows in the "1" line. When the M memory has at least one of its ten locations empty, current flows in the "0" line. The "0" line passes through the control winding of a cryotron 626 having its gate connected between junction 624 and line 587. The "1" line of pair 236 flows through the control winding of a cryotron 628 having its gate connected between junction 624 and line 586.

The input pairs for the network of FIG. 38 are described above, and include the pairs 590, 456–464, 378, 564 and 236. For any combination of inputs on those input pairs, current flows in one and only one of the eight transfer lines 581–588.

The network of FIG. 38 also includes five output pairs, all supplied with current from sources 630 at B or B″ times.

The uppermost output pair shown in FIG. 38 is the pair 536 which supplies counting pulses to the rejected characters counter 544 of FIG. 37. The "0" line of the pair 536 includes the gate of a cryotron 632 having a control winding connected in transfer line 585 and the gate of a cryotron 634 having a control winding connected in the transfer line 583. The "1" line of the output pair 536 includes the gates of cryotrons 636, 637, 638, 639, 640 and 641, having their control windings respectively connected in the transfer lines 588, 587, 586, 584, 582 and 581. Whenever current flows in the "1" line of the pair 536, the counter 544 of FIG. 37 counts a rejected character. Whenever current flows in the "0" line of output pair 536, the counter 544 does not count a rejected character.

It may be seen that there are only two combinations of input conditions in which a rejected character is counted. One of these combinations is indicated by current flowing in transfer line 585 and includes the following conditions: (a) the bit count is within the prescribed maximum and minimum limits, (b) the high sort count indicates more than two G elements are high and equal; and (c) the count in the rejected counter 544 is less than seven. The other combination is indicated by current flowing in transfer line 583 and includes the conditions that; (a) the bit count is within the prescribed limits; (b) the high sort count is equal to "1" (less than 2); (c) there is less than a 2% difference between the high and next high G elements; and (d) the reject count is less than seven.

The next lower output circuit in the network 338 leads to the output pair 228 which is effective to determine whether the data in the word "1" location of the M memory is to be set to blank.

The "0" line of the pair 228 includes the gates of cryotrons 642, 643 and 644, whose control windings are respectively connected in the lines 584, 582 and 581. The "1" line of the pair 228 includes in series the gates of the cryotrons 645, 646, 647, 648 and 649, whose control windings are respectively connected in the transfer lines 588, 587, 586, 585 and 583. When an output appears on the "1" line of the pair 228, the entry in the word "1" location of the M memory is set to blank. This occurs in response to three different combinations of input conditions. The first "combination" of input conditions is really only a single condition, namely that the bit count is outside the prescribed maximum or minimum limits, and is indicated by current flowing in transfer line 581. The second combination of conditions is indicated by current flowing in the transfer line 582, and includes the conditions (a) that the bit count is within the prescribed limits; (b) the high sort count is greater than "1" and (c) the reject count is equal to seven. The third combination of conditions is indicated by current flowing in the transfer line 584 is that (a) the bit count and includes the conditions within the prescribed limits; (b) the high sort count is equal to "1"; (c) the difference between the high-and-next high G elements is less than 2%; and (d) the reject count is equal to seven.

The third pair of output lines is shown at 451 and is connected to the input of the output character selector 46 shown in FIG. 32. As described in that figure, when current flows in the "0" line of the pair 451, a special output code is supplied to the output lines showing that the character observed was not recognizable. On the other hand, if current flows in the "1" line of the pair 451, a particular digit, as recognized by the apparatus, is identified by the code placed on the output lines. The "0" line of the pair 451 includes the gate of a cryotron 650 having a control winding in the transfer line 588. The "1" line of the pair 451 includes in series the gates of cryotrons 651 to 657, having control windings in the lines 587 to 581, respectively. It may be seen that only one combination of inputs to the network of FIG. 38 results in the reading out of the observed character. That combination is determined by current flowing in the line 588, and includes the following conditions: (a) the bit count is within the prescribed limits; (b) the high sort count is equal to "1"; (c) the difference between the high G element and the next high G element is greater than 2%; and (d) the reject count is less than seven.

The next pair of output lines is shown at 510 and is connected to the cross-correlate flip-flop at 502 in FIG.

35. When a current appears on the "1" line of the pair 510, the cross-correlate flip-flop is triggered to start the apparatus on the cross-correlate phase (2) of the operation.

The "0" line of pair 510 includes the gate of a cryotron 658 having its control winding connected in the transfer line 587. The "1" line of the pair 510 includes the gates of cryotrons 659 to 665, having their control lines conected respectively in series with the transfer lines 588, 586, 585, 584, 583, 582 and 581.

Only one combination of conditions produces current in the transfer line 587 and hence output current on the "1" line of the pair 510. That combination is: (a) that the bit count is within the prescribed limits; (b) the high sort count is equal to "1"; (c) the percentage difference between the two highest G elements is greater than 2; (d) the reject count is equal to seven; and (e) the M memory is full.

The last output pair shown in the network of FIG. 38 is the pair 538, which is connected to the recognized characters counter of FIG. 37. The "0" line of the pair 538 includes the gates of a cryotron 666 having its control winding in the transfer line 588. The "1" line of the pair 538 includes the gates of cryotrons 667 to 673, having their control windings connected in the transfer lines 587 to 581, respectively.

Only one combination of input conditions causes the current to be placed on the "1" line of the pair 538 to count a recognized character. That combination of conditions is the same as required for putting a recognized character on the output lines as described above in connection with the output pair 451.

*FIG. 39*

This figure illustrates in block diagram form the three clocks which are utilized to time the various phases of operation of the apparatus.

The clock shown at the top of FIG. 39 is identified as the read-and-compare clock RCC, and establishes the apparatus in the phase (4) identified above, in which the apparatus is receiving new specimens and comparing them with the autocorrelation functions of characters previously stored in the M memory. This clock produces a repeated sequence of three pulses on three different output lines identified as A, B and C. The pulse on the A line is a square wave output pulse continuing from time A to time B. The square wave on the B line extends from time B to time C. The square wave on the C line extends from time C to time A of the succeeding cycle. Each A, B, C cycle is effective to read one character or to advance the reading mechanism to initiate the reading of the next character.

The clock RCC is provided with start and stop input lines which are controlled by the circuits of FIGS. 37 and 38. Note that each output line is identified by the same reference character as the time instant at which a pulse begins on that line.

The collect-specimens clock CSC has three output lines identified as A′, B′, and B″. This clock also produces a repeat sequence of three pulses on its output lines. Each pulse on output line A′ extends from A′ to time B′. Each pulse on the B′ output line extends B′ to time A″. Each pulse on B″ extends from B″ to A′ time of the suceeding cycle. Note that each output line is identified by the same reference character as the time instant at which the pulses begin on that line. Note also that there is no pulse beginning at A″ time.

The cross-correlate clock CCC is considerably more complex than the other two clocks. It has a set of 206 outputs, each consisting of four output lines identified as G, H, K and L. The CCC clock produces on the groups of output lines a series of pulses which begin at equally spaced instants identified as G, H, K and L to correspond with their respective output lines. The pulses on the various G, H, K and L output lines are not of the same duration in all the 206 output groups. However, at each G time, all of the G, H, K and L pulses of the preceding group are terminated. The durations of the individual G, H, K and L clock pulses are described in detail below.

The input lines to which the various A, B, C, A′, B′, B″, G, H, K and L current pulse supply lines are connected as shown in the various circuit drawings.

*FIG. 40*

Figure 33:
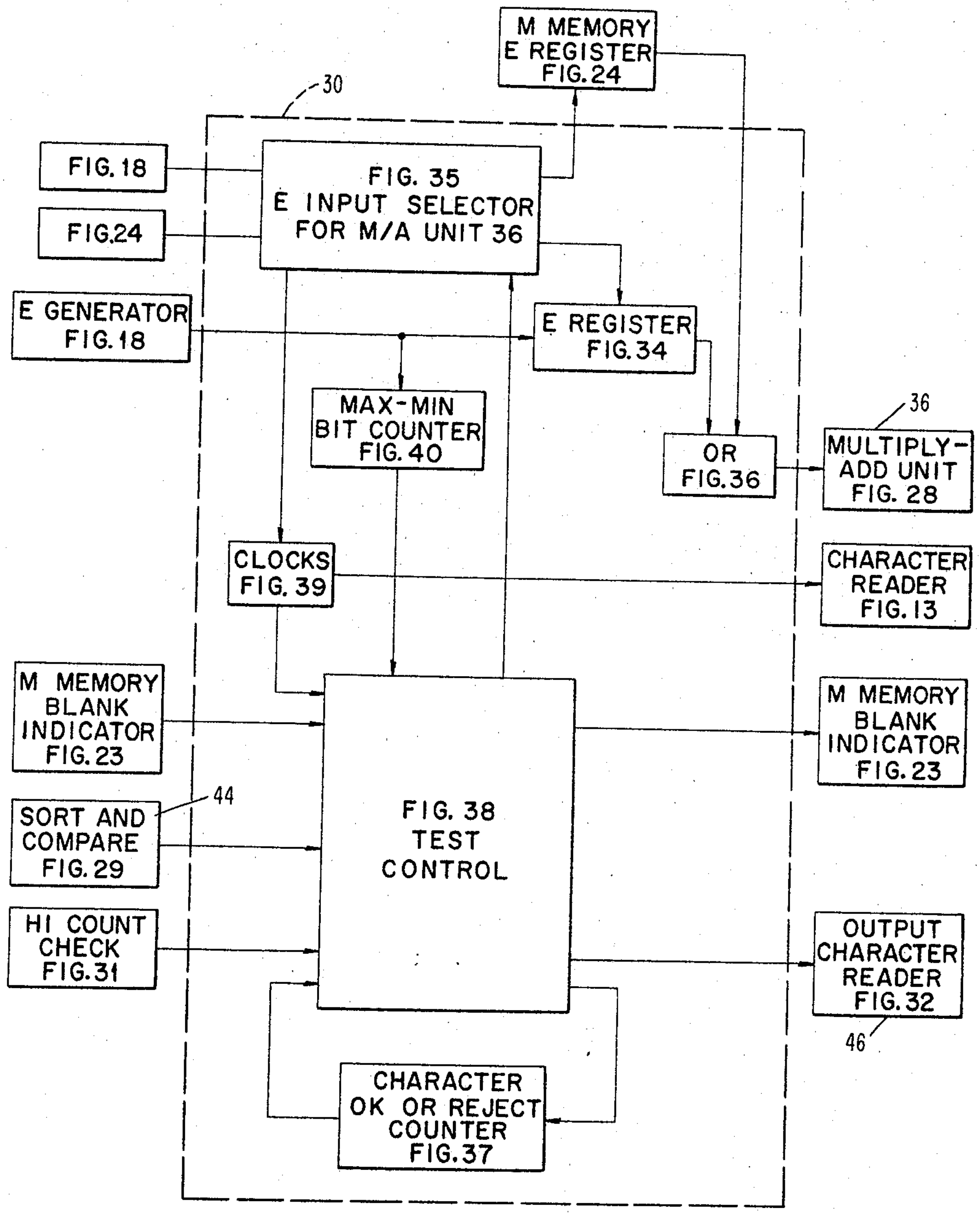
FIG. 33 is a block diagram showing the various subunits in the control unit of FIG. 11 and the information flow between them.
Figure 36:
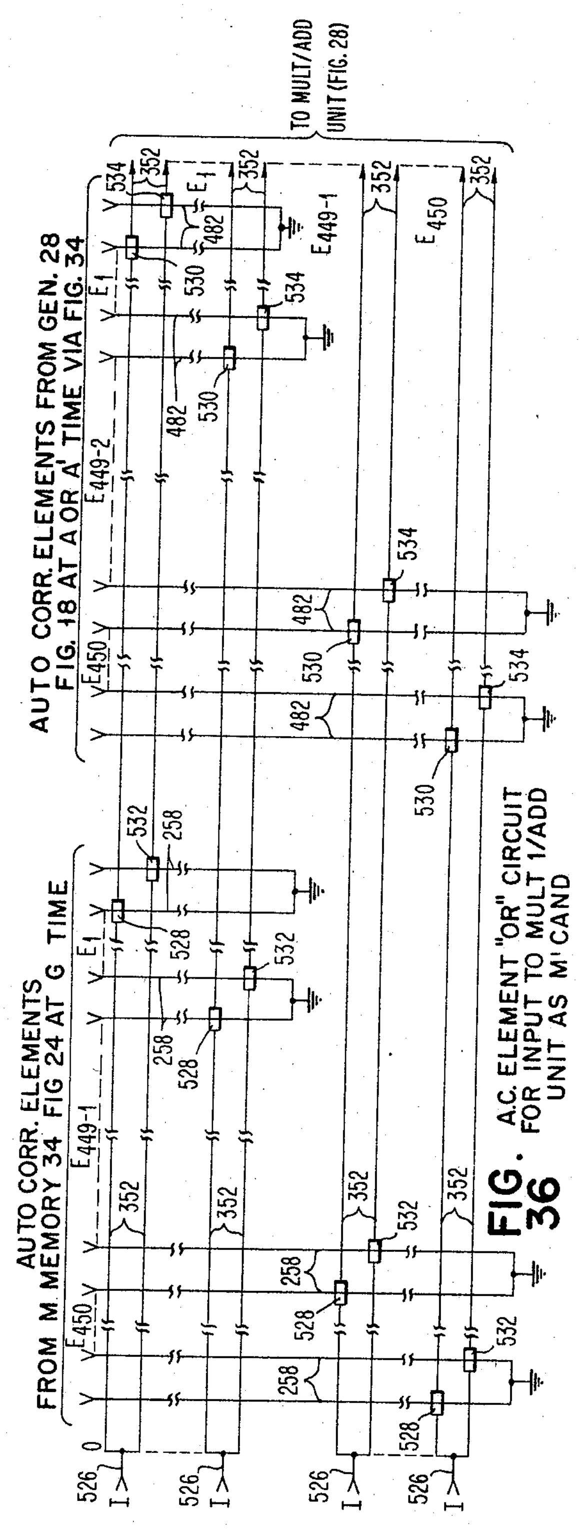

This figure illustrates the details of the bit count limit check circuit shown diagrammatically at 98 in FIG. 33.

Figure 40:
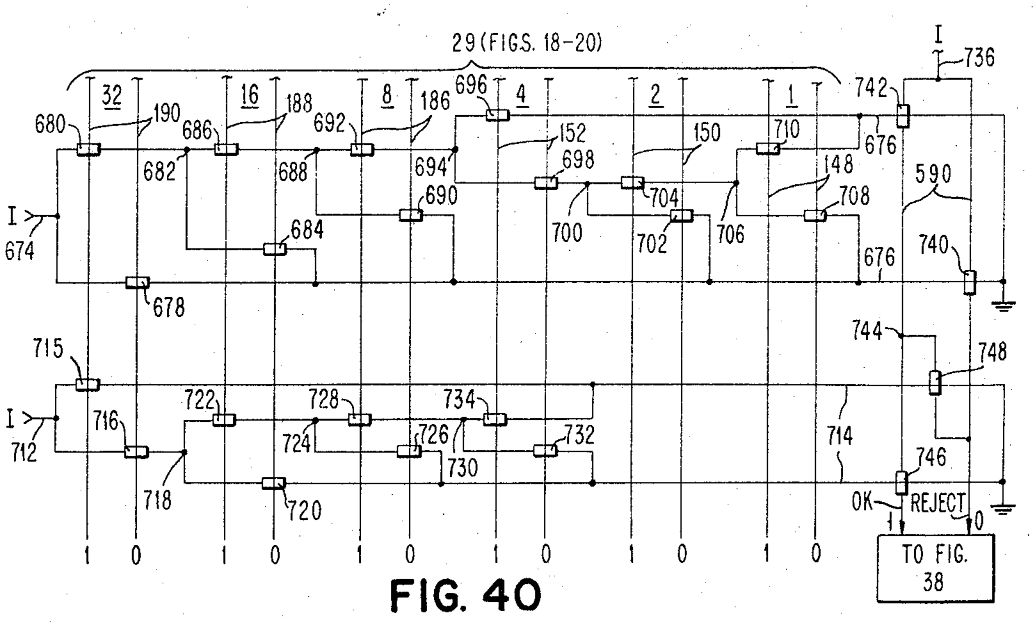
FIG. 40 is a wiring diagram of a circuit for counting the bits in the autocorrelation elements.

The function of the circuit shown in FIG. 40 is to count the bits registered on the output lines 29 (FIG. 18) coming from the adder 94, i.e., the total number of non-illuminated photocells in the bank 58. If the number of input bit falls between a preselected range, the operation of the apparatus is allowed to proceed. If the number of bits is outside of that range, a control impulse is produced which causes the reading apparatus to advance to the next character without any classification (as to recognition or non-recognition) of the specimen in the field of observation. For example, with the font of numerical characters shown in FIG. 3, it is considered that if the number of bits appearing is less than five, then the specimen being observed is either a blank or so mutilated as to be unrecognizable, so that it must be discarded. Furthermore, if the number of bits counted for any given specimen is greater than thirty-five, it is considered that the specimen is practically a blot and cannot be recognized by the apparatus. These limits are of course arbitrarily selected from practical considerations. In any practical apparatus having a larger number of bit cells than the 450 shown herein, the range of permissible variation in the bit count would be substantially wider.

FIG. 40 shows binary input lines 148, 150, 152, which correspond to the binary output lines bearing the same reference numerals in FIG. 20. There are also shown in FIG. 40 further binary input lines 186, 188 and 190 corresponding to higher binary orders. As illustrated by the legends in FIG. 40, the pairs of input lines 148, 150, 152, 186, 188 and 190 respectively correspond to the binary orders 1, 2, 4, 8, 16, 32.

Referring to FIG. 40, there is shown a constant current source 674 feeding a network of alternative circuits leading to an alternative output pair 676. Current from source 674 may flow through a cryotron 678 having a control winding in the "0" line of the "32" input pair 190 directly to the "1" line of the output pair 676, or it may flow through a cryotron 680 having a control winding in the "1" line of the input pair 190 to a junction 682. From the junction 682, current may flow either through a cryotron 684 having a control winding in the "0" line of the "16" input pair 188 directly to the "1" line of the output pair 676, or it may flow through a cryotron 686 having a control winding in the "1" line of the "16" input pair 188 to a junction 688. From the junction 688, current may flow either through a cryotron 690 having a control winding in the "0" line of the input pair 186, directly to the "1" line of the output pair 676, or it may flow through a cryotron 692, having a control winding in the "1" line of the "8" input pair 186 to a junction 694. From the junction 694 current may flow either through a cryotron 696 having a control winding in the "1" line of the "4" input pair 152 directly to the "0" line of the output pair 676, or it may flow through a cryotron 698 having a control winding in the "0" line of the "4" input pair 152 to a junction 700. From the junction 700, current may flow through a cryotron 702 having a control winding in the "0" line of the "2" input pair 150 directly to the "1" line of the output pair 676, or it may flow through cryotron 704 having a control winding in the "1" line of the "2" input pair 150 to a junction 706. From the junction 706, current may flow either through a cryotron 708 having a control winding in the "0" input line of the "2" input pair 148, directly to the "1" line of the output pair 676, or it may flow through cryotron 710 having a control winding in the "1" line of the "1" input pair 148, directly to the "0" line of the output pair 676.

Another constant current source 712 feeds a network of alternative circuits leading to an alternative pair of output lines 714. Current may flow from source 712 either through a cryotron 715 having a control winding in the "1" line of the "32" input pair 190 directly to the "0" line of the output pair 714, or it may flow though a cryotron 716 having a control winding in the "0" line of the "32" input pair 190 to a junction 718. From junction 718, current may flow through a cryotron 720 having a control winding in the "0" line of the "16" input pair 188 directly to the "1" line of the output pair 714, or it may flow through a cryotron 722 having control winding in the "1" input line of the "16" pair 188 to a junction 724. From junction 724, current may flow either through a cryotron 726 having a control winding in the "0" line of the "8" input pair 186 directly to the "1" line of output pair 714, or it may flow through a cryotron 728 having a control winding in the "1" line of the "8" input pair 186 to a junction 730. From junction 730, current may flow through a cryotron 732 having a control winding in the "0" input line of the "4" input pair 152 directly to the "1" line of the output pair 714, or it may flow through a cryotron 734 having a control winding in the "1" line of the "4" input pair 152 directly to the "0" line of the output pair 714.

Another constant current source 736 supplies a network of alternative circuits leading to an alternative pair 590 of output lines. Current may flow from the source 736 either through a cryotron 740 having a control winding in the "1" line of the alternative pair 676 directly to the "0" line of the alternative pair 590, or it may flow through a cryotron 742 having a control winding in the "0" line of the alternative pair 194 to a junction 744. Current may flow from junction 744 either through a cryotron 746 having a control winding in the "1" line of the alternative pair 714 to the "1" line of the alternative pair 590, or it may flow through a cross-over cryotron 748 having a control winding in the "0" pair of the alternative line 714, directly to the "0" line of the alternative pair 738.

An output signal is produced on the "1" line of the alternative pair 676 if the number of bits counted by the input lines 29 is equal to or greater than five, and on the "0" line of the pair 676 if the number of bits is less than five. It may be seen that an input signal on the "1" line of any of the input pairs 186, 188 and 190 would block one of the cryotrons 692, 686 or 680 and transfer the current from source 674 to the "1" line of pair 676. If no signal is received on the "1" lines of the pairs 186, 188 and 190, but a signal is received on the "1" line of the input pair 152, a count of four bits is indicated. The "0" line is then blocked by the cryotron 696, so that current reaching the junction 694 then flows through cryotron 698 to junction 700. If there is a signal on the "1" line of the "2" input pair 150, then the cryotron 704 blocks the current and it passes through the cross-over cryotron 702 to the "1" output line of pair 676. If there is no signal on the "1" line of the pair 150, then the current proceeds through cryotron 704 to junction 706. If there is then current on the "1" line of the input pair 148, indicating a count of five, the current is blocked by cryotron 710 and flows through cryotron 718 to the "1" output line of pair 676. If, however, there is no input signal on the "1" line of pair 148, but the input signal is rather on the "0" line, then a count of only four bits is indicated, and the cryotron 708 blocks the current and it flows through cryotron 710 to the "0" line of pair 676, thereby blocking the cryotron 742 in the alternative pair 590.

Summarizing the operation of the alternative pair 676, it may be seen that this circuit operates to block the cryotron 742 and unblock cryotron 740 in the pair 204 if the bit count is less than five. On the other hand, if the bit count is greater than five, then the cryotron 740 is blocked and cryotron 742 is unblocked. Where additional binary orders are contemplated, higher than the "32" order, each input pair for all but the highest order should include the control windings of two cryotrons connected similarly to the cryotrons 684 and 686 with respect to the alternative input pair 188. The input pair for the highest order should include the control windings of two cryotrons located in the pair 676 in the same manner as the cryotrons 678 and 680 in FIG. 40.

If the number of bits counted on the input lines is greater than 35, then there necessarily must be a signal current in the "1" line of the input pair 190, blocking the cryotron 714 and unblocking the cryotron 716. If there is an input signal also on the "1" line of the input pair 188, a count greater than 48 is indicated. Cryotron 722 is then blocked and cryotron 720 is unblocked, and the signal current proceeds on the "1" output line of pair 714. If the signal on the input pair 188 is on the "0" line, then cryotron 720 is blocked and the current flows from junction 718 through cryotron 722 to junction 724. If the signal on the 186 input pair is on the "1" line, cryotron 728 is blocked and cryotron 726 is unblocked and the current flows to the "1" output line through cryotron 726. On the other hand, if the signal on input pair 186 is on the "0" line, cryotron 726 is blocked and cryotron 728 is unblocked so that the current passes through cryotron 728 to junction 730. If there is then a signal on the "1" line of the "4" input pair 152, it indicates that the bit count is greater than thirty-five. That signal is effective to block cryotron 734, while cryotron 732 remains unblocked and the signal current from source 712 proceeds to the "1" line of output pair 714. If the signal on the input pair 152 is on the "0" line, then the count is less than thirty-six, the cryotron 732 is blocked and cryotron 734 is unblocked and the signal current from source 712 proceeds to the "0" output line 714.

Where the input lines include binary orders which are themselves greater than the upper limit of the bit count, as will usually be the case, each such binary order should have a cryotron controlled by its "1" line blocking the "0" line of the pair 714 and a cryotron controlled by its "0" line blocking the "1" line of the pair 714.

If a signal appears on the "1" output line of pair 714, cryotron 746 is blocked and cryotron 748 is unblocked so that the output signal in pair 204 must necessarily be on the "0" line. On the other hand, if the output signal of the pair 714 is on the "0" line, cryotron 748 is blocked and cryotron 746 is unblocked so that the signal may then appear on either output line of the pair 590, depending upon the signal appearing on the pair 676.

Thus, it may be seen that the alternative pair 676 checks the lower limit of the bit count and the pair 746 checks the upper limit of the bit count.

If the total bits in the specimen being observed fall between the established upper and lower limits, then a signal current is produced on the "1" line of the pair 590, and if the total bits is outside those limits, then a current is produced on the "0" line of pair 590.

*FIGS. 41–45*

These figures illustrate the circuits involved in the unit identified in FIG. 11 as the N memory 38.

The function of the N memory 38 is to store the matrix of the cross-correlation functions of the set of unrecognized specimens collected in phase (1) of the operation and whose cross-correlation functions have been generated in phase (2) of the operation. The storage of these cross-correlation functions in the N memory is not a static storage, but is actively concerned with phase (3) of the operation. The data when first received in the N memory is essentially the same as the data in the reference matrix of FIG. 10, except that the rows are not arranged in numerical order, and the numbers in each row are not arranged in order of their magnitudes.

During the decoding operation of phase (3), the data stored in the N memory is sorted and compared and rearranged in accordance with information derived from the matrix of FIG. 10 until a point is reached where the identifying data of each of the ten different unrecognized characters has been identified with one of the ten numerals to be recognized. The N memory 38 then controls the rearranging of the words in the M memory 34 to place those words in their proper numerical order as determined by the recognitions established in the N memory 38.

Figure 42:
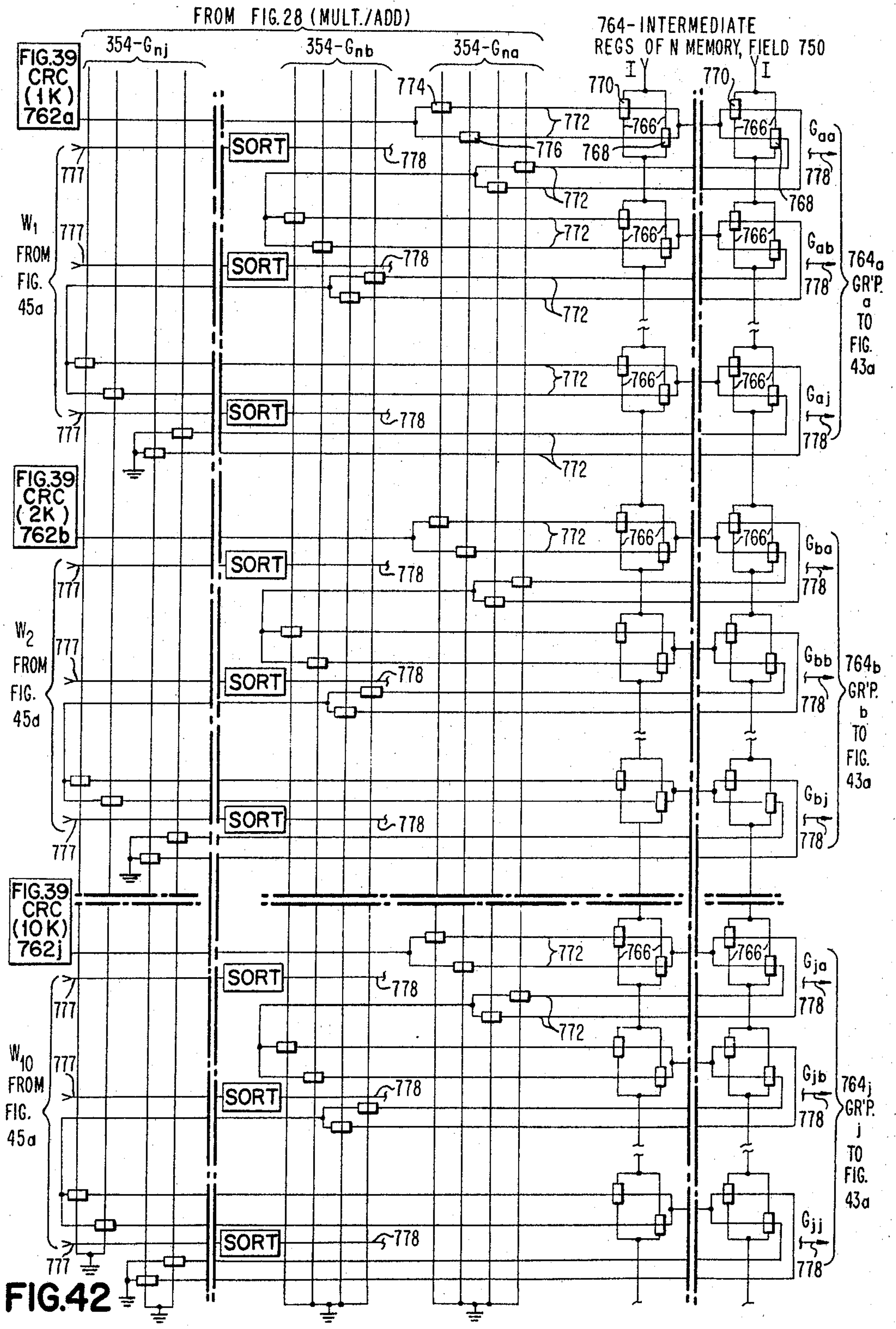
FIG. 42 is a wiring diagram of the sum register of the N memory.

The N memory 38 includes four registers, identified as the sum G register 750, the F register 752, the group E register 754, and the group identification register 756. The G register 750 is illustrated in FIG. 42, and the F register in FIG. 43; the group E register and the group identification register are illustrated in FIG. 44. Also included in the N memory 38 is a group selecting control circuit shown in FIG. 45.

Figure 41:
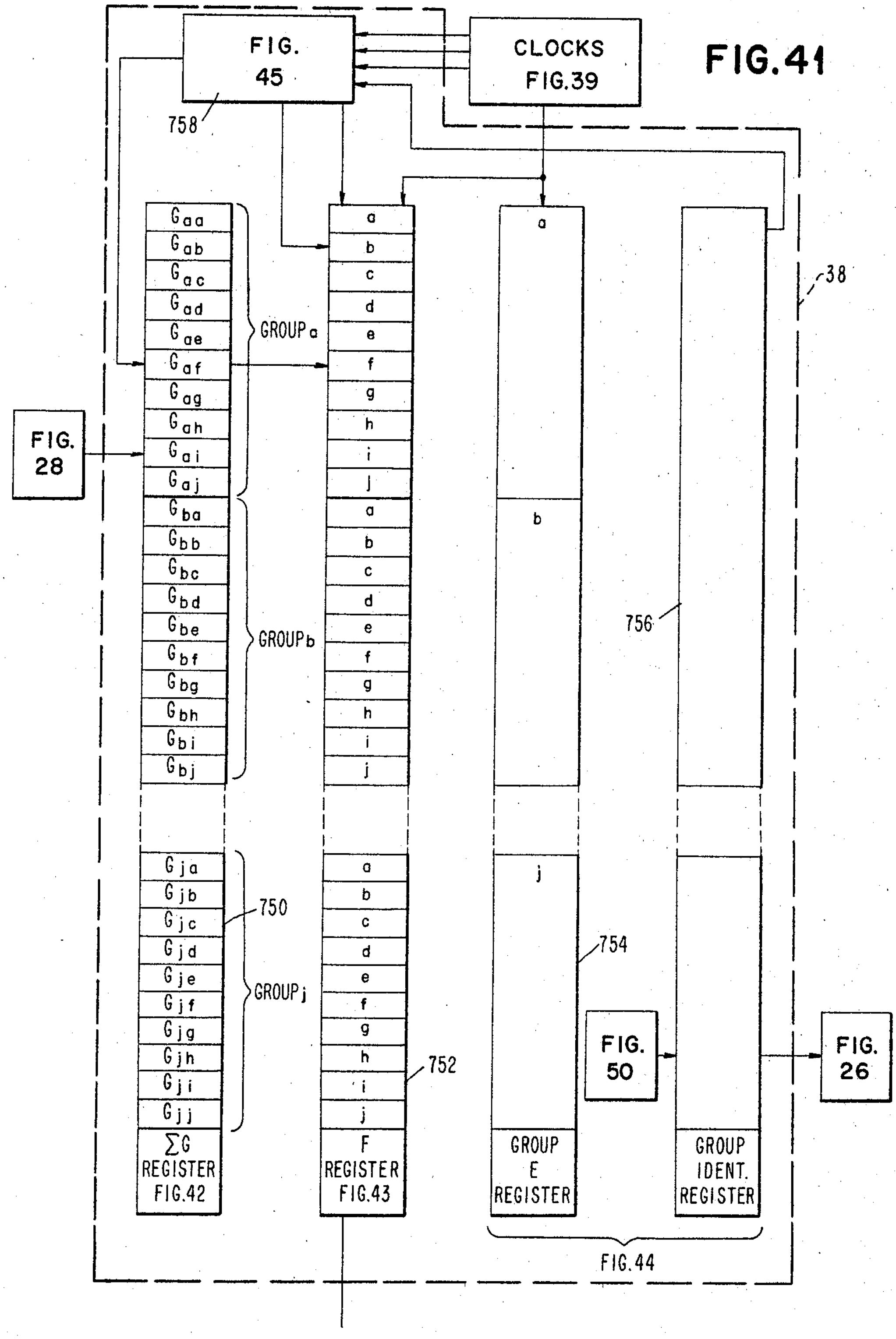
FIG. 41 is a block diagram showing the subunits included in the N memory shown as a single block in FIG. 11.

As indicated diagrammatically in FIG. 41, the N memory 750 has a capacity of ten groups, identified as Group *a*, Group *b*, . . . Group *j*. Within each group, there is a capacity of ten words. In each word is stored the sum G of the cross-correlation elements.

Each sum G stored in the sum register 750 represents the sum of the products of the autocorrelation elements E stored in a particular word of the M memory 34 (FIG. 22) times the normalized autocorrelation elements F stored in a particular word of the M memory 34. For example, in the first line of Group *a*, the sum register is indicated as $G_{aa}$. This indicates that the sum of the cross-correlation elements stored as $G_{aa}$ is derived by taking the sum of the products of the autocorrelation elements $E_a$ stored in word one of the M memory 22 times the normalized autocorrelation elements stored at word one of the M memory 22 and identified as $F_a$. In each group, all the autocorrelation elements E from which the sums G of all the words of the group are derived come from a single location in the M memory 22. That location is identified by the designation in the Group E register 754. The identification there employs alphabetical designations *a* through *j*, corresponding respectively to words one to ten of the Memory 34. The reason for using alphabetical designations rather than the numerical designations of the word locations in the M memory is to avoid confusion when the words in the M memory are rearranged in their proper numerical order later on.

The F register 752 shown in detail in FIG. 43 is illustrated diagrammatically in FIG. 41 as having ten groups of ten words each. In each word of the group, there is stored an alphabetical designation identifying the source of the F elements from which the sum in the corresponding location of the sum G register 750 was derived. The alphabetical designations in the F register 752 and the E register 754 are arbitrarily determined by the sequence of operation of the apparatus. Suitable write in circuits (not shown) are provided for writing these designations into the registers 752 and 754 just before the start of each sorting operation.

Continuing with the example previously selected, the sum $G_{aa}$ was derived from the products of the elements $E_a$ and the normalized elements $F_a$. The source of the E elements is identified in FIG. 41 by the letter *a* appearing in the group *e* register 754 opposite the first group in the 750 register. The source of the F elements in the sum $G_{aa}$ is identified by the letter *a* appearing in the first line of the first group of the F register 752 in FIG. 41.

To take another example, the sum identified as $G_{bh}$ in the sum register 750 of FIG. 41 is derived from the product of the autocorrelation elements $E_b$ of the M memory in FIG. 22 and the normalized autocorrelation elements $F_h$ in the M memory of FIG. 22.

*FIG. 42*

As in the case of the M memory 34 of FIGS. 22 to 27, the N memory 38 is a push-down memory with a self-rearranging feature, as shown and described in the co-pending application of Robert I. Roth, Serial No. 198,239, mentioned above.

FIG. 42 shows the circuits for writing the data defining the sums of the cross-correlation elements G into the side entry or intermediate registers of the push-down memory.

Ten sets of lines 354 extend from the output of the multiplier-adder unit of FIG. 28 to the input of the sum register 750, as shown in the upper portion of FIG. 42. At any B″ time, each of the ten sets of input lines 354, which sets are respectively identified as "$G_{na}$, $G_{nb}$ . . . $G_{nj}$," carries binary data defining the sum of one of a set of ten cross-correlation products, for example, $G_{aa}$ . . . $G_{aj}$. At such a B″ time, during a series of ten cycles from 1B″ to 10B″, current is supplied from the CRC clock of FIG. 39 to one of a set of ten group input lines 762, of which only lines **762*a*, 762*b* and 762*j* are shown in the drawing. When an input line 762 is energized, the binary data appearing on the ten sets of input lines 354 is transferred through a set of transfer flip-flops 772 in series with the line 762, to a corresponding group of word registers 764. Each group of word registers includes a register for each of ten different words, indicated in the drawings as $W_1$ . . . $W_{10}$. For example, the group register 764*a* includes word registers for $G_{aa}$, $G_{ab}$ . . . $G_{aj}$. Each word register includes a plurality of cryogenic flip-flops 766, of which only the flip-flops for the lowest and highest binary orders are shown. Each flip-flop 766 includes the gate of a cryotron 768 in its "0" line and the gate of a cryotron 770 in its "1" line. Each transfer flip-flop 772 includes in its "0" line the gate of a cryotron 774, and in its "1" line the gate of a cryotron 776. In the case of the flip-flop 766 for the highest binary order of the word $G_{aa}$, the control windings of the cryotrons 744 and 776 are respectively connected in the "1" and "0" lines of the input pair 354 for the highest order digit of the input line $G_{na}$. The "0" line of the transfer flip-flop 772 includes in series a control winding for the cryotron 770, and the "1" line of the transfer flip-flop 772 includes in series a control winding for the cryotron 768 of the highest order memory flip-flop 766** for the word $G_{aa}$.

Each binary order of each word in the memory is similarly provided with a memory flip-flop 766, a transfer flip-flop 772 and a time input line 762 for transferring data from the input lines 354 to the word registers 766 of the sum G register 750.

The sum register 750 is provided with sorting circuits, including "ALL ONE'S" circuits similar to those provided in the sorting memories 362 and 364 in FIG. 30. In order to simplify the drawings, those sorting circuits have not been shown in FIG. 42, except for their current input lines 777 and their output lines 778. One output line 778 is provided for each word of each group in the sum memory 750. Current flowing in a particular output line indicates that that word is the low word of that group. The current supply circuits for the input lines 777 are shown in FIG. 45*a*, and are time controlled, as described below in connection with the operation of the apparatus, so that sorting is carried out only at certain times.

*FIGS. 43, 43a and 43b*

FIG. 43 is a diagrammatic figure showing the manner in which the fragmentary FIGURES 43*a* and 43*b* are to be joined.

These figures illustrate the alphabetical field 752 (FIG. 41) of the N memory 38. As in the case of the sum G field 750, the alphabetical field 752 is a push-down memory with a self-rearranging feature. There are shown in FIGS. 43*a* and 43*b*, a plurality of main register flip-flops 780, one such flip-flop being provided for each bit of each word to be stored in the alphabetical field 752. The memory is provided with capacity for ten words in each of ten groups. There are shown in FIG. 43*a* only the flip-flops 780 for the lowest order (bit 1) and the highest order bit (bit *n*) for each of the first, second and tenth words in Group *a*. FIG. 43*b* shows the flip-flops 780 for the same bits in the same words of Group *b*. The other words in the other groups are similar, and are omitted to avoid unnecessary repetition of the circuitry.

At the time the sum field 750 is being filled, the alphabetical field 752 is filled by circuits not shown, so as to write into the words of each group an arbitrarily selected designation, which may, for example, be an alphabetical character expressed in a conventional binary code form. This alphabetical designation serves as an identification of the source (i.e., the location in the M memory 34) of the F component of the G sum (as defined above in connection with FIGS. 1–10) appearing in the same word of the sum register 750. Since in filling the sum register 750, the F components are always taken in an arbitrary order depending upon their location, those locations can be identified by an arbitrarily assigned code in the alphabetical register 752.

The location in the M memory 34 from which the E components of the G sums (as defined in connection with FIGS. 1–10) were taken are identified in the N memory 38 by the group E register 754.

In the operation of the N memory, the words will be rearranged in numerical order of magnitude, in the sum register 750. The alphabetical source identifications in the register 752 must always travel with their associated G sums during the rearrangement, so that after the decoding of the matrix is complete, and the particular words in the particular locations in the N memory are identified as specific numerical characters, that identification may be carried back to specific locations in the M memory whose words may then be rearranged in numerical order after that identification.

The flip-flops 780 for corresponding bits in all the words and groups are connected in series and supplied with current from a constant source 782. The "0" line of each flip-flop 780 includes in series the gate of a cryotron 784 and the control windings of cryotrons 786, 788 and 790. The "1" line of each flip-flop 780 includes the gate of a cryotron 792 and the control windings of cryotrons 794, 796 and 798.

Two read out circuits are provided for the flip-flops 780 of each word. One read out circuit is supplied with current from the line 778 of the corresponding word in the sum memory 750. It may be remembered that the line 778 is supplied with current only if the word associated with it in the sum memory is the lowest word numerically in its group. The read out circuits supplied with current from line 778, hereinafter referred to as the low word read out circuits, may be traced in FIG. 43*a* through a series of read out flip-flops 800, one for each bit of the word register. The "0" line of each read out flip-flop 800 includes the gate of cryotron 796 and the control winding of a cryroton 802. The "1" line of each flip-flop 800 includes the gate of cryotron 788 and the control winding of a cryotron 804. The low word read out circuit continues through a line 806 to FIG. 44.

The other read out circuit for each word of the alphabetical field 752 is supplied with current by the cross-correlate clock CCC of FIG. 39, through a wire 808 at a particular time, determined for each word by the operation of the clock CCC, as explained below in connection with the operation of the apparatus.

Ten such read out circuits are provided, one for each of the ten words, and are numbered respectively 808–1, 808–2 . . . 808–10. The read out circuits for all the correspondingly numbered words of all ten groups are connected in series. Thus, a current flowing through line 808–1 is effective to read WORD #1 of all ten groups.

The circuits supplied through the lines 808 are hereinafter termed the "word select read out circuits," and include in series a plurality of flip-flops 810, one for each bit of the binary code in the alphabetical register 752. The "0" line of each flip-flop 810 includes the gate of the cryotron 798 and the control winding of a cryotron 812. The "1" line of each flip-flop 810 includes the gate of cryotron 790 and the control winding of a cryotron 814.

For each column of bits in each group of the N memory, there is provided a group read circuit supplied with current from a line 816. The current supply circuits for lines 816 are shown in FIGS. 45*a* and 45*b* and are controlled by the CCC clock. The source 816 supplies an alternative pair of lines 817. The "0" line includes the gates of cryotrons 804 and 814, and the "1" line includes the gates of cryotrons 802 and 804, for the bits of the same order in all the words of one group. The "0" line of each pair 817 also includes the control windings of cryotrons 818 and 820. The "1" line of the same pair includes the control windings of cryotrons 822 and 824. Each pair of lines 817 acts as a transfer flip-flop from one of the read flip-flops 800 or 810 to a set of output flip-flops 826 connected to the P and Q memories of FIG. 46 and supplied with current from the cross-correlate clock CCC at various H times as described below. The "0" line of each output flip-flop 826 includes the gate of one of the cryotrons 822. The "1" line of each output flip-flop 826 includes the gate of one of the cryotrons 818. The transfer flip-flops 817 alternatively transfer data to a set of memory complementing flip-flops 828, supplied with current from clock CCC at various times as described below. The "0" line of each flip-flop 828 includes the gate of one of the cryotrons 824. The "1" line of each flip-flop 828 includes the gate of one of the cryotrons 820.

One memory complementing flip-flop 828 is provided for each column of bits in the alphabetical field 752, including all groups of words. The "1" line of each column memory complementing flip-flop 828 includes a control winding of each cryotron 784 in its column and a control winding of each cryotron 792 in its column. Associated with the cryotrons 784 and 792 are further control windings connected in series in a persistent current loop 829 similar to that described above in connection with FIG. 27 (note the persistent loop 340, 342, 344, 346). Each column memory flip-flop 828 is supplied with current from a source 830 at times described below in connection with the operation of the apparatus.

A set of compare circuits is provided, one for each word in the alphabetical field 752. Each compare circuit comprises a source of current 832 supplying an alternative pair 833. The "0" line of the alternative pair 833 includes the gates of all the cryotrons 794 of its associated word. The "1" line includes the gate of the cryotron 786 of the highest order bit in its associated word. The other cryotrons 786 for the other words act as cross-overs between the "0" line and the "1" output line. The "0" line also includes a control winding of a cryotron 834, and the "1" line includes the control winding of a cryotron 836. A match count flip-flop 838 is supplied with current from a source 840 (FIG. 43*b*) at times such as 176L, described below. The "0" line of the flip-flop 838 includes the gates of all the cryotrons 836. The "1" line of the flip-flop 838 includes the gates of all the cryotrons 834. The "0" and "1" lines of the flip-flops 838 extend to FIG. 53, where they operate a match indicator circuit.

*FIG. 44*

This figure illustrates a wiring diagram for the group E register 754 and the group identification register 756 of FIG. 41, together with circuits by which specific locations in the group E register 754 are assigned particular numerical identities after those identities have been determined by the sorting and checking circuits.

The data input for the circuits of FIG. 44 are derived from the sorting read out lines 806 associated with the alphabetical registers 752 (FIGS. 43*a* and 43*b*).

There are ten read out lines 806 for each group of ten words in the N memory. As described below in connection with FIG. 45, only one line 806 carries current at one time. In other words, only a single group of the memory is selected at one time for a low sort, and the low word in that group is the only word having current flowing on its output line 806.

Each low sort output line 806 extends through the control winding of a cryotron 842 and a control winding of a cryotron 844 to ground. Each cryotron 844 is provided with a bias winding having current flowing in opposition to the current in the line 806, so that the cryotron 844 is blocked in the absence of current in its associated line 806.

A set of ten alternative pairs 846 are supplied with current from ten constant sources 848. The currents in the pairs 846 pass through a network selectively controlled by the cryotrons 842 and 844 to a set of ten output lines 850. In the first memory group encountered by the current flowing from a source 848, shown in the drawing as the group "*j*", the "0" line of the pair 846 includes the gate of cryotron 844, and the "1" line of the pair 846 includes the gate of cryotron 842. In the other nine groups of the memory, the gate 842 is connected to the "1" line and the gate of cryotron 844 is connected as a cross-over between the "1" line at the input of the group and the "0" line at the output of the group. The "1" lines all lead to ground and the "0" lines lead to the ten output lines 850.

During a sorting operation, one group is selected arbitrarily by means to be described below, and is sorted to determine the low word therein. Current thereupon flows in its low sort output line 806, thereby blocking its associated cryotron 842 and unblocking its cryotron 844. Current thereupon flows from the associated source 848 through the unblocked cryotron 844 to one only of the output lines 850, which extend to the group E register 754.

The group E register 754 includes ten sets of memory flip-flops 852, one set for each of ten different words which identify the location of the source of the E component of all of the G sums appearing in the corresponding group of the sum register 750. For each word in the register 752, there are shown in the drawing only the lowest order bit flip-flop and the highest order bit flip-flop.

At or before the time when the sum field 750 is being filled with the G sums, the group E register 754 is filled by circuits not shown so as to write into the ten words an arbitrarily selected designation, which may, for example, be an alphabetical character expressed in a conventional binary code form. This alphabetical designation serves as an identification of the source (i.e., the location in the M memory 34) of the E component of all the G sums appearing in the corresponding group of the sum register 750. Since in filling the sum register 750, the E components are always taken in an arbitrary order depending upon their location in the M memory, those locations can be identified by an arbitrarily assigned code in the alphabetical group E register 754. Furthermore, since the words in the register 754 are never rearranged during the operation of this apparatus, the words in question may be permanently written into the flip-flops 852. The flip-flops are nevertheless necessary, because the data in each word is complemented during the operation of the apparatus and thus reduced to zero temporarily.

Each of the ten lines 850 extends in the register 754 through a plurality of transfer flip-flops 854 connected in series and equal in number to the number of bits in each of the ten words of the register, to an output line 328 which extends to and controls a digit assignment flip-flop 302 in the field 4 of the M memory, as shown in FIG. 26.

Each of the memory flip-flops 852 includes in its "0" line the control winding of a cryotron 856 and in its "1" line the control winding of a cryotron 858. Each associated transfer flip-flop 854 includes, in its "0" line, the gate of the cryotron 858 and the control winding of a cryotron 860, and in its "1" line, the gate of the cryotron 856 and the control winding of a cryotron 862.

A set of alternative pairs of output lines 864 is supplied with current from constant current sources 866. Each "1" line of an output pair 864 includes in series the gates of all the cryotrons 860 in one bit column in the group E register 754. Each "0" line of an output pair 864 includes in series all the cryotrons 862 in one bit column in the group E register 754.

The group identification register 756 includes six sets of transfer flip-flops 866 for transferring data from the input lines 864 to any one of six sets of memory flip-flops 868. Six sets of transfer flip-flops 870 are provided for transferring data from any one of the six sets of the memory flip-flops 868 to a single set of output pairs 872.

When phase (3) of the operation of the apparatus begins, there are stored in the M memory data identifying ten different characters, whose specific identities are unknown. As the identifying operation proceeds, the characters are tentatively identified, one by one. During this tentative identification process, the locations of the particular sets of data defining particular identified numerals are stored in corresponding particular ones of the six locations in the group identification register 756. For example, the first character to be identified is the character "1." The alphabetical code defining the location in which the data for the character "1" is stored in the M memory is written into the memory flip-flops 868 in the top row, as shown in the drawing. In the specific example shown, the locations of the 4, 0, 3, 2 and 7 identifying memory flip-flops 868 appear in the successive rows below the top row, as indicated by the legends in the drawing.

Each "1" line of an input pair 864 includes in series the control windings of a cryotron 874 for each bit in one bit column of the register 756. The "0" line of each input pair 864 includes the control winding of a cryotron 876 for the corresponding bits in the same column of the register 756.

The "0" line of each flip-flop 866 includes the gate of the associated cryotron 874 and the control winding of a cryotron 878, and the "1" line of each transfer flip-flop 866 includes the gate of the associated cryotron 876 and the control winding of a cryotron 880. All the transfer flip-flops 866 for all the bits of a particular word in the group identification register 756 are connected in series with a source supplied with current at a time indicated by the legend in the drawing. For example, the current source for the transfer flip-flops 866 for the top digit "1" in the register 756 is supplied with current at the time 14H.

The "0" line of each memory flip-flops 868 includes the gate of the associated cryotron 880 and the control winding of a cryotron 884, while the "1" line of each memory flip-flop 868 includes the gate of a cryotron 878 and control winding of a cryotron 882.

The "0" line of each transfer flip-flop 870 includes the gate of the associated cryotron 882 and the control winding of a cryotron 886, while the "1" line includes the gate of the associated cryotron 884 and the control winding of a cryotron 888. Each transfer flip-flop 870 is supplied with current at a time determined by the cross-correlate clock CCC. For the top word in the register 756, this current is supplied at two times 69G and 175G, as indicated by the legend in the drawing. When this current is supplied, it is effective to transfer data from the memory flip-flops 868 to the output lines 872.

The "0" line of each output pair 872 includes in series the gates of all the cryotrons 888 for one bit column of all the words in register 756. The "1" line of each output pair 872 includes in series the gates of all the cryotrons 886 for the digits in one bit column. The "1" line of each output pair 872 also includes in series the gate of a cryotron 894. The control windings of all the cryotrons 894 are connected in series with a line 896. The line 896 is supplied with current at times determined by the CCC clock and it is effective to set all the output pairs 872 to zero.

The output pairs 872 extend upward into the group E register 754, and there energize complementing circuits indicated diagrammatically at 898 in FIG. 44. These complementing circuits are not shown in detail in order to avoid complicating the drawing, but are similar in all respects to the complementing circuits shown at 348 in FIG. 27. The group E register 754 is also provided with sorting circuits indicated in FIG. 44 by a block 900 bearing the legend "SORT FOR LOW AFTER COMPLEMENTING" and leading to a set of ten output lines 902. These sorting circuits are substantially the same as those shown at 402, 409 in FIG. 30. They are omitted from FIG. 44 in order to simplify the drawing.

It may be understood that when complementing current is supplied on the lines 892, one only of the words in the register 754 is set to zero. On the subsequent sort for low, one only of the output lines 902 carries current, indicating which one of the ten words in the register 754 was set to zero.

*FIGS. 45a and 45b*

These figures, which fit together as shown in FIG. 45, illustrate a wiring diagram of group selecting circuits for controlling the selection of a group within the N memory 38 from which information is to be sorted, compared, or read. The group selection is determined by the flow of current in the output lines 902 from FIG. 44 just described, which appear as input lines at the left-hand side of FIG. 45*a*.

Each line 902 extends through the control winding of a cryotron 904 whose gate is connected in the "0" line of a flip-flop 906, hereinafter termed an associated result flip-flop. Ten flip-flops 906 are provided, one for each of the ten groups in the N memory.

The ten flip-flops 906 are connected in series with a constant current source 907. Each "0" line of each flip-flop 906 includes, besides the gate of cryotron 904, the control windings of three cryotrons 908, 910 and 912. The "1" line of each flip-flop 906 includes the gate of a cryotron 914, whose control winding is connected in series with a reset line 916 which extends in series through the control windings of all the cryotrons 914 in all the flip-flops 906.

The gate of each cryotron 908 is connected in series in a group sort control line 918. All the group sort control lines 918 are connected in parallel to a source 920 supplied with current at particular times determined by the cross-correlate clock CCC. Each line 918 extends from the gate of cryotron 908 through the control winding of a cryotron 921 connected in the "0" line of a group sort control flip-flop 922. All the flip-flops 922 are connected in series to a source of constant current. The "0" line of each flip-flop 922 includes, besides the gate of cryotron 921, the control windings of ten cryotrons 924, one for each word in the group, and the gate of a set cryotron 928. The "1" line of each flip-flop 922 includes the control windings of ten cryotrons 926, one for each word in the group, and the gate of a reset cryotron 930. The gates of each pair of cryotrons 924 and 926 provide a pair of alternate paths for current from a constant source 931 either through the gate of the cryotron 926 to ground or through the gate of the cryotron 924 to a line 777 which serves as the sort current supply line for one word in the sum register 750 (FIG. 42).

The control windings of all the set cryotrons 928 are connected in series and supplied with current at times determined by the cross-correlate clock CCC. The control windings of all the reset cryotrons 930 are also connected in series and supplied with current at times determined by the cross-correlate clock CCC.

The gate of the cryotron 910 in each flip-flop 906 is connected in series with a line 932. The lines 932 are all supplied with current in parallel from a single source 934 at times determined by the cross-correlate clock CCC when it is desired to supply currents to the compare circuits 832 of the alphabetical field or F register of the N memory 38 (see FIG. 43). Each line 932 extends from the gate of cryotron 910 through the control winding of a cryotron 936 (FIG. 45*b*) connected in the "0" line of a flip-flop 938 provided with current from a constant source. The "0" line of each flip-flop 938 also includes the control windings of ten cryotrons 940, one for each of the ten words in one group of the alphabetical or F register 752 of the N memory 38. The "1" line of each flip-flop 938 includes the gate of a reset cryotron 942 supplied with current from a reset circuit. All the control windings of all the reset cryotrons 942 are connected in series and supplied with current at times determined by the cross-correlate clock CCC.

Ten current input lines 944 are provided, one for each word in all ten groups. For example, lines for the word "1," for each of the ten groups are connected in parallel to one of the ten lines 944, which is supplied with current at a time or times determined by the cross-correlate clock CCC. The current from a selected one of the sources 944 flows through a selected one of the cryotrons 940 to one of the compare input lines 832 of the alphabetical field or F register 752 (see FIG. 43).

Each cryotron 912 (FIG. 45*a*) associated with a flip-flop 908 is connected in series with an output line 946. All the lines 946 are supplied with current in parallel from a line 948 at a time or times determined by the cross-correlate clock CCC. Each line 946 extends through the control winding of a cryotron 950 (FIG. 45*b*) connected in the "0" line of a flip-flop 952 supplied with current from a constant source. The "0" line of flip-flop 952 also includes in series the control windings of ten cryotrons 954, one for each of the ten words of a group in the N memory 38. The "0" line of the flip-flop 954 also includes in series the gate of a set cryotron 956. The "1" line of each flip-flop 952 includes in series the control windings of ten cryotrons 958, one for each of the ten words in a group of the N memory 38 and the gate of a reset cryotron 960. All of the reset cryotrons 956 are connected in series and supplied with current at times determined by the cross-correlate clock CCC. All of the reset cryotrons 958 are connected in series and supplied with current at times determined by the cross-correlate clock CCC.

Each pair of cryotrons 954 and 958 provides a pair of alternate paths of current from a constant source 962 either to ground through the gate of cryotron 958 or through the gate of cryotron 954 to a read current input line 816 which supplies one bit column of the alphabetical field 752 of the N memory 38 (FIG. 43*a*).

*P and Q memories—Analyzing unit FIGS. 46-50*

The analyzing unit 40 includes a P memory having an alphabetical register indicated diagrammatically at 962 in FIG. 46, and a Q memory also having an alphabetical register indicated diagrammatically at 964. The P and Q memories each have a capacity of ten words. Data is inserted in those memories from the output pairs 826 in N memory 38 of FIG. 43, each word written into a location of the P and Q memories representing the high word in one of the ten groups in the N memory 38. The data is written into both the P and Q memories simultaneously and from the same source, but the data is supplied to the Q memory in complement form as indicated by the complement block 966 in FIG. 46. The P and Q memories may consist of a plurality of memory flip-flops of the cryotron type, similar to the memory flip-flops 780 of FIG. 43. The data is written into the memory flip-flops by conventional transfer flip-flops from the lines 826. The memory flip-flops and the transfer flip-flops are not shown, in order to simplify the drawing. The P and Q memories 962 and 964 are provided with sorting circuits similar to the sorting circuits shown and described in detail in connection with FIG. 30. The outputs of these sorting circuits are supplied to a counting tree shown diagrammatically at 968 in FIG. 46 for the P memory and at 970 for the Q memory, and described in detail in connection with FIG. 47. The outputs of the sorting circuits are also supplied to the sort analyzing circuits shown diagrammatically at 969, 971 in FIG. 46, and also shown in detail in FIG. 47. The outputs of the counting trees 968 and 970 are supplied to an analyzing network 972 shown in FIG. 48. The analyzing network 972 of FIG. 48 controls the sort analyzing circuits of FIG. 47 and cooperates with the sort analyzing circuits to control an OR circuit 974, shown in FIG. 49. The analyzing circuits of FIG. 47 also control word read out circuits 976 for the P and Q memories, shown in detail in FIG. 50.

As the cross-correlation or phase (3) operation begins, if the data collected in the M memory correctly define a set of ten different numerical specimens, then the cross-correlation products derived from the data in the M memory and stored in the N memory consist of ten groups of ten words each. The ten words of each group are sorted to determine the numerical maximum word, and the sources of the F components of those ten maximum words are located. It will be found that for nine of the ten words, the F source is the same, and may be used to identify the location in the M memory of the data defining the specimen "1." The P and Q memories perform the function of storing the data identifying the locations of the F sources for the ten maximum words in the N memory. Those ten words are then compared in the sorting circuits of the P and Q memory, the counting trees 968 for those memories and in the analyzing network of FIG. 48. These circuits determine how many of the maximum words stored in the P and Q memories are alike. If the number of like words in either the P or Q memory meets the established criterion (nine out of ten in this example), then the location of the data identifying the "1" specimen in the M memory is established. If the number of like words does not meet the established criterion, then the analyzing circuitry of FIGS. 47 to 49 is effective to blank out that part of the M memory which appears to be composed of data defining unrecognizable characters, whereupon the apparatus refills those blank spaces in the M memory by reading new specimens.

The Q memory 964 is in all respects similar to the P memory 962. The counting tree 970 for the Q memory is in all respects similar to the counting tree of the P memory. The sort analyzing circuits 968, 971 are likewise similar in both memories. Consequently, these circuits are shown in detail only for the P memory in FIG. 47. It will be readily understood that the circuits for the Q memories are counterparts of those shown in FIG. 47.

The P memory is provided with sorting circuits, one for each of the ten words. Each sorting circuit is shown in FIG. 47 simply as a constant current source 978 feeding an alternative pair 980. The sorting circuits are similar to those shown at 402, 409 in FIG. 30 and produce a current on the "0" line of the pair 980 if the associated word in the P memory is high, and a current on the "1" line of the pair 980 if the associated word is low.

The counting tree 968 is essentially the same as the counting tree of adder 94 in FIG. 20. It will not be described further in detail. The counting tree has nine output lines 982, only one of which carries current at any particular time. The particular line which carries current indicates how many of the words in the P memory are maximum, i.e., how many are equal and high. The five right-hand output lines 982 in FIG. 47 are connected together to an output terminal 984. Current appearing at terminal 984 shows that the number of like maximum characters identified in the P memory is somewhere between one and five. The next three output lines 982, which respectively indicate that the number of like words is between six and eight, are connected together to an output terminal 986. The ninth output line 982 is connected to an output terminal 987.

Each output pair 980 of a sorting circuit for the P memory has its "0" line extending beyond the counting tree 968 through the control winding of a cryotron 988 and its "1" line extending through the control winding of a cryotron 990. The cryotrons 988 and 990 "for all words except the tenth" are connected respectively in the "0" and "1" lines of a flip-flop 982 supplied with current from a constant source 994. The flip-flop 992 stores an indication of whether the particular word in the P memory with which it is associated is one of the high words in that memory.

The "0" line of each flip-flop 992 includes the control winding of a cryotron 996, and the "1" line includes the control winding of a cryotron 998.

A transfer flip-flop 1000 is supplied with current from a constant source 1002. Its "0" line includes the gate of cryotron 996 and the control winding of a cryotron 1004. Its "1" line includes the gate of cryotron 998 and the control winding of a cryotron 1006.

The cryotrons 1004 and 1006 control the flow of current to an output line 1008 from a constant current source 1010. Current from the source 1010 may flow either through the gate of a cryotron 1012 directly to ground or through the gate of a cryotron 1014 to a junction 1016. From the junction 1016, current may flow either through the gate of cryotron 1004 directly to ground or through the gate of cryotron 1006 to the output line 1008. Cryotron 1014 is provided with a bias winding.

The tenth word in the P memory has its sorting output pair 980 connected to a high-not high flip-flop 993 which differs from the flip-flops 992 of the other nine words in having an extra pair of cryotrons. The "0" line of the flip-flop 993 passes through the control winding of a cryotron 1018, and the "1" line of the flip-flop 993 passes through the control winding of a cryotron 1020. Current from a supply line 1022 from FIG. 48 passes alternatively through the gates of cryotrons 1018 and 1020 to a pair of output lines 1024 connected to read out circuits shown in FIG. 50.

Referring now to FIG. 48, it may be seen that current from the one to five output terminal of the P counting tree 968 passes through the control windings of cryotrons 1026, 1028, 1039 to ground. Current from the six to eight output terminal 986 of the P counting tree 968 passes through control windings 1032, 1034 and 1036 to ground. Current from the nine output 987 of the P counting tree 968 passes through the control windings of cryotrons 1040, 1042 and 1044 to ground.

In a similar fashion, current from the one to five output terminal 984 of the Q counting tree 970 passes through the control windings of cryotrons 1046, 1048 and 1050 to ground. Current from the six to eight output terminal 986 of the Q counting tree 970 extends through the control windings of cryotrons 1052, 1054 and 1056 to ground. Current from the nine output line 987 of the Q counting tree 970 extends through the control windings of cryotrons 1058, 1060, 1062 and 1064 to ground.

At 12H time current is supplied to a line 1066 which supplies four alternative branch test circuits. The uppermost of the four branch circuits may be traced from the supply line 1066 through the gates of cryotrons 1032 and 1052 and thence either through the gate of cryotron 1026 or the gate of cryotron 1046, to ground. This circuit just traced can carry current only if neither of the cryotrons 1032 and 1052 is blocked and if only one of the cryotrons 1026 and 1046 is blocked. In other words, this circuit can carry current if one of the trees 968 and 970 has current on its nine output line and the other tree has current on the one to five output line. Any other combination of currents will block this circuit and force current from the supply line 1066 through one of the other three branch circuits to be described. The second branch circuit supplied from line 1066 may be traced through the gates of cryotrons 1040, 1060 and 1054, and thence either through the gate of cryotron 1028 or the gate of cryotron 1048 to an output line 1068, which is connected to a circuit shown in FIG. 47, where it extends through the control windings of the cryotrons 1012 and 1014 for all ten words of the P memory and continues on to FIG. 35, where it is effective to stop the cross-correlate clock CCC and start the collect-rejects clock CRC.

The third branch circuit supplied from source 1066 may be traced through the gates of cryotrons 1042, 1062 and 1034 and thence through either of the gates of cryotrons 1030 and 1050 to an output line 1070. The output line 1070 extends through a circuit similar to that shown at 1068 in FIG. 47, except that it is located in the Q memory, and thence to FIG. 35, where it is likewise effective to stop the cross-correlate clock.

The fourth branch circuit supplied from line 1066 extends through the gates of cryotrons 1044, 1064, 1036 and 1056 to an output line 1072. The output line 1072 extends through a circuit in FIG. 49 to be described below and thence to FIG. 35. Current in line 1072 appearing in FIG. 35 is effective to stop the cross-correlate clock.

When at time 12H test current is supplied to line 1066, if no one of the three output lines 1068, 1070 and 1072 is energized, then the cross-correlate clock continues and at the subsequent 13G time current is supplied from a line 1074 (FIG. 48) alternatively either through the gate of cryotron 1058 to line 1022 or through the gate of cryotron 1038 to a line 1076 which corresponds to line 1022 except that it is located in the Q memory, and is not shown in detail. Current on either of the lines 1022 and 1076 is effective to read out either the ninth or tenth word from either the P or Q memory through the circuitry illustrated in FIG. 50.

Referring now to FIG. 49, there is shown an OR circuit which selects particular words in the field #1 of the M memory to be set to blank under the control of the analyzing circuits of FIG. 47 and FIG. 48.

FIG. 49 shows an alternative pair of output lines 232 for each of the ten word locations in the M memory. These output lines appear as input lines in FIG. 23. The network supplying each alternative output pair 232 is similar for all of the three words (#1, #2 and #10) shown, so that only the network for word #1 will be described in detail. Current is supplied to this network from a constant current source 1078. Current may flow from the source 1078 through any one of three alternative paths to the "0" line of the output pair 232. These three alternative paths respectively include the gates of cryotrons 1080, 1082 and 1084. Current may alternatively flow from the source 1078 through the gates of cryotrons 1086, 1088 and 1090 to the "1" line of the output pair 232. The output line 1008P from FIG. 47 passes through control windings of cryotrons 1086 and 1080. The corresponding output line 1008Q from the Q memory passes through control windings of cryotrons 1088 and 1082. The output line 1072 from FIG. 48 extends through control windings of cryotrons 1090 and 1084. A bias line 1092, supplied with a constant curent, extends through bias windings on the cryotrons 1080, 1082 and 1084.

When current is supplied on the output line 1068 of FIG. 48, then that current is effective in the circuit of FIG. 47 to switch current to those output lines 1008P whose words are not high in the P memory. The OR circuit of FIG. 49 responds to those currents in lines 1008P to transfer to FIG. 23 (pairs 232) current effective to set the corresponding words in the M memory to blank. In a similar fashion, if current is supplied on the output line 1070 of FIG. 48, then the output lines 1008Q of all the words in the Q memory which are not high are supplied with current and those words are set to blank in the M memory. If current is supplied on output line 1072 of FIG. 48, then the circuit in FIG. 49 sets all the words in the M memory to blank condition.

Referring now to FIG. 50, there are shown memory flip-flops 1094 for words 9 and 10 of the P and Q memories. The writing circuits for storing data in these flip-flops is not shown. FIG. 50 shows circuits for reading out whatever data may be stored in the flip-flops 1094.

The memory flip-flops 1094 are supplied from constant current sources. A set of transfer flip-flops 1096 for the word "9" of the P memory 962 is supplied with current from the "0" line of the output pair 1024 of FIG. 47. A corresponding set of transfer flip-flops for the word "10" of the P memory 962 is supplied from the "1" line of the output pair 1024. Similar sets of transfer flip-flops 1096 are provided for the words "9" and "10" of the Q memory, being supplied with current from the output pair 1024Q, corresponding to the pair 1024, except that it is located in the Q memory.

Each transfer flip-flop 1096 includes in its "0" line the control winding of a cryotron 1098 and the gate of a cryotron 1100, and in its "1" line a control winding of a cryotron 1102 and the gate of a cryotron 1104. The cryotrons 1104 and 1100 have their gates respectively located in the "0" and "1" lines of the associated memory flip-flop 1094. The cryotrons 1098 and 1102 have their gates respectively located in the "1" and "0" lines of one of a set of output pairs 872 which extend to FIG. 44 where they are effective to associatively interrogate the information stored in the group identification register 754.

*FIGS. 51–53*

These figures illustrate the details of the circuits of the matrix check unit 42, shown as a single block in FIG. 11. The matrix check unit derives its input information from the match indicator pair 838 of FIG. 43A. In the operation of checking the decoding of the matrix, a checking cycle of operation is carried out an arbitrarily selected number of times. In the operation described herein six such checks are made. In each check, the location of the F data which supplied a particular position in the matrix is checked against the location of the F data which supplied another known position in the matrix and which should be the same location. If the two F data sources for the two positions in the matrix are the same, then the apparatus registers a match indication. This match indication is associated with a particular one of the ten numerals. After the six checks have been made, the number of match indications is counted. If all six checks produce match indications, it is considered that the matrix has been successfully decoded and that the cross-correlation operation is complete. The apparatus then transfers from cross-correlate phase (3) of the operation to phase (4). If less than three matches are secured in the checking operation, then it is considered that the data previously identified as corresponding to three particular numerals (in this example 0, 2, and 4) are in error. The reason for considering these three particular sets of data in error is that they have been the primary sources of information for the operation of decoding the matrix. If four or five match indications are obtained out of the six checks, then only those numerals which failed to check have their identifying data erased.

Referring to FIG. 51, it may be seen that the data on the output pair 838 from FIG. 43*a* is supplied to a counter diagrammatically indicated at 1108 and is also supplied to the checking circuit 1110 shown in detail in FIG. 53. The counter 1108 may be suitable cryogenic counter and is not disclosed in detain herein.

The counter output checking circuit is shown in detail in FIG. 52 and includes an output pair 1112 which has current in its "1" line when the binary "2" stage in the counter register a "1" bit. The counter also has an output pair 1114 which has current in its "1" line when the binary 4 order stage in the counter registers a "1" bit. The counter has a maximum capacity of six, since it is intended to count only six matches.

Current in the "0" line of the pair 1112 flows through the control winding of a cryotron 1116 to ground. Current in the "1" line of the output pair 1112 flows through the control winding of a cryotron 1118 to ground. Current in the "0" line of the output pair 1114 flows through the control windings of cryotrons 1120 and 1122 to ground. Current in the "1" line of the counter output pair 1114 flows through the control winding of a cryotron 1124 to ground.

At 189G time, current flows from a source 1126 through one of three parallel paths. One of the three paths may be traced from the source 1126 through the control winding of a cyrotron 1128 and the gate of cryotron 1124 to an output line 1130 which extends to FIG. 53. The second alternative path may be traced from source 1126 through the control winding of a cryotron 1132 and the gates of cryotrons 1120 and 1118 to ground. The third alternative path may be traced from source 1126 through the control winding of cryotron 1134 and the gates of cryotrons 1122 and 1116 to ground.

A flip-flop 1136 is supplied with constant current from a source 1138. The "0" line of flip-flop 1136 includes the gate of cryotron 1134 and the control winding of a cryotron 1140. The "1" line of flip-flop 1136 includes the gates of cryotrons 1128 and 1132 and the control winding of a cryotron 1142. At 193G time, current is supplied from a source 1144 alternatively through the gate of one or the other of cryotrons 1140 and 1142 to one or the other lines of an output pair 1145 which extends to FIG. 35, where it is effective to reset the cross-correlate flip-flop, i.e., to stop the cross-correlate clock.

Reviewing the circuit of FIG. 52, it may be observed that when the output from the counter indicates a count of less than 4, then current flows at 189G time through the line 1130 to FIG. 53. If a count of less than six is indicated, then current on the "1" line of the output pair 1144 resets the cross-correlate flip-flop. If a count of six is indicated, then the cross-correlate operation proceeds without any output from the circuits of FIG. 52.

Referring now to FIG. 53, a signal is received from FIG. 43*a* on the "0" line of the match indicating pair 838 whenever a cross check of two positions in the matrix indicates a match. If no match is indicated, current flows on the "1" line of the pair 838. The pair 838 extends through a set of ten transfer flip-flops 1146, one for each of the ten numerals in the set of specimens to be identified. At six particular times in the cross-correlate cycle, indicated by the legends in the drawing, current flows from the cross-correlate clock through the respective transfer flip-flops 1146. In the particular example illustrated, since only six checks are used, no current is ever supplied to the other four flip-flops 1146. However, the circuits for all ten flip-flops are shown, since for some other font of characters to be recognized, it might be desirable to make ten checks. In each transfer flip-flop 1146, the "0" line of the match indicating pair 838 passes through the control winding of a cryotron 1150, while the "1" line of the pair 838 passes through the control winding of a cryotron 1152. The "0" line of the flip-flop 1146 includes the gate of cryotron 1152 and the control winding of a cryotron 1154. The "1" line of the flip-flop 1146 includes the gate of cryotron 1150 and the control winding of a cryotron 1156. The cryotrons 1154 and 1156 are connected respectively in the "1" and "0" lines of a match indicating flip-flop 1158. Ten match indicating flip-flops 1158 are provided, one for each of the ten numerals in the set of specimens to be identified.

The "0" lines of the flip-flops 1158 for the numerals 0, 2 and 4 include the gates of cryotrons 1160. In the flip-flops 1158 for all the other numerals, the "1" lines include the gates of cryotrons 1162. The control windings of all the flip-flops 1160 and 1162 for all the ten flip-flops 1158 are connected in series with the line 1130 which receives current from the circuit shown in FIG. 52 whenever the match count is less than four. Current on that line is effective to set the flip-flops 1158 for the numerals 0, 2, and 4 to their "1" conditions. The flip-flops 1158 may be set to their "0" or match indicating conditions by current from their associated timing sources (shown as 184L, 177L, 187L, 176L, 183L and 180L) if a match indication is received at the same time on the lines 838.

The information in the column of ten flip-flops 1158 is utilized to selectively read out numerical digits stored in a binary code in a set of memory flip-flops 1164, of which only the lowest and highest order digit flip-flops are shown. The memory flip-flops 1164 have permanently written into them the identities of the ten numerals (0, 1, 2 . . . 9) to be identified. Each "0" line of a memory flip-flop 1164 includes the control winding of a cryotron 1166, and each "1" line includes the control winding of a cryotron 1168. The cryotrons 1168 and 1166 are respectively connected in the "0" and "1" lines of a transfer flip-flop 1170, supplied with current from a source controlled by the match indicating flip-flop 1158 and indicated diagrammatically at 1172 in the drawing. The "0" line of each transfer flip-flop 1170 includes the control winding of a cryotron 1174 and the gate of a cryotron 1168. The "1" line of each flip-flop 1170 includes the control winding of a cryotron 1176 and the gate of a cryotron 1166. The supply of current to the lines 1172 under the control of the match indicating flip-flops 1158 follows the principles shown and described in detail in the pending application of Harold Fleisher and Robert I. Roth, Serial No. 133,679, filed August 24, 1961 and now Patent No. 3,191,012 entitled "Memory Read Out and Summing System." Briefly, the read out pulses are supplied through circuits not shown in FIG. 53 to the top of the column of match indicating flip-flops 1158. A pulse proceeds down that column until it encounters a flip-flop 1158 which is set to its "1" condition, whereupon that pulse is directed through the associated read out circuit 1172 and is there effective again to transfer the data in the memory flip-flops 1164 to the set of output lines 348 which extend to the numerical indicating field #4 of the M memory in FIG. 27. Currents appearing on those lines in FIG. 27 are effective to associatively interrogate that memory and read out from the memory any numerals which match the data appearing on the lines 348.

After one word in the memory flip-flop 1164 has been read out, the next read out pulse applied to the top of the column of match indicating flip-flops 1158 passes through that word and proceeds down the column to read out the next word to the not-match condition. In the particular example disclosed herein, the maximum number of words which are read out in this fashion is three. If no flip-flop 1158 is in its not-match condition, then the current proceeds down the column and eventually appears on a line 1178, which extends through the gates of cryotrons 1180 located in the "1" lines of the output pairs 348. Current appearing in the line 1178 indicates that all the cross-checks ended with match indications and that none of the information in the M memory is to be erased. Consequently, the cryotrons 1180 are effective to block the "1" lines and prevent any erasure in the M memory.

OPERATION—(PHASE 1)—COLLECT SPECIMENS

Assume that the apparatus is starting with the M memory 34 empty.

The apparatus is provided with a starting circuit (not shown) which insures that when the power is first turned on, the apparatus begins in phase (1) (on the collect specimen cycle, with the collect-specimens clock CSC of FIG. 39 operating). Another starting circuit insures that the rejected characters counter 544 of FIG. 37 is supplied with current on the line 550 to initially reset that counter to a full count of 7. As indicated in FIG. 39, the clock CSC goes through a repeated cycle of times A′, B′, A″, B″.

At each A′ time, the gate 80 of FIG. 15 is opened and the character observed by the optical system of FIG. 13 is read into the photocells 58 and the corresponding identifying data is transferred through the lines 88 of FIG. 15 to the autocorrelation element generator 28 of FIG. 18. The autocorrelation elements E are supplied from the generator 28 to the normalizing unit 32 of FIG. 21, and are also supplied directly to field 2 of the input register 198 of the M memory 34. The normalized elements F are supplied to field #3 of the M memory. The autocorrelation elements E are also supplied from generator 28 to the input selecting circuit of FIG. 34, where they are selected as multiplicand inputs for the multiplier-add unit of FIG. 28.

At B′ time, the data appearing in the input register of the M memory 34 are transferred into "WORD 1" of that register. The F elements appearing in field #3 of that register (FIG. 25) are immediately transferred to the input lines 276 of the multiplier-add unit in FIG. 28. At this time, all the other nine words in the M memory are blank, so that only the "WORD 1" input lines in FIG. 28 receive any data other than zeros. The output of the multiplier-add unit FIG. 28 is fed to the sorting memory of FIG. 29 and on through the high sort counting circuit of FIG. 31, and the two percent difference counting circuit of FIG. 29. In the course of determining the autocorrelation elements E, the bit counting limit checking circuit of FIG. 40 produces an output on its lines 590, to indicate whether that count is within or without the prescribed limits.

At the end of the clock pulse which began at the B′ time, there is significant information on each of the six control input circuits shown at the upper right of FIG. 38. If the bit count is within the prescribed limits, there is current on the "1" line of the pair 590. Since all the products in the multiplier-add unit are zero except the product of $E_1$ and $F_1$, the high sort count from FIG. 31 is necessarily less than two, so that current flows in the "1" line 464. For the same reason, there is necessarily a two percent difference between the maximum product ($E_1$, $F_1$) from the multiplier-add unit and the next highest product, which is zero, so that current is flowing in the "1" line of the pair 378. As stated above, the reject counter 544 was initially set to read a count of seven, so that current flows in the "0" line of pair 564. The M memory of FIG. 23 is not full, so that current flows in the "0" line of the pair 236.

With current flowing in the signal input lines as just described, the current from source 580 must flow through the gates of cryotrons 592, 598, 604, 622 and 628 to line 586 controlling the test network at the bottom of FIG. 38.

At A″ time, no pulse is supplied by the collect-specimens clock CSC, except that an advance read pulse may be supplied to the advance read mechanism 62 of FIG. 13. The time between A″ and B″ is desirable to allow the circuits to settle down from any transient conditions which may have been imposed by the operation.

At B″ time, current is supplied to the lines 630 of FIG. 38. With current flowing in line 586, the following conditions exist in the network:

(1) The cryotron 638 is blocked, so that the output lines 536 are not effective to count a rejected character;

(2) Cryotron 647 is blocked, so that the output lines 228 are not effective to suppress the entry in the first position of the M memory;

(3) Cryotron 652 is blocked, so that no output character is supplied to the output of the apparatus;

(4) Cryotron 660 is blocked, so that the cross-correlate flip-flop of FIG. 35 is held in its non-cross correlating condition;

(5) Cryotron 668 is blocked, so that there is no count of a recognized character in the counter 540 of FIG. 37.

As the apparatus proceeds through the next cycle, at A′ time the next specimen appearing before the optical system of FIG. 13 has its autocorrelation elements E and its normalized autocorrelation elements F computed and supplied to the input register of the M memory.

At B′ time, the E and F elements are written from the input register of the M memory "WORD 1," the data previously appearing in "WORD 1" being pushed down into "WORD 2."

The E elements from the E generator 28 and the F elements from the M memory 34 are then supplied to the multiplier-add unit of FIG. 28, as before, and pass through the sorting memories of FIG. 29 and the high sort counting circuit of FIG. 31.

Thereafter, at B″ time, the results of the multiplier-add unit will again be checked, as before. If the products meet all the criteria required by the five control inputs of FIG. 38, then the apparatus will proceed as before and read the next succeeding specimen. However, if any of the first three control criteria of FIG. 38 are not met, then the output pair 228 will have its "1" line energized to set the first position in the M memory to the blank condition, thereby erasing the E and F elements defining the character last read.

For example, if the bit count as determined by FIG. 40 is outside the required limits, then current will flow in the zero line of the input pair 590 and the current from source 580 will flow through cryotron 596 and line 581, and will thereby block cryotron 644, so that current from one of the sources 630 will appear on the one line of the output pair 228. Furthermore, if the high sort count is two or more, or if the high and next high have less than two percent difference, then the "0" line of the output pair 228 will be blocked, by either cryotron 643 or 642, and the data in "WORD 1" of the M memory will be suppressed.

The cycle determined by the collect-specimens clock CSC of FIG. 39 repeats until ten different words have been stored in the M memory. At that time, the input pair 236 in FIG. 38 has the current switched from its "0" line to its "1" line, thereby blocking the cryotron 628 and unblocking the cryotron 626. The current from source 580 now reaches junction 624 and then flows through the gate of the unblocked cryotron 626 to line 587. The control effects of current in line 587 differ from those of current in line 586 only with respect to the output pair 510. Current in the line 587 blocks the cryotron 658, so that the current from the associated source 630 flows through the "1" line of the output pair 510 to switch the cross-correlate flip-flop 502 of FIG. 35 to its cross-correlate condition, thereby starting the cross-correlate clock CCC and stopping the collect-specimens clock CSC. This switches the apparatus from phase (1) of the operation as identified above to phase (2).

OPERATION—PHASE (2)

This phase of the operation includes the generation of the cross-correlation functions G of the set of unrecognized specimens corresponding to the E and F data are stored in the M memory 34, and the storage of these cross-correlation functions G in the N memory 38. At the end of this phase of operation, there are stored in the N memory 38 data equivalent to that in the order of likeness matrix shown in FIG. 10, but differing from that matrix in that the rows are arranged in a random order, and the items in each row are not arranged in their numerical order of magnitude, but are also in a random order.

This phase of the operation is completed during the first ten cycles of operation of the cross-correlate clock CCC (FIG. 39). Each one of these ten cycles proceeds through a series of four times identified as G, H, K and L. These ten cycles and the times therein will be identified by a number from 1 to 10 followed by one of the time letters, e.g., 1G, 1H, 1K, 1L. The clock pulses produced during all ten of these cycles are the same and only the clock pulses for the first of the ten cycles will be described in detail.

At 1G time the clock applies an input pulse to the line 249 (FIG. 24) for "WORD 1" of the M memory, thereby transferring the E elements to the input lines 258 of FIG. 36, and thence to the E input lines 352 of the multiplier-adder unit 36 shown in FIG. 28. That unit multiplies this set of E elements by all ten sets of F elements in all tend words of the M memory and sums each set of products, thereby generating ten G elements on its output lines 354 ($G_{1,n}$). The clock pulse applied to line 249 terminates at 1H time.

No clock pulse is supplied between 1H time and 1K time to allow the circuits to settle down and eliminate transient responses.

At 1K time current is supplied to the line 762*a* in FIG. 442 to read out the G elements appearing on the output lines 354 of the multiplier-adder unit into the intermediate registers 766 of the N memory. Also at 1K time, the cross-correlate clock CCC provides suitable input pulses to transfer all information from the intermediate registers to the main registers of that memory. The transfer of information from the intermediate registers to the main registers is shown and described in application Serial No. 133,679 mentioned above and need not be further described in the present application.

On each of the first ten cycles of the cross-correlate clock the operation described above is repeated, except that a different word in the M memory is used as the source of the E elements for each of these ten cycles. At the end of the ten cycles, all the data defining G sums are written into the sum registers 750 of the N memory 38. As previously mentioned, at this time there are written into the F register 752 and the Group E register 754 of the N memory data identifying by an alpha-numerical code the sources in the M memory from which the elements constituting the factors of the G elements were derived.

OPERATION—PHASE (3)

In this phase of the operation, the data stored in the N memory are sorted and decoded in accordance with predetermined standards derived from the matrix in FIG. 10, so as to assign to each word in the M memory an identification with a particular numerical character. After the words in the M memory have been so identified, they are then rearranged in numerical order.

The entire sorting and decoding operation proceeds under the control of the cross-correlate clock CCC and, when carried through the completion, extends over cycles 11 to 206 of the operation of that clock. As in the case of the first ten cycles of that clock, described above in connection with phase (2) of the operation, four times in each cycle, identified as times G, H, K and L, are utilized as control times for turning on or off various clock pulses. During this phase (3) of the operation, the clock pulses in any one numbered cycle do not necessarily correspond to the clock pulses in any other number of cycles. Unless such a correspondence is specifically stated, it should not be assumed.

The first step in the sorting and decoding of the data in the N matrix is the identification of the numerical character 1. This step is carried out during cycles 11 through 13 of the operation of the cross-correlate clock CCC.

This identification is based on the fact (observable in the right-hand column of FIG. 10) that, for nine of the ten numerals, the numeral 1 is lowest in the order of likeness, and hence the sum $G_{m,1}$ appears in the right-hand column for all lines of the matrix except the $G_{1,m}$ line.

At time 11G, all the groups in the sum register 750 are sorted to determine the low word in each group. This is accomplished by supplying current to the set lines S of all the group sort control flip-flops 922 of FIG. 45*a*, switching the current in each of those flip-flops to its "1" line, thereby blocking all the cryotrons 926 and supplying current from the sources 931 to the lines 777 supplying the sort circuits in FIG. 42. At at the same time 11G current is supplied to the set lines S of all the group read control flip-flops 952 in FIG. 45*b*, thereby supplying current from the sources 962 to the read lines 816 in FIG. 43.

When the sort circuits 777 of FIG. 42 are energized they select the low word in each group in the numerical sum register 750, and supply a current through only one of the lines 778 in each group in the alphabetical F register 752 (FIG. 43*a*). That one line 778 in FIG. 43*a* is effective to transfer the alpha-numerical code data stored in the registers 780 of the selected word of each group to the alternative pairs 817. The pairs 817 are supplied with current at the same time from read lines 816, as just described, and are effective to transfer the information from the selected word register in the alphabetical field 752 to the output lines 826 through the control windings of cryotrons 818 and 822.

At time 11H, current is supplied to the output lines 826 in FIGS. 43*a* and 43*b*, thereby reading out to the P and Q memories shown at 962 and 964 in FIG. 46, the ten alpha-numerical code words selected from the ten groups of the F register 752.

It is now desired to check whether nine of the ten words read out of the F register are the same, as they should be if the data in the N memory corresponds to that in the reference matrix of FIG. 10. For that purpose, the data stored in the P and Q registers 962 and 964 are next sorted for low, using the sorting techniques described above in connection with FIG. 30. Since the words inserted in the P and Q registers are expressed in an alpha-numerical code, the numerical magnitudes of those words are of no significance. However, if the data collected and stored in the N memory does in fact correspond to the data in the reference matrix of FIG. 10, the sort for low will reveal that in either the P or Q register, nine out of the ten words are equal.

Thus, at time 11K, when the current to the lines 826 of FIGS. 43*a* and 43*b* is terminated, the P and Q memories 962 and 964 have stored in them alpha-numerical code data identifying the sources of the F components of the low words in all ten groups of the N memory.

No current is supplied during the initial 11K–11L to allow time for the sorting circuits to stabilize and eliminate transient conditions.

At 11L time reset currents are supplied to the reset lines R for the group sort control flip-flops 922 in FIG. 45*a* and for the reset lines R of the group read control flip-flops 952 in FIG. 45*b*. These reset currents are turned off at time 12G.

Beginning at time 12G and continuing to time 12H, sorting currents are supplied to the sort circuits 978 for the P and Q memories, shown in FIG. 47 for the P memory 962. These sorting circuits operate as described. in connection with FIG. 30. If nine of the words in the P memory are equal and lower than the tenth word, then nine of the output pairs 980 from the P memory 962 will have current on their "0" or low lines and the P counting tree 968 will produce an output on its nine counting line connected to terminal 987.

On the other hand, if the particular alpha-numerical code identifying the location in the M memory of the F data for the numerical character 1 happens to be numerically higher than the alpha-numerical code identifying the source of the tenth word in the P memory, then the P counting tree 968 produces a current on its "1" output line leading to terminal 984. Since it is equally probable that the alpha-numerical code for the nine equal words may be higher or lower than the alpha-numerical code for the tenth word, the Q memory is provided and the same ten words that are supplied to the P memory 962 are supplied to the Q memory 964, but are complemented before insertion in the Q memory by the circuit illustrated diagrammatically at 966 in FIG. 46. Consequently, if the P memory happens to produce an output on its "1" line because of the accidental relationship of the alpha-numerical code identifying the F source of the character "1" and the code identifying the F source of the tenth character, then the Q memory will, upon being sorted, produce in its Q counting tree a nine output. Summarizing, if nine of the alpha-numerical codes are the same, then one of the P and Q counting trees 968 and 970 produces a current at its nine output terminal 987.

At time 12H and continuing to time 12K, a test is made by supplying current to the line 1066 of FIG. 48. As described in connection with FIGS. 47, 48 and 49, if it is determined upon making this test that the count in either the P or Q memory is equal to nine, then the cross-correlation decoding operation proceeds. If it is found that only six to eight of the words in one of those memories are equal and low, then the words which were high in that memory are set to blank in the M memory by the current on lines 1068 or 1070 of FIG. 48. If the low count in both the P and Q memories comes out between one and five, it indicates that a serious error has been made in collecting the data in the M memory and the entire M memory is set to blank by the current in the line 1072. If any words in the M memory are set to blank by current in one of the lines 1068, 1070, 1072, then the same current is effective in the circuit of FIG. 35 to turn off the cross-correlate flip-flop 502, to stop the cross-correlate clock CCC and to start the collect-specimens clock CSC again to begin anew or to finish, as the case may be, the collection of ten different rejects as described above in phase (1) of the operation.

Assuming that no words in the M memory are erased as a result of the check of the P and Q memories, the decoding of the data in the N memory continues with the number "1" now identified with that location in the M memory whose alpha-numerical code appears nine out of ten times in either the P or Q memory.

At time 13G a current is supplied to line 1074 in FIG. 48, and depending upon the condition of the cryotrons 1038 and 1058 is effective to transfer that current to either line 1022, directed to the control circuits for the P memory, shown in FIG. 47, or to line 1076, directed to similar control circuits for the Q memory, not shown in detail.

Referring to FIG. 47, it may be seen that current on line 1022 flows through either the gate of cryotron 1018 or the gate of cryotron 1020, thereby energizing one of a pair of lines 1024 which appear in FIG. 50 and are there effective to read either WORD 9 or WORD 10 from the P memory. If WORD 10 was one of the low words (i.e., one of the nine equal words) in the P memory, then the gate of cryotron 1020 is blocked, and the WORD 10 is read. If the WORD 10 was not one of the low words, then it is known that WORD 9 must be one of the low words, since it has been previously determined that all the other nine words except WORD 10 are low and equal. The alpha-numeric code defining WORD 9 or WORD 10 of the memory is then transferred by the circuits shown in FIG. 50 to the lines 1106, which continue to FIG. 44 and which supply complementing current to the memory columns of the group E register 754, appearing at the top of FIG. 44. The complementing currents appearing on the lines 1106 are effective to set to zero only that one of the words *a* to *j* in register 754 which corresponds to the alpha-numeric code of the word selected from the P and Q registers.

At time 13H sorting currents are supplied to sorting circuits 900, shown as a block in FIG. 44, which are effective to produce an output current on one of the lines 902 corresponding to the one word in the register 754 which has been set to zero. This current on the line 902 of FIG. 45*a* is effective to set one of the associate result flip-flips 906 by blocking the cryotron 904, thereby forcing the current from source 907 into the "1" line of of that flip-flip. Consequently, one of the ten flip-flops 906 is selected and set to its "1" condition.

At time 13K current is supplied to line 920 in FIG. 45*a*, and passes through the gate of cryotron 908 in the selected flip-flop 906 and is effective to transfer one of the group sort control flip-flops 922 to its "1" condition, thereby supplying sorting current to all of the sorting circuits 777 for a selected group in the N memory.

At time 13L, current is supplied to the line 896 in FIG. 44 to restore all of the complementing lines 1106 to their normal or "0" condition, thereby allowing the group E register 754 of the N memory to return to its normal condition. (The memory flip-flops 864 of register 754 are provided with persistent loops (not shown) such as that shown at 346 in FIG. 27, which are effective to restore the original data after the complementing current is turned off.

At time 14G, the group selected by the setting of its group sort control flip-flop 972 in FIG. 45*a* is sorted for high by complementing the sum field shown in FIG. 42 (by current supplied to circuits not shown, but similar to complement supply lines 348 and high sort line 349 of FIG. 27), so that the sort output line 778 indicates the high word in the register rather than the low word. The one word now identified as high has current appearing on its line 806 in FIG. 44, which is supplied through output line 778 in FIG. 42 (see FIG. 43 for the 772–806 connection). The information on the output line 806 is transferred by cryotrons 842, 844 to one of the lines 850 and carries through the group E register 754 to the corresponding output line 328. That line extends to FIG. 26, where it is effective to set to its "1" condition that one of the digit assignment flip-flops 302 corresponding to that particular word in the "1" group.

At time 14H, current is supplied to the uppermost line 282 in FIG. 26, thereby producing on the lines 280 a binary code identifying the numeral 1, and switching the cryotrons 312 and 314 associated with that particular word so that the current from source 300, controlled by line 328, is effective to write the numerical identification of the numeral 1 into the corresponding word in the intermediate registers 284 of field #4 of the M memory.

At the same time 14H, a flip-flop (not shown) associated with that particular word in the 1 group of the N memory 42 is set to indicate that that word has been sorted, so that that word will be removed from further sorts of the 1 group. The "I've Been Sorted" flip-flops and their functions are shown and described completely in copending application Serial No. 198,239 mentioned above, (IBM Dkt. 10,552).

Referring to FIG. 10 to illustrate this procedure, the $G_{1,n}$ line of the matrix has been selected by the selection of one word in the P and Q memories. That line appears in a particular group *a* to *j* of the N memory sum register 750, and has the values of the ten words or G products therein arranged in a random order. The sorting of that group for high determines the identification of one of the ten G products as the one whose F component was derived from a location in the M memory where the autocorrelation functions of the numeral "1" are stored. The particular location in the M memory identified by that high sort has now been tagged in the M memory field #4 with the binary code identifying numeral "1."

At time 14K, reset current is supplied to the reset line R of the digital assignment flip-flops 302 in FIG. 26. Also, at that time, currents are supplied to write the information appearing in the field #4 intermediate registers into the main registers (not shown) of that field.

During time cycle 15, the sorting operation described during time cycle 14 is repeated on the same group of words in the sum field 750 of the N memory. During this second sort of those words, the word which was identified as the $G_{1,1}$ product is eliminated by the setting of the "I've Been Sorted" flip-flop, so that only the remaining nine words are sorted. The high one of those remaining nine words will be the cross-correlation product $G_{1,4}$ as indicated by the second item in the first line in the reference matrix in FIG. 10. Consequently, the location of the new high word in the sum G register 750 may now be used to identify the numeral character "4," and the circuits of FIG. 26 are effective at time 15H to write the binary data identifying the number 4 into the intermediate register of the corresponding word of field #4 of the N memory. Again, the high word is removed from the sort by setting the "I've Been Sorted" flip-flop.

During time cycle 16, the same group in the N memory is sorted again. At time 16H, the circuits of FIG. 26 are effective to identify a particular location in the M memory with the numerical character "0." Again, this particular word is removed from the sort at the end of the cycle 16.

During the next six sorting cycles, the data in the reference matrix of FIG. 10 are so close together as to make them unreliable for sorting purposes (less than 2% difference between adjacent items in the first row of FIG. 10). Consequently, the apparatus proceeds through six more sorting cycles identified as cycles 15G to 22G, inclusive, but during these sorting cycles there is no writing into the field #4 of the N memory at H time. Note that the list of H times in FIG. 26 skips from 16H to 23H. The apparatus runs through these six cycles for the purpose of eliminating the next six words from the sort, leaving only the last or tenth word to be sorted.

During time cycle 23, the apparatus proceeds through another sort cycle. This time, there is only the word $G_{1,3}$ left to be sorted in the selected group of the N memory. At time 23H the binary data identifying the number 3 is written into field #4 of the M memory.

At each of the 14H, 15H, 16H and 23H times, the currents flowing in the lines 850 of FIG. 44 are effective to actuate the transfer flip-flops 854 and thereby to write the data appearing in the selected words of the Group E register 754 into the first four words (memory flip-flops 868) of the group identification register 756. The data stored in the group identification register 756 serve as temporary memories of the locations in the N memory where particular numerical characters have their identifying data stored. These temporary location identifications stored in the group identification register 756 are used later in cross-checking the decoding operation.

At time 23L, the associate result flip-flop 906 in FIG. 45*a* is reset by applying current to the reset line 916. At the same time, the group sort control flip-flop 922 is reset by applying current to the reset lines R or all the group sort control flip-flops 922. These reset currents terminate at time 24G.

In that part of the sorting and decoding operation just described, the group in the N memory which is considered to contain data identifying the numeral 1 has been selected, and the words in that group have been sorted, i.e., the words in the sum memory 750 have been checked to determine their order of magnitude, but the words have not been rearranged. From the sorting operation, certain groups have been tentatively identified as containing data defining the reference numerals 4, 0 and 3. These tentative identifications have been stored in the group identification register 756 and in field #4 of the M memory (FIG. 26).

TIME 24G—29L

In the next series of steps from time 24G through time 29L, the tentatively identified "4" group in the N memory, i.e., the group identified as containing the data in row $G_{4,n}$ of FIG. 10, is sorted to identify the two words therein which are derived from the F components of the numerals 6 and 8. Referring to FIG. 10, and particularly to the row $G_{4,n}$ therein, it may be seen that this will require sorting the data in this group in sum register 750 five times. In each sort, the high word is selected and is eliminated from subsequent sorts. The first word selected identifies the numeral 4, which has already been identified so that that information is not further used in the decoding operation. The second sort identifies reference numeral 6, and that information is stored in field #4 of the M memory (FIG. 26). The next two sorts are unreliable since the two sums for $G_{4,5}$ and $G_{4,9}$ are too close together, but the fifth sort serves as an identification of the numeral 8, and that information is stored in field #4 of the M memory (FIG. 26).

Considering now the operations from time 24G through time 29L in more detail, at time 24G, current is supplied to that one of the lines 869 of FIG. 44 which is marked 24G, thereby energizing transfer flip-flops 870 to write the information contained in the second word from the top in the group identification register 756 into the lines 872 and hence to complement the data in certain columns of the group E register 754, thereby reducing to zero the one word in the register 754 which corresponded to the second word stored in group identification register 756. This write current supplied to line 869 terminates at time 24H.

At time 24H–24K, current is supplied through the sorting input lines 901 of FIG. 44 to the sorting circuits 900 to sort the register 754 for its low word, which will be the word which has just been set to zero by the complementing operation at time 24H. An output current appears on one only of the output lines 902 of those sorting circuits and passes to the corresponding line 902 in FIG. 45*a*, where it is effective to set one of the associate result flip-flops 906 to its "1" condition.

During the interval 24K–24L, current is supplied to the line 920 in FIG. 45*a*, thereby setting one of the group sort control flip-flops 922, the selection being determined by the particular one of the associate result flip-flops 906 which was selected in the preceding operation. The selected flip-flop 922 is effective to supply current to the input lines 777 of the particular group in the M memory which tentatively corresponds to the numeral "4."

During the interval 24L–25G, current is supplied to the line 896 in FIG. 44 to restore the complementing lines 872 to their "0" condition.

During the interval 25G–25H, current is supplied to complement supply lines and a high sort line in sum register 750 so that the current supplied to the sorting input lines 777 becomes effective to sort the selected group in the sum register 750 for the high word. This produces a current output on the line 778 of FIG. 42 corresponding to the high word in the selected group, which in turn results in a corresponding current on the output line 806 of FIG. 43*a* and FIG. 44. The energization of one of the lines 806 results in a current flow in one of the lines 850 and thence to one of the lines 328, which extend to FIG. 26 and are there effective to set one of the digital assignment flip-flops 302.

During the interval 25H–25K, the "I've Been Sorted" flip-flop for the selected high word in the sum register 750 is set, thereby removing that word from subsequent sorts.

During the interval 25K–25L, the digit assignment flip-flops 302 in FIG. 26 are all reset by supplying current to the reset line R. Actually, only one of those flip-flops has previously been set and it is the only one now reset. The reason for resetting it is that the numeral 4 has previously been identified with one word in the M memory and it is therefore not desired to have the flip-flop 302 set at this time, since no use is to be made of it.

No action takes place during the interval 25L–26G.

During the time interval 26G–26H, the "4" group is sorted again for high and the digital assignment flip-flop 302 of FIG. 26 is set for the group corresponding to the numeral "6."

During the time interval 26H–26K, current is supplied to the line 282 marked 26H in FIG. 26 causing the pairs 280 to register the binary code of the numeral "6," and that numeral is written into the intermediate register of field #4 of the M memory (one set of the memory flip-flops 284 in FIG. 26). During this interval also, the "I've Been Sorted" flip-flop for this word in the sum register 750 is set.

During the interval 26K–26L, the digital assignment flip-flops 302 are again reset to their "0" conditions and current pulses are supplied to transfer the data entered in the intermediate register of field #4 of the N memory into the main register.

During time intervals 27G–28G and 28G–29G, the apparatus repeats the operation described above during the interval 25G–26G. Referring to FIG. 10, the row $G_{4,n}$ is sorted two more times during these intervals. The information resulting from these sorts is not used because the sums for the next two numerals "5" and "9" are so close together to make the sorting unreliable. Hence, the only important action in these two sorts is the setting of the "I've Been Sorted" flip-flops for those two words in the "4" group, so that the apparatus can proceed with the next sort which results in a tentative recognition of the numeral "8."

During the interval 29G–30G, the "4" group is sorted for the numeral "8," and the binary code identifying that number is transferred into the M memory field #4 at time 29H. The operation except for the selection of the particular numeral entered in the M memory is the same as described in interval 26G–27G above.

The apparatus has now extracted all the useable information the $G_{4,n}$ row of the matrix, so during the interval 29L–30G, the associate result flip-flop 906 and the group sort control flip-flop 922 for the numeral "4" are reset by applying current to the reset lines.

During the interval 30G–31G, the "0" group is identified by reading out from the third word in the group identification register 756 in FIG. 44 by applying a current to the line 869 marked with time 30G. The operation is similar to that described in the interval 24G–25G above, differing only in that a different associate result flip-flop 906 and a different group sort control flip-flop 922 are set, both for the group in the N memory corresponding to the $G_{0,n}$ row of the matrix of FIG. 10.

During the interval 31G–33G, the selected group of data in the N memory sum register 750 is sorted twice for high, and the results are discarded, i.e., no digit assignment flip-flop is set, since both the numeral "0" and the numeral "8" have previously been recognized.

During the time interval 33G–34G, the $G_{0,n}$ group is sorted again for high and the numeral 5 is emitted by the line 282 in FIG. 26 which is tagged with the time 33H. The binary code identifying the numeral "5" is written into the selected intermediate register in field #4 of the N memory.

During the time interval 34G–38G, the data from line $G_{0,n}$ is sorted four more times and the information discarded because of the closeness of the data in the matrix of FIG. 10.

During the interval 38G–39G, the $G_{0,n}$ group is sorted for the eighth time, resulting in the tentative identification of the numeral "2" and the writing of the binary code for numeral "2" into the intermediate register field #4 of the M memory. Since the numerals remaining in the $G_{0,n}$ row, namely "3" and "1," have both been previously identified, the associate result flip-flop 906 and the group sort control flip-flop 922 are reset at time 38L–39G, so that the apparatus may select a new row for sorting.

During interval 39G–40G, the $G_{3,n}$ row is selected for sorting, the procedure being the same as that set forth in the interval 25G–26G above. The five highest sets of data in the $G_{3,n}$ row are of no significance, the first set being not useful since the numeral 3 has already been tentatively identified and the next four steps being not useful since they are too close together for accurate separation. Consequently, during the time interval 40G–45G, the set of data corresponding to the $G_{3,n}$ row is sorted five times and the information discarded.

During the interval 45G–46G, the information in the $G_{3,n}$ row is sorted a sixth time and the result is used as an identification of the reference numeral "9." The data identifying reference numeral 9 are written into the field #4 of the N memory at time interval 45H. There is no further useful information to be extracted from the $G_{3,n}$ row, so the associate result flip-flop 906 and the group sort control flip-flop 922 are reset during the interval 45L–46G.

During the interval 46G–47G, the $G_{2,n}$ row is selected for sorting. During the interval 47G–48G, that group is sorted once for high and the information discarded. During the interval 48G–49G, the group $G_{2,n}$ is sorted a second time to identify the numeral "7," which is the last of the ten numerals to be identified.

During the interval 48L–49G, the "I've Been Sorted" flip-flop for all the groups of the sum register 750 are reset to their not sorted position.

During the interval 49G–174G, the information in the sum register 750 is sorted to rearrange each group in numerical order, with the highest numerical group in the top position of the register and the lowest numerical group in the bottom position of the register. This push-down memory and the rearranging operation are described in detail in application Serial No. 198,239, mentioned above. Briefly, the operation proceeds by selecting a particular group, sorting it for low, reading out the data defining that particular group and its corresponding data in the same word of the F register 752, and entering that information in an input register, not shown in the drawings, but corresponding to the input register 198 of the M memory, which appears in FIG. 21. After an entry is made in the input register, the memory is pushed down, so that that data appears in the first word of the memory and the information previously stored in the respective words of the memory are pushed down one word until the word that has just been read out is reached. This operation is repeated ten times, each time sorting the group for low. After the tenth sort is completed, the words are in order in the group, with the lowest numerical word at the bottom of the group and the highest at the top. One time interval is required for a group selection and two time intervals for each sort and push down operation, so that twenty-one intervals (49G–69G) are required to rearrange one group. The sorting proceeds through the 0, 1, 2, 4 and 7 groups, one by one, and is completed at time 174G. (The groups selected for sorting are those to be utilized in the cross-checking operations which immediately follow.)

During the interval 174G–188G, six cross-checking operations are carried out. The cross-checking operations are all similar, and only one of them will be described in detail. In a cross-checking operation, a particular group in the N memory (i.e., a particular line in the matrix of FIG. 10) is selected and a particular word in that group is selected. The identity of the numeral appearing at that location, in terms of the F source identified in the F register 752, is then compared with the identity, expressed in similar terms, of the numeral appearing in another group at another word in the now numerically ordered N memory. The other group and the other word are selected by reference to the matrix of FIG. 10, so that the two words should be the same. The first cross-checking operation selected compares the numeral appearing in line $G_{0,n}$ word nine, which is the numeral "3," with the numeral appearing in line $G_{1,n}$, word ten, which should also be the numeral "3."

At time 174G, an input current is supplied to the line 869 in FIG. 44 which is marked with the time 174G and which energizes the transfer flip-flops 870 to read the information stored in the memory flip-flops 868 out into the complementing lines 872. The data in certain columns of the register 754 is thus selectively complemented, resulting in setting to zero the word corresponding to the alpha-numerical code stored in the third or "0" word of the group identification register 756.

At time 174H, current is is supplied to the sorting circuits 900, thereby sorting the register 754 to determine the identity of the low word, namely the one set to "0." That identity is established by a current flowing on one of the output lines 902, which extends to FIG. 45*a*, and is effective to set one of the associate result flip-flops 906 to its "1" condition.

At time 174K, current is supplied to line 948 of FIG. 45*a*, which proceeds through the one of the associate flip-flops 906 which has been set to its "1" condition, and is effective to set one of the group read control flip-flops 952 in FIG. 45*b*. This operation is completed at time 174L.

During the interval 174L–175G, current is supplied to the line 896 in FIG. 44 to reset the complement lines 872 to their normal condition, and current is also supplied to the reset line 916 of the associate result flip-flops, thereby restoring them to their normal condition.

Thus at time 175G, one of the group control flip-flops 952 has been selected, being the flip-flop for the group corresponding to the line $G_{0,n}$ in FIG. 10.

At time 175G, current is supplied to the line 869 in FIG. 44, which is marked with the time 175G and which supplies current to the transfer flip-flops 870 which read out the memory flip-flops 868 containing the data of the alpha-numerical code identifying the location of the numeral "1." This data is read out to the complement lines 872 and is effective to complement those columns of the memory 754 which have a "1" in the code.

At time 175H, sorting current is supplied to the lines 901 of the register 754, thereby supplying current to the one word in the register which has been set to "0," resulting in current on one word of the lines 902 leading to FIG. 45*a* and there effective to set one of the associate result flip-flops 906.

At time 175K, current is supplied to the line 934 of FIG. 45*a*, resulting in the selection of one of the group compare control flip-flop 938 in FIG. 45*b* and setting a selected flip-flop.

At time 175L, current is again supplied to line 896 of FIG. 44, setting the complement lines 892 to "0."

At this point, one of the group read control flip-flops 952 has been set and one of the group compare control flip-flops 938 has been set.

At time 176G, current is supplied to the line 808–9 of FIG. 43 to read out the word "9" and the corresponding words in all the other groups. This current reads out the data in the memory flip-flops 780 and transfers it to the read out pairs 817. However, the read out pair 817 for only one group is energized, depending upon the particular group read control flip flop 952 which has been set. As pointed out above, the group for the numeral "0" is the one whose flip-flop 952 has been set, so that the data for the word nine in group "0" is now read out from the memory flip-flops 780 of FIG. 43*a* and is transferred to the output lines 817, where it becomes available to the complement lines 828 which extend through the entire memory.

At time 176H, complement current is supplied to the lines 830 at the top of the N memory alphabetical field shown in FIG. 43*a*, and is effective to set to zero the memory flip-flops of those words in all groups whose alpha-numerical code is the same as the one which has just been made available to the pairs 828 by the output lines 817. All the other words in the memory will have their flip-flop settings changed, but will not be set to "0."

At time 176K, current is supplied to the line 944 for word ten in FIG. 45*b*, and passes through the one group compare control flip-flop 938 which has been set (the one corresponding to the numeral "1") and thus passes to the input line 832 of FIG. 43*a* for word ten of the group corresponding to the numeral "1." That input line sends current through the pair 833 and checks the data stored in that word of the N memory alphabetical field. If that word has been set to zero by the complementing operation at time 176H, then current flows on the "0" line of the pair 833 and blocks the cryotron 834 in the "1" line of the match indicator pair 838. If that data in the word one of the N memory alphabetical field has not been set to "0," current will appear on the "1" line of pair 833 and will block cryotron 836 in the match indicator pair 838.

At time 176L, current is supplied to the source 840 in FIG. 43*b*, which supplies the match indicator pair 838 and thus transfers to FIG. 53 an indication as to whether the two words selected for a cross-check have resulted in a match or a mismatch. As indicated in FIG. 51, the current in the match indicating pair 838 also passes to a match counter circuit 1108 shown only diagrammatically in FIG. 51. At time 176L, current is also supplied to a line 1182 in FIG. 53, bearing the tag 176L, which is effective to transfer from the match indicating pair 838 to a flip-flop 1158 information indicating whether the numeral "3" has been checked as a match or a mismatch. This information remains stored in the flip-flop 1158 for numeral 3 for subsequent use.

At time 178G, reset current is supplied to the associate result flip-flop 906 in FIG. 45*a*.. At time 178H reset current is supplied to the group compare control flip-flop 938 in FIG. 45*b*. The first cross-check is now complete.

During the interval 177G–179G a second cross-check is made between the data in F register 752, group $G_{0,n}$, word ten, and the data group $G_{1,n}$, word one, both of which should be equal and should identify the location of the data in memory M corresponding to the numeral "1."

During the interval 179G–182G, a third cross-check is made between the group $G_{0,n}$, word two, and the group $G_{4,n}$, word 5. Both of these words should correspond and identify the reference numeral "8." The operation is the same as that described for the first cross-check during the interval 174G–179G, and need not be repeated in detail.

During the interval 182G–184G, a comparison is made between group $G_{2,n}$, word eight, and word $G_{4,n}$, word one, both of which should be equal as identifying the location of the data for the numeral "4."

During interval 184G–186G, the fifth check is made between group $G_{2,n}$, word nine and the group $G_{4,n}$, word nine, both of which should identify the location of the numeral "0." During the interval 186G–188G, the sixth and final cross-check is made between group $G_{2,n}$, word one and group $G_{7,n}$, word two, both of which should identify the numeral 2.

At time 188G, the last associate result flip-flop is reset by supplying current to its reset lines. At time 188H, the group read control flip-flops 952 and the group compare control flip-flops 938 are reset by currents supplied from reset lines. The cross-checking operation is now complete, but the results of the cross-checking operation must now be analyzed for matches and mismatches. If all the data has been correctly assembled in the memory M, there should be six matches and no mismatches. If some error has been made in reading the data, a mismatch may appear, in which case selected data in the memory M may have to be erased and new unknown numerals must be read in.

At time 189G, current is supplied to line 1126 in FIG. 52, to test the results obtained from the counter 1108 of FIG. 51, which counts the total of matches obtained in the six cross-checking operations. As shown in FIG. 52, the counter has two output pairs 1112 and 1114, which respectively indicate whether or not there is a two output or a four output from the counter.

If the total in the counter is less than four, then cryotron 1124 is not blocked and the current from line 1126 flows through the gate of cryotron 1124 and out on line 1130 to FIG. 53, where it is effective to set the flip-flops 1158 for the numbers 0, 2, and 4 to the "1" or not-match condition and to set the flip-flops 1158 for all the other numerals to the "0" or match condition. The reason for selecting these numerals, 0, 2 and 4, is that the decoding operation has been based principally on those numerals. If the cross-checking operation shows a match count of less than four, it is likely that an error has been made in identifying one of those three numerals.

Current from source 1126 flowing through wire 1130 also flows through the control winding of cryotron 1128, switching the flip-flop 1136 to its zero condition and making a zero available to the output lines 1144.

If the total in the counter 1108 is equal to 4 or 5, then cryotron 1124 is blocked and cryotron 1118 is not blocked, so that current from source 1126 flows through the control winding of the cryotron 1132 and through the gates of cryotron 1120 and 1118 to ground. In that event, no control operation takes place at this time, but the control by the cross-correlate clock CCC continues. In this situation only those one or two words which did not match in the cross-checking operation have their flip-flops 1158 set to "1."

If the counter 1108 of FIG. 51 counts six matches in the cross-checking operation, then cryotrons 1124 and 1118 are both blocked, and the current from source 1126 must pass through the control winding of cryotron 1134 and through the gates of cryotrons 1122 and 1116 to ground. Flip-flop 1136 is thereby switched to its "1" condition, wherein current flows through the control winding of cryotron 1142.

At time 190G, current is supplied to a read out circuit (not shown) in FIG. 53, controlled by the uppermost one of the match indicating flip-flops 1158 which is found to be set to its not match condition. Current is diverted by that flip-flop 1158 through the line 1172 to the transfer flip-flops 1170 which read out the memory flip-flops 1164 for the same word to the output pairs 348, so as to read the alpha-numerical code corresponding to that digit to the field number 4 of the M memory shown in FIG. 27, where it is used as an associate interrogate input to the complementing lines 348 and is effective to set to zero the particular word in the register that has been assigned the same value as the word which was just read out of the memory in FIG. 53.

At time 190H, the field number 4 of the M memory is sorted for low, and the word found to be low, which will be the word just set to zero by the complementing action of line 348, has its blank—not blank indicating flip-flop in field number 1 of the M memory set to zero. This operation of reading out a flip-flop 1158 which has been set to not match and thereby controlling the read-out of the corresponding number from the memory flip-flops 1164 to the field number 4 of the M memory is repeated twice more, during the time cycles 191 and 192. This reading out of the match-not match flip-flops 1158 is repeated three times, because the maximum number of those flip-flops which can be set to their not match condition is three. The setting of three to the not match condition occurs whenever the match count is less than 4, and results in a setting of the 0, 2 and 4 flip-flops 1158 to their not match condition and the setting of all the others to their match condition, as described above in connection with FIG. 52. If only one or two of the flip-flops 1158 was set to its not match condition, then only those one or two words will be read out during the cycles 190, 191 and 192. The last one or two of those cycles will go on, even though nothing is read out. On the cycle 192, at the end of which there is nothing more to be read out from the column of flip-flops 1158, a current appears on the output line 1178 at the bottom of that column. Current in the line 1178 is effective to block all the cryotrons 1180, and set the current in all the complementing lines 348 to the zero line, so that the field number 4 of the M memory is restored to its previous condition.

At time 193G, current is supplied to line 1144 in FIG. 52, which reads out the condition of the flip-flop 1136. If that flip-flop is in its "0" condition, then current flows through the gate of cryotron 1142 and out on line 1145 to FIG. 35, where it is effective to reset the cross-correlate flip-flop and restore the operation of the circuit to phase (1) as described above. The flip-flop 1136 is in its zero condition if any words in the field number 4 of the M memory has been erased. The reason for resetting the cross-correlate flip-flop is to collect data defining new characters and store them in the M memory to replace the data from the words improperly recognized and which have been deleted from the M memory.

If the flip-flop 1136 is in its "1" condition, indicating that all six of the cross checks resulted in matches, then no current appears on the line 1144, and the cross-correlate clock CCC proceeds to time cycle 194.

It has now been determined that the ten characters selected, whose identifying data is stored in the M memory, constitutes a proper set of characters for the recognition of further unidentified specimens observed by the apparatus. However, the identifying data in the M memory is not presently in numerical order. It remains to rearrange the data in the M memory to place those identifying data in proper numerical order.

This rearrangement is accomplished by supplying at time 194G a current to the line 349 in FIG. 27, thereby blocking all the cryotrons 350 and switching the currents in the pairs 348 to their one lines, thereby complementing all the data in the field #4 of the M memory. Before this complementing operation, the data standing in that memory consisted of ten words of four digits each, identifying the ten numerals from 0 to 9, with 0 identified by an 8+2 code, as is conventional in the binary system. After the complementing operation, the code representing the numeral 0 now becomes the low code stored in the ten words of the field #4. That field is sorted for low, and the one word identified as low has the data from its fields #2, #3 and #4 transferred to the input register of the M memory (see input register 198 in FIG. 21). Thereafter, that data is pushed down into WORD 1 of the memory, thereby pushing down the information in all the other words. The word from which the data was taken for insertion into the input register had its blank-not blank indicator set to the blank condition when that transfer took place. Consequently, the pushing down operation stops when the blank word is reached in the memory. The data in word one of the memory now is the data identifying the reference numeral 0. The "I've Been Sorted" flip-flop for the word number 1 of field #4 is set in the sorted position, thereby removing that word from subsequent sorts.

The operation just described as beginning at time 194G is now repeated nine more times, and during these operations, the identifying data corresponding to the reference numerals 9, 8, 7, 6, 5, 4, 3, 2, 1 are inserted in that order into the input register of the M memory and are then pushed down into the main registers of that memory.

Consequently, at the end of these ten cycles, the data in the M memory is arranged in numerical order with the data in WORD 1 of the memory identifying the reference numeral "1" and the other words in corresponding order identifying the other reference numerals.

The apparatus is now ready to terminate phase (3) of the operation and to start phase (4) of the operation. To this end, at time 206G, current pulses are supplied to the lines 546 and 548 of FIG. 37 to reset the recognized characters counter 540 and the rejected characters counter 544 to 0. At the same time, current is supplied to line 1178 in FIG. 53 to reset all the complementing pairs 348 to their "0" conditions, so that the words in the M memory field #4 will be in their normal form instead of their complement form.

At time 206H, a current pulse is supplied to the restoring mechanism 68 of FIG. 12 to restore the reading mechanism to the position which it had before the decoding of the newly observed font of characters was started.

At time 206K, a pulse is supplied to line 520 in FIG. 35, which is effective to reset the cross-correlate flip-flop 502 to its zero condition and also to stop the cross-correlate clock CCC and to start the read and compare clock RCC.

OPERATION—(PHASE 4)

During this phase of the operation, the apparatus observes new characters presented at its input and identifies them according to the techniques described in greater detail in our Patent No. 3,196,392, mentioned above. More specifically, the apparatus generates the autocorrelation elements E for each of the new observed specimens. The element E for each specimen are then multiplied by the normalized autocorrelations functions F for each of the set of ten reference characters whose identifying data are stored in the memory M, thereby producing ten product matrices, which are separately summed. The maximum one of these ten sums is selected and used to identify the particular set of F elements which produced that maximum sum. The observed specimen is then identified with the numeral whose F elements produced that maximum product. As each new specimen is observed, the input data are checked to determine that they come within certain predetermined limits of accuracy. If the check establishes that the incoming data is within those limits, then the identifying character is delivered to the output lines of the apparatus in a pre-established binary code. If the identifying data of the input specimen does not come within those limits, then a special character is placed on the output line indicating that the observed character was not identified.

As mentioned above, the operation of the apparatus in phase (4) is determined by the read and compare clock RCC of FIG. 39. This clock produces a repeated cycle of three pulses, identified as the A, B and C pulses.

On each A pulse, current is supplied to the gate 80 of FIG. 15 to transfer the information observed by the photocell matrix 58 to the input lines 88 of FIG. 18.

The generator of FIG. 18 receives the input bits on the lines 88 and generates the autocorrelation elements E. The data defining the autocorrelation elements E are transferred on the lines 29 to the register of FIG. 34 and thence through the output pairs 482 to the circuit of FIG. 36, where they are transferred to the pairs 352 running to the input of the multiplier-adder unit 36 shown in FIG. 28. The multiplier-adder unit of FIG. 28 produces 10 matrix products of the elements E appearing on the input lines 352 times each one of the F matrices appearing on the input lines 276. These ten products are summed and the ten sums appear on the output lines 354, where they are transmitted to the sorting memories 362 and 364 of FIGS. 29 and 30. The circuits in FIG. 30 sort the ten products to determine which one is high. The one particular product determined to be high is identified by a current appearing on the one line of a particular one of the pairs 366 which connect the output of sorting memory 362 of FIG. 30 to the inputs of FIGS. 31 and 32. In the output character selector of FIG. 32, the current on one line of a particular pair 366 makes available to the transfer flip-flops 468 data defining a particular numeral, which is the numeral identified with the F elements that produced the maximum product when multiplied by the E elements identifying the new input specimen. All the operations just described take place during the A pulse period.

At B time, current is supplied to the current input lines 630 of FIG. 38 to test whether the data supplied to the apparatus in the form of element E comes within certain criteria established to determine whether the specimen being observed is in fact a recognizable character.

There are three principal criteria. The circuit of FIG. 40 determines one criterion, namely whether the bit count observed by the photo cells in the information source 26 is within certain maximum and minimum limits. The information as to whether the count is within those limits is supplied to the input pair 590 of FIG. 38. Another criterion is whether the high word count in sorting memory 362 was one or more than one. If the high word in memory 362 is equal to another high word, obviously there can be no unequivocal identification.

The third criterion is applied by the circuit of FIG. 29, which checks to determine whether there is a 2% difference between the high product and the next high product. The results of this check are applied to the pair 378 in FIG. 38. If there is not at least a 2% difference, the network of FIG. 38 rejects the tentative identification made and classifies the character on the output lines 450 of FIG. 38 as not identified.

It may be desirable to use a different criterion as to permissible percentage variation between specimens and reference patterns in phase (4) than was used in collecting rejected specimens in phase (1). More specifically, the permissible percentage variation in phase (4) should be generally less stringent than that in phase (1). For example, where a 2% difference is required in phase (1), as in the present embodiment, a difference of 0.5% might be required in phase (4).

If the specimen observed at the information choice meets all three of these criteria, then the current from source 580 in FIG. 38 passes down through the tree to the line 588, where it is effective to block the cryotrons 636, 645, 650, 659 and 666.

Blocking of cryotron 636 prevents the counting of a rejected character. Blocking of cryotron 645 prevents the suppression of any entry in the M memory.

Blocking of cryotron 650 transfers a character to the "1" line of output pair 450, which is transmitted to FIG. 32, where it is effective to switch the flip-flop 456 to its "1" condition.

Blocking of cryotron 659 prevents energization of the cross-correlate flip-flop in FIG. 35.

Blocking of cryotron 666 causes energization of the one line of the output pair 538 to count a recognized character in the counter 540 of FIG. 37.

If any one of the three established criteria are not met, the network of 638 will respond by causing the counter 544 of FIG. 37 to count a rejected character and will control the output character selector of FIG. 32 to set flip-flop 456 to its "0" condition.

At time C, current is supplied to the lines 462 of FIG. 32 to test the condition of flip-flop 456. If flip-flop 456 is in its "1" condition then a binary code, identifying a particular character determined by the input lines 366, namely, the one of the input pairs 366 that has current in its "1" line, is transferred to the output pairs 448. If flip-flop 456 is in its "0" condition, then there is placed on the output pairs 448 a special code indicating that the character observed was not recognized.

At time C also, the lines 556 and 578 of FIG. 37 are energized to check the conditions of the output lines 552 of the rejected character counter 544. As long as that count is less than seven, the currents in lines 556 and 578 are bypassed to ground. If the number of rejected characters equals seven, current from line 556 becomes effective to switch the clock mechanism of FIG.. 39 to stop the read—and compare clock RCC and to start the collect specimens clock CSC, thereby transferring the operation of the apparatus from phase (4) to phase (1). Also, current from line 578 becomes effective to transfer an output current to a line directed to FIGS. 22 to 27 to reset all the data in the M memory to zero, so that the new rejected data collected in phase (1) of operation may be placed in that memory.

Note that the recognized characters counter 540 of FIG. 37 produces an output pulse at the count of 16 and that this output pulse is fed into the rejected characters counter 544 in a fashion such as to reset that counter to "0." Thus, the apparatus continues to read characters until it encounters a group, which may be any number up to 23 (16+7), and in which more than seven of the characters are unrecognized and rejected. Every time a total of sixteen characters is recognized without having more than seven rejected characters, then the rejected characters counter is reset to "0." The counting limits for the recognized characters counter 540 and the rejected characters counter 544 are arbitrarily selected.

The apparatus as described above initiates the decoding of the order of likeness matrix of the unrecognized specimens by utilizing as a first clue the identity of the specimen appearing the largest number of times in the least like column of the matrix. It may be that some matrices may be decoded more readily by utilizing some other clue, involving some other column or perhaps some other row, or some special configuration of the elements of the matrix. The circuitry may be appropriately modified to use the most convenient clue for the tentative identification of the first specimen. As a further alternative, the first tentative identification may be made arbitrarily, without reference to any clue in the matrix. If the first tentative identification is wrong, the checking apparatus will reject it, and a new tentative identification can be made. These tentative identifications can be repeated in a predetermined sequence, throughout the set of specimens collected, until one is found where the correctness of the tentative identification can be proved by the cross-checking methods described herein. Of course, such a hit-or-miss tentative identification method is relatively crude and clumsy as compared to the use of clues, which is the preferred method utilized by the specific apparatus disclosed herein. Nevertheless, it is a useful method and it has the advantage that it is universally adaptable to all matrices which may be encountered.

OPERATION WITH PLURAL REFERENCE MATRICES

The operation of the apparatus has been described above with a single reference matrix, as shown in FIG. 10. The apparatus may be readily adapted to operate with a plurality of reference matrices, which are not affine transformations of each other. The apparatus can in that fashion recognize fonts of characters which are not affine transformations of one another.

The particular reference matrix which is followed in the decoding operation of phase (3) is determined by the circuits energized by the cross-correlate clock CCC of FIG. 39 at particular times. In otherwords, where a plurality of matrices are to be used, a corresponding plurality of cross-correlate clocks must be provided, each set to energize particular circuits at particular times. The selection of a particular cross-correlate clock (and hence a particular reference matrix), for the decoding operation might be made, for example, by means of a stepping selector switch mechanism, or it might be made manually by an operator observing the incoming characters.

Where a plurality of reference matrices is used, the various design criteria, such as the bit count limits of FIG. 40, and the 2% difference of FIG. 29 must be modified so that those criteria are acceptable to the least sensitive of the plurality of matrices used.

Where a stepping selector switch mechanism is used to select the reference matrix to be checked for recognition, the most difficult matrix in the group should be checked first. At the time 193G, when the cross-checking operation is completed, if the six (or other required number) of cross-checks have not all been found to result in matches, then instead of erasing part of the data in the M memory as in the operation described above, the apparatus should shift to another matrix and proceed through the phase (3) of the operation as before but under the control of the cross-correlate clock associated with that new matrix.

Although the apparatus illustrated scans incoming specimens in the parallel mode of operation, i.e., by scanning all elemental areas of an incoming specimen simultaneously, and in fact operates in a substantially parallel mode, it will be apparent to those skilled in the art that equivalent apparatus could readily be designed to operate in the serial mode, i.e., by scanning the elemental areas successively.

The apparatus described herein recognizes specimens according to a two-dimensional order of likeness matrix illustrated in FIG. 10. In solving more complex problems, it may be desirable to base the solution on more than one variable condition, in which case the order of likeness matrix may be three-dimensional, or even n-dimensional.

While we have shown and described a preferred embodiment of our invention, other modifications thereof will readily occur to those skilled in the art, and we therefore intend our invention to be limited only by the appended claims.

What is claimed is:

1. Apparatus for identifying received specimens with corresponding members of a set of reference patterns having a predetermined order of likeness matrix with respect to sums of cross-correlation products thereof, comprising:

(a) means to assemble data measuring the corresponding sums of cross-correlation products of a set of unlike unrecognized specimens;

(b) means for determining the order of likeness matrix of the sums of cross-correlation products of the unlike unrecognized specimens;

(c) means for decoding the order of likeness matrix of the unrecognized specimens to determine whether there is a possible rearrangement of said last-mentioned matrix which will make it correspond, element for element, to the order of likeness matrix of the reference patterns; and (d) tagging means effective, if such a rearrangement is found, to identify each unlike unrecognized specimen in the rearranged matrix with the particular reference pattern which appears in the corresponding position in said order of likeness matrix of the reference patterns.

2. Apparatus as defined in claim 1, in which said data assembling means includes:

(a) means to compute the autocorrelation functions and normalized autocorrelation functions of each received specimen;

(b) means to store said computed functions;

(c) means to compute a set of cross-correlation functions of each received specimen and all the previously received specimens;

(d) means to compare the members of the set of cross-correlation functions; and (e) means controlled by said comparing means to reject the data associated with a newly received specimen if equal cross-correlation functions are found in the set.

3. Apparatus as defined in claim 2, including means to stop the data assembling means when the number of stored autocorrelation functions is equal to the number in the set of reference patterns.

4. Apparatus as defined in claim 1, in which:

(a) the order of likeness matrix of the reference patterns has rows and columns each equal in number to the patterns in the set, in which matrix: (1) each element is the sum of the terms of a cross-correlation product of two factors; (2) all the products from which the sums of each row are derived have one of said two factors in common, said one factor being derived from one of the set of reference patterns; (3) the set of the other of said two factors for the elements of each row are derived from the set of reference patterns; and (4) the sums in each row are arranged in order of magnitude; and (b) said order of likeness matrix determining means includes means to compute a specimen matrix in which the set of elements in each row of the matrix is derived by multiplying a first correlation function of a particular member of the set of unrecognized specimens times a set of second correlation functions of all the members of the set of unrecognized specimens.

5. Apparatus as defined in claim 4, in which said order of likeness matrix determining means includes means to arrange each row of the specimen matrix in the order of magnitude of the sums which constitute its elements.

6. Apparatus as defined in claim 5, in which said order of likeness matrix determining means includes:

(a) first memory means to exhibit for each row, the particular member of the set of unrecognized specimens whose correlation function is used as a first factor to derive all the sums in that row; and (b) second memory means to exhibit, for each sum in each row, the particular member of the set of unrecognized specimens whose correlation function is used as the second factor to derive that sum.

7. Apparatus as defined in claim 6, including:

(a) cross-checking means for comparing the specimen appearing in a particular position in the second memory means of one identified row with the specimen appearing in another particular position in the second memory means of another identified row to determine a match or mismatch between the respective second memory means; and (b) means effective upon occurrence of a mismatch to erase at least some of the assembled data and to initiate further operation of the data assembling means.

8. Apparatus as defined in claim 6, in which said tagging means includes:

(a) means to identify the member of the set of unrecognized specimens which appears the greatest number of times in the second memory means of the smallest magnitude column of the specimen matrix with that member of the set of reference patterns which appears correspondingly in the reference matrix; and (b) means to identify one row of the specimen matrix with the pattern identified by means (a).

9. Apparatus as defined in claim 8, including:

(a) means to identify at least some members of the set of unrecognized specimens by comparing their positions in the second memory means in said one row with the members of the set of reference patterns which appear in corresponding positions in the corresponding row of the reference matrix; and (b) means to identify particular rows of the specimen matrix with the patterns identified by means (a).

10. Apparatus as defined in claim 9, including further means to identify other members of the set of specimens from their positions in the second memory means of identified rows in the specimen matrix.

11. Apparatus for identifying received specimens with members of a set of known patterns having an order of likeness matrix, comprising:

(a) means for recognizing received specimens including:

(1) means for generating autocorrelation functions of the received specimens;

(2) means for multiplying a first correlation function of each received specimen by a set of second correlation functions of said set of reference patterns, at least one of said first and second functions being a normalized function, thereby producing a set of cross-correlation functions equal in number to the set of reference patterns;

(3) means for summing the terms of each cross-correlation function to produce a set of such sums;

(4) means for selecting from the set of sums the maximum sum and the next smaller sum;

(5) means for comparing the two selected sums to determine the difference between them; and (6) means for identifying the specimen with the reference pattern which produced the maximum sum, if that difference is greater than a predetermined minimum;

(b) means effective upon non-recognition of a predetermined number of specimens by said recognizing means to collect data defining first and second correlation functions of a set of unlike unrecognized specimens;

(c) means to compute a set of cross-correlation functions of the set of unlike specimens;

(d) means to sum each of the last-mentioned set of cross-correlation functions to produce a set of cross-correlation sums;

(e) means to arrange the cross-correlation sums in an order of likeness matrix;

(f) means to select the one specimen having the largest representation among the cross-correlation sums in the least like column of the matrix;

(g) means to sort the row of cross-correlation sums of the matrix which are derived from said one specimen to identify tentatively other specimens from the positions of their cross-correlation sums in said one row;

(h) means to compare the positions of the cross-correlation sums of the respective specimens in the tentatively identified rows with the positions of the cross-correlation sums of the corresponding reference patterns in the order of likeness matrix of the reference patterns; and (i) means to identify the set of unlike specimens if said comparing means shows substantial agreement between the two order of likeness matrices.

12. Apparatus as defined in claim 11, including:

(a) revising means effective if said comparing means (h) does not show said agreement to discard the data corresponding to at least one specimen, and to collect new data defining other unlike unrecognized specimens to complete the revised set; and (b) means for submitting the data revised by the revising means to the several means (c)–(h) as defined in claim 11.

13. Apparatus for identifying randomly ordered specimens having a common property, comprising:

(a) means for collecting a set of unlike specimens;

(b) means for deriving from said set a first function of said common property defining the correlation between the specimens of the set;

(c) means for comparing the first function with a second function of said property defining the correlation between a set of arbitrarily ordered patterns having the same common property;
(d) means for rearranging the terms of the first function into the same order as the terms of the second function; and
(e) means for changing the order of the unlike specimens to correspond to the rearrangement of the terms of the first function, and
(f) means for identifying each of the unlike specimens in the changed order with that particular one of the set of arbitrarily ordered patterns which appears in the corresponding position in the arbitrary order.

14. Specimen identification apparatus, comprising:
(a) means for computing, for a set of unlike specimens, an order of likeness matrix based on a set of cross-correlation products;
(b) memory means for said matrix including:
(1) a plurality of groups of word storage means, the number of groups being equal to the number of unlike specimens in the set, the number of word storage means in each group also being equal to the number of unlike specimens in the set;
(2) group identification means for identifying each group with one of the specimens; and
(3) word identification means for each word storage means, for identifying the respective members of the set of words in each group with the respective members of the set of unlike specimens;
(4) means for storing in each word storage means a cross-correlation sum derived from the cross-correlation product of a correlation function of the specimen identified in the associated word identification means times a correlation function of the specimen identified in the group identification means;
(c) means for tentatively identifying at least two members of the set of specimens with corresponding members of a set of known reference patterns having an order of likeness matrix;
(d) means to select from the memory means based on said tentative identification and on the order of likeness matrix of the reference patterns, at least one set of word storage means, each selected set consisting of one word storage means of each of a plurality of groups, in which the word identification means of each selected set have the same specimens stored if the tentative identification is correct;
(e) means to compare the identifications stored in the word identification means of each selected set of word storage means; and
(f) means effective when a predetermined number of said sets of word storage means show equalities in said comparisons to identify positively each member of the set of specimens with a corresponding member of the set of reference patterns.

15. Specimen identification apparatus as defined in claim 14, in which said tentative identification means comprises:
(a) means to arrange the words in each of said groups in numerical order; and
(b) means to select the specimen appearing the largest number of times in the word identification means for the lowest numerical word of all the groups, and to identify the specimen so selected with a particular pattern.

16. Specimen identification apparatus as defined in claim 14, including:
(a) means effective when any of said selected sets of word storage means shows an inequality in said comparison to discard at least one of the tentative identifications on which the comparison is based; and
(b) means to substitute a different tentative identification for each one discarded.

17. Apparatus for identifying members of a set of unknown specimens with respective members of a set of known reference patterns, comprising:
(a) means for computing an order of likeness matrix for the specimens;
(b) means for computing an order of likeness matrix for the patterns;
(c) means for tentatively identifying at least two of the specimens with two of the patterns;
(d) means for selecting, on the basis of the tentative identification and the pattern matrix, at least one set of positions in the specimen matrix in which the same specimens should appear if the tentative identification is correct;
(e) means for comparing the specimens in said selected set of positions; and
(f) means for confirming the tentative identification if the comparing means shows the specimens to be the same.

18. Apparatus as defined in claim 17, including:
(a) means responsive to said comparing means, and effective if the comparison shows the specimens to be different, to discard the original tentative identification and to substitute a new tentative identification; and
(b) means effective upon such substitution to recycle the selecting, comparing and confirming means based on the new tentative identification.

19. Apparatus as defined in claim 17, including:
(a) means in said tentatively identifying means to identify a predetermined number of specimens;
(b) means in said selecting means to select a corresponding predetermined number of sets of positions;
(c) discarding means effective if said comparing means shows differences in a number of said sets of positions substantially smaller than said corresponding predetermined number, to discard only those tentative identifications in connection with which the differences appear;
(d) means effective upon operation of said discarding means to substitute new tentative identifications for those discarded; and
(e) means effective upon such substitution to recycle the selecting, comparing and confirming means based on the new tentative identifications.

20. Apparatus as defined in claim 17, including:
(a) means in said tentatively identifying means to identify a predetermined number of specimens;
(b) means in said selecting means to select a corresponding predetermined number of sets of positions;
(c) discarding means effective if said comparing means shows differences in a number of said sets of positions equal to a second predetermined number, to discard all the tentative identifications;
(d) means effective upon operation of said discarding means to substitute new tentative identifications for those discarded; and
(e) means effective upon such substitution to recycle the selecting, comparing and confirming means based on the new tentative identifications.

21. Apparatus for identifying members of a set of unknown specimens with respective members of a set of known reference patterns, comprising:
(a) means for computing an order of likeness matrix for the specimens;
(b) means for computing an order of likeness matrix for the patterns;
(c) means for tentatively identifying a plurality but less than all of said specimens with a corresponding plurality of the patterns;
(d) means for selecting, on the basis of the tentative identification and the pattern matrix, a plurality of sets of positions in the specimen matrix in which the same specimens should appear in all the members of each set if the tentative identifications are correct;
(e) means for comparing the specimens in said sets of positions;
(f) means effective if the comparing means shows the specimens in each set to be the same, to confirm the tentative identification; and
(g) means operable after such confirmation to identify all the members of the set of specimens not previously identified on the basis of the two order of likeness matrices.

22. Apparatus for identifying unknown specimens with members of a set of known patterns, comprising:
(a) means for computing and storing an order of likeness matrix having one row of elements for each pattern in the set, said rows being arranged in a definitive order, each row being a row of the sums of the cross-correlation functions of one particular pattern and each of the set of patterns, said sums being arranged in their numerical order; said computing and storing means including:
  (1) storage means for identifying each row with said one particular pattern; and
  (2) storage means for identifying each element in the row with the other pattern which is a factor in the cross-correlation function of which the element is a sum;
(b) means to assemble data defining a set of unlike unrecognized specimens equal in number to said set of known patterns;
(c) means for computing and storing an order of likeness matrix for the specimens similar to the means for computing and storing the pattern matrix, except that the rows are arranged in random order and the identifications stored in the respective storage means are arbitrarily assigned;
(d) means for tentatively identifying at least two members of the set of specimens with a corresponding number of members of the set of known patterns, thereby tentatively identifying a corresponding number of the rows in the specimen matrix with respective rows in the pattern matrix;
(e) means to select, from the element identifying storage means in the tentatively identified rows, a set of element identifying means in which the same assigned identification should be stored if the tentative identification is correct;
(f) means to compare the specimens stored in the selected element identifying storage means, and to confirm the tentative identification of the specimens if the comparison shows equality; and
(g) means to repeat the operation of the tentative identifying means (d), the selecting means (e) and the comparing means (f) until all the rows in the specimen matrix have confirmed identifications with rows in the pattern matrix.

23. Specimen identification apparatus, comprising:
(a) means for recognizing received specimens that correspond with any of a set of reference patterns having a predetermined order of likeness matrix;
(b) means effective upon non-recognition of specimens by said recognizing means to assemble data defining a set of unlike, unrecognized specimens;
(c) means for determining the order of likeness matrix of the unlike, unrecognized specimens;
(d) means for decoding the order of likeness matrix of the unrecognized specimens to determine whether there is a possible rearrangement of said last-mentioned matrix which will make it correspond, element for element, to the order of likeness matrix of the reference patterns;
(e) tagging means effective, if such a rearrangement is found, to identify each unlike unrecognized specimen in the rearranged matrix with the particular reference pattern which appears in the corresponding position in said order of likeness matrix of the reference patterns; and
(f) means for comparing further received specimens with the tagged set of specimens to identify said further received specimens.

24. Apparatus for identifying received specimens with members of a set of reference patterns having a predetermined order of likeness matrix, comprising:
(a) means for assembling data defining a set of unlike received specimens;
(b) means for determining the order of likeness matrix of the unlike received specimens;
(c) means for decoding the order of likeness matrix of the unlike received specimens to determine whether there is a possible rearrangement of said last-mentioned matrix which will make it correspond, element for element, to the order of likeness matrix of the reference patterns; and
(d) tagging means effective, if such a rearrangement is found, to identify each unlike received specimen in the rearranged matrix with the particular reference pattern which appears in the corresponding position in said predetermined order of likeness matrix of said set of reference patterns.

25. Apparatus for identifying received specimens with members of one of a plurality of sets of reference patterns having predetermined order of likeness matrices, comprising:
(a) means for assembling data defining a set of unlike received specimens;
(b) means for determining the order of likeness matrix of the unlike received specimens;
(c) means for decoding the order of likeness matrix of the unrecognized specimens to determine whether there is a possible rearrangement of said last-mentioned matrix which will make it correspond, element for element, to any one of the order of likeness matrices of the sets of reference patterns;
(d) tagging means effective, if such a rearrangement is found, to identify each unlike received specimen in the rearranged order of likeness matrix of the received specimens with the particular reference pattern which appears in the corresponding position in the one order of likeness matrix of reference patterns with which correspondence was found.

26. Apparatus for identifying characters within a first class of statistically defined characters, comprising the steps of:
(a) means for analyzing the characters of the first class to establish a first measure of the relationship between said characters;
(b) means for computing, for each pair of characters of the first class, a numerical index of said relationship;
(c) means for arranging the set of indices computed for each character in numerical order;
(d) means for analyzing the characters of a second class, having known identifications, to establish a measure of the relationship between the characters of the second class;
(e) means for computing, for each pair of characters of the second class, a numerical index of the relationship;
(f) means for arranging the set of indices computed for each character of the second class in numerical order;
(g) means for comparing the sets of ordered indices of the second class of characters with the sets of ordered indices of the first class of characters to determine the presence or absence of correspondence between them; and
(h) means effective upon finding of correspondence between a set of indices of a character of the first class and a set of indices of a character of the second class, to identify said last-mentioned character of the first class with said last-mentioned character of the second class.

References Cited by the Examiner

UNITED STATES PATENTS

| | | | |
|---|---|---|---|
| 2,865,567 | 12/1958 | Booth et al. | 340—146.2 |
| 2,885,655 | 5/1959 | Brandenburg | 340—146.2 |
| 2,889,534 | 6/1959 | Smoliar | 235—177 |
| 2,910,667 | 10/1959 | Lubkin | 235—177 |
| 2,920,310 | 1/1960 | Sallach | 340—146.2 |
| 2,934,272 | 4/1960 | Ayres et al. | 340—146.2 |
| 3,034,103 | 5/1962 | Underwood | 340—146.2 |
| 3,090,945 | 5/1963 | Brandenburg | 340—146.2 |
| 3,167,740 | 1/1965 | King et al. | 340—146.2 |

FOREIGN PATENTS

| | | |
|---|---|---|
| 940,912 | 11/1963 | Great Britain. |

MAYNARD R. WILBUR, *Primary Examiner.*

MALCOLM MORRISON, *Examiner.*

J. E. SMITH, *Assistant Examiner.*